US012619304B2

(12) United States Patent (10) Patent No.: US 12,619,304 B2
Kelly et al. (45) Date of Patent: May 5, 2026

(54) DEVICE CONTROL USING GAZE INFORMATION

(71) Applicant: Apple Inc., Cupertino, CA (US)

(72) Inventors: Sean B. Kelly, San Francisco, CA (US); Felipe Bacim De Araujo E Silva, San Jose, CA (US); Karlin Y. Bark, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/829,038

(22) Filed: Sep. 9, 2024

(65) Prior Publication Data

US 2024/0427417 A1 Dec. 26, 2024

Related U.S. Application Data

(63) Continuation of application No. 18/105,191, filed on Feb. 2, 2023, now Pat. No. 12,105,874, which is a continuation of application No. 17/087,855, filed on Nov. 3, 2020, now Pat. No. 11,619,991, which is a continuation of application No. 16/553,622, filed on Aug. 28, 2019, now Pat. No. 10,860,096.

(60) Provisional application No. 62/739,087, filed on Sep. 28, 2018.

(51) Int. Cl.
 *G06F 3/01* (2006.01)
 *G06F 3/16* (2006.01)
 *G10L 15/22* (2006.01)
(52) U.S. Cl.
 CPC .............. *G06F 3/013* (2013.01); *G06F 3/165* (2013.01); *G06F 3/167* (2013.01); *G10L 15/22* (2013.01); *G10L 2015/223* (2013.01)

(58) Field of Classification Search
 CPC ...................................................... G06F 3/167
 See application file for complete search history.

(56) References Cited

U.S. PATENT DOCUMENTS

| | | |
|---|---|---|
| 5,229,764 A | 7/1993 | Matchett et al. |
| 5,237,159 A | 8/1993 | Stephens et al. |
| 5,265,007 A | 11/1993 | Barnhard, Jr. et al. |
| 5,484,988 A | 1/1996 | Hills et al. |
| 5,615,384 A | 3/1997 | Allard et al. |
| 5,691,524 A | 11/1997 | Josephson |

(Continued)

FOREIGN PATENT DOCUMENTS

| | | |
|---|---|---|
| AR | 060465 A1 | 6/2008 |
| AU | 2016100090 A4 | 3/2016 |

(Continued)

OTHER PUBLICATIONS

Brief Communication Regarding Oral Proceedings received for European Patent Application No. 20191533.7, mailed on Dec. 12, 2024, 1 page.

(Continued)

*Primary Examiner* — Nan-Ying Yang
(74) *Attorney, Agent, or Firm* — YHE Law LLP

(57) ABSTRACT

The present disclosure generally relates to controlling electronic devices. In some examples, the electronic device uses gaze information to activate a digital assistant. In some examples, the electronic device uses gaze information to identify an external device on which to act. In some examples, the electronic device provides an indication that distinguishes between different speakers.

18 Claims, 31 Drawing Sheets

(56) References Cited

U.S. PATENT DOCUMENTS

| | | | |
|---|---|---|---|
| 5,717,868 A | 2/1998 | James |
| 5,767,457 A | 6/1998 | Gerpheide et al. |
| 5,783,808 A | 7/1998 | Josephson |
| 5,801,763 A | 9/1998 | Suzuki |
| 5,828,773 A | 10/1998 | Setlak et al. |
| 5,838,306 A | 11/1998 | O'Connor et al. |
| 5,852,670 A | 12/1998 | Setlak et al. |
| 5,910,989 A | 6/1999 | Naccache |
| 5,933,134 A | 8/1999 | Shieh |
| 5,960,411 A | 9/1999 | Hartman et al. |
| 5,974,150 A | 10/1999 | Kaish et al. |
| 5,983,197 A | 11/1999 | Enta |
| 6,016,484 A | 1/2000 | Williams et al. |
| 6,064,429 A | 5/2000 | Belk et al. |
| 6,104,922 A | 8/2000 | Baumann |
| 6,111,517 A | 8/2000 | Atick et al. |
| 6,141,436 A | 10/2000 | Srey et al. |
| 6,151,208 A | 11/2000 | Bartlett |
| 6,151,593 A | 11/2000 | Cho et al. |
| 6,164,528 A | 12/2000 | Hills et al. |
| 6,173,402 B1 | 1/2001 | Chapman |
| 6,189,785 B1 | 2/2001 | Lowery |
| 6,192,380 B1 | 2/2001 | Light et al. |
| 6,193,152 B1 | 2/2001 | Fernando et al. |
| 6,219,793 B1 | 4/2001 | Li et al. |
| 6,230,148 B1 | 5/2001 | Pare, Jr. et al. |
| 6,260,027 B1 | 7/2001 | Takahashi et al. |
| 6,260,300 B1 | 7/2001 | Klebes et al. |
| 6,282,655 B1 | 8/2001 | Given |
| 6,289,114 B1 | 9/2001 | Mainguet |
| 6,317,835 B1 | 11/2001 | Bilger et al. |
| 6,323,846 B1 | 11/2001 | Westerman et al. |
| 6,328,207 B1 | 12/2001 | Gregoire et al. |
| 6,337,919 B1 | 1/2002 | Dunton |
| 6,374,145 B1 | 4/2002 | Lignoul |
| 6,398,646 B1 | 6/2002 | Wei et al. |
| 6,408,087 B1 | 6/2002 | Kramer |
| 6,421,453 B1 | 7/2002 | Kanevsky et al. |
| 6,560,711 B1 | 5/2003 | Given et al. |
| 6,570,557 B1 | 5/2003 | Westerman et al. |
| 6,573,883 B1 | 6/2003 | Bartlett |
| 6,581,042 B2 | 6/2003 | Pare, Jr. et al. |
| 6,618,806 B1 | 9/2003 | Brown et al. |
| 6,639,584 B1 | 10/2003 | Li |
| 6,644,546 B2 | 11/2003 | George et al. |
| 6,662,166 B2 | 12/2003 | Pare, Jr. et al. |
| 6,677,932 B1 | 1/2004 | Westerman |
| 6,709,333 B1 | 3/2004 | Bradford et al. |
| 6,714,665 B1 | 3/2004 | Hanna et al. |
| 6,720,860 B1 | 4/2004 | Narayanaswami |
| 6,795,569 B1 | 9/2004 | Setlak |
| 6,941,001 B1 | 9/2005 | Bolle et al. |
| 6,950,810 B2 | 9/2005 | Lapsley et al. |
| 6,970,855 B2 | 11/2005 | Das et al. |
| 6,980,081 B2 | 12/2005 | Anderson |
| 7,027,619 B2 | 4/2006 | Pavlidis et al. |
| 7,030,860 B1 | 4/2006 | Hsu et al. |
| 7,039,221 B1 | 5/2006 | Tumey et al. |
| 7,046,838 B1 | 5/2006 | Sakagawa et al. |
| 7,057,607 B2 | 6/2006 | Mayoraz et al. |
| 7,057,625 B2 | 6/2006 | Kamata et al. |
| 7,079,652 B1 | 7/2006 | Harris |
| 7,086,085 B1 | 8/2006 | Brown et al. |
| 7,099,845 B2 | 8/2006 | Higgins et al. |
| 7,099,850 B1 | 8/2006 | Mann, II et al. |
| 7,124,300 B1 | 10/2006 | Lemke |
| 7,130,454 B1 | 10/2006 | Berube et al. |
| 7,190,816 B2 | 3/2007 | Mitsuyu et al. |
| 7,239,728 B1 | 7/2007 | Choi et al. |
| 7,258,272 B2 | 8/2007 | Yoshizane et al. |
| 7,346,778 B1 | 3/2008 | Guiter et al. |
| 7,356,516 B2 | 4/2008 | Richey et al. |
| 7,359,880 B2 | 4/2008 | Abel et al. |
| 7,414,613 B2 | 8/2008 | Simelius |
| 7,415,720 B2 | 8/2008 | Jung |
| 7,420,546 B2 | 9/2008 | Abdallah et al. |
| 7,430,537 B2 | 9/2008 | Templeton et al. |
| 7,535,344 B2 | 5/2009 | Obradovich |
| 7,542,592 B2 | 6/2009 | Singh et al. |
| 7,546,470 B2 | 6/2009 | Schultz |
| 7,630,522 B2 | 12/2009 | Popp et al. |
| 7,633,076 B2 | 12/2009 | Huppi et al. |
| 7,644,019 B2 | 1/2010 | Woda et al. |
| 7,657,441 B2 | 2/2010 | Richey et al. |
| 7,657,849 B2 | 2/2010 | Chaudhri et al. |
| 7,676,748 B1 | 3/2010 | Barrus et al. |
| 7,689,508 B2 | 3/2010 | Davis et al. |
| 7,697,729 B2 | 4/2010 | Howell et al. |
| 7,705,737 B2 | 4/2010 | Senga |
| 7,730,401 B2 | 6/2010 | Gillespie et al. |
| 7,734,930 B2 | 6/2010 | Kirovski et al. |
| 7,738,916 B2 | 6/2010 | Fukuda |
| 7,860,536 B2 | 12/2010 | Jobs et al. |
| 7,860,936 B1 | 12/2010 | Newstadt et al. |
| 7,921,297 B2 | 4/2011 | Ortiz et al. |
| 8,006,299 B2 | 8/2011 | Suominen |
| 8,018,440 B2 | 9/2011 | Townsend et al. |
| 8,042,157 B2 | 10/2011 | Bennett et al. |
| 8,050,997 B1 | 11/2011 | Nosek et al. |
| 8,060,571 B2 | 11/2011 | Rao |
| 8,095,634 B2 | 1/2012 | Rao et al. |
| 8,131,848 B1 | 3/2012 | Denise |
| 8,145,912 B2 | 3/2012 | McLean |
| 8,157,164 B1 | 4/2012 | Billman |
| 8,195,507 B2 | 6/2012 | Postrel |
| 8,254,642 B2 | 8/2012 | Kobayashi et al. |
| 8,254,647 B1 | 8/2012 | Nechyba et al. |
| 8,311,514 B2 | 11/2012 | Bandyopadhyay et al. |
| 8,336,086 B2 | 12/2012 | Seo |
| 8,341,557 B2 | 12/2012 | Pisula et al. |
| 8,392,259 B2 | 3/2013 | MacGillivray et al. |
| 8,395,658 B2 | 3/2013 | Corson |
| 8,396,265 B1 | 3/2013 | Ross et al. |
| 8,418,075 B2 | 4/2013 | Gallo et al. |
| 8,438,400 B2 | 5/2013 | Hoghaug et al. |
| 8,452,654 B1 | 5/2013 | Wooters et al. |
| 8,452,978 B2 | 5/2013 | Alward et al. |
| 8,488,040 B2 | 7/2013 | Chen et al. |
| 8,526,915 B2 | 9/2013 | Kakiuchi et al. |
| 8,538,158 B1 | 9/2013 | Denise |
| 8,543,834 B1 | 9/2013 | Barra |
| 8,560,004 B1 | 10/2013 | Tsvetkov et al. |
| 8,581,877 B2 | 11/2013 | Yoo |
| 8,583,549 B1 | 11/2013 | Mohsenzadeh |
| 8,594,374 B1 | 11/2013 | Bozarth |
| 8,606,512 B1 | 12/2013 | Bogovich et al. |
| 8,606,640 B2 | 12/2013 | Brody et al. |
| 8,619,050 B2 | 12/2013 | Herz et al. |
| 8,638,385 B2 | 1/2014 | Bhogal |
| 8,639,621 B1 | 1/2014 | Kennedy et al. |
| 8,646,060 B1 | 2/2014 | Ben Ayed |
| 8,679,012 B1 | 3/2014 | Kayyali |
| 8,762,272 B1 | 6/2014 | Cozens et al. |
| 8,763,896 B2 | 7/2014 | Kushevsky et al. |
| 8,769,624 B2 | 7/2014 | Cotterill |
| 8,782,775 B2 | 7/2014 | Fadell et al. |
| 8,788,838 B1 | 7/2014 | Fadell et al. |
| 8,831,677 B2 | 9/2014 | Villa-Real |
| 8,856,541 B1 | 10/2014 | Chaudhury et al. |
| 8,886,953 B1 | 11/2014 | Sipe et al. |
| 8,892,474 B1 | 11/2014 | Inskeep et al. |
| 8,904,479 B1 | 12/2014 | Johansson et al. |
| 8,943,580 B2 | 1/2015 | Fadell et al. |
| 8,949,618 B1 | 2/2015 | Lee et al. |
| 8,949,902 B1 | 2/2015 | Fabian-Isaacs et al. |
| 8,963,806 B1 | 2/2015 | Starner et al. |
| 8,983,846 B2 | 3/2015 | Di Profio et al. |
| 8,988,490 B2 | 3/2015 | Fujii |
| 8,994,499 B2 | 3/2015 | Zhao et al. |
| 9,002,322 B2 | 4/2015 | Cotterill |
| 9,031,847 B2 | 5/2015 | Sarin et al. |
| 9,031,872 B1 | 5/2015 | Foster |
| 9,038,167 B2 | 5/2015 | Fadell et al. |
| 9,053,293 B2 | 6/2015 | Latzina |

(56)  References Cited

U.S. PATENT DOCUMENTS

| | | | |
|---|---|---|---|
| 9,098,931 B2 | 8/2015 | Shpunt et al. |
| 9,128,601 B2 | 9/2015 | Fadell et al. |
| 9,134,896 B2 | 9/2015 | Fadell et al. |
| 9,170,645 B2 | 10/2015 | Park et al. |
| 9,177,130 B2 | 11/2015 | Nechyba et al. |
| 9,179,298 B2 | 11/2015 | Jung et al. |
| 9,250,795 B2 | 2/2016 | Fadell et al. |
| 9,253,223 B1 | 2/2016 | Cushing et al. |
| 9,253,375 B2 | 2/2016 | Milanfar et al. |
| 9,269,083 B1 | 2/2016 | Jarajapu et al. |
| 9,269,196 B1 | 2/2016 | Fan et al. |
| 9,274,647 B2 | 3/2016 | Fadell et al. |
| 9,294,476 B1 | 3/2016 | Lurey et al. |
| 9,304,624 B2 | 4/2016 | Fadell et al. |
| 9,305,155 B1 | 4/2016 | Vo et al. |
| 9,324,067 B2 | 4/2016 | Van Os et al. |
| 9,329,771 B2 | 5/2016 | Fadell et al. |
| 9,331,970 B2 | 5/2016 | Yuen et al. |
| 9,349,035 B1 | 5/2016 | Gerber et al. |
| 9,355,234 B1 | 5/2016 | Magi Shaashua et al. |
| 9,357,391 B1 | 5/2016 | Alsvig et al. |
| 9,411,460 B2 | 8/2016 | Dumont et al. |
| 9,451,210 B1 | 9/2016 | Smus |
| 9,477,872 B2 | 10/2016 | Sarve et al. |
| 9,483,763 B2 | 11/2016 | Van Os et al. |
| 9,495,531 B2 | 11/2016 | Fadell et al. |
| 9,519,771 B2 | 12/2016 | Fadell et al. |
| 9,519,901 B1 | 12/2016 | Dorogusker |
| 9,526,127 B1 | 12/2016 | Taubman et al. |
| 9,558,636 B1 | 1/2017 | Burdick |
| 9,569,605 B1 | 2/2017 | Schneider et al. |
| 9,569,655 B2 | 2/2017 | Harper |
| 9,600,709 B2 | 3/2017 | Russo |
| 9,613,245 B1 | 4/2017 | Eltoft et al. |
| 9,678,571 B1 | 6/2017 | Robert et al. |
| 9,716,825 B1 | 7/2017 | Manzari et al. |
| 9,753,541 B1 | 9/2017 | Robert et al. |
| 9,788,203 B2 | 10/2017 | Dutt et al. |
| 9,817,549 B2 | 11/2017 | Chandrasekaran |
| 9,847,999 B2 | 12/2017 | Van Os et al. |
| 9,851,214 B1 | 12/2017 | Chintakindi |
| 9,876,788 B1 | 1/2018 | Ziraknejad et al. |
| 9,881,198 B2 | 1/2018 | Lee et al. |
| 9,898,642 B2 | 2/2018 | Han et al. |
| 9,913,246 B1 | 3/2018 | Carey et al. |
| 9,953,149 B2 | 4/2018 | Tussy |
| 9,965,039 B2 | 5/2018 | Kwon |
| 9,984,270 B2 | 5/2018 | Yousefpor et al. |
| 10,003,738 B2 | 6/2018 | Lautenbach et al. |
| 10,019,904 B1 | 7/2018 | Chan et al. |
| 10,073,541 B1 | 9/2018 | Baldwin |
| 10,089,607 B2 | 10/2018 | Ziat et al. |
| 10,148,912 B1 * | 12/2018 | Oliver .................. H04L 65/403 |
| 10,163,105 B1 | 12/2018 | Ziraknejad et al. |
| 10,199,051 B2 | 2/2019 | Binder et al. |
| 10,334,054 B2 | 6/2019 | Van Os et al. |
| 10,410,035 B2 | 9/2019 | Han et al. |
| 10,440,574 B2 | 10/2019 | Ledvina et al. |
| 10,482,461 B2 | 11/2019 | Van Os et al. |
| 10,749,967 B2 | 8/2020 | Van Os et al. |
| 10,802,582 B1 | 10/2020 | Clements |
| 10,803,281 B2 | 10/2020 | Han et al. |
| 10,805,758 B2 | 10/2020 | Norris et al. |
| 10,861,104 B1 | 12/2020 | Young |
| 10,931,813 B1 | 2/2021 | Kim et al. |
| 10,943,382 B2 | 3/2021 | Shapiro et al. |
| 10,971,171 B2 | 4/2021 | Davis et al. |
| 11,100,349 B2 | 8/2021 | Cohen et al. |
| 11,106,280 B1 | 8/2021 | Bigham et al. |
| 11,291,776 B2 | 4/2022 | Plumptre |
| 11,751,053 B2 | 9/2023 | Lee et al. |
| 11,907,421 B1 | 2/2024 | Clements |
| 2001/0030715 A1 | 10/2001 | Tabata |
| 2001/0031072 A1 | 10/2001 | Dobashi et al. |
| 2001/0039497 A1 | 11/2001 | Hubbard |
| 2001/0044906 A1 | 11/2001 | Kanevsky et al. |
| 2001/0047365 A1 | 11/2001 | Yonaitis |
| 2001/0047488 A1 | 11/2001 | Verplaetse et al. |
| 2002/0002682 A1 | 1/2002 | Tsuchiyama et al. |
| 2002/0004760 A1 | 1/2002 | Yoshida et al. |
| 2002/0015024 A1 | 2/2002 | Westerman et al. |
| 2002/0046064 A1 | 4/2002 | Maury et al. |
| 2002/0059295 A1 | 5/2002 | Ludtke et al. |
| 2002/0061130 A1 | 5/2002 | Kirk et al. |
| 2002/0065774 A1 | 5/2002 | Young et al. |
| 2002/0095588 A1 | 7/2002 | Shigematsu et al. |
| 2002/0097145 A1 | 7/2002 | Tumey et al. |
| 2002/0109668 A1 | 8/2002 | Rosenberg et al. |
| 2002/0136435 A1 | 9/2002 | Prokoski |
| 2002/0141586 A1 | 10/2002 | Margalit et al. |
| 2002/0190960 A1 | 12/2002 | Kuo et al. |
| 2002/0191029 A1 | 12/2002 | Gillespie et al. |
| 2002/0191816 A1 | 12/2002 | Maritzen et al. |
| 2002/0191817 A1 | 12/2002 | Sato et al. |
| 2003/0006280 A1 | 1/2003 | Seita et al. |
| 2003/0028639 A1 | 2/2003 | Yamamoto et al. |
| 2003/0038754 A1 | 2/2003 | Goldstein et al. |
| 2003/0046557 A1 | 3/2003 | Miller et al. |
| 2003/0048173 A1 | 3/2003 | Shigematsu et al. |
| 2003/0059092 A1 | 3/2003 | Okubo et al. |
| 2003/0097413 A1 | 5/2003 | Vishik et al. |
| 2003/0103652 A1 | 6/2003 | Lee et al. |
| 2003/0115490 A1 | 6/2003 | Russo et al. |
| 2003/0118217 A1 | 6/2003 | Kondo et al. |
| 2003/0120934 A1 | 6/2003 | Ortiz |
| 2003/0132974 A1 | 7/2003 | Bodin |
| 2003/0138136 A1 | 7/2003 | Umezaki et al. |
| 2003/0141959 A1 | 7/2003 | Keogh et al. |
| 2003/0149929 A1 | 8/2003 | White |
| 2003/0160815 A1 | 8/2003 | Muschetto |
| 2003/0163710 A1 | 8/2003 | Ortiz et al. |
| 2003/0188183 A1 | 10/2003 | Lee et al. |
| 2003/0200184 A1 | 10/2003 | Dominguez et al. |
| 2003/0210127 A1 | 11/2003 | Anderson |
| 2003/0236746 A1 | 12/2003 | Turner et al. |
| 2004/0010722 A1 | 1/2004 | Ha |
| 2004/0030934 A1 | 2/2004 | Mizoguchi et al. |
| 2004/0059590 A1 | 3/2004 | Mercredi et al. |
| 2004/0073432 A1 | 4/2004 | Stone |
| 2004/0076310 A1 | 4/2004 | Hersch et al. |
| 2004/0085300 A1 | 5/2004 | Matusis et al. |
| 2004/0085351 A1 | 5/2004 | Tokkonen |
| 2004/0088564 A1 | 5/2004 | Norman |
| 2004/0091136 A1 | 5/2004 | Dombrowski |
| 2004/0113819 A1 | 6/2004 | Gauthey et al. |
| 2004/0122685 A1 | 6/2004 | Bunce |
| 2004/0131237 A1 | 7/2004 | Machida |
| 2004/0135801 A1 | 7/2004 | Thompson et al. |
| 2004/0137890 A1 | 7/2004 | Kalke |
| 2004/0143553 A1 | 7/2004 | Torget et al. |
| 2004/0151347 A1 | 8/2004 | Wisniewski |
| 2004/0172562 A1 | 9/2004 | Berger et al. |
| 2004/0181695 A1 | 9/2004 | Walker et al. |
| 2004/0190758 A1 | 9/2004 | Doi et al. |
| 2004/0196400 A1 | 10/2004 | Stavely et al. |
| 2004/0210771 A1 | 10/2004 | Wood et al. |
| 2004/0215572 A1 | 10/2004 | Uehara et al. |
| 2004/0229560 A1 | 11/2004 | Maloney |
| 2004/0230843 A1 | 11/2004 | Jansen |
| 2004/0239481 A1 | 12/2004 | Beenau et al. |
| 2004/0239648 A1 | 12/2004 | Abdallah et al. |
| 2004/0239732 A1 | 12/2004 | Silverbrook |
| 2004/0242200 A1 | 12/2004 | Maeoka et al. |
| 2004/0250138 A1 | 12/2004 | Schneider |
| 2004/0252867 A1 | 12/2004 | Lan et al. |
| 2004/0254891 A1 | 12/2004 | Blinn et al. |
| 2004/0257196 A1 | 12/2004 | Kotzin |
| 2004/0260955 A1 | 12/2004 | Mantyla |
| 2005/0024341 A1 | 2/2005 | Gillespie et al. |
| 2005/0028082 A1 | 2/2005 | Topalov et al. |
| 2005/0040962 A1 | 2/2005 | Funkhouser et al. |
| 2005/0041841 A1 | 2/2005 | Yoo et al. |
| 2005/0060554 A1 | 3/2005 | O'Donoghue |
| 2005/0071188 A1 | 3/2005 | Thuerk |

(56)                References Cited

U.S. PATENT DOCUMENTS

| | | |
|---|---|---|
| 2005/0071635 A1 | 3/2005 | Furuyama |
| 2005/0071647 A1 | 3/2005 | Fujinuma et al. |
| 2005/0074147 A1 | 4/2005 | Smith et al. |
| 2005/0078855 A1 | 4/2005 | Chandler et al. |
| 2005/0079896 A1 | 4/2005 | Kokko et al. |
| 2005/0091213 A1 | 4/2005 | Schutz et al. |
| 2005/0093834 A1 | 5/2005 | Abdallah et al. |
| 2005/0093868 A1 | 5/2005 | Hinckley |
| 2005/0096009 A1 | 5/2005 | Ackley |
| 2005/0097037 A1 | 5/2005 | Tibor |
| 2005/0097171 A1 | 5/2005 | Hikichi |
| 2005/0097608 A1 | 5/2005 | Penke et al. |
| 2005/0100198 A1 | 5/2005 | Nakano et al. |
| 2005/0105778 A1 | 5/2005 | Sung et al. |
| 2005/0110801 A1 | 5/2005 | Lin |
| 2005/0111708 A1 | 5/2005 | Chou |
| 2005/0113071 A1 | 5/2005 | Nagata |
| 2005/0114686 A1 | 5/2005 | Ball et al. |
| 2005/0116840 A1 | 6/2005 | Simelius |
| 2005/0137015 A1 | 6/2005 | Rogers et al. |
| 2005/0144452 A1 | 6/2005 | Lynch et al. |
| 2005/0169503 A1 | 8/2005 | Howell et al. |
| 2005/0174325 A1 | 8/2005 | Setlak et al. |
| 2005/0187873 A1 | 8/2005 | Labrou et al. |
| 2005/0190059 A1 | 9/2005 | Wehrenberg |
| 2005/0204173 A1 | 9/2005 | Chang |
| 2005/0206501 A1 | 9/2005 | Farhat |
| 2005/0220304 A1 | 10/2005 | Lenoir et al. |
| 2005/0221798 A1 | 10/2005 | Sengupta et al. |
| 2005/0226472 A1 | 10/2005 | Komura et al. |
| 2005/0231625 A1 | 10/2005 | Parulski et al. |
| 2005/0250538 A1 | 11/2005 | Narasimhan et al. |
| 2005/0253817 A1 | 11/2005 | Rytivaara et al. |
| 2005/0254086 A1 | 11/2005 | Shouno |
| 2006/0017692 A1 | 1/2006 | Wehrenberg et al. |
| 2006/0021003 A1 | 1/2006 | Fisher et al. |
| 2006/0029262 A1 | 2/2006 | Fujimatsu et al. |
| 2006/0032908 A1 | 2/2006 | Sines |
| 2006/0036553 A1 | 2/2006 | Gupta et al. |
| 2006/0039686 A1 | 2/2006 | Soh et al. |
| 2006/0046699 A1 | 3/2006 | Guyot et al. |
| 2006/0056664 A1 | 3/2006 | Iwasaki |
| 2006/0075228 A1 | 4/2006 | Black et al. |
| 2006/0075250 A1 | 4/2006 | Liao |
| 2006/0078176 A1 | 4/2006 | Abiko et al. |
| 2006/0080525 A1 | 4/2006 | Ritter et al. |
| 2006/0093183 A1 | 5/2006 | Hosoi et al. |
| 2006/0093192 A1 | 5/2006 | Bechtel |
| 2006/0097172 A1 | 5/2006 | Park |
| 2006/0102843 A1 | 5/2006 | Bazakos et al. |
| 2006/0104488 A1 | 5/2006 | Bazakos et al. |
| 2006/0107067 A1 | 5/2006 | Safal et al. |
| 2006/0115130 A1 | 6/2006 | Kozlay |
| 2006/0116555 A1 | 6/2006 | Pavlidis et al. |
| 2006/0120707 A1 | 6/2006 | Kusakari et al. |
| 2006/0136087 A1 | 6/2006 | Higashiura |
| 2006/0136734 A1 | 6/2006 | Telek et al. |
| 2006/0156228 A1 | 7/2006 | Gallo et al. |
| 2006/0161870 A1 | 7/2006 | Hotelling et al. |
| 2006/0161871 A1 | 7/2006 | Hotelling et al. |
| 2006/0165060 A1 | 7/2006 | Dua et al. |
| 2006/0192775 A1 | 8/2006 | Nicholson et al. |
| 2006/0192868 A1 | 8/2006 | Wakamori |
| 2006/0198514 A1 | 9/2006 | Lyseggen et al. |
| 2006/0206709 A1 | 9/2006 | Labrou et al. |
| 2006/0206724 A1 | 9/2006 | Schaufele et al. |
| 2006/0208065 A1 | 9/2006 | Mendelovich et al. |
| 2006/0214910 A1 | 9/2006 | Mizuno et al. |
| 2006/0215886 A1 | 9/2006 | Black |
| 2006/0219776 A1 | 10/2006 | Finn |
| 2006/0224645 A1 | 10/2006 | Kadi |
| 2006/0234764 A1 | 10/2006 | Gamo et al. |
| 2006/0239517 A1 | 10/2006 | Creasey et al. |
| 2006/0274920 A1 | 12/2006 | Tochikubo et al. |
| 2006/0280340 A1 | 12/2006 | Derakhshani et al. |
| 2006/0282671 A1 | 12/2006 | Burton |
| 2006/0282682 A1 | 12/2006 | Masaki et al. |
| 2006/0285663 A1 | 12/2006 | Rathus et al. |
| 2006/0288082 A1 | 12/2006 | Rosenberg et al. |
| 2006/0288226 A1 | 12/2006 | Kowal |
| 2006/0294007 A1 | 12/2006 | Barthelemy |
| 2006/0294025 A1 | 12/2006 | Mengerink |
| 2006/0294465 A1 | 12/2006 | Ronen et al. |
| 2007/0008066 A1 | 1/2007 | Fukuda |
| 2007/0009139 A1 | 1/2007 | Landschaft et al. |
| 2007/0014439 A1 | 1/2007 | Ando et al. |
| 2007/0016958 A1 | 1/2007 | Bodepudi et al. |
| 2007/0021194 A1 | 1/2007 | Aida |
| 2007/0024579 A1 | 2/2007 | Rosenberg |
| 2007/0025723 A1 | 2/2007 | Baudisch et al. |
| 2007/0061126 A1 | 3/2007 | Russo et al. |
| 2007/0061889 A1 | 3/2007 | Sainaney et al. |
| 2007/0067642 A1 | 3/2007 | Singhal |
| 2007/0073649 A1 | 3/2007 | Kikkoji et al. |
| 2007/0075965 A1 | 4/2007 | Huppi et al. |
| 2007/0079137 A1 | 4/2007 | Tu |
| 2007/0081081 A1 | 4/2007 | Cheng |
| 2007/0089164 A1 | 4/2007 | Gao et al. |
| 2007/0106942 A1 | 5/2007 | Sanaka et al. |
| 2007/0109274 A1 | 5/2007 | Reynolds |
| 2007/0110287 A1 | 5/2007 | Kim et al. |
| 2007/0113181 A1 | 5/2007 | Blattner et al. |
| 2007/0126859 A1 | 6/2007 | Choi et al. |
| 2007/0143628 A1 | 6/2007 | Genda |
| 2007/0150842 A1 | 6/2007 | Chaudhri et al. |
| 2007/0156521 A1 | 7/2007 | Yates |
| 2007/0168863 A1 | 7/2007 | Blattner et al. |
| 2007/0180062 A1 | 8/2007 | Southerland et al. |
| 2007/0180492 A1 | 8/2007 | Hassan et al. |
| 2007/0186106 A1 | 8/2007 | Ting et al. |
| 2007/0189583 A1 | 8/2007 | Shimada et al. |
| 2007/0192168 A1 | 8/2007 | Van |
| 2007/0194113 A1 | 8/2007 | Esplin et al. |
| 2007/0200916 A1 | 8/2007 | Han |
| 2007/0201730 A1 | 8/2007 | Masaki et al. |
| 2007/0204037 A1 | 8/2007 | Kunz et al. |
| 2007/0208743 A1 | 9/2007 | Sainaney et al. |
| 2007/0219901 A1 | 9/2007 | Garbow et al. |
| 2007/0220273 A1 | 9/2007 | Campisi |
| 2007/0226778 A1 | 9/2007 | Pietruszka |
| 2007/0230773 A1 | 10/2007 | Nagao et al. |
| 2007/0236330 A1 | 10/2007 | Cho et al. |
| 2007/0236475 A1 | 10/2007 | Wherry |
| 2007/0239921 A1 | 10/2007 | Toorians et al. |
| 2007/0244811 A1 | 10/2007 | Tumminaro |
| 2007/0250573 A1 | 10/2007 | Rothschild et al. |
| 2007/0253604 A1 | 11/2007 | Inoue et al. |
| 2007/0255564 A1 | 11/2007 | Yee et al. |
| 2007/0259716 A1 | 11/2007 | Mattice et al. |
| 2007/0260547 A1 | 11/2007 | Little |
| 2007/0277224 A1 | 11/2007 | Osborn et al. |
| 2007/0280515 A1 | 12/2007 | Goto |
| 2007/0287423 A1 | 12/2007 | Kakiuchi et al. |
| 2007/0291997 A1 | 12/2007 | Mason |
| 2007/0294182 A1 | 12/2007 | Hammad |
| 2008/0001703 A1 | 1/2008 | Goto |
| 2008/0030496 A1 | 2/2008 | Lee et al. |
| 2008/0032801 A1 | 2/2008 | Brunet De Courssou |
| 2008/0041936 A1 | 2/2008 | Vawter |
| 2008/0042866 A1 | 2/2008 | Morse et al. |
| 2008/0042983 A1 | 2/2008 | Kim et al. |
| 2008/0048878 A1 | 2/2008 | Boillot |
| 2008/0049984 A1 | 2/2008 | Poo et al. |
| 2008/0054081 A1 | 3/2008 | Mullen |
| 2008/0059351 A1 | 3/2008 | Richey et al. |
| 2008/0069412 A1 | 3/2008 | Champagne et al. |
| 2008/0072045 A1 | 3/2008 | Mizrah |
| 2008/0084539 A1 | 4/2008 | Daniel |
| 2008/0092245 A1 | 4/2008 | Alward et al. |
| 2008/0114678 A1 | 5/2008 | Bennett et al. |
| 2008/0114980 A1 | 5/2008 | Sridhar |
| 2008/0133931 A1 | 6/2008 | Kosaka |
| 2008/0140868 A1 | 6/2008 | Kalayjian et al. |
| 2008/0156028 A1 | 7/2008 | Cur et al. |

(56) References Cited

U.S. PATENT DOCUMENTS

| | | |
|---|---|---|
| 2008/0165255 A1 | 7/2008 | Christie et al. |
| 2008/0167834 A1 | 7/2008 | Herz et al. |
| 2008/0172598 A1 | 7/2008 | Jacobsen et al. |
| 2008/0178283 A1 | 7/2008 | Pratt et al. |
| 2008/0208762 A1 | 8/2008 | Arthur et al. |
| 2008/0212849 A1 | 9/2008 | Gao |
| 2008/0218535 A1 | 9/2008 | Forstall et al. |
| 2008/0218641 A1 | 9/2008 | Kjeldsen et al. |
| 2008/0229409 A1 | 9/2008 | Miller et al. |
| 2008/0231729 A1 | 9/2008 | Sato et al. |
| 2008/0246917 A1 | 10/2008 | Phinney et al. |
| 2008/0250481 A1 | 10/2008 | Beck et al. |
| 2008/0275779 A1 | 11/2008 | Lakshminarayanan |
| 2008/0288234 A1 | 11/2008 | Nelson et al. |
| 2008/0292144 A1 | 11/2008 | Kim et al. |
| 2008/0309632 A1 | 12/2008 | Westerman et al. |
| 2008/0314971 A1 | 12/2008 | Faith et al. |
| 2008/0317292 A1 | 12/2008 | Baker et al. |
| 2008/0319875 A1 | 12/2008 | Levchin et al. |
| 2008/0320391 A1 | 12/2008 | Lemay et al. |
| 2009/0005165 A1 | 1/2009 | Arezina et al. |
| 2009/0006292 A1 | 1/2009 | Block |
| 2009/0006991 A1 | 1/2009 | Lindberg et al. |
| 2009/0016574 A1 | 1/2009 | Tsukahara |
| 2009/0031375 A1 | 1/2009 | Sullivan et al. |
| 2009/0036165 A1 | 2/2009 | Brede |
| 2009/0037742 A1 | 2/2009 | Narayanaswami |
| 2009/0054044 A1 | 2/2009 | Ikemori et al. |
| 2009/0055484 A1 | 2/2009 | Vuong et al. |
| 2009/0061837 A1 | 3/2009 | Chaudhri et al. |
| 2009/0063851 A1 | 3/2009 | Nijdam |
| 2009/0064055 A1 | 3/2009 | Chaudhri et al. |
| 2009/0067685 A1 | 3/2009 | Boshra et al. |
| 2009/0074255 A1 | 3/2009 | Holm |
| 2009/0082066 A1 | 3/2009 | Katz |
| 2009/0083847 A1 | 3/2009 | Fadell et al. |
| 2009/0083850 A1 | 3/2009 | Fadell et al. |
| 2009/0094681 A1 | 4/2009 | Sadler et al. |
| 2009/0106558 A1 | 4/2009 | Delgrosso et al. |
| 2009/0119754 A1 | 5/2009 | Schubert |
| 2009/0122149 A1 | 5/2009 | Ishii |
| 2009/0144074 A1 | 6/2009 | Choi |
| 2009/0146779 A1 | 6/2009 | Kumar et al. |
| 2009/0158390 A1 | 6/2009 | Guan |
| 2009/0159696 A1 | 6/2009 | Mullen |
| 2009/0160609 A1 | 6/2009 | Lin et al. |
| 2009/0164878 A1 | 6/2009 | Cottrille |
| 2009/0165107 A1 | 6/2009 | Tojo et al. |
| 2009/0168756 A1 | 7/2009 | Kurapati et al. |
| 2009/0175509 A1 | 7/2009 | Gonion et al. |
| 2009/0176565 A1 | 7/2009 | Kelly et al. |
| 2009/0187423 A1 | 7/2009 | Kim |
| 2009/0193514 A1 | 7/2009 | Adams et al. |
| 2009/0199188 A1 | 8/2009 | Fujimaki |
| 2009/0201257 A1 | 8/2009 | Saitoh et al. |
| 2009/0210308 A1 | 8/2009 | Toomer et al. |
| 2009/0215533 A1 | 8/2009 | Zalewski et al. |
| 2009/0224874 A1 | 9/2009 | Dewar et al. |
| 2009/0228938 A1 | 9/2009 | White et al. |
| 2009/0241169 A1 | 9/2009 | Dhand et al. |
| 2009/0258667 A1 | 10/2009 | Suzuki et al. |
| 2009/0262947 A1 | 10/2009 | Karlsson et al. |
| 2009/0300525 A1 | 12/2009 | Jolliff et al. |
| 2009/0307139 A1 | 12/2009 | Mardikar et al. |
| 2009/0310828 A1 | 12/2009 | Kakadiaris et al. |
| 2009/0312049 A1 | 12/2009 | Isomursu |
| 2009/0313584 A1 | 12/2009 | Kerr et al. |
| 2009/0327744 A1 | 12/2009 | Hatano et al. |
| 2009/0328162 A1 | 12/2009 | Kokumai et al. |
| 2010/0008545 A1 | 1/2010 | Ueki et al. |
| 2010/0011424 A1 | 1/2010 | Ushiku |
| 2010/0026640 A1 | 2/2010 | Kim et al. |
| 2010/0027854 A1 | 2/2010 | Chatterjee et al. |
| 2010/0034432 A1 | 2/2010 | Ono et al. |
| 2010/0042835 A1 | 2/2010 | Lee et al. |
| 2010/0066822 A1 | 3/2010 | Steinberg et al. |
| 2010/0082462 A1 | 4/2010 | Yuan et al. |
| 2010/0082481 A1 | 4/2010 | Lin et al. |
| 2010/0085416 A1 | 4/2010 | Hegde et al. |
| 2010/0088148 A1 | 4/2010 | Presswala et al. |
| 2010/0098300 A1 | 4/2010 | Otto et al. |
| 2010/0107229 A1 | 4/2010 | Najafi et al. |
| 2010/0114731 A1 | 5/2010 | Kingston et al. |
| 2010/0124363 A1 | 5/2010 | Ek et al. |
| 2010/0131303 A1 | 5/2010 | Collopy et al. |
| 2010/0146384 A1 | 6/2010 | Peev et al. |
| 2010/0153265 A1 | 6/2010 | Hershfield et al. |
| 2010/0158327 A1 | 6/2010 | Kangas et al. |
| 2010/0164684 A1 | 7/2010 | Sasa et al. |
| 2010/0185871 A1 | 7/2010 | Scherrer et al. |
| 2010/0191570 A1 | 7/2010 | Michaud et al. |
| 2010/0205091 A1 | 8/2010 | Graziano et al. |
| 2010/0207721 A1 | 8/2010 | Nakajima et al. |
| 2010/0216425 A1 | 8/2010 | Smith |
| 2010/0217808 A1 | 8/2010 | Benninger |
| 2010/0223145 A1 | 9/2010 | Dragt |
| 2010/0225607 A1 | 9/2010 | Kim |
| 2010/0231356 A1 | 9/2010 | Kim |
| 2010/0240415 A1 | 9/2010 | Kim et al. |
| 2010/0243741 A1 | 9/2010 | Eng |
| 2010/0251243 A1 | 9/2010 | Gill et al. |
| 2010/0265204 A1 | 10/2010 | Tsuda |
| 2010/0267362 A1 | 10/2010 | Smith et al. |
| 2010/0269156 A1 | 10/2010 | Hohlfeld et al. |
| 2010/0273461 A1 | 10/2010 | Choi |
| 2010/0302016 A1 | 12/2010 | Zaborowski |
| 2010/0311397 A1 | 12/2010 | Li |
| 2010/0313263 A1 | 12/2010 | Uchida et al. |
| 2011/0013813 A1 | 1/2011 | Yamamoto et al. |
| 2011/0032274 A1 | 2/2011 | Miyata |
| 2011/0035799 A1 | 2/2011 | Handler |
| 2011/0050976 A1 | 3/2011 | Kwon |
| 2011/0052013 A1 | 3/2011 | Sasahara et al. |
| 2011/0054268 A1 | 3/2011 | Fidacaro et al. |
| 2011/0055763 A1 | 3/2011 | Utsuki et al. |
| 2011/0065479 A1 | 3/2011 | Nader |
| 2011/0067098 A1 | 3/2011 | Ruggiero et al. |
| 2011/0088086 A1 | 4/2011 | Swink et al. |
| 2011/0099079 A1 | 4/2011 | White et al. |
| 2011/0119610 A1 | 5/2011 | Hackborn et al. |
| 2011/0122294 A1 | 5/2011 | Suh et al. |
| 2011/0138166 A1 | 6/2011 | Peszek et al. |
| 2011/0142234 A1 | 6/2011 | Rogers |
| 2011/0145049 A1 | 6/2011 | Hertel et al. |
| 2011/0145051 A1 | 6/2011 | Paradise et al. |
| 2011/0149874 A1 | 6/2011 | Reif |
| 2011/0161116 A1 | 6/2011 | Peak et al. |
| 2011/0163969 A1 | 7/2011 | Freddy et al. |
| 2011/0164269 A1 | 7/2011 | Kamishiro |
| 2011/0167382 A1 | 7/2011 | Van Os |
| 2011/0175703 A1 | 7/2011 | Benkley, III |
| 2011/0187497 A1 | 8/2011 | Chin |
| 2011/0201306 A1 | 8/2011 | Ali Al-Harbi |
| 2011/0225057 A1 | 9/2011 | Webb et al. |
| 2011/0225069 A1 | 9/2011 | Cramer et al. |
| 2011/0230769 A1 | 9/2011 | Yamazaki |
| 2011/0231914 A1 | 9/2011 | Hung |
| 2011/0238514 A1 | 9/2011 | Ramalingam et al. |
| 2011/0251892 A1 | 10/2011 | Laracey |
| 2011/0254683 A1 | 10/2011 | Soldan et al. |
| 2011/0286640 A1 | 11/2011 | Kwon et al. |
| 2011/0288970 A1 | 11/2011 | Kidron et al. |
| 2011/0292283 A1 | 12/2011 | Stephens |
| 2011/0296324 A1 | 12/2011 | Goossens et al. |
| 2011/0300829 A1 | 12/2011 | Nurmi et al. |
| 2012/0009896 A1 | 1/2012 | Bandyopadhyay et al. |
| 2012/0023185 A1 | 1/2012 | Holden et al. |
| 2012/0023573 A1 | 1/2012 | Shi |
| 2012/0028659 A1 | 2/2012 | Whitney et al. |
| 2012/0028695 A1 | 2/2012 | Walker et al. |
| 2012/0032891 A1 | 2/2012 | Parivar et al. |
| 2012/0036433 A1 | 2/2012 | Zimmer et al. |
| 2012/0050152 A1 | 3/2012 | Salminen et al. |
| 2012/0059787 A1 | 3/2012 | Brown et al. |

(56) References Cited

U.S. PATENT DOCUMENTS

| | | |
|---|---|---|
| 2012/0069231 A1 | 3/2012 | Chao |
| 2012/0072546 A1 | 3/2012 | Etchegoyen |
| 2012/0078751 A1 | 3/2012 | MacPhail et al. |
| 2012/0081282 A1 | 4/2012 | Chin |
| 2012/0081356 A1 | 4/2012 | Filippov et al. |
| 2012/0089507 A1 | 4/2012 | Zhang et al. |
| 2012/0089835 A1 | 4/2012 | Peckover |
| 2012/0095853 A1 | 4/2012 | Von et al. |
| 2012/0095865 A1 | 4/2012 | Doherty et al. |
| 2012/0105444 A1 | 5/2012 | Tokuda |
| 2012/0105486 A1 | 5/2012 | Lankford et al. |
| 2012/0123806 A1 | 5/2012 | Schumann et al. |
| 2012/0123937 A1 | 5/2012 | Spodak et al. |
| 2012/0139698 A1 | 6/2012 | Tsui et al. |
| 2012/0179767 A1 | 7/2012 | Clarke et al. |
| 2012/0189273 A1 | 7/2012 | Folgner et al. |
| 2012/0197743 A1 | 8/2012 | Grigg et al. |
| 2012/0200489 A1 | 8/2012 | Miyashita et al. |
| 2012/0200600 A1 | 8/2012 | Demaine |
| 2012/0215553 A1 | 8/2012 | Leston |
| 2012/0218125 A1 | 8/2012 | Demirdjian et al. |
| 2012/0221427 A1 | 8/2012 | Woo |
| 2012/0221464 A1 | 8/2012 | Pasquero et al. |
| 2012/0231770 A1 | 9/2012 | Clarke et al. |
| 2012/0235790 A1 | 9/2012 | Zhao et al. |
| 2012/0236025 A1 | 9/2012 | Jacobsen et al. |
| 2012/0245985 A1 | 9/2012 | Cho et al. |
| 2012/0254989 A1* | 10/2012 | Levien ................. G06F 3/0346 |
| | | 726/19 |
| 2012/0267432 A1 | 10/2012 | Kuttuva |
| 2012/0271712 A1 | 10/2012 | Katzin et al. |
| 2012/0280917 A1 | 11/2012 | Toksvig et al. |
| 2012/0283871 A1 | 11/2012 | Chai et al. |
| 2012/0290449 A1 | 11/2012 | Mullen et al. |
| 2012/0291121 A1 | 11/2012 | Huang et al. |
| 2012/0293438 A1 | 11/2012 | Chaudhri et al. |
| 2012/0295708 A1 | 11/2012 | Hernandez-Abrego et al. |
| 2012/0310760 A1 | 12/2012 | Phillips et al. |
| 2012/0311438 A1 | 12/2012 | Cranfill et al. |
| 2012/0311499 A1 | 12/2012 | Dellinger et al. |
| 2012/0316876 A1 | 12/2012 | Jang et al. |
| 2012/0316933 A1 | 12/2012 | Pentland et al. |
| 2012/0322370 A1 | 12/2012 | Lee |
| 2012/0322371 A1 | 12/2012 | Lee |
| 2012/0327183 A1 | 12/2012 | Fujii |
| 2013/0010093 A1 | 1/2013 | Redmann et al. |
| 2013/0013499 A1 | 1/2013 | Kalgi |
| 2013/0014052 A1 | 1/2013 | Frey et al. |
| 2013/0015946 A1 | 1/2013 | Lau et al. |
| 2013/0030934 A1 | 1/2013 | Bakshi et al. |
| 2013/0031217 A1 | 1/2013 | Rajapakse |
| 2013/0036370 A1 | 2/2013 | Ananthakrishnan |
| 2013/0036380 A1 | 2/2013 | Symons |
| 2013/0047233 A1 | 2/2013 | Fisk et al. |
| 2013/0047236 A1 | 2/2013 | Singh |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0067545 A1 | 3/2013 | Hanes |
| 2013/0073321 A1 | 3/2013 | Hofmann et al. |
| 2013/0074194 A1 | 3/2013 | White et al. |
| 2013/0080272 A1 | 3/2013 | Ronca et al. |
| 2013/0080275 A1 | 3/2013 | Ronca et al. |
| 2013/0082819 A1 | 4/2013 | Cotterill |
| 2013/0082974 A1 | 4/2013 | Kerr et al. |
| 2013/0085931 A1 | 4/2013 | Runyan |
| 2013/0085936 A1 | 4/2013 | Law et al. |
| 2013/0086637 A1 | 4/2013 | Cotterill et al. |
| 2013/0102281 A1 | 4/2013 | Kanda et al. |
| 2013/0103519 A1 | 4/2013 | Kountotsis et al. |
| 2013/0110719 A1 | 5/2013 | Carter et al. |
| 2013/0114043 A1 | 5/2013 | Balan et al. |
| 2013/0122866 A1 | 5/2013 | Huang |
| 2013/0124423 A1 | 5/2013 | Fisher |
| 2013/0127854 A1 | 5/2013 | Shpunt et al. |
| 2013/0129162 A1 | 5/2013 | Cheng et al. |
| 2013/0136341 A1 | 5/2013 | Yamamoto |
| 2013/0145448 A1 | 6/2013 | Newell |
| 2013/0148867 A1 | 6/2013 | Wang |
| 2013/0151414 A1 | 6/2013 | Zhu et al. |
| 2013/0160110 A1 | 6/2013 | Schechter et al. |
| 2013/0166325 A1 | 6/2013 | Ganapathy et al. |
| 2013/0169549 A1 | 7/2013 | Seymour et al. |
| 2013/0169742 A1 | 7/2013 | Wu et al. |
| 2013/0176208 A1 | 7/2013 | Tanaka et al. |
| 2013/0191911 A1 | 7/2013 | Dellinger et al. |
| 2013/0198296 A1 | 8/2013 | Roy et al. |
| 2013/0200146 A1 | 8/2013 | Moghadam et al. |
| 2013/0201185 A1 | 8/2013 | Kochi |
| 2013/0212655 A1 | 8/2013 | Hoyos et al. |
| 2013/0216108 A1 | 8/2013 | Hwang et al. |
| 2013/0218721 A1 | 8/2013 | Borhan et al. |
| 2013/0222323 A1 | 8/2013 | McKenzie |
| 2013/0223696 A1 | 8/2013 | Azar et al. |
| 2013/0226792 A1 | 8/2013 | Kushevsky et al. |
| 2013/0227596 A1 | 8/2013 | Pettis et al. |
| 2013/0239202 A1 | 9/2013 | Adams et al. |
| 2013/0243264 A1 | 9/2013 | Aoki |
| 2013/0247175 A1 | 9/2013 | Nechyba et al. |
| 2013/0262857 A1 | 10/2013 | Neuman et al. |
| 2013/0279768 A1 | 10/2013 | Boshra |
| 2013/0282577 A1 | 10/2013 | Milne |
| 2013/0283208 A1 | 10/2013 | Bychkov et al. |
| 2013/0286161 A1 | 10/2013 | Lv et al. |
| 2013/0290187 A1 | 10/2013 | Itwaru |
| 2013/0301832 A1 | 11/2013 | Harper |
| 2013/0304479 A1 | 11/2013 | Teller et al. |
| 2013/0304514 A1 | 11/2013 | Hyde et al. |
| 2013/0304651 A1 | 11/2013 | Smith et al. |
| 2013/0307771 A1 | 11/2013 | Parker et al. |
| 2013/0312087 A1 | 11/2013 | Latzina |
| 2013/0317991 A1 | 11/2013 | Groat et al. |
| 2013/0332358 A1 | 12/2013 | Zhao |
| 2013/0332364 A1 | 12/2013 | Templeton et al. |
| 2013/0333006 A1 | 12/2013 | Tapling et al. |
| 2013/0336545 A1 | 12/2013 | Pritikin et al. |
| 2013/0338527 A1 | 12/2013 | Nechyba et al. |
| 2013/0342672 A1 | 12/2013 | Gray et al. |
| 2013/0346273 A1 | 12/2013 | Stockton et al. |
| 2013/0346302 A1 | 12/2013 | Purves et al. |
| 2014/0003677 A1 | 1/2014 | Han et al. |
| 2014/0006155 A1 | 1/2014 | Ramirez et al. |
| 2014/0006285 A1 | 1/2014 | Chi et al. |
| 2014/0013422 A1 | 1/2014 | Janus et al. |
| 2014/0019352 A1 | 1/2014 | Shrivastava |
| 2014/0025513 A1 | 1/2014 | Cooke et al. |
| 2014/0040120 A1 | 2/2014 | Cho et al. |
| 2014/0047560 A1 | 2/2014 | Meyer et al. |
| 2014/0056491 A1 | 2/2014 | Knight |
| 2014/0058935 A1 | 2/2014 | Mijares |
| 2014/0058939 A1 | 2/2014 | Savla |
| 2014/0058941 A1 | 2/2014 | Moon et al. |
| 2014/0062853 A1 | 3/2014 | Chaudhri et al. |
| 2014/0068740 A1 | 3/2014 | Lecun et al. |
| 2014/0070957 A1 | 3/2014 | Longinotti-Buitoni et al. |
| 2014/0071044 A1 | 3/2014 | Nam |
| 2014/0074635 A1 | 3/2014 | Reese et al. |
| 2014/0074716 A1 | 3/2014 | Ni |
| 2014/0085191 A1 | 3/2014 | Gonion et al. |
| 2014/0085460 A1 | 3/2014 | Park et al. |
| 2014/0094143 A1 | 4/2014 | Ayotte |
| 2014/0100952 A1 | 4/2014 | Bart et al. |
| 2014/0101056 A1 | 4/2014 | Wendling |
| 2014/0104394 A1 | 4/2014 | Yanai et al. |
| 2014/0109018 A1 | 4/2014 | Casey et al. |
| 2014/0109200 A1 | 4/2014 | Tootill et al. |
| 2014/0111420 A1 | 4/2014 | Ahn et al. |
| 2014/0112555 A1 | 4/2014 | Fadell et al. |
| 2014/0114856 A1 | 4/2014 | Jung et al. |
| 2014/0115695 A1 | 4/2014 | Fadell et al. |
| 2014/0118519 A1 | 5/2014 | Sahin |
| 2014/0119620 A1 | 5/2014 | Jung et al. |
| 2014/0122331 A1 | 5/2014 | Vaish et al. |
| 2014/0123275 A1 | 5/2014 | Azar et al. |

(56) References Cited

U.S. PATENT DOCUMENTS

| | | |
|---|---|---|
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0135631 A1 | 5/2014 | Brumback et al. |
| 2014/0143145 A1 | 5/2014 | Kortina et al. |
| 2014/0143682 A1 | 5/2014 | Druck et al. |
| 2014/0143693 A1 | 5/2014 | Goossens et al. |
| 2014/0157153 A1 | 6/2014 | Yuen et al. |
| 2014/0164082 A1 | 6/2014 | Sun et al. |
| 2014/0165000 A1 | 6/2014 | Fleizach et al. |
| 2014/0173450 A1 | 6/2014 | Akula |
| 2014/0181229 A1 | 6/2014 | Tucker et al. |
| 2014/0187163 A1 | 7/2014 | Fujita |
| 2014/0188673 A1 | 7/2014 | Graham et al. |
| 2014/0193783 A1 | 7/2014 | Jeong et al. |
| 2014/0195918 A1 | 7/2014 | Friedlander |
| 2014/0204173 A1 | 7/2014 | Eidelson et al. |
| 2014/0205161 A1 | 7/2014 | Salatino et al. |
| 2014/0208417 A1 | 7/2014 | Robison |
| 2014/0222436 A1 | 8/2014 | Binder et al. |
| 2014/0222664 A1 | 8/2014 | Milne |
| 2014/0237393 A1 | 8/2014 | Van Wie et al. |
| 2014/0244365 A1 | 8/2014 | Price et al. |
| 2014/0244493 A1 | 8/2014 | Kenyon et al. |
| 2014/0254891 A1 | 9/2014 | Lee et al. |
| 2014/0257871 A1 | 9/2014 | Christensen et al. |
| 2014/0258292 A1 | 9/2014 | Thramann et al. |
| 2014/0258828 A1 | 9/2014 | Lymer et al. |
| 2014/0270374 A1 | 9/2014 | Unzueta |
| 2014/0279442 A1 | 9/2014 | Luoma et al. |
| 2014/0279497 A1 | 9/2014 | Qaim-Magami et al. |
| 2014/0279556 A1 | 9/2014 | Priebatsch et al. |
| 2014/0283128 A1 | 9/2014 | Shepherd et al. |
| 2014/0292641 A1 | 10/2014 | Cho et al. |
| 2014/0293079 A1 | 10/2014 | Milanfar et al. |
| 2014/0298432 A1 | 10/2014 | Brown |
| 2014/0300554 A1 | 10/2014 | Samuel et al. |
| 2014/0304809 A1 | 10/2014 | Fadell et al. |
| 2014/0310365 A1 | 10/2014 | Sample et al. |
| 2014/0310788 A1 | 10/2014 | Ricci |
| 2014/0311447 A1 | 10/2014 | Surnilla et al. |
| 2014/0313307 A1 | 10/2014 | Oh et al. |
| 2014/0320389 A1 | 10/2014 | Scavezze et al. |
| 2014/0337175 A1 | 11/2014 | Katzin et al. |
| 2014/0337221 A1 | 11/2014 | Hoyos |
| 2014/0337931 A1 | 11/2014 | Cotterill |
| 2014/0337948 A1 | 11/2014 | Hoyos |
| 2014/0344896 A1 | 11/2014 | Pak et al. |
| 2014/0344904 A1 | 11/2014 | Venkataramani et al. |
| 2014/0347390 A1 | 11/2014 | Poulos et al. |
| 2014/0350924 A1 | 11/2014 | Zurek et al. |
| 2014/0354401 A1 | 12/2014 | Soni et al. |
| 2014/0354538 A1 | 12/2014 | Lee et al. |
| 2014/0354539 A1 | 12/2014 | Skogo et al. |
| 2014/0359140 A1 | 12/2014 | Shankarraman |
| 2014/0366159 A1 | 12/2014 | Cohen |
| 2014/0375835 A1 | 12/2014 | Bos |
| 2014/0380465 A1 | 12/2014 | Fadell et al. |
| 2015/0002696 A1 | 1/2015 | He et al. |
| 2015/0006207 A1 | 1/2015 | Jarvis et al. |
| 2015/0029179 A1 | 1/2015 | Han et al. |
| 2015/0033364 A1 | 1/2015 | Wong |
| 2015/0043790 A1 | 2/2015 | Ono et al. |
| 2015/0044965 A1 | 2/2015 | Kurimoto et al. |
| 2015/0049014 A1 | 2/2015 | Saito |
| 2015/0051846 A1 | 2/2015 | Masuya |
| 2015/0052462 A1 | 2/2015 | Kulkarni |
| 2015/0054764 A1 | 2/2015 | Kim et al. |
| 2015/0058146 A1 | 2/2015 | Aissi et al. |
| 2015/0074418 A1 | 3/2015 | Lee et al. |
| 2015/0074615 A1 | 3/2015 | Han et al. |
| 2015/0095175 A1 | 4/2015 | Dua |
| 2015/0101041 A1 | 4/2015 | Devar et al. |
| 2015/0109191 A1 | 4/2015 | Johnson et al. |
| 2015/0116086 A1 | 4/2015 | Kim et al. |
| 2015/0121251 A1 | 4/2015 | Siddhartha et al. |
| 2015/0124053 A1 | 5/2015 | Tamura et al. |
| 2015/0127539 A1 | 5/2015 | Ye et al. |
| 2015/0130716 A1 | 5/2015 | Sridharan et al. |
| 2015/0130740 A1 | 5/2015 | Cederlund et al. |
| 2015/0133084 A1 | 5/2015 | Baek et al. |
| 2015/0135282 A1 | 5/2015 | Kong et al. |
| 2015/0135309 A1 | 5/2015 | Karmarkar et al. |
| 2015/0146945 A1 | 5/2015 | Han |
| 2015/0154001 A1 | 6/2015 | Knox et al. |
| 2015/0154589 A1 | 6/2015 | Li |
| 2015/0169053 A1 | 6/2015 | Bozarth et al. |
| 2015/0186152 A1 | 7/2015 | Jothiswaran et al. |
| 2015/0186860 A1 | 7/2015 | Rangarajan |
| 2015/0187019 A1 | 7/2015 | Fernandes et al. |
| 2015/0195277 A1 | 7/2015 | Faaborg et al. |
| 2015/0208244 A1 | 7/2015 | Nakao |
| 2015/0213244 A1 | 7/2015 | Lymberopoulos et al. |
| 2015/0215128 A1 | 7/2015 | Pal |
| 2015/0220924 A1 | 8/2015 | Bakker |
| 2015/0228121 A1 | 8/2015 | Tsukahara et al. |
| 2015/0235018 A1 | 8/2015 | Gupta et al. |
| 2015/0235055 A1 | 8/2015 | An et al. |
| 2015/0235098 A1 | 8/2015 | Lee et al. |
| 2015/0235476 A1 | 8/2015 | McMahon et al. |
| 2015/0242611 A1 | 8/2015 | Cotterill |
| 2015/0245159 A1 | 8/2015 | Osman |
| 2015/0249540 A1 | 9/2015 | Khalil et al. |
| 2015/0254661 A1 | 9/2015 | Lanc |
| 2015/0257004 A1 | 9/2015 | Shanmugam et al. |
| 2015/0261292 A1 | 9/2015 | Conzola et al. |
| 2015/0261387 A1 | 9/2015 | Petersen et al. |
| 2015/0288633 A1 | 10/2015 | Ogundokun et al. |
| 2015/0295921 A1 | 10/2015 | Cao |
| 2015/0310259 A1 | 10/2015 | Lau et al. |
| 2015/0324113 A1 | 11/2015 | Kapp et al. |
| 2015/0334567 A1 | 11/2015 | Chen et al. |
| 2015/0339652 A1 | 11/2015 | Park et al. |
| 2015/0341717 A1 | 11/2015 | Song et al. |
| 2015/0346845 A1 | 12/2015 | Di Censo et al. |
| 2015/0348001 A1 | 12/2015 | Van Os et al. |
| 2015/0348002 A1 | 12/2015 | Van et al. |
| 2015/0348014 A1 | 12/2015 | Van Os et al. |
| 2015/0348018 A1 | 12/2015 | Campos et al. |
| 2015/0348029 A1 | 12/2015 | Van Os et al. |
| 2015/0349959 A1 | 12/2015 | Marciniak |
| 2015/0350125 A1 | 12/2015 | Henderson |
| 2015/0356286 A1 | 12/2015 | Quirk et al. |
| 2015/0358316 A1 | 12/2015 | Cronin |
| 2015/0362977 A1 | 12/2015 | Doniwa |
| 2015/0363632 A1 | 12/2015 | Ahn et al. |
| 2015/0365400 A1 | 12/2015 | Cox |
| 2015/0370323 A1 | 12/2015 | Cieplinski et al. |
| 2015/0379252 A1 | 12/2015 | Tang et al. |
| 2016/0005024 A1 | 1/2016 | Harrell |
| 2016/0019536 A1 | 1/2016 | Ortiz et al. |
| 2016/0025993 A1 | 1/2016 | Mor et al. |
| 2016/0026253 A1 | 1/2016 | Bradski et al. |
| 2016/0026779 A1 | 1/2016 | Grigg et al. |
| 2016/0035074 A1 | 2/2016 | Jeong et al. |
| 2016/0036759 A1 | 2/2016 | Prado et al. |
| 2016/0036965 A1 | 2/2016 | Kim |
| 2016/0042166 A1 | 2/2016 | Kang et al. |
| 2016/0047666 A1 | 2/2016 | Fuchs |
| 2016/0048705 A1 | 2/2016 | Yang |
| 2016/0050199 A1 | 2/2016 | Ganesan |
| 2016/0055323 A1 | 2/2016 | Stuntebeck et al. |
| 2016/0055324 A1 | 2/2016 | Agarwal |
| 2016/0063235 A1 | 3/2016 | Tussy |
| 2016/0063298 A1 | 3/2016 | Tuneld et al. |
| 2016/0063828 A1 | 3/2016 | Verweij et al. |
| 2016/0063850 A1 | 3/2016 | Yang et al. |
| 2016/0078281 A1 | 3/2016 | Gongaware et al. |
| 2016/0086379 A1 | 3/2016 | Sadi et al. |
| 2016/0092665 A1 | 3/2016 | Cowan et al. |
| 2016/0094705 A1 | 3/2016 | Vendrow |
| 2016/0104034 A1 | 4/2016 | Wilder et al. |
| 2016/0117681 A1 | 4/2016 | Jiao et al. |
| 2016/0127641 A1 | 5/2016 | Gove |

(56) References Cited

U.S. PATENT DOCUMENTS

| | | |
|---|---|---|
| 2016/0132840 A1 | 5/2016 | Bowles et al. |
| 2016/0134488 A1 | 5/2016 | Straub et al. |
| 2016/0147987 A1 | 5/2016 | Jang et al. |
| 2016/0148042 A1 | 5/2016 | Gonion et al. |
| 2016/0148384 A1 | 5/2016 | Bud et al. |
| 2016/0150124 A1 | 5/2016 | Panda et al. |
| 2016/0154956 A1 | 6/2016 | Fadell et al. |
| 2016/0165205 A1 | 6/2016 | Liu et al. |
| 2016/0171192 A1 | 6/2016 | Holz et al. |
| 2016/0182435 A1* | 6/2016 | Landqvist .............. H04L 51/52 |
| | | 709/204 |
| 2016/0188181 A1 | 6/2016 | Smith |
| 2016/0188860 A1 | 6/2016 | Lee et al. |
| 2016/0192324 A1 | 6/2016 | Zhang et al. |
| 2016/0217310 A1 | 7/2016 | Shah et al. |
| 2016/0219262 A1 | 7/2016 | Cole et al. |
| 2016/0232513 A1 | 8/2016 | Purves et al. |
| 2016/0234023 A1 | 8/2016 | Mozer et al. |
| 2016/0239701 A1 | 8/2016 | Lee et al. |
| 2016/0241543 A1 | 8/2016 | Jung et al. |
| 2016/0253665 A1 | 9/2016 | Van Os et al. |
| 2016/0253745 A1 | 9/2016 | Lee |
| 2016/0267779 A1 | 9/2016 | Kuang |
| 2016/0275281 A1 | 9/2016 | Ranjit et al. |
| 2016/0277396 A1 | 9/2016 | Gardiner et al. |
| 2016/0284123 A1 | 9/2016 | Hare et al. |
| 2016/0292407 A1 | 10/2016 | Tieu et al. |
| 2016/0292525 A1 | 10/2016 | Aoki |
| 2016/0294557 A1 | 10/2016 | Baldwin et al. |
| 2016/0294837 A1 | 10/2016 | Turgeman |
| 2016/0300100 A1 | 10/2016 | Shen et al. |
| 2016/0306533 A1 | 10/2016 | Agarwal et al. |
| 2016/0308859 A1 | 10/2016 | Barry et al. |
| 2016/0314290 A1 | 10/2016 | Baca et al. |
| 2016/0320838 A1 | 11/2016 | Teller et al. |
| 2016/0335495 A1 | 11/2016 | Kim et al. |
| 2016/0342832 A1 | 11/2016 | Newell et al. |
| 2016/0345172 A1 | 11/2016 | Cotterill |
| 2016/0358180 A1 | 12/2016 | Van Os et al. |
| 2016/0364561 A1 | 12/2016 | Lee et al. |
| 2016/0364591 A1 | 12/2016 | El-Khoury et al. |
| 2016/0364600 A1 | 12/2016 | Shah et al. |
| 2016/0371438 A1 | 12/2016 | Annulis |
| 2016/0378961 A1 | 12/2016 | Park |
| 2016/0378966 A1 | 12/2016 | Alten |
| 2017/0004293 A1 | 1/2017 | Mantri et al. |
| 2017/0004828 A1 | 1/2017 | Lee et al. |
| 2017/0011395 A1 | 1/2017 | Pillai et al. |
| 2017/0017834 A1 | 1/2017 | Sabitov et al. |
| 2017/0032113 A1 | 2/2017 | Tunnell et al. |
| 2017/0032168 A1 | 2/2017 | Kim |
| 2017/0032375 A1 | 2/2017 | Van Os et al. |
| 2017/0039358 A1 | 2/2017 | Yuen et al. |
| 2017/0046507 A1 | 2/2017 | Archer et al. |
| 2017/0046508 A1 | 2/2017 | Shin et al. |
| 2017/0048450 A1 | 2/2017 | Lee et al. |
| 2017/0048458 A1 | 2/2017 | Jeon et al. |
| 2017/0054731 A1 | 2/2017 | Cotterill |
| 2017/0063851 A1 | 3/2017 | Kim et al. |
| 2017/0063852 A1 | 3/2017 | Azar et al. |
| 2017/0070680 A1 | 3/2017 | Kobayashi |
| 2017/0076132 A1 | 3/2017 | Sezan et al. |
| 2017/0102916 A1 | 4/2017 | Noble et al. |
| 2017/0103230 A1 | 4/2017 | O'Brien |
| 2017/0108924 A1 | 4/2017 | Hurter |
| 2017/0109936 A1 | 4/2017 | Powderly et al. |
| 2017/0124328 A1 | 5/2017 | Krishnapura |
| 2017/0142584 A1 | 5/2017 | Oh et al. |
| 2017/0147681 A1 | 5/2017 | Tankersley et al. |
| 2017/0147802 A1 | 5/2017 | Li |
| 2017/0163588 A1 | 6/2017 | Devasthali et al. |
| 2017/0169202 A1 | 6/2017 | Duggan et al. |
| 2017/0169204 A1 | 6/2017 | Fadell et al. |
| 2017/0169287 A1 | 6/2017 | Tokunaga et al. |
| 2017/0180637 A1 | 6/2017 | Lautenbach et al. |
| 2017/0185760 A1 | 6/2017 | Wilder |
| 2017/0187866 A1 | 6/2017 | Li |
| 2017/0193214 A1 | 7/2017 | Shim et al. |
| 2017/0193314 A1 | 7/2017 | Kim et al. |
| 2017/0195307 A1 | 7/2017 | Jones-Mcfadden et al. |
| 2017/0199997 A1 | 7/2017 | Fadell et al. |
| 2017/0235361 A1 | 8/2017 | Rigazio et al. |
| 2017/0243054 A1 | 8/2017 | Lee et al. |
| 2017/0244703 A1 | 8/2017 | Lee et al. |
| 2017/0269792 A1 | 9/2017 | Xu et al. |
| 2017/0287061 A1 | 10/2017 | Chae et al. |
| 2017/0300122 A1 | 10/2017 | Kramer et al. |
| 2017/0300897 A1 | 10/2017 | Ferenczi et al. |
| 2017/0323141 A1 | 11/2017 | Lee et al. |
| 2017/0329949 A1 | 11/2017 | Civelli |
| 2017/0332035 A1 | 11/2017 | Shah et al. |
| 2017/0332045 A1 | 11/2017 | Metter et al. |
| 2017/0336867 A1 | 11/2017 | Wilairat et al. |
| 2017/0339151 A1 | 11/2017 | Van Os et al. |
| 2017/0344251 A1 | 11/2017 | Hajimusa et al. |
| 2017/0353423 A1 | 12/2017 | Morrison et al. |
| 2017/0357320 A1 | 12/2017 | Chaudhri et al. |
| 2017/0357788 A1 | 12/2017 | Ledvina et al. |
| 2017/0357972 A1 | 12/2017 | Van Os et al. |
| 2018/0004924 A1 | 1/2018 | Tieu |
| 2018/0018514 A1 | 1/2018 | Azam et al. |
| 2018/0021954 A1 | 1/2018 | Fischer et al. |
| 2018/0024846 A1 | 1/2018 | Wu et al. |
| 2018/0026922 A1 | 1/2018 | Perigault |
| 2018/0063249 A1 | 3/2018 | Nguyen |
| 2018/0082052 A1 | 3/2018 | Swart et al. |
| 2018/0088787 A1 | 3/2018 | Bereza et al. |
| 2018/0095635 A1 | 4/2018 | Valdivia et al. |
| 2018/0096690 A1 | 4/2018 | Mixter et al. |
| 2018/0100156 A1 | 4/2018 | Lutz et al. |
| 2018/0109629 A1 | 4/2018 | Van Os et al. |
| 2018/0117944 A1 | 5/2018 | Lee |
| 2018/0144178 A1 | 5/2018 | Han et al. |
| 2018/0150627 A1 | 5/2018 | Rodefer |
| 2018/0158066 A1 | 6/2018 | Van Os et al. |
| 2018/0173928 A1 | 6/2018 | Han et al. |
| 2018/0173929 A1 | 6/2018 | Han et al. |
| 2018/0173930 A1 | 6/2018 | Han et al. |
| 2018/0181201 A1 | 6/2018 | Grant et al. |
| 2018/0181737 A1 | 6/2018 | Tussy |
| 2018/0211030 A1 | 7/2018 | Kim et al. |
| 2018/0211093 A1 | 7/2018 | Bae et al. |
| 2018/0233139 A1 | 8/2018 | Finkelstein et al. |
| 2018/0234242 A1 | 8/2018 | Hindocha et al. |
| 2018/0251183 A1 | 9/2018 | Meermann |
| 2018/0262834 A1 | 9/2018 | Cho et al. |
| 2018/0268747 A1 | 9/2018 | Braun |
| 2018/0276673 A1 | 9/2018 | Van Os et al. |
| 2018/0302786 A1 | 10/2018 | Yu et al. |
| 2018/0302790 A1 | 10/2018 | Cotterill |
| 2018/0311583 A1 | 11/2018 | Osman et al. |
| 2018/0321826 A1 | 11/2018 | Bereza et al. |
| 2018/0332025 A1 | 11/2018 | Bakshan |
| 2018/0336326 A1 | 11/2018 | Wallace et al. |
| 2018/0365898 A1 | 12/2018 | Costa |
| 2019/0020483 A1 | 1/2019 | Meng |
| 2019/0033965 A1 | 1/2019 | Raghunath et al. |
| 2019/0050867 A1 | 2/2019 | Van Os et al. |
| 2019/0053739 A1 | 2/2019 | Inoue et al. |
| 2019/0080066 A1 | 3/2019 | Van Os et al. |
| 2019/0080070 A1 | 3/2019 | Van Os et al. |
| 2019/0080071 A1 | 3/2019 | Van Os et al. |
| 2019/0080072 A1 | 3/2019 | Van Os et al. |
| 2019/0080189 A1 | 3/2019 | Van Os et al. |
| 2019/0124510 A1 | 4/2019 | Cotterill |
| 2019/0138092 A1 | 5/2019 | Song |
| 2019/0155382 A1 | 5/2019 | Ikuta et al. |
| 2019/0156607 A1 | 5/2019 | Tao et al. |
| 2019/0164134 A1 | 5/2019 | Morrow et al. |
| 2019/0180088 A1 | 6/2019 | Norimatsu |
| 2019/0220647 A1 | 7/2019 | Han et al. |
| 2019/0235247 A1 | 8/2019 | Norden |
| 2019/0243957 A1 | 8/2019 | Fadell et al. |
| 2019/0272363 A1 | 9/2019 | Suwald |

(56) References Cited

U.S. PATENT DOCUMENTS

| | | | |
|---|---|---|---|
| 2019/0276051 A1 | 9/2019 | Marti et al. | |
| 2019/0289079 A1 | 9/2019 | Van Os et al. | |
| 2019/0333508 A1 | 10/2019 | Rao et al. | |
| 2019/0347389 A1 | 11/2019 | Kawakita et al. | |
| 2019/0347391 A1 | 11/2019 | Kim et al. | |
| 2019/0370448 A1 | 12/2019 | Devine et al. | |
| 2019/0370583 A1 | 12/2019 | Van Os et al. | |
| 2019/0371323 A1* | 12/2019 | Kao | G06V 40/168 |
| 2019/0392129 A1 | 12/2019 | Tsai et al. | |
| 2019/0394649 A1 | 12/2019 | Ledvina et al. | |
| 2020/0042083 A1 | 2/2020 | Min | |
| 2020/0042685 A1 | 2/2020 | Tussy et al. | |
| 2020/0065821 A1 | 2/2020 | Van Os et al. | |
| 2020/0075015 A1* | 3/2020 | Taki | G10L 15/22 |
| 2020/0103963 A1 | 4/2020 | Kelly et al. | |
| 2020/0104620 A1 | 4/2020 | Cohen et al. | |
| 2020/0120503 A1 | 4/2020 | Cotterill | |
| 2020/0134601 A1 | 4/2020 | Ding et al. | |
| 2020/0142484 A1 | 5/2020 | Maalouf et al. | |
| 2020/0225746 A1 | 7/2020 | Bar-Zeev et al. | |
| 2020/0234027 A1 | 7/2020 | Han et al. | |
| 2020/0280446 A1 | 9/2020 | Matsumoto | |
| 2020/0311509 A1 | 10/2020 | Benkley et al. | |
| 2020/0341610 A1 | 10/2020 | Quintana et al. | |
| 2020/0356761 A1 | 11/2020 | Gonion et al. | |
| 2020/0366742 A1 | 11/2020 | Van Os et al. | |
| 2020/0367827 A1 | 11/2020 | Min et al. | |
| 2020/0372514 A1 | 11/2020 | Van Os et al. | |
| 2020/0379560 A1 | 12/2020 | Krasadakis | |
| 2020/0401686 A1 | 12/2020 | Duchastel | |
| 2021/0014070 A1 | 1/2021 | Gopalakrishnan et al. | |
| 2021/0027790 A1* | 1/2021 | Choi | G06F 3/167 |
| 2021/0042549 A1 | 2/2021 | Van Os et al. | |
| 2021/0048883 A1 | 2/2021 | Kelly et al. | |
| 2021/0073823 A1 | 3/2021 | Van Os | |
| 2021/0096726 A1 | 4/2021 | Faulkner et al. | |
| 2021/0105277 A1 | 4/2021 | Epstein et al. | |
| 2021/0151008 A1 | 5/2021 | Chrapek et al. | |
| 2021/0165557 A1 | 6/2021 | Agarawala et al. | |
| 2021/0192530 A1 | 6/2021 | Van Os et al. | |
| 2021/0203506 A1 | 7/2021 | Edwards et al. | |
| 2021/0255269 A1 | 8/2021 | Lv et al. | |
| 2021/0256261 A1 | 8/2021 | Wang et al. | |
| 2021/0286502 A1 | 9/2021 | Lemay et al. | |
| 2021/0287416 A1 | 9/2021 | O'Hagan et al. | |
| 2022/0012323 A1 | 1/2022 | Moriwaki et al. | |
| 2022/0027446 A1 | 1/2022 | Van Os et al. | |
| 2022/0053168 A1 | 2/2022 | Strasman et al. | |
| 2022/0058257 A1 | 2/2022 | Cotterill | |
| 2022/0067133 A1 | 3/2022 | Fadell et al. | |
| 2022/0074754 A1 | 3/2022 | Elder et al. | |
| 2022/0100270 A1 | 3/2022 | Pastrana Vicente et al. | |
| 2022/0100812 A1 | 3/2022 | Anvaripour et al. | |
| 2022/0121277 A1 | 4/2022 | Azam et al. | |
| 2022/0124254 A1 | 4/2022 | Dellinger et al. | |
| 2022/0129082 A1 | 4/2022 | Schoen | |
| 2022/0180667 A1 | 6/2022 | Cohen et al. | |
| 2022/0207840 A1 | 6/2022 | Cansizoglu et al. | |
| 2022/0214743 A1 | 7/2022 | Dascola et al. | |
| 2022/0229524 A1 | 7/2022 | Mckenzie et al. | |
| 2022/0229895 A1 | 7/2022 | Ranjan et al. | |
| 2022/0237274 A1 | 7/2022 | Paul et al. | |
| 2022/0237660 A1 | 7/2022 | Balondona | |
| 2022/0244838 A1 | 8/2022 | Bereza et al. | |
| 2022/0253136 A1 | 8/2022 | Holder et al. | |
| 2022/0262080 A1 | 8/2022 | Burton et al. | |
| 2022/0284084 A1 | 9/2022 | Deng | |
| 2022/0342972 A1 | 10/2022 | Van Os et al. | |
| 2022/0351549 A1 | 11/2022 | Van Os et al. | |
| 2022/0382839 A1 | 12/2022 | Vargas et al. | |
| 2022/0413605 A1 | 12/2022 | Liu et al. | |
| 2023/0019250 A1 | 1/2023 | Lee et al. | |
| 2023/0021247 A1 | 1/2023 | Han et al. | |
| 2023/0071037 A1 | 3/2023 | Kim et al. | |
| 2023/0185373 A1 | 6/2023 | Kelly et al. | |
| 2023/0214466 A1 | 7/2023 | Fadell et al. | |
| 2023/0252779 A1 | 8/2023 | Gonion et al. | |
| 2023/0254152 A1 | 8/2023 | Ratnakaram et al. | |
| 2023/0273985 A1 | 8/2023 | Suchan et al. | |
| 2023/0326144 A1 | 10/2023 | Insley | |
| 2023/0364936 A1 | 11/2023 | Antonakis | |
| 2023/0401032 A1 | 12/2023 | Cohen et al. | |
| 2023/0409160 A1 | 12/2023 | Han et al. | |
| 2024/0028110 A1 | 1/2024 | Aurongzeb et al. | |
| 2024/0028177 A1 | 1/2024 | Pastrana Vicente et al. | |
| 2024/0085707 A1 | 3/2024 | Schowengerdt | |
| 2024/0103616 A1 | 3/2024 | Yerkes et al. | |
| 2024/0103617 A1 | 3/2024 | Yerkes et al. | |
| 2024/0103678 A1 | 3/2024 | Dryer et al. | |
| 2024/0104859 A1 | 3/2024 | Chand et al. | |
| 2024/0118746 A1 | 4/2024 | Yerkes et al. | |
| 2024/0184869 A1 | 6/2024 | Van Os et al. | |
| 2024/0220009 A1 | 7/2024 | Dryer et al. | |
| 2024/0310988 A1 | 9/2024 | Bereza et al. | |
| 2024/0346817 A1 | 10/2024 | Gonion et al. | |
| 2024/0427869 A1 | 12/2024 | Paul | |
| 2025/0086633 A1 | 3/2025 | Van Os et al. | |
| 2025/0093947 A1 | 3/2025 | Bedard et al. | |
| 2025/0148066 A1 | 5/2025 | Lee et al. | |
| 2025/0156025 A1 | 5/2025 | Han et al. | |
| 2025/0156516 A1 | 5/2025 | Deng et al. | |
| 2025/0168497 A1 | 5/2025 | Dellinger et al. | |
| 2025/0193205 A1 | 6/2025 | Krstic et al. | |
| 2025/0298879 A1 | 9/2025 | Fadell et al. | |
| 2025/0342671 A1 | 11/2025 | Chand et al. | |

FOREIGN PATENT DOCUMENTS

| | | |
|---|---|---|
| AU | 2016219716 A1 | 9/2016 |
| AU | 2015255652 A1 | 11/2016 |
| AU | 2017100556 A4 | 6/2017 |
| AU | 2016201310 A1 | 2/2024 |
| CA | 2949642 A1 | 6/2017 |
| CN | 1163669 A | 10/1997 |
| CN | 1183475 A | 6/1998 |
| CN | 1220433 A | 6/1999 |
| CN | 1335557 A | 2/2002 |
| CN | 1452739 A | 10/2003 |
| CN | 1484425 A | 3/2004 |
| CN | 1183475 C | 1/2005 |
| CN | 1592914 A | 3/2005 |
| CN | 1663174 A | 8/2005 |
| CN | 1685357 A | 10/2005 |
| CN | 1695163 A | 11/2005 |
| CN | 1741104 A | 3/2006 |
| CN | 1742252 A | 3/2006 |
| CN | 1801708 A | 7/2006 |
| CN | 1836397 A | 9/2006 |
| CN | 1846221 A | 10/2006 |
| CN | 1908981 A | 2/2007 |
| CN | 1960546 A | 5/2007 |
| CN | 101005681 A | 7/2007 |
| CN | 101035335 A | 9/2007 |
| CN | 101039184 A | 9/2007 |
| CN | 101080737 A | 11/2007 |
| CN | 101171604 A | 4/2008 |
| CN | 101226616 A | 7/2008 |
| CN | 101227359 A | 7/2008 |
| CN | 101268470 A | 9/2008 |
| CN | 101299694 A | 11/2008 |
| CN | 101341718 A | 1/2009 |
| CN | 101341727 A | 1/2009 |
| CN | 101352042 A | 1/2009 |
| CN | 101454795 A | 6/2009 |
| CN | 101485128 A | 7/2009 |
| CN | 101567071 A | 10/2009 |
| CN | 101610155 A | 12/2009 |
| CN | 101656548 A | 2/2010 |
| CN | 101719955 A | 6/2010 |
| CN | 101730907 A | 6/2010 |
| CN | 101788880 A | 7/2010 |
| CN | 101816165 A | 8/2010 |
| CN | 101833651 A | 9/2010 |
| CN | 101847139 A | 9/2010 |

(56) References Cited

FOREIGN PATENT DOCUMENTS

| | | | |
|----|------------|---|---------|
| CN | 101960896  | A | 1/2011  |
| CN | 102004908  | A | 4/2011  |
| CN | 102016877  | A | 4/2011  |
| CN | 102065148  | A | 5/2011  |
| CN | 102096546  | A | 6/2011  |
| CN | 102164213  | A | 8/2011  |
| CN | 102202192  | A | 9/2011  |
| CN | 102209321  | A | 10/2011 |
| CN | 102244530  | A | 11/2011 |
| CN | 102265586  | A | 11/2011 |
| CN | 102282578  | A | 12/2011 |
| CN | 102376049  | A | 3/2012  |
| CN | 102394919  | A | 3/2012  |
| CN | 102396205  | A | 3/2012  |
| CN | 102542444  | A | 7/2012  |
| CN | 102591889  | A | 7/2012  |
| CN | 102737313  | A | 10/2012 |
| CN | 102741874  | A | 10/2012 |
| CN | 102750631  | A | 10/2012 |
| CN | 102799983  | A | 11/2012 |
| CN | 102804182  | A | 11/2012 |
| CN | 102822855  | A | 12/2012 |
| CN | 102833423  | A | 12/2012 |
| CN | 102841683  | A | 12/2012 |
| CN | 102859544  | A | 1/2013  |
| CN | 102880959  | A | 1/2013  |
| CN | 102930254  | A | 2/2013  |
| CN | 202735894  | U | 2/2013  |
| CN | 102984195  | A | 3/2013  |
| CN | 103020807  | A | 4/2013  |
| CN | 103077463  | A | 5/2013  |
| CN | 103092503  | A | 5/2013  |
| CN | 103106576  | A | 5/2013  |
| CN | 103188280  | A | 7/2013  |
| CN | 103197872  | A | 7/2013  |
| CN | 103209642  | A | 7/2013  |
| CN | 103229206  | A | 7/2013  |
| CN | 103257826  | A | 8/2013  |
| CN | 103262108  | A | 8/2013  |
| CN | 103294171  | A | 9/2013  |
| CN | 103324909  | A | 9/2013  |
| CN | 203179000  | U | 9/2013  |
| CN | 103346957  | A | 10/2013 |
| CN | 103413218  | A | 11/2013 |
| CN | 203299885  | U | 11/2013 |
| CN | 103455913  | A | 12/2013 |
| CN | 103489095  | A | 1/2014  |
| CN | 103501304  | A | 1/2014  |
| CN | 103577982  | A | 2/2014  |
| CN | 103635920  | A | 3/2014  |
| CN | 103701605  | A | 4/2014  |
| CN | 103765861  | A | 4/2014  |
| CN | 103778533  | A | 5/2014  |
| CN | 104252675  | A | 12/2014 |
| CN | 104321778  | A | 1/2015  |
| CN | 104361302  | A | 2/2015  |
| CN | 104539924  | A | 4/2015  |
| CN | 104732396  | A | 6/2015  |
| CN | 104753766  | A | 7/2015  |
| CN | 104935497  | A | 9/2015  |
| CN | 105051651  | A | 11/2015 |
| CN | 105093526  | A | 11/2015 |
| CN | 105099861  | A | 11/2015 |
| CN | 105389491  | A | 3/2016  |
| CN | 105391843  | A | 3/2016  |
| CN | 105844101  | A | 8/2016  |
| CN | 105868613  | A | 8/2016  |
| CN | 105874405  | A | 8/2016  |
| CN | 105893814  | A | 8/2016  |
| CN | 106020436  | A | 10/2016 |
| CN | 106095247  | A | 11/2016 |
| CN | 106156566  | A | 11/2016 |
| CN | 106164934  | A | 11/2016 |
| CN | 106355058  | A | 1/2017  |
| CN | 106462383  | A | 2/2017  |
| CN | 106485123  | A | 3/2017  |
| CN | 106503514  | A | 3/2017  |
| CN | 106533918  | A | 3/2017  |
| CN | 106557738  | A | 4/2017  |
| CN | 106575332  | A | 4/2017  |
| CN | 106778222  | A | 5/2017  |
| CN | 106895554  | A | 6/2017  |
| CN | 107066857  | A | 8/2017  |
| CN | 107797657  | A | 3/2018  |
| CN | 107870690  | A | 4/2018  |
| CN | 108574773  | A | 9/2018  |
| CN | 109769397  | A | 5/2019  |
| CN | 102681777  | A | 1/2025  |
| DE | 10153591   | A1 | 5/2003 |
| EP | 0593386    | A2 | 4/1994 |
| EP | 0923018    | A2 | 6/1999 |
| EP | 1229496    | A2 | 8/2002 |
| EP | 1422589    | A1 | 5/2004 |
| EP | 1599862    | A2 | 11/2005 |
| EP | 1626330    | A1 | 2/2006 |
| EP | 1645989    | A2 | 4/2006 |
| EP | 1736908    | A2 | 12/2006 |
| EP | 1835697    | A2 | 9/2007 |
| EP | 2173298    | A1 | 4/2010 |
| EP | 2180665    | A1 | 4/2010 |
| EP | 1835697    | A3 | 6/2010 |
| EP | 2224348    | A1 | 9/2010 |
| EP | 2309410    | A1 | 4/2011 |
| EP | 1626330    | A4 | 1/2012 |
| EP | 2528010    | A1 | 11/2012 |
| EP | 2674889    | A2 | 12/2013 |
| EP | 2713298    | A1 | 4/2014 |
| EP | 2725521    | A2 | 4/2014 |
| EP | 2725537    | A1 | 4/2014 |
| EP | 2741175    | A2 | 6/2014 |
| EP | 2762997    | A2 | 8/2014 |
| EP | 2960822    | A1 | 12/2015 |
| EP | 2993619    | A1 | 3/2016 |
| EP | 3057024    | A1 | 8/2016 |
| EP | 3076334    | A1 | 10/2016 |
| EP | 3118761    | A1 | 1/2017 |
| EP | 3190563    | A1 | 7/2017 |
| EP | 2801972    | B1 | 1/2018 |
| EP | 1835697    | B1 | 5/2018 |
| EP | 3373132    | A2 | 9/2018 |
| EP | 3958101    | A1 | 2/2022 |
| EP | 4024854    | A1 | 6/2022 |
| GB | 2184576    | A | 6/1987 |
| GB | 2312040    | A | 10/1997 |
| GB | 2313460    | A | 11/1997 |
| GB | 2360618    | A | 9/2001 |
| GB | 2466038    | A | 6/2010 |
| GB | 2500321    | A | 9/2013 |
| IN | 201917024374 | A | 9/2020 |
| JP | 4-158434   | A | 6/1992 |
| JP | 6-284182   | A | 10/1994 |
| JP | 7-146942   | A | 6/1995 |
| JP | 7-220008   | A | 8/1995 |
| JP | 9-81309    | A | 3/1997 |
| JP | 9-128208   | A | 5/1997 |
| JP | 9-221950   | A | 8/1997 |
| JP | 9-269930   | A | 10/1997 |
| JP | 9-322199   | A | 12/1997 |
| JP | 10-69346   | A | 3/1998 |
| JP | 10-232934  | A | 9/1998 |
| JP | 10-247936  | A | 9/1998 |
| JP | 10-269358  | A | 10/1998 |
| JP | 11-39385   | A | 2/1999 |
| JP | 11-73530   | A | 3/1999 |
| JP | 11-185016  | A | 7/1999 |
| JP | 11-242745  | A | 9/1999 |
| JP | 2000-259477 | A | 9/2000 |
| JP | 2000-283720 | A | 10/2000 |
| JP | 2000-315118 | A | 11/2000 |
| JP | 2001-92554 | A | 4/2001 |
| JP | 2001-92783 | A | 4/2001 |
| JP | 2001-103046 | A | 4/2001 |
| JP | 2001-155137 | A | 6/2001 |
| JP | 2001-331758 | A | 11/2001 |

(56) References Cited

FOREIGN PATENT DOCUMENTS

| | | | |
|---|---|---|---|
| JP | 2002-49570 A | 2/2002 | |
| JP | 2002-99854 A | 4/2002 | |
| JP | 2002-149171 A | 5/2002 | |
| JP | 2002-159052 A | 5/2002 | |
| JP | 2002-515145 A | 5/2002 | |
| JP | 2002-183093 A | 6/2002 | |
| JP | 2002-207525 A | 7/2002 | |
| JP | 2002-222412 A | 8/2002 | |
| JP | 2002-288137 A | 10/2002 | |
| JP | 2003-16398 A | 1/2003 | |
| JP | 2003-36401 A | 2/2003 | |
| JP | 2003-67343 A | 3/2003 | |
| JP | 2003-141541 A | 5/2003 | |
| JP | 2003-143290 A | 5/2003 | |
| JP | 2003-150550 A | 5/2003 | |
| JP | 2003-178244 A | 6/2003 | |
| JP | 2003-298689 A | 10/2003 | |
| JP | 2003-346059 A | 12/2003 | |
| JP | 2004-86866 A | 3/2004 | |
| JP | 2004-194069 A | 7/2004 | |
| JP | 2004-252736 A | 9/2004 | |
| JP | 2004-265353 A | 9/2004 | |
| JP | 2004-532477 A | 10/2004 | |
| JP | 2004-310443 A | 11/2004 | |
| JP | 2004-313459 A | 11/2004 | |
| JP | 2004-334788 A | 11/2004 | |
| JP | 2004-348600 A | 12/2004 | |
| JP | 2004-348601 A | 12/2004 | |
| JP | 2004-355088 A | 12/2004 | |
| JP | 2004-356816 A | 12/2004 | |
| JP | 2005-4490 A | 1/2005 | |
| JP | 2005-71225 A | 3/2005 | |
| JP | 2005-84991 A | 3/2005 | |
| JP | 2005-115480 A | 4/2005 | |
| JP | 2005-122700 A | 5/2005 | |
| JP | 2005-143890 A | 6/2005 | |
| JP | 2005-202578 A | 7/2005 | |
| JP | 2005-521961 A | 7/2005 | |
| JP | 2005-523505 A | 8/2005 | |
| JP | 2005-293280 A | 10/2005 | |
| JP | 2005-317049 A | 11/2005 | |
| JP | 2005-327076 A | 11/2005 | |
| JP | 2005-339425 A | 12/2005 | |
| JP | 2005-353053 A | 12/2005 | |
| JP | 2006-12080 A | 1/2006 | |
| JP | 2006-18613 A | 1/2006 | |
| JP | 2006-31182 A | 2/2006 | |
| JP | 2006-59280 A | 3/2006 | |
| JP | 2006-85559 A | 3/2006 | |
| JP | 2006-93912 A | 4/2006 | |
| JP | 2006-107288 A | 4/2006 | |
| JP | 2006-114018 A | 4/2006 | |
| JP | 2006-115043 A | 4/2006 | |
| JP | 2006-127502 A | 5/2006 | |
| JP | 2006-163960 A | 6/2006 | |
| JP | 2006-172180 A | 6/2006 | |
| JP | 2006-189999 A | 7/2006 | |
| JP | 2006-191245 A | 7/2006 | |
| JP | 2006-197071 A | 7/2006 | |
| JP | 2006-202278 A | 8/2006 | |
| JP | 2006-203858 A | 8/2006 | |
| JP | 2006-212185 A | 8/2006 | |
| JP | 2006-215705 A | 8/2006 | |
| JP | 2006-520053 A | 8/2006 | |
| JP | 2006-259930 A | 9/2006 | |
| JP | 2006-259931 A | 9/2006 | |
| JP | 2006-277670 A | 10/2006 | |
| JP | 2006-293939 A | 10/2006 | |
| JP | 2006-303701 A | 11/2006 | |
| JP | 2006-308375 A | 11/2006 | |
| JP | 2007-11667 A | 1/2007 | |
| JP | 2007-34637 A | 2/2007 | |
| JP | 2007-52574 A | 3/2007 | |
| JP | 2007-52770 A | 3/2007 | |
| JP | 2007-58397 A | 3/2007 | |
| JP | 2007-71008 A | 3/2007 | |
| JP | 2007-507011 A | 3/2007 | |
| JP | 2007-102278 A | 4/2007 | |
| JP | 2007-116318 A | 5/2007 | |
| JP | 2007-116602 A | 5/2007 | |
| JP | 2007-128201 A | 5/2007 | |
| JP | 2007-135149 A | 5/2007 | |
| JP | 2007-140696 A | 6/2007 | |
| JP | 2007-141002 A | 6/2007 | |
| JP | 2007-148801 A | 6/2007 | |
| JP | 2007-199984 A | 8/2007 | |
| JP | 2007-226293 A | 9/2007 | |
| JP | 2007-226794 A | 9/2007 | |
| JP | 2007-334637 A | 12/2007 | |
| JP | 2008-5180 A | 1/2008 | |
| JP | 2008-9529 A | 1/2008 | |
| JP | 2008-15800 A | 1/2008 | |
| JP | 2008-33681 A | 2/2008 | |
| JP | 2008-46692 A | 2/2008 | |
| JP | 2008-70926 A | 3/2008 | |
| JP | 2008-71158 A | 3/2008 | |
| JP | 2008-75424 A | 4/2008 | |
| JP | 2008-250601 A | 10/2008 | |
| JP | 2009-9434 A | 1/2009 | |
| JP | 2009-15543 A | 1/2009 | |
| JP | 2009-42802 A | 2/2009 | |
| JP | 2009-49878 A | 3/2009 | |
| JP | 2009-87156 A | 4/2009 | |
| JP | 2009-99076 A | 5/2009 | |
| JP | 2009-135770 A | 6/2009 | |
| JP | 2009-211166 A | 9/2009 | |
| JP | 2009-240523 A | 10/2009 | |
| JP | 2009-258991 A | 11/2009 | |
| JP | 2010-9513 A | 1/2010 | |
| JP | 2010-15417 A | 1/2010 | |
| JP | 2010-28404 A | 2/2010 | |
| JP | 2010-102718 A | 5/2010 | |
| JP | 2010-112002 A | 5/2010 | |
| JP | 2010-517390 A | 5/2010 | |
| JP | 2010-152506 A | 7/2010 | |
| JP | 2010-165012 A | 7/2010 | |
| JP | 2010-524051 A | 7/2010 | |
| JP | 2010-211577 A | 9/2010 | |
| JP | 2010-211579 A | 9/2010 | |
| JP | 2010-211742 A | 9/2010 | |
| JP | 2010-250386 A | 11/2010 | |
| JP | 2010-271779 A | 12/2010 | |
| JP | 2010-541046 A | 12/2010 | |
| JP | 2011-22687 A | 2/2011 | |
| JP | 2011-53849 A | 3/2011 | |
| JP | 2011-54120 A | 3/2011 | |
| JP | 2011-97287 A | 5/2011 | |
| JP | 2011-114611 A | 6/2011 | |
| JP | 2011-519439 A | 7/2011 | |
| JP | 2011-159006 A | 8/2011 | |
| JP | 2011-192228 A | 9/2011 | |
| JP | 2011-209787 A | 10/2011 | |
| JP | 2011-217146 A | 10/2011 | |
| JP | 2011-242924 A | 12/2011 | |
| JP | 2012-8951 A | 1/2012 | |
| JP | 2012-8985 A | 1/2012 | |
| JP | 2012-504273 A | 2/2012 | |
| JP | 2012-73724 A | 4/2012 | |
| JP | 2012-508930 A | 4/2012 | |
| JP | 2012-99025 A | 5/2012 | |
| JP | 2012-164070 A | 8/2012 | |
| JP | 2012-168802 A | 9/2012 | |
| JP | 2012-194661 A | 10/2012 | |
| JP | 2012-208719 A | 10/2012 | |
| JP | 2012-215981 A | 11/2012 | |
| JP | 2012-529699 A | 11/2012 | |
| JP | 2013-9073 A | 1/2013 | |
| JP | 2013-20496 A | 1/2013 | |
| JP | 2013-30052 A | 2/2013 | |
| JP | 2013-34322 A | 2/2013 | |
| JP | 2013-58828 A | 3/2013 | |
| JP | 2013-88906 A | 5/2013 | |
| JP | 2013-114317 A | 6/2013 | |
| JP | 2013-114498 A | 6/2013 | |

(56) References Cited

FOREIGN PATENT DOCUMENTS

| | | | |
|---|---|---|---|
| JP | 2013-140540 | A | 7/2013 |
| JP | 2013-530445 | A | 7/2013 |
| JP | 2013-149206 | A | 8/2013 |
| JP | 2013-533532 | A | 8/2013 |
| JP | 2013-534008 | A | 8/2013 |
| JP | 5267966 | B2 | 8/2013 |
| JP | 2013-174904 | A | 9/2013 |
| JP | 2013-178723 | A | 9/2013 |
| JP | 2013-534662 | A | 9/2013 |
| JP | 2013-537670 | A | 10/2013 |
| JP | 2013-232197 | A | 11/2013 |
| JP | 2014-44719 | A | 3/2014 |
| JP | 2014-44724 | A | 3/2014 |
| JP | 2014-75155 | A | 4/2014 |
| JP | 2014-93076 | A | 5/2014 |
| JP | 2014-102845 | A | 6/2014 |
| JP | 2014-110009 | A | 6/2014 |
| JP | 2014-517366 | A | 7/2014 |
| JP | 2014-230061 | A | 12/2014 |
| JP | 2014-239478 | A | 12/2014 |
| JP | 2015-14923 | A | 1/2015 |
| JP | 2015-36925 | A | 2/2015 |
| JP | 2015-56142 | A | 3/2015 |
| JP | 2015-75877 | A | 4/2015 |
| JP | 2015-514254 | A | 5/2015 |
| JP | 2015-144026 | A | 8/2015 |
| JP | 2015-149634 | A | 8/2015 |
| JP | 2015-187783 | A | 10/2015 |
| JP | 2015-207051 | A | 11/2015 |
| JP | 2016-508007 | A | 3/2016 |
| JP | 2016-53865 | A | 4/2016 |
| JP | 2016-76799 | A | 5/2016 |
| JP | 2016-521403 | A | 7/2016 |
| JP | 2016-162000 | A | 9/2016 |
| JP | 2016-534435 | A | 11/2016 |
| JP | 6023162 | B2 | 11/2016 |
| JP | 2016-224960 | A | 12/2016 |
| JP | 2017-16170 | A | 1/2017 |
| JP | 2017-500656 | A | 1/2017 |
| JP | 1573356 | S | 4/2017 |
| JP | 6112878 | B2 | 4/2017 |
| JP | 2017-91129 | A | 5/2017 |
| JP | 2017-102952 | A | 6/2017 |
| JP | 2017-117159 | A | 6/2017 |
| JP | 2017-138846 | A | 8/2017 |
| JP | 6208151 | B2 | 10/2017 |
| JP | 6238381 | B1 | 11/2017 |
| JP | 2018-36965 | A | 3/2018 |
| JP | 2018-513515 | A | 5/2018 |
| JP | 2019-155115 | A | 9/2019 |
| JP | 2020-30853 | A | 2/2020 |
| JP | 2020-504376 | A | 2/2020 |
| JP | 2020-149336 | A | 9/2020 |
| JP | 2021-533512 | A | 12/2021 |
| JP | 2022-3545 | A | 1/2022 |
| JP | 2022-23406 | A | 2/2022 |
| JP | 2022-109048 | A | 7/2022 |
| JP | 2024-109668 | A | 8/2024 |
| JP | 2024-537657 | A | 10/2024 |
| JP | 2000-276446 | A | 11/2024 |
| JP | 2013-134570 | A | 11/2024 |
| KR | 2000-0030544 | A | 6/2000 |
| KR | 10-2001-0019345 | A | 3/2001 |
| KR | 10-2001-0074258 | A | 8/2001 |
| KR | 2001-0074059 | A | 8/2001 |
| KR | 2002-0002484 | A | 1/2002 |
| KR | 2002-0019031 | A | 3/2002 |
| KR | 2002-0022295 | A | 3/2002 |
| KR | 10-2002-0038162 | A | 5/2002 |
| KR | 2002-0087665 | A | 11/2002 |
| KR | 10-2004-0005505 | A | 1/2004 |
| KR | 10-2004-0049502 | A | 6/2004 |
| KR | 10-2004-0084994 | A | 10/2004 |
| KR | 10-2005-0061975 | A | 6/2005 |
| KR | 10-2006-0018063 | A | 2/2006 |
| KR | 10-052624 | B1 | 12/2006 |
| KR | 10-2007-0004191 | A | 1/2007 |
| KR | 10-2007-0028808 | A | 3/2007 |
| KR | 10-2007-0044055 | A | 4/2007 |
| KR | 10-2007-0081773 | A | 8/2007 |
| KR | 10-2007-0086374 | | 8/2007 |
| KR | 10-2007-0120125 | A | 12/2007 |
| KR | 10-2008-0002837 | A | 1/2008 |
| KR | 10-0805341 | B1 | 2/2008 |
| KR | 10-2008-0064395 | A | 7/2008 |
| KR | 10-2009-0011323 | A | 2/2009 |
| KR | 10-2009-0089472 | A | 8/2009 |
| KR | 10-2010-0074218 | A | 7/2010 |
| KR | 10-1024272 | B1 | 3/2011 |
| KR | 10-2011-0056561 | A | 5/2011 |
| KR | 10-2011-0098435 | A | 9/2011 |
| KR | 10-2011-0101683 | A | 9/2011 |
| KR | 10-2011-0114732 | A | 10/2011 |
| KR | 10-2012-0040693 | A | 4/2012 |
| KR | 10-2012-0052150 | A | 5/2012 |
| KR | 10-2012-0076675 | A | 7/2012 |
| KR | 10-2012-0087333 | A | 8/2012 |
| KR | 10-2012-0127842 | A | 11/2012 |
| KR | 10-2013-0011423 | A | 1/2013 |
| KR | 10-2013-0027326 | A | 3/2013 |
| KR | 10-1253392 | B1 | 4/2013 |
| KR | 10-2013-0044292 | A | 5/2013 |
| KR | 10-1312097 | B1 | 9/2013 |
| KR | 10-2013-0116905 | A | 10/2013 |
| KR | 10-1330962 | B1 | 11/2013 |
| KR | 10-1342208 | B1 | 12/2013 |
| KR | 10-2014-0015171 | A | 2/2014 |
| KR | 10-2014-0018019 | A | 2/2014 |
| KR | 10-2014-0026263 | A | 3/2014 |
| KR | 10-2014-0055429 | A | 5/2014 |
| KR | 10-2014-0063531 | A | 5/2014 |
| KR | 10-2014-0137400 | A | 12/2014 |
| KR | 10-2015-0013264 | A | 2/2015 |
| KR | 10-2015-0029495 | A | 3/2015 |
| KR | 10-2015-0068013 | A | 6/2015 |
| KR | 10-2016-0012636 | A | 2/2016 |
| KR | 10-2016-0014623 | A | 2/2016 |
| KR | 10-2016-0026337 | A | 3/2016 |
| KR | 10-2016-0026791 | A | 3/2016 |
| KR | 10-2016-0045633 | A | 4/2016 |
| KR | 10-2016-0048215 | A | 5/2016 |
| KR | 10-2016-0054573 | A | 5/2016 |
| KR | 10-2016-0099432 | A | 8/2016 |
| KR | 10-2017-0019595 | A | 2/2017 |
| KR | 10-2017-0023063 | A | 3/2017 |
| KR | 10-2017-0065563 | A | 6/2017 |
| KR | 10-1820573 | B1 | 1/2018 |
| KR | 10-2020-0135538 | A | 12/2020 |
| TW | 200529636 | A | 9/2005 |
| TW | 200601176 | A | 1/2006 |
| TW | 200642408 | A | 12/2006 |
| TW | 200919255 | A | 5/2009 |
| WO | 97/41528 | A1 | 11/1997 |
| WO | 98/58346 | A1 | 12/1998 |
| WO | 99/28701 | A1 | 6/1999 |
| WO | 99/44114 | A1 | 9/1999 |
| WO | 00/55812 | A1 | 9/2000 |
| WO | 00/68873 | A1 | 11/2000 |
| WO | 00/72245 | A1 | 11/2000 |
| WO | 01/24103 | A1 | 4/2001 |
| WO | 01/57757 | A1 | 8/2001 |
| WO | 01/80017 | A1 | 10/2001 |
| WO | 02/01864 | A1 | 1/2002 |
| WO | 02/21871 | A1 | 3/2002 |
| WO | 03/038698 | A1 | 5/2003 |
| WO | 03/083793 | A2 | 10/2003 |
| WO | 2004/029862 | A1 | 4/2004 |
| WO | 2004/079530 | A2 | 9/2004 |
| WO | 2004/104813 | A1 | 12/2004 |
| WO | 2005/008568 | A1 | 1/2005 |
| WO | 2005/020036 | A2 | 3/2005 |
| WO | 2005/048832 | A1 | 6/2005 |
| WO | 2005/106774 | A2 | 11/2005 |
| WO | 2006/004155 | A1 | 1/2006 |

(56) References Cited

FOREIGN PATENT DOCUMENTS

| | | |
|---|---|---|
| WO | 2006/051462 A1 | 5/2006 |
| WO | 2006/061833 A2 | 6/2006 |
| WO | 2006/113834 A2 | 10/2006 |
| WO | 2006/115518 A1 | 11/2006 |
| WO | 2007/017207 A1 | 2/2007 |
| WO | 2007/029710 A1 | 3/2007 |
| WO | 2007/060102 A1 | 5/2007 |
| WO | 2007/070014 A1 | 6/2007 |
| WO | 2007/072447 A2 | 6/2007 |
| WO | 2007/073422 A1 | 6/2007 |
| WO | 2007/076210 A1 | 7/2007 |
| WO | 2007/116521 A1 | 10/2007 |
| WO | 2008/008101 A2 | 1/2008 |
| WO | 2008/013001 A1 | 1/2008 |
| WO | 2008/024454 A1 | 2/2008 |
| WO | 2008/147457 A1 | 12/2008 |
| WO | 2008/151229 A1 | 12/2008 |
| WO | 2009/042392 A2 | 4/2009 |
| WO | 2009/045335 A2 | 4/2009 |
| WO | 2009/108645 A1 | 9/2009 |
| WO | 2009/125481 A1 | 10/2009 |
| WO | 2010/039337 A2 | 4/2010 |
| WO | 2010/056484 A2 | 5/2010 |
| WO | 2010/059306 A2 | 5/2010 |
| WO | 2010/086993 A1 | 8/2010 |
| WO | 2010/120972 A1 | 10/2010 |
| WO | 2010/128442 A2 | 11/2010 |
| WO | 2011/119407 A1 | 9/2011 |
| WO | 2011/130422 A2 | 10/2011 |
| WO | 2012/018513 A1 | 2/2012 |
| WO | 2012/068193 A2 | 5/2012 |
| WO | 2012/083113 A2 | 6/2012 |
| WO | 2012/128750 A1 | 9/2012 |
| WO | 2012/129231 A1 | 9/2012 |
| WO | 2013/000150 A1 | 1/2013 |
| WO | 2013/003372 A1 | 1/2013 |
| WO | 2013/005115 A2 | 1/2013 |
| WO | 2013/019880 A1 | 2/2013 |
| WO | 2013/023224 A2 | 2/2013 |
| WO | 2013/052081 A2 | 4/2013 |
| WO | 2013/066659 A1 | 5/2013 |
| WO | 2013/096943 A1 | 6/2013 |
| WO | 2013/096949 A1 | 6/2013 |
| WO | 2013/125222 A1 | 8/2013 |
| WO | 2013/169849 A2 | 11/2013 |
| WO | 2013/169877 A2 | 11/2013 |
| WO | 2013/173838 A2 | 11/2013 |
| WO | 2013/177500 A1 | 11/2013 |
| WO | 2013/177548 A1 | 11/2013 |
| WO | 2013/181102 A1 | 12/2013 |
| WO | 2014/004556 A1 | 1/2014 |
| WO | 2014/012456 A1 | 1/2014 |
| WO | 2014/105276 A1 | 7/2014 |
| WO | 2014/124332 A2 | 8/2014 |
| WO | 2014/147297 A1 | 9/2014 |
| WO | 2014/193465 A1 | 12/2014 |
| WO | 2015/057320 A1 | 4/2015 |
| WO | 2015/062382 A1 | 5/2015 |
| WO | 2015/069153 A1 | 5/2015 |
| WO | 2015/088141 A1 | 6/2015 |
| WO | 2015/105649 A1 | 7/2015 |
| WO | 2015/119605 A1 | 8/2015 |
| WO | 2015/120019 A1 | 8/2015 |
| WO | 2015/195216 A1 | 12/2015 |
| WO | 2015/196448 A1 | 12/2015 |
| WO | 2016/013249 A1 | 1/2016 |
| WO | 2016/025036 A1 | 2/2016 |
| WO | 2016/036218 A1 | 3/2016 |
| WO | 2016/049439 A1 | 3/2016 |
| WO | 2016/111808 A1 | 7/2016 |
| WO | 2016/123309 A1 | 8/2016 |
| WO | 2016/126374 A1 | 8/2016 |
| WO | 2016/189390 A2 | 12/2016 |
| WO | 2016/196054 A1 | 12/2016 |
| WO | 2016/201037 A1 | 12/2016 |
| WO | 2017/012302 A1 | 1/2017 |
| WO | 2017/030223 A1 | 2/2017 |
| WO | 2017/043314 A1 | 3/2017 |
| WO | 2017/060844 A1 | 4/2017 |
| WO | 2017/068422 A1 | 4/2017 |
| WO | 2017/094052 A1 | 6/2017 |
| WO | 2017/132258 A1 | 8/2017 |
| WO | 2017/218094 A1 | 12/2017 |
| WO | 2018/048632 A1 | 3/2018 |
| WO | 2018/109751 A1 | 6/2018 |
| WO | 2018/125563 A1 | 7/2018 |
| WO | 2018/212801 A1 | 11/2018 |
| WO | 2018/226265 A1 | 12/2018 |
| WO | 2019/033129 A2 | 2/2019 |
| WO | 2019/216999 A1 | 11/2019 |
| WO | 2020/028236 A1 | 2/2020 |
| WO | 2021/188439 A1 | 9/2021 |
| WO | 2022/086580 A1 | 4/2022 |
| WO | 2022/147146 A1 | 7/2022 |
| WO | 2023/049418 A2 | 3/2023 |

OTHER PUBLICATIONS

Notice of Allowance received for Japanese Patent Application No. 2023-110191, mailed on Dec. 6, 2024, 4 pages (1 page of English Translation and 3 pages of Official Copy).

Office Action received for Australian Patent Application No. 2023213252, mailed on Dec. 9, 2024, 3 pages.

Office Action received for Chinese Patent Application No. 202011020666.5, mailed on Nov. 7, 2024, 7 pages (4 pages of English Translation and 3 pages of Official Copy).

Office Action received for European Patent Application No. 21173988.3, mailed on Dec. 10, 2024, 5 pages.

Office Action received for European Patent Application No. 22198902.3, mailed on Dec. 12, 2024, 8 pages.

Office Action received for Indian Patent Application No. 202318006305, mailed on Dec. 4, 2024, 9 pages.

Office Action received for Indian Patent Application No. 202318006306, mailed on Dec. 4, 2024, 9 pages.

Office Action received for Indian Patent Application No. 202318006307, mailed on Dec. 4, 2024, 9 pages.

Office Action received for Indian Patent Application No. 202318006308, mailed on Dec. 4, 2024, 10 pages.

Office Action received for Indian Patent Application No. 202318006309, mailed on Dec. 4, 2024, 9 pages.

Office Action received for Indian Patent Application No. 202318006310, mailed on Dec. 6, 2024, 10 pages.

Office Action received for Indian Patent Application No. 202318006311, mailed on Dec. 6, 2024, 10 pages.

Office Action received for Indian Patent Application No. 202318006312, mailed on Dec. 6, 2024, 10 pages.

Office Action received for Indian Patent Application No. 202318006313, mailed on Dec. 6, 2024, 10 pages.

Office Action received for Indian Patent Application No. 202318006314, mailed on Dec. 6, 2024, 10 pages.

Office Action received for Japanese Patent Application No. 2023-211453, mailed on Dec. 6, 2024, 6 pages (3 pages of English Translation and 3 pages of Official Copy).

Advisory Action received for U.S. Appl. No. 14/503,296, mailed on Oct. 2, 2015, 3 pages.

Adractas et al., "The road to mobile payments services", McKinsey on Payments, Online available at: https://www.mckinsey.com.br/~/media/mckinsey/dotcom/client_service/financial%20service s/latest%20thinking/reports/the_road_to_mobile_payments_services.pdf, Sep. 2011, pp. 45-52.

Adrianisen, "Samsung Galaxy S8 Face Recognition ~ Register Your Face Review!", Retrieved from < https://www.youtube.com/watch?v=04KVPaCJq94>, Apr. 27, 2017, 1 page.

Advisory Action received for U.S. Appl. No. 12/207,374, mailed on Feb. 25, 2013, 3 pages.

Advisory Action received for U.S. Appl. No. 12/207,374, mailed on May 15, 2014, 3 pages.

Advisory Action received for U.S. Appl. No. 14/311,214, mailed on Feb. 10, 2015, 4 pages.

(56) References Cited

OTHER PUBLICATIONS

Advisory Action received for U.S. Appl. No. 14/980,344, mailed on Feb. 10, 2020, 5 pages.

Advisory Action received for U.S. Appl. No. 14/980,344, mailed on Mar. 27, 2019, 5 pages.

Advisory Action received for U.S. Appl. No. 15/137,944, mailed on May 11, 2017, 6 pages.

Advisory Action received for U.S. Appl. No. 16/164,561, mailed on Nov. 14, 2019, 2 pages.

Advisory Action received for U.S. Appl. No. 16/369,473, mailed on May 12, 2022, 4 pages.

Advisory Action received for U.S. Appl. No. 17/193,991, mailed on Jan. 31, 2023, 3 pages.

Advisory Action received for U.S. Appl. No. 17/863,974, mailed on Feb. 15, 2023, 2 pages.

Action received for U.S. Appl. No. 17/962,369, mailed on Nov. 13, 2023, 4 pages.

Action received for U.S. Appl. No. 15/250,152, mailed on Mar. 25, 2019, 5 pages.

Amazon.com, "Visual ID on Echo Show", Online Available at: <https://www.amazon.com/b?ie=UTF8&node=23615589011>, retrieved on Aug. 16, 2023, 3 pages.

Decision received for Australian Patent Application No. 2019268070, mailed on Dec. 22, 2022, 26 pages.

Interview Summary received for U.S. Appl. No. 13/243,045, mailed on Oct. 22, 2019, 3 pages.

Interview Summary received for U.S. Appl. No. 15/714,887. mailed on Aug. 19, 2020, 4 pages.

Interview Summary received for U.S. Appl. No. 15/714,887, mailed on Mar. 17, 2020, 5 pages.

Interview Summary received for U.S. Appl. No. 16/147,023, mailed on Oct. 29, 2019, 3 pages.

Interview Summary received for U.S. Appl. No. 16/553,622, mailed on Aug. 3, 2020, 3 pages.

Interview Summary received for U.S. Appl. No. 17/725,311, mailed on Jun. 30, 2023, 5 pages.

Interview Summary received for U.S. Appl. No. 14/612,214, mailed on Feb. 18, 2020, 3 pages.

Interview Summary received for U.S. Appl. No. 16/125,267, mailed on Feb. 8, 2021, 3 pages.

Interview Summary received for U.S. Appl. No. 16/125,267. mailed on Jan. 25, 2022, 5 pages.

Interview Summary received for U.S. Appl. No. 16/125,267, mailed on Jun. 25, 2021, 5 pages.

Applicant-Initiated Interview Summary received for U.S. Appl. No. 16/125,267, mailed on Oct. 25, 2021, 4 pages.

Applicant-Initiated Interview Summary received for U.S. Appl. No. 16/125,267, mailed on Sep. 14, 2020, 5 pages.

Applicant-Initiated Interview Summary received for U.S. Appl. No. 16/369,355, mailed on Jul. 28, 2021, 2 pages.

Applicant-Initiated Interview Summary received for U.S. Appl. No. 16/369,473, mailed on Apr. 16, 2021, 2 pages.

Applicant-Initiated Interview Summary received for U.S. Appl. No. 16/369,473, mailed on Oct. 13, 2020, 5 pages.

Applicant-Initiated Interview Summary received for U.S. Appl. No. 16/369,473, mailed on Oct. 18, 2021, 2 pages.

Applicant-Initiated Interview Summary received for U.S. Appl. No. 16/369,473, mailed on Sep. 21, 2020, 5 pages.

Applicant-Initiated Interview Summary received for U.S. Appl. No. 16/667,271, mailed on Apr. 8, 2020, 3 pages.

Applicant-Initiated Interview Summary received for U.S. Appl. No. 16/670,949, mailed on Apr. 6, 2021, 2 pages.

Applicant-Initiated Interview Summary received for U.S. Appl. No. 16/938,362, mailed on Nov. 2, 2022, 2 pages.

Applicant-Initiated Interview Summary received for U.S. Appl. No. 16/062,941, mailed on Apr. 19, 2023, 2 pages.

Applicant-Initiated Interview Summary received for U.S. Appl. No. 16/062,941, mailed on Dec. 14, 2023, 2 pages.

Applicant-Initiated Interview Summary received for U.S. Appl. No. 17/087,855, mailed on Feb. 28, 2022, 2 pages.

Applicant-Initiated Interview Summary received for U.S. Appl. No. 17/087,855, mailed on Jul. 5, 2022, 2 pages.

Applicant-Initiated Interview Summary received for U.S. Appl. No. 17/087,855, mailed on Nov. 5, 2021, 2 pages.

Applicant-Initiated Interview Summary received for U.S. Appl. No. 17/409,570, mailed on Dec. 7, 2022, 4 pages.

Applicant-Initiated Interview Summary received for U.S. Appl. No. 17/409,570, mailed on Dec. 27, 2022, 2 pages.

Applicant-Initiated Interview Summary received for U.S. Appl. No. 17/409,570, mailed on Nov. 3, 2022, 5 pages.

Interview Summary received for U.S. Appl. No. 17/409,570, mailed on Nov. 29, 2022, 4 pages.

Interview Summary received for U.S. Appl. No. 17/496,716, mailed on Sep. 14, 2023, 2 pages.

Interview Summary received for U.S. Appl. No. 17/725,311, mailed on Jan. 16, 2024, 6 pages.

Interview Summary received for U.S. Appl. No. 17/863,974, mailed on Dec. 9, 2022, 2 pages.

Interview Summary received for U.S. Appl. No. 17/863,974, mailed on May 25, 2023, 2 pages.

Interview Summary received for U.S. Appl. No. 17/962,369, mailed on Jul. 24, 2023, 4 pages.

Interview Summary received for U.S. Appl. No. 17/962,369, mailed on Oct. 16, 2023, 4 pages.

Interview Summary received for U.S. Appl. No. 18/105,191, mailed on Apr. 30, 2024, 2 pages.

Interview Summary received for U.S. Appl. No. 18/105,191. mailed on Jan. 17, 2024, 2 pages.

Interview Summary received for U.S. Appl. No. 18/136,819, mailed on Dec. 20, 2023, 2 pages.

Interview Summary received for U.S. Appl. No. 18/136,819, mailed on Mar. 19, 2024, 2 pages.

Bao et al., "Location-based and Preference-Aware Recommendation Using Sparse Geo-Social Networking Data", ACM SIGSPATIAL GIS '12, Redondo Beach, CA, USA, Online available at: https://www.microsoft.com/en~us/research/wp~content/uploads/2016/02/LocationRecommendation.pdf, Nov. 6-9, 2012, 10 pages.

Board Decision received for Chinese Patent Application No. 201410407626.4, mailed on Jun. 8, 2020, 17 pages.

Board Decision received for Chinese Patent Application No. 201510284715.9, mailed on Jul. 21, 2022, 22 pages.

Board Decision received for Chinese Patent Application No. 201510284896.5, mailed on Nov. 19, 2021, 14 pages.

Board Decision received for Chinese Patent Application No. 201710094150.7, mailed on Dec. 22, 2021, 20 pages.

Board Decision received for Chinese Patent Application No. 201710198190.6, mailed on May 23, 2022, 2 pages.

Board Decision received for Chinese Patent Application No. 201810094316.X, mailed on Dec. 3, 2021, 18 pages.

Board Decision received for Chinese Patent Application No. 201810338826.7, mailed on May 30, 2022, 20 pages.

Board Decision received for Chinese Patent Application No. 201510284715.9, mailed on Jun. 6, 2021, 14 pages.

Board Decision received for Chinese Patent Application No. 201610459968.X, mailed on Mar. 3, 2022, 11 pages.

Board Decision received for Chinese Patent Application No. 201810094316.X, mailed on Sep. 30, 2021, 11 pages.

Board Decision received for Chinese Patent Application No. 201810338826.7, mailed on Jan. 19, 2022, 18 pages.

Brief Communication Regarding Oral Proceedings received for European Patent Application No. 15727291.5, mailed on Jun. 9, 2020, 12 pages.

Brief Communication Regarding Oral Proceedings received for European Patent Application No. 16201159.7, mailed on Jun. 29, 2021, 13 pages.

Brief Communication Regarding Oral Proceedings received for European Patent Application No. 16201205.8, mailed on May 29, 2020, 29 pages.

Brief Communication Regarding Oral Proceedings received for European Patent Application No. 17799904.2, mailed on Sep. 13, 2022, 1 page.

(56) References Cited

OTHER PUBLICATIONS

Brief Communication Regarding Oral Proceedings received for European Patent Application No. 18713408.5, mailed on Sep. 28, 2021, 2 pages.
Brief Communication Regarding Oral Proceedings received for European Patent Application No. 18830326.7, mailed on Jun. 30, 2021, 2 pages.
Brief Communication Regarding Oral Proceedings received for European Patent Application No. 19150528.8, mailed on Sep. 5, 2022, 2 pages.
Brief Communication Regarding Oral Proceedings received for European Patent Application No. 19160348.9, mailed on Nov. 8, 2022, 3 pages.
Brief Communication Regarding Oral Proceedings received for European Patent Application No. 19194828.0, mailed on May 6, 2022, 1 page.
Brief Communication Regarding Oral Proceedings received for European Patent Application No. 20198076.0, mailed on Aug. 28, 2023, 1 page.
Brief Communication Regarding Oral Proceedings received for European Patent Application No. 20198076.0, mailed on May 2, 2023, 1 page.
Certificate of Examination received for Australian Patent Application No. 2017100553, mailed on Jan. 17, 2018, 2 pages.
Choong et al., "Fingerprint Self-Captures: Usability of a fingerprint system with real-time feedback.", IEEE Fifth International Conference on Biometrics: Theory, Applications and Systems (BTAS). IEEE, 2012. URL: https://ieeexplore.ieee.orgistamp/stamp.jsp?tp. Szar-munber=6374553, 2012, pp. 16-22.
Corrected Notice of Allowance received for U.S. Appl. No. 12/074,985, mailed on Oct. 10, 2013, 4 pages.
Corrected Notice of Allowance received for U.S. Appl. No. 14/612,214, mailed on May 1, 2020, 2 pages.
Corrected Notice of Allowance received for U.S. Appl. No. 15/017,436, mailed on Sep. 2, 2016, 5 pages.
Corrected Notice of Allowance received for U.S. Appl. No. 15/137,944, mailed on Jan. 11, 2018, 2 pages.
Corrected Notice of Allowance received for U.S. Appl. No. 15/137,944, mailed on Jan. 19, 2018, 2 pages.
Corrected Notice of Allowance received for U.S. Appl. No. 15/269,801, mailed on Oct. 3, 2017, 4 pages.
Corrected Notice of Allowance received for U.S. Appl. No. 15/294,439, mailed on Mar. 13, 2019, 4 pages.
Corrected Notice of Allowance received for U.S. Appl. No. 15/357,873, mailed on Jan. 19, 2018, 2 pages.
Corrected Notice of Allowance received for U.S. Appl. No. 15/357,873, mailed on Mar. 16, 2018, 2 pages.
Corrected Notice of Allowance received for U.S. Appl. No. 15/845,794, mailed on Feb. 25, 2019, 2 pages.
Corrected Notice of Allowance received for U.S. Appl. No. 15/866,341, mailed on Aug. 21, 2019, 3 pages.
Corrected Notice of Allowance received for U.S. Appl. No. 15/866,341, mailed on Aug. 26, 2019, 3 pages.
Corrected Notice of Allowance received for U.S. Appl. No. 16/125,267, mailed on Apr. 4, 2022, 2 pages.
Corrected Notice of Allowance received for U.S. Appl. No. 16/125,267, mailed on Mar. 16, 2022, 2 pages.
Corrected Notice of Allowance received for U.S. Appl. No. 16/125,267, mailed on May 4, 2022, 3 pages.
Corrected Notice of Allowance received for U.S. Appl. No. 16/369,473, mailed on Sep. 9, 2022, 2 pages.
Corrected Notice of Allowance received for U.S. Appl. No. 16/386,707, mailed on Feb. 19, 2021, 2 pages.
Corrected Notice of Allowance received for U.S. Appl. No. 16/386,707, mailed on Jan. 25, 2021, 2 pages.
Corrected Notice of Allowance received for U.S. Appl. No. 16/434,865, mailed on Apr. 28, 2020, 2 pages.
Corrected Notice of Allowance received for U.S. Appl. No. 16/434,865, mailed on Jun. 4, 2020, 2 pages.

Corrected Notice of Allowance received for U.S. Appl. No. 16/456,839, mailed on Apr. 29, 2021, 2 pages.
Corrected Notice of Allowance received for U.S. Appl. No. 16/456,839, mailed on Jul. 20, 2021, 3 pages.
Corrected Notice of Allowance received for U.S. Appl. No. 16/553,622, mailed on Sep. 23, 2020, 5 pages.
Corrected Notice of Allowance received for U.S. Appl. No. 16/670,949, mailed on Sep. 8, 2021, 2 pages.
Corrected Notice of Allowance received for U.S. Appl. No. 16/843,638, mailed on Dec. 22, 2021, 2 pages.
Corrected Notice of Allowance received for U.S. Appl. No. 16/843,638, mailed on Feb. 16, 2022, 2 pages.
Corrected Notice of Allowance received for U.S. Appl. No. 16/938,362, mailed on Feb. 7, 2023, 4 pages.
Corrected Notice of Allowance received for U.S. Appl. No. 16/987,003, mailed on Sep. 1, 2021, 3 pages.
Corrected Notice of Allowance received for U.S. Appl. No. 17/087,855, mailed on Jan. 12, 2023, 6 pages.
Corrected Notice of Allowance received for U.S. Appl. No. 17/087,855, mailed on Jan. 25, 2023, 4 pages.
Corrected Notice of Allowance received for U.S. Appl. No. 17/208,957, mailed on Jun. 30, 2022, 2 pages.
Corrected Notice of Allowance received for U.S. Appl. No. 17/409,570, mailed on May 10, 2023, 2 pages.
Corrected Notice of Allowance received for U.S. Appl. No. 17/496,716, mailed on Dec. 6, 2023, 2 pages.
Corrected Notice of Allowance received for U.S. Appl. No. 17/587,558, mailed on Apr. 16, 2024, 2 pages.
Corrected Notice of Allowance received for U.S. Appl. No. 17/725,311, mailed on Mar. 28, 2024, 2 pages.
Corrected Notice of Allowance received for U.S. Appl. No. 18/105,191, mailed on Aug. 6, 2024, 5 pages.
CV Meerkat, "Extracting Face Orientation in Real-time", Available online at: <https://www.youtube.com/watch?v=Ugwfnjx6UYw>, Jul. 22, 2016, 3 pages.
Das et al., "A Security Framework for Mobile-to-Mobile Payment Network", International Conference on Personal Wireless Communications, Jan. 25, 2005, pp. 420-423.
Decision from Intellectual Property Tribunal received for Korean Patent Application No. 10-2011-7023152, mailed on Feb. 17, 2015, 22 pages.
Decision on Appeal received for Korean Patent Application No. 10-2015-7010262, mailed on Dec. 21, 2018, 16 pages.
Decision on Appeal received for Korean Patent Application No. 10-2016-0152210, mailed on Jun. 23, 2020, 20 pages.
Decision on Appeal received for Korean Patent Application No. 10-2019-7033799, mailed on Jul. 19, 2022, 23 pages.
Decision on Appeal received for Korean Patent Application No. 10-2020-7020782, mailed on Jan. 24, 2022, 22 pages.
Decision on Appeal received for Korean Patent Application No. 10-2022-7004578, mailed on Oct. 31, 2023, 26 pages.
Decision on Appeal received for U.S. Appl. No. 13/243,045, mailed on Mar. 18, 2019, 10 Pages.
Decision on Appeal received for U.S. Appl. No. 13/243,045, mailed on May 10, 2021, 11 pages.
Decision on Appeal received for U.S. Appl. No. 14/612,214, mailed on Sep. 3, 2019, 10 pages.
Decision on Appeal received for U.S. Appl. No. 15/714,887, mailed on Feb. 18, 2022, 14 pages.
Decision to Grant received for Danish Patent Application No. PA201670628, mailed on Nov. 20, 2017, 2 pages.
Decision to Grant received for Danish Patent Application No. PA201770418, mailed on Oct. 25, 2019, 3 pages.
Decision to Grant received for Danish Patent Application No. PA201770419, mailed on Oct. 25, 2018, 2 pages,.
Decision to Grant received for Danish Patent Application No. PA201770715, mailed on Feb. 15, 2019, 2 pages.
Decision to Grant received for Danish Patent Application No. PA201770782, mailed on Oct. 25, 2019, 2 pages.
Decision to Grant received for Danish Patent Application No. PA201870370, mailed on Mar. 29, 2019, 2 pages.
Decision to Grant received for Danish Patent Application No. PA201870371, mailed on Mar. 29, 2019, 2 pages.

(56) References Cited

OTHER PUBLICATIONS

Decision to Grant received for Danish Patent Application No. PA201870855, mailed on Oct. 20, 2020, 2 pages.
Decision to Grant received for Danish Patent Application No. PA201970127, mailed on Aug. 20, 2020, 2 pages.
Decision to Grant received for European Patent Application No. 12773460.6, mailed on Jun. 27, 2019, 2 pages.
Decision to Grant received for European Patent Application No. 13171145.9, mailed on Jul. 11, 2019, 2 pages.
Decision to Grant received for European Patent Application No. 14853215.3, mailed on Sep. 27, 2018, 2 pages.
Decision to Grant received for European Patent Application No. 15168475.0, mailed on Sep. 30, 2021, 2 pages.
Decision to Grant received for European Patent Application No. 17853654.6, mailed on Apr. 15, 2021, 2 pages.
Decision to Grant received for European Patent Application No. 18190250.3, mailed on Oct 1, 2020, 2 pages.
Decision to Grant received for European Patent Application No. 18704335.1, mailed on Sep. 24, 2020, 2 pages.
Decision to Grant received for European Patent Application No. 18713408.5, mailed on Sep. 1, 2022, 3 pages.
Decision to Grant received for European Patent Application No. 18830326.7, mailed on Nov. 11, 2021, 3 pages.
Decision to Grant received for European Patent Application No. 19160344.8, mailed on Sep. 1, 2022, 3 pages.
Decision to Grant received for European Patent Application No. 19194828.0, mailed on Oct. 27, 2022, 3 pages.
Decision to Grant received for European Patent Application No. 19769336.9, mailed on Oct. 7, 2022, 2 pages.
Decision to Grant received for European Patent Application No. 20186286.9, mailed on May 11, 2023, 4 pages.
Decision to Grant received for European Patent Application No. 20196476.4, mailed on Jan. 13, 2022, 2 pages.
Decision to Grant received for European Patent Application No. 20198076.0, mailed on Feb. 1, 2024, 4 pages.
Decision to Grant received for Japanese Patent Application No. 2017-075031, mailed on Jul. 1, 2019, 3 pages.
Decision to Grant received for the European Patent Application No. 12181538.5, mailed on Jul. 2, 2015, 1 page.
Decision to Refuse received for European Patent Application No. 08834386.8, mailed on Apr. 8, 2013, 8 pages.
Decision to Refuse received for European Patent Application No. 12770400.5, mailed on Nov. 8, 2018, 12 pages.
Decision to Refuse received for European Patent Application No. 15727291.5, mailed on Jun. 30, 2020, 21 pages.
Decision to Refuse received for European Patent Application No. 15728352.4, mailed on May 28, 2020, 25 pages.
Decision to Refuse received for European Patent Application No. 16201159.7, mailed on Sep. 27, 2021, 22 pages.
Decision to Refuse received for European Patent Application No. 16201195.1, mailed on Mar. 4, 2019, 23 pages.
Decision to Refuse received for European Patent Application No. 16201205.8, mailed on Jun. 30, 2020, 29 pages.
Decision to Refuse received for European Patent Application No. 17799904.2, mailed on Sep. 19, 2022, 4 pages.
Decision to Refuse received for European Patent Application No. 18208881.5, mailed on Dec. 23, 2022, 12 pages.
Decision to Refuse received for European Patent Application No. 19150528.8, mailed on Sep. 9, 2022, 4 pages.
Decision to Refuse received for Japanese Patent Application No. 2021-149549, mailed on Jun. 26, 2023, 4 pages.
Decision to Refuse received for Japanese Patent Application No. 2021-168243, mailed on Aug. 14, 2023, 7 pages.
Decision to Refuse received for Japanese Patent Application No. 2022-151495, mailed on Jan. 12, 2024, 14 pages.
Drareni Jamil, "Face Tracking and Head Pose Estimation with Open CV", Available online at: https://www.youtube.com/watch?v=Etj_aktbnwM>, Jun. 9, 2013, 3 pages.
Examination Report received for Australian Patent Application No. 2015202397, mailed on Feb. 29, 2016, 4 pages.

Examiner's Answer to Appeal Brief received for U.S. Appl. No. 13/243,045, mailed on Oct. 26, 2020, 17 pages.
Examiner's Answer to Appeal Brief received for U.S. Appl. No. 15/714,887, mailed on Aug. 27, 2021, 23 pages.
Examiner's Answer to Appeal Brief received for U.S. Appl. No. 17/516,495, mailed on Jul. 28, 2023, 13 pages.
Examiner's Answer to Appeal Brief received for U.S. Appl. No. 17/962,369, mailed on Apr. 10, 2024, 18 pages.
Examiner's Pre-Review Report received for Japanese Patent Application No. 2013-098406, mailed on Oct. 8, 2015, 7 pages.
Examiner's Pre-Review Report received for Japanese Patent Application No. 2018-113081, mailed on Apr. 28, 2021, 4 pages.
Examiner's Pre-Review Report received for Japanese Patent Application No. 2019-563560, mailed on Dec. 27, 2021, 4 pages.
Extended European Search Report (includes Partial European Search Report and European Search Opinion) received for European Patent Application No. 13171145.9, mailed on Feb. 5, 2014, 6 pages.
Extended European Search Report (includes Partial European Search Report and European Search Opinion) received for European Patent Application No. 15168475.0, mailed on Oct. 21, 2015, 6 pages.
Extended European Search Report received for European Patent Application No. 12181538.5, mailed on Oct. 23, 2012, 6 pages.
Extended European Search Report received for European Patent Application No. 14853215.3, mailed on Sep. 13, 2016, 9 pages.
Extended European Search Report received for European Patent Application No. 16177139.9, mailed on Nov. 4, 2016, 7 pages.
Extended European Search Report received for European Patent Application No. 16201159.7, mailed on Mar. 27, 2017, 12 pages.
Extended European Search Report Received for European Patent Application No. 16201195.1, mailed on Feb. 7, 2017, 13 pages.
Extended European Search Report received for European Patent Application No. 16201205.8, mailed on Jan. 5, 2017, 12 pages.
Extended European Search Report received for European Patent Application No. 17799904.2, mailed on Jul. 30, 2018, 7 pages.
Extended European Search Report received for European Patent Application No. 17853654.6, mailed on Jul. 8, 2019, 9 pages.
Extended European Search Report received for European Patent Application No. 18190250.3, mailed on Nov. 9, 2018, 6 pages.
Extended European Search Report received for European Patent Application No. 18208881.5, mailed on Jan. 8, 2019, 7 pages.
Extended European Search Report received for European Patent Application No. 19150528.8, mailed on May 15, 2019, 9 pages.
Extended European Search Report received for European Patent Application No. 19160344.8, mailed on Jun. 14, 2019, 7 pages.
Extended European Search Report received for European Patent Application No. 19160348.9, mailed on Jul. 19, 2019, 6 pages.
Extended European Search Report received for European Patent Application No. 19186538.5, mailed on Oct. 9, 2019, 10 pages.
Extended European Search Report received for European Patent Application No. 19194828.0, mailed on Dec. 19, 2019, 7 pages.
Extended European Search Report received for European Patent Application No. 20186286.9, mailed on Nov. 2, 2020, 9 pages.
Extended European Search Report received for European Patent Application No. 20191533.7, mailed on Nov. 13, 2020, 8 pages.
Extended European Search Report received for European Patent Application No. 20196476.4, mailed on Nov. 5, 2020, 5 pages.
Extended European Search Report received for European Patent Application No. 20198076.0, mailed on Jan. 13, 2021, 8 pages.
Extended European Search Report received for European Patent Application No. 21166287.9, mailed on Nov. 5, 2021, 10 pages.
Extended European Search Report received for European Patent Application No. 21173988.3, mailed on Aug. 23, 2021, 6 pages.
Extended European Search Report received for European Patent Application No. 22150595.1, mailed on Apr. 8, 2022, 6 pages.
Extended European Search Report received for European Patent Application No. 22188377.0, mailed on Oct. 27, 2022, 8 pages.
Extended European Search Report received for European Patent Application No. 22197752.3, mailed on Feb. 15, 2023, 7 pages.
Extended European Search Report received for European Patent Application No. 22197755.6, mailed on Feb. 20, 2023, 8 pages.
Extended European Search Report received for European Patent Application No. 22198902.3, mailed on Jan. 20, 2023, 9 pages.

(56)          References Cited

OTHER PUBLICATIONS

Extended European Search Report received for European Patent Application No. 22212086.7, mailed on Feb. 21, 2023, 10 pages.
Extended European Search Report received for European Patent Application No. 23157906.1, mailed on Apr. 6, 2023, 10 pages.
Feng et al., "A Prototype Three-Dimensional Position Sensitive CdZnTe Detector Array", IEEE Transactions on Nuclear Science, vol. 54, No. 4., Aug. 2007, 6 pages.
Final Office Action received for U.S. Appl. No. 12/074,985, mailed on Dec. 2, 2011, 19 pages.
Final Office Action received for U.S. Appl. No. 12/207,370, mailed on Dec. 13, 2011, 15 pages.
Final Office Action received for U.S. Appl. No. 12/207,370, mailed on Feb. 15, 2013, 17 pages.
Final Office Action received for U.S. Appl. No. 12/207,374, mailed on Jan. 31, 2014, 12 pages.
Final Office Action received for U.S. Appl. No. 12/207,374, mailed on Nov. 6, 2012, 25 pages.
Final Office Action received for U.S. Appl. No. 12/207,374, mailed on Oct. 21, 2011, 16 pages.
Final Office Action received for U.S. Appl. No. 13/243,045, mailed on Aug. 05. 2015, 10 pages.
Final Office Action received for U.S. Appl. No. 13/243,045, mailed on Jan. 15, 2020, 12 pages.
Final Office Action received for U.S. Appl. No. 13/248,882, mailed on Dec. 4, 2013, 22 pages.
Final Office Action received for U.S. Appl. No. 14/142,669, mailed on Jun. 12, 2015, 14 pages.
Final Office Action received for U.S. Appl. No. 14/285,378, mailed on Jul. 23, 2015, 19 pages.
Final Office Action received for U.S. Appl. No. 14/311,214, mailed on Jan. 8, 2015, 12 pages.
Final Office Action received for U.S. Appl. No. 14/311,214, mailed on Sep. 24, 2015, 15 pages.
Final Office Action received for U.S. Appl. No. 14/479,088, mailed on Mar. 11, 2015, 10 pages.
Final Office Action received for U.S. Appl. No. 14/480,183, mailed on Jun. 28, 2017, 14 pages.
Final Office Action received for U.S. Appl. No. 14/503,072, mailed on Mar. 2, 2017, 9 pages.
Final Office Action received for U.S. Appl. No. 14/503,072, mailed on Sep. 1, 2015, 16 pages.
Final Office Action received for U.S. Appl. No. 14/503,296, mailed on Apr. 24, 2019, 5 pages.
Final Office Action received for U.S. Appl. No. 14/503,296, mailed on Jul. 2, 2015, 7 pages.
Final Office Action received for U.S. Appl. No. 14/503,296, mailed on Jun. 4, 2018, 8 pages.
Final Office Action received for U.S. Appl. No. 14/612,214, mailed on Dec. 7, 2015, 13 pages.
Final Office Action received for U.S. Appl. No. 14/980,344, mailed on Dec. 5, 2018, 17 pages.
Final Office Action received for U.S. Appl. No. 14/980,344, mailed on Nov. 25, 2019, 13 pages.
Final Office Action received for U.S. Appl. No. 15/137,944, mailed on Feb. 27, 2017, 10 pages.
Final Office Action received for U.S. Appl. No. 15/470,752, mailed on Mar. 13, 2018, 14 pages.
Final Office Action received for U.S. Appl. No. 15/714,887, mailed on Nov. 13, 2020, 60 pages.
Final Office Action received for U.S. Appl. No. 15/714,887, mailed on Nov. 15, 2019, 55 pages.
Final Office Action received for U.S. Appl. No. 15/866,341, mailed on May 14, 2019, 10 pages.
Final Office Action received for U.S. Appl. No. 15/872,685, mailed on Oct. 26, 2018, 10 pages.
Final Office Action received for U.S. Appl. No. 15/899,966, mailed on Nov. 5, 2018, 10 Pages.
Final Office Action received for U.S. Appl. No. 16/125,267, mailed on Aug. 26, 2021, 22 pages.

Final Office Action received for U.S. Appl. No. 16/125,267, mailed on Dec. 10, 2020, 20 pages.
Final Office Action received for U.S. Appl. No. 16/147,023, mailed on Jul. 23, 2019, 18 pages.
Final Office Action received for U.S. Appl. No. 16/147,115, mailed on Jun. 19, 2019, 14 pages.
Final Office Action received for U.S. Appl. No. 16/164,561, mailed on Sep. 5, 2019, 12 pages.
Final Office Action received for U.S. Appl. No. 16/369,473, mailed on Dec. 14, 2020, 17 pages.
Final Office Action received for U.S. Appl. No. 16/369,473, mailed on Jan. 25, 2022, 19 pages.
Final Office Action received for U.S. Appl. No. 17/087,855, mailed on Mar. 31, 2022, 23 pages.
Final Office Action received for U.S. Appl. No. 17/193,991, mailed on Dec. 22, 2022, 6 pages,.
Final Office Action received for U.S. Appl. No. 17/409,570, mailed on Nov. 9, 2022, 37 pages.
Final Office Action received for U.S. Appl. No. 17/516,495, mailed on Nov. 15, 2022, 12 pages.
Final Office Action received for U.S. Appl. No. 17/725,311, mailed on Oct. 13, 2023, 66 pages.
Final Office Action received for U.S. Appl. No. 17/863,974, mailed on Dec. 16, 2022, 23 pages.
Final Office Action received for U.S. Appl. No. 17/962,369, mailed on Aug. 15, 2023, 20 pages.
Final Office Action received for U.S. Appl. No. 18/105,191, mailed on Feb. 20, 2024, 20 pages.
Final Office Action received for U.S. Appl. No. 18/136,819, mailed on Mar. 4, 2024, 10 pages.
Final Office Action received for U.S. Appl. No. 15/250,152, mailed on Aug. 23, 2017, 24 pages.
Final Office Action received for U.S. Appl. No. 15/250,152, mailed on Nov. 16, 2018, 30 pages.
Fono et al., "EyeWindows: Evaluation of Eye-Controlled Zooming Windows for Focus Selection", CHI 2005, Conference Proceedings, Conference on Human Factors in Computing Systems, Apr. 2-7, 2005, pp. 151-160.
FSS, "Mobile Banking", Available online at: https://mobile.fssnet. co.in/mpayweb/Retrieved on: Dec. 5, 2023, 2 pages.
How to Smartphone, "Samsung Galaxy S7—screen rotation on / off", Available Online at <https://www.youtube.com/watch?v= np54sEEI11E >, see video from 1:10 to 1:30., Dec. 12, 2016, 3 pages.
Hwang et al., "Toward Event-Based Haptics: Rendering Contact Using Open-Loop Force Pulses", 12th International Symposium on Haptic Interfaces for Virtual Environment and Teleoperator Systems, 2004, 8 pages.
IDEX, "IDEX Fingerprint Sensor Mobile Glass Display", Youtube, available at <https://www.youtube.com/watch?v=X1dAIP5sFzw>, Apr. 11, 2013, 2 pages.
Intention to Grant received for Danish Patent Application No. PA201670628, mailed on Aug. 28, 2017, 2 pages.
Intention to Grant received for Danish Patent Application No. PA201770418, mailed on Aug. 22, 2019, 2 pages.
Intention to Grant received for Danish Patent Application No. PA201770418, mailed on Nov. 16, 2018, 3 pages.
Intention to Grant received for Danish Patent Application No. PA201770419, mailed on Mar. 28, 2018, 2 pages.
Intention to Grant received for Danish Patent Application No. PA201770714, mailed on Feb. 15, 2019, 2 pages.
Intention to Grant received for Danish Patent Application No. PA201770714, mailed on Nov. 2, 2018, 2 pages.
Intention to Grant received for Danish Patent Application No. PA201770715, mailed on Nov. 13, 2018, 2 pages.
Intention to Grant received for Danish Patent Application No. PA201770782, mailed on Aug. 8, 2019, 2 pages.
Intention to Grant received for Danish Patent Application No. PA201870370, mailed on Jan. 2, 2019, 2 pages.
Intention to Grant received for Danish Patent Application No. PA201870371, mailed on Jan. 2, 2019, 2 pages.
Intention to Grant received for Danish Patent Application No. PA201870855, mailed on Jul. 13, 2020, 2 pages.

(56) References Cited

OTHER PUBLICATIONS

Intention to Grant received for Danish Patent Application No. PA201970127, mailed on Apr. 21, 2020, 2 pages.

Intention to Grant received for European Patent Application No. 12181538.5, mailed on Feb. 20, 2015, 8 pages.

Intention to Grant received for European Patent Application No. 12773460.6, mailed on Feb. 4, 2019, 8 pages.

Intention to Grant received for European Patent Application No. 12773460.6, mailed on Jun. 17, 2019, 4 pages.

Intention to Grant received for European Patent Application No. 13171145.9, mailed on Feb. 21, 2019, 8 pages.

Intention to Grant received for European Patent Application No. 14853215.3, mailed on Jun. 27, 2018, 9 pages.

Intention to Grant received for European Patent Application No. 15168475.0, mailed on Feb. 4, 2020, 9 pages.

Intention to Grant received for European Patent Application No. 15168475.0, mailed on Jan. 22, 2021, 8 pages.

Intention to Grant received for European Patent Application No. 15168475.0, mailed on Jul. 7, 2021, 8 pages.

Intention to Grant received for European Patent Application No. 17853654.6, mailed on Nov. 23, 2020, 8 pages.

Intention to Grant received for European Patent Application No. 18190250.3, mailed on May 15, 2020, 9 pages.

Intention to Grant received for European Patent Application No. 18704335.1, mailed on Apr. 17, 2020, 6 pages.

Intention to Grant received for European Patent Application No. 18713408.5, mailed on Mar. 17, 2022, 10 pages.

Intention to Grant received for European Patent Application No. 18713408.5, mailed on May 23, 2022, 10 pages.

Intention to Grant received for European Patent Application No. 18713408.5, mailed on Oct. 28, 2021, 10 pages.

Intention to Grant received for European Patent Application No. 18830326.7, mailed on Sep. 15, 2021, 11 pages.

Intention to Grant received for European Patent Application No. 19160344.8, mailed on May 13, 2022, 10 pages.

Intention to Grant received for European Patent Application No. 1914828.0, mailed on Jun. 30, 2022, 9 pages.

Intention to Grant received for European Patent Application No. 19769336.9, mailed on May 31, 2022, 13 pages.

Intention to Grant received for European Patent Application No. 20186286.9, mailed on Feb. 17, 2023, 9 pages.

Intention to Grant received for European Patent Application No. 20186286.9, mailed on Sep. 15, 2022, 9 pages.

Intention to Grant received for European Patent Application No. 20196476.4, mailed on Aug. 25, 2021, 9 pages.

Intention to Grant received for European Patent Application No. 20198076.0, mailed on Oct. 25, 2023, 11 pages,.

Intention to Grant received for European Patent Application No. 21166287.9, mailed on Feb. 23, 2023, 9 pages.

International Preliminary Report on Patentability received for PCT Patent Application No. PCT/US2018/014658, mailed on Nov. 28, 2019, 14 pages.

International Preliminary Report on Patentability received for PCT Patent Application No. PCT/US2018/049289, mailed on Mar. 19, 2020, 9 pages.

International Preliminary Report on Patentability received for PCT Patent Application No. PCT/US2008/075738, completed on Jan. 28, 2010, 15 pages.

International Preliminary Report on Patentability received for PCT Patent Application No. PCT/US2012/057319, mailed on Apr. 10, 2014, 6 pages.

International Preliminary Report on Patentability received for PCT Patent Application No. PCT/US2012/057656, mailed on Apr. 10, 2014, 6 pages.

International Preliminary Report on Patentability received for PCT Patent Application No. PCT/US2014/054800, mailed on Mar. 31, 2016, 27 pages.

International Preliminary Report on Patentability received for PCT Patent Application No. PCT/US2015/033326, mailed on Dec. 8, 2016, 11 pages.

International Preliminary Report on Patentability received for PCT Patent Application No. PCT/US2015/033380, mailed on Dec. 8, 2016, 10 pages.

International Preliminary Report on Patentability received for PCT Patent Application No. PCT/US2017/032240, mailed on Nov. 29, 2018, 29 pages.

International Preliminary Report on Patentability received for PCT Patent Application No. PCT/US2017/049760, mailed on Apr. 4, 2019, 9 pages.

International Preliminary Report on Patentability received for PCT Patent Application No. PCT/US2018/015603, mailed on Mar. 19, 2020, 8 pages.

International Preliminary Report on Patentability received for PCT Patent Application No. PCT/US2019/035092, mailed on Dec. 17, 2020, 10 pages.

International Preliminary Report on Patentability received for PCT Patent Application No. PCT/US2019/049227, mailed on Apr. 8, 2021, 11 pages.

International Preliminary Report on Patentability received for PCT Patent Application No. PCT/US2019/049239, mailed on Apr. 8, 2021, 12 pages.

International Preliminary Report on Patentability received for PCT Patent Application No. PCT/US2022/013730, mailed on Aug. 3, 2023, 15 pages.

International Preliminary Report on Patentability received for PCT Patent Application No. PCT/US2022/044637, mailed on Apr. 4, 2024, 12 pages.

International Search Report and Written Opinion received for PCT Application No. PCT/US2015/033326, mailed on Aug. 10, 2015, 13 pages.

International Search Report and Written Opinion received for PCT Patent Application No. PCT/US17/49760, mailed on Jan. 19, 2018, 12 pages.

International Search Report and Written Opinion received for PCT Patent Application No. PCT/US2008/075738, mailed on Jul. 2, 2009, 14 pages.

International Search Report and Written Opinion received for PCT Patent Application No. PCT/US2012/057319, mailed on Feb. 25, 2013, 7 pages.

International Search Report and Written Opinion received for PCT Patent Application No. PCT/US2012/057656, mailed on Feb. 25, 2013, 7 pages.

International Search Report and Written Opinion received for PCT Patent Application No. PCT/US2014/054800, mailed on Jan. 29, 2015, 33 pages.

International Search Report and Written Opinion received for PCT Patent Application No. PCT/US2015/033380, mailed on Aug. 10, 2015, 13 pages.

International Search Report and Written Opinion received for PCT Patent Application No. PCT/US2017/032240, mailed on Sep. 21, 2017, 33 pages.

International Search Report and Written Opinion received for PCT Patent Application No. PCT/US2018/014658, mailed on Jun. 6, 2018, 20 pages.

International Search Report and Written Opinion received for PCT Patent Application No. PCT/US2018/015603, mailed on Jun. 22, 2018, 13 pages.

International Search Report and Written Opinion received for PCT Patent Application No. PCT/US2018/049289, mailed on Feb. 19, 2019, 12 pages.

International Search Report and Written Opinion received for PCT Patent Application No. PCT/US2019/035092, mailed on Jan. 16, 2020, 16 pages.

International Search Report and Written Opinion received for PCT Patent Application No. PCT/US2019/049227, mailed on Dec. 12, 2019, 14 pages.

International Search Report and Written Opinion received for PCT Patent Application No. PCT/US2019/049239, mailed on Jan. 22, 2020, 18 pages.

International Search Report and Written Opinion received for PCT Patent Application No. PCT/US2022/013730, mailed on Apr. 8, 2022, 19 pages.

(56) References Cited

OTHER PUBLICATIONS

International Search Report and Written Opinion received for PCT Patent Application No. PCT/US2022/044637, mailed on Mar. 15, 2023, 19 pages.
International Search Report and Written Opinion received for PCT Patent Application No. PCT/US2023/033372, mailed on Jan. 12, 2024, 21 pages.
International Search Report and Written Opinion received for PCT Patent Application No. PCT/US2023/033376, mailed on Mar. 18, 2024, 21 pages.
International Search Report and Written Opinion received for PCT Patent Application No. PCT/US2023/033540, mailed on Feb. 6, 2024, 25 pages.
International Search Report and Written Opinion received for PCT Patent Application No. PCT/US2023/14067, mailed on Aug. 4, 2023, 17 pages.
Invitation to Pay Addition Fees received for PCT Patent Application No. PCT/US2018/014658, mailed on Apr. 11, 2018, 14 pages.
Invitation to Pay Additional Fee received for PCT Patent Application No. PCT/US17/32240. mailed on Jul. 12, 2017, 2 pages.
Invitation to Pay Additional Fee received for PCT Patent Application No. PCT/US2019/035092, mailed on Nov. 20, 2019, 6 pages.
Invitation to Pay Additional Fees and Partial International Search Report received for PCT Patent Application No. PCT/US2022/044637, mailed on Jan. 20, 2023, 12 pages.
Invitation to Pay Additional Fees and Partial International Search Report received for PCT Patent Application No. PCT/US2023/033372, mailed on Nov. 22, 2023, 13 pages.
Invitation to Pay Additional Fees and Partial International Search Report received for PCT Patent Application No. PCT/US2023/033376, mailed on Jan. 24, 2024, 13 pages.
Invitation to Pay Additional Fees and Partial International Search Report received for PCT Patent Application No. PCT/US2023/033540, mailed on Dec. 12, 2023, 17 pages.
Invitation to Pay Additional Fees and Partial International Search Report received for PCT Patent Application No. PCT/US2023/14067, mailed on Jun. 14, 2023, 16 pages.
Invitation to pay Additional fees received for PCT Patent Application No. PCT/US17/49760, mailed on Nov. 21, 2017, 2 pages.
Invitation to Pay Additional Fees received for PCT Patent Application No. PCT/US2014/054800, mailed on Oct. 31, 2014, 2 pages.
Invitation to Pay Additional Fees received for PCT Patent Application No. PCT/US2019/049239, mailed on Dec. 4, 2019, 10 pages.
Invitation to Pay Search Fees received for European Patent Application No. 19731554.2, mailed on Dec. 16, 2021, 3 pages.
"iPhone 4S Tips 'N' Tricks: Access the Camera from the Lock Screen—Phones 4u", Youtube, available at <https://www.youtube.com/watch?v=C8eDN4Vu2mg>, Dec. 9, 2011, 2 pages.
IPHONEBLOG, "iOS 5.0.1 Security Flaw—Bypass the Passcode—Access Camera Roll". Youtube, available at <https://www.youtube.com/watch?v=qd0Fwgaymb0>, Feb. 24. 2012, 2 pages.
Jianxin et al., "Fingerprint-based Authentication in Networking Environment", Artificial Intelligence Institute of Zhejiang University, Hangzhou Zhejiang 310027, China, Dec. 28, 2001, 4 pages.
Kawai Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31.
Komachi Aneem, "Time Attendance ~ Face Recognition ~ Biometrics", Available at <https://www.youtube.com/watch?v=asclTiiiSbc>, Feb. 9, 2010, 1 page.
Krumm et al., "Multi-camera multi-person tracking for easyliving", Third IEEE International Workshop on Visual Surveillance, Available online at: http://mesh.brown.edu/en193s05~2004/pdfs/KrummEtAl~iwvs00.pdf, Jul. 1, 2000, 8 pages.
Kurihara Ryo, "Torisetsu of OS X that we want to know", Mac Fan, Japan, Mai Navi Co. Ltd. vol. 21, No. 6, Jun. 1, 2013, 8 pages.

Lu Haiyun, "Recommendations Based on Purchase Patterns", International Journal of Machine Learning and Computing, vol. 4, No. 6, Online available at: http://www.ijmlc.org/papers/462~C015.pdf, Dec. 2014, pp. 501-504.
Mahfouz et al., "Android users in the wild: Their authentication and usage behavior", Pervasive and Mobile Computing, vol. 32, Jul. 11, 2016, pp. 50-61.
"Managing Windows User Accounts on Your Home Computer", Available online at: https://www.informit.com/articles/article.aspx?p=478948&seqNum=8, Jun. 23, 2006, 2 pages.
Minutes of Oral Proceedings received for European Patent Application No. 18208881.5, mailed on Dec. 22, 2022, 4 pages.
Minutes of the Oral Proceedings received for European Application No. 12770400.5, mailed on Nov. 6, 2018, 7 pages.
Minutes of the Oral Proceedings received for European Patent Application No. 15727291.5, mailed on Jun. 29, 2020, 8 pages.
Minutes of the Oral Proceedings received for European Patent Application No. 15728352.4, mailed on May 27, 2020, 3 pages.
Minutes of the Oral Proceedings received for European Patent Application No. 16201159.7, mailed on Sep. 23, 2021, 6 pages.
Minutes of the Oral Proceedings received for European Patent Application No. 16201205.8, mailed on Jun. 29, 2020, 6 pages.
Minutes of the Oral Proceedings received for European Patent Application No. 19194828.0, mailed on Jun. 28, 2022, 6 pages.
Naver Blog, "How to Use Smart Wallet and Registered Card", Online Available at <http://feena74.blog.me/140185758401>, Mar. 29, 2013, 20 pages.
NHDANH -Protocol CORP,"How to Enroll Face Enbioaccess T9 Nitgen Korea—Đăng Ký Khuôn Mặt Enbioaccess T9 Nitgen", Available online at <https://www.youtube.com/watch?v=mFn03PD4NIE>, Mar. 30, 2017, 1 page.
Non-Final Office Action received for U.S. Appl. No. 12/207,374, mailed on Apr. 15, 2011, 13 pages.
Non-Final Office Action received for U.S. Appl. No. 12/207,374, mailed on Jun. 7, 2013, 26 pages.
Non-Final Office Action received for U.S. Appl. No. 12/207,374, mailed on May 24, 2012, 20 pages.
Non-Final Office Action received for U.S. Appl. No. 14/311,214, mailed on Apr. 10, 2015, 12 pages.
Non-Final Office Action received for U.S. Appl. No. 14/503,072, mailed on Jan. 26, 2015, 12 pages.
Non-Final Office Action received for U.S. Appl. No. 14/503,296, mailed on Jan. 30, 2015, 16 pages.
Non-Final Office Action received for U.S. Appl. No. 15/899,966, mailed on May 4, 2018, 10 pages.
Non-Final Office Action received for U.S. Appl. No. 15/900,047, mailed on May 08. 2018, 7 pages.
Non-Final Office Action received for U.S. Appl. No. 14/503,364, mailed on Feb. 3, 2016, 16 pages.
Non-Final Office Action received for U.S. Appl. No. 12/074,985, mailed on Apr. 19, 2011, 24 pages.
Non-Final Office Action received for U.S. Appl. No. 12/074,985, mailed on Mar. 18, 2013, 19 pages.
Non-Final Office Action received for U.S. Appl. No. 12/207,370, mailed on Aug. 2, 2012, 16 pages.
Non-Final Office Action received for U.S. Appl. No. 12/207,370, mailed on May 6, 2011, 15 pages.
Non-Final Office Action received for U.S. Appl. No. 12/207,370, mailed on Oct. 17, 2013,17 pages.
Non-Final Office Action received for U.S. Appl. No. 13/243,326, mailed on Jun. 12, 2019, 11 pages.
Non-Final Office Action received for U.S. Appl. No. 13/243,326, mailed on Feb. 14, 2013, 13 pages.
Non-Final Office Action received for U.S. Appl. No. 13/248,872, mailed on May 19, 2014, 6 pages.
Non-Final Office Action received for U.S. Appl. No. 13/248,882, mailed on Jul. 10, 2013, 14 pages.
Non-Final Office Action received for U.S. Appl. No. 14/090,344, mailed on Jan. 15, 2015, 13 pages.
Non-Final Office Action received for U.S. Appl. No. 14/142,669, mailed on Oct. 28, 2015, 14 pages.
Non-Final Office Action received for U.S. Appl. No. 14/142,669, mailed on Sep. 12, 2014, 11 pages.

(56) References Cited

OTHER PUBLICATIONS

Non-Final Office Action received for U.S. Appl. No. 14/285,378, mailed on Dec. 21, 2015, 18 pages.
Non-Final Office Action received for U.S. Appl. No. 14/285,378, mailed on Jan. 21, 2015, 19 pages.
Non-Final Office Action received for U.S. Appl. No. 14/311,214, mailed on Sep. 18, 2014, 10 pages.
Non-Final Office Action received for U.S. Appl. No. 14/479,088, mailed on Jul. 6, 2015, 10 pages.
Non-Final Office Action received for U.S. Appl. No. 14/479,088, mailed on Nov. 18, 2014, 8 pages.
Non-Final Office Action received for U.S. Appl. No. 14/480,183, mailed on Oct. 18, 2016, 12 pages.
Non-Final Office Action received for U.S. Appl. No. 14/503,072, mailed on Jun. 17, 2016, 19 pages.
Non-Final Office Action received for U.S. Appl. No. 14/503,296, mailed on Aug. 28, 2017, 14 pages.
Non-Final Office Action received for U.S. Appl. No. 14/503,296, mailed on Oct. 5, 2016, 11 pages.
Non-Final Office Action received for U.S. Appl. No. 14/503,296, mailed on Sep. 18, 2018, 20 pages.
Non-Final Office Action received for U.S. Appl. No. 14/503,381, mailed on May 13, 2015, 13 pages.
Non-Final Office Action received for U.S. Appl. No. 14/612,214, mailed on Jul. 29, 2015, 12 pages.
Non-Final Office Action received for U.S. Appl. No. 14/612,214, mailed on Nov. 20, 2019, 11 pages.
Non-Final Office Action received for U.S. Appl. No. 14/642,366, mailed on Aug. 24, 2015, 7 pages.
Non-Final Office Action received for U.S. Appl. No. 14/980,344, mailed on Mar. 14, 2018, 13 pages.
Non-Final Office Action received for U.S. Appl. No. 14/980,344, mailed on May 14, 2019, 11 pages.
Non-Final Office Action received for U.S. Appl. No. 15/134,638, mailed on Sep. 20, 2016, 6 pages.
Non-Final Office Action received for U.S. Appl. No. 15/137,944, mailed on Jul. 27, 2017, 13 pages.
Non-Final Office Action received for U.S. Appl. No. 15/137,944, mailed on Oct. 18, 2016, 10 pages.
Non-Final Office Action received for U.S. Appl. No. 15/269,801, mailed on Dec. 30, 2016, 17 pages.
Non-Final Office Action received for U.S. Appl. No. 15/294,439, mailed on Jan. 26, 2018, 18 pages.
Non-Final Office Action received for U.S. Appl. No. 15/470,752, mailed on Aug. 28, 2018, 12 pages.
Non-Final Office Action received for U.S. Appl. No. 15/470,752, mailed on Jul. 28, 2017, 11 pages.
Non-Final Office Action received for U.S. Appl. No. 15/714,887, mailed on May 27, 2020, 48 pages.
Non-Final Office Action received for U.S. Appl. No. 15/714,887, mailed on May 30, 2019, 47 pages.
Non-Final Office Action received for U.S. Appl. No. 15/845,794, mailed on Oct. 15, 2018, 8 pages.
Non-Final Office Action received for U.S. Appl. No. 15/866,341, mailed on Nov. 13, 2018, 11 pages.
Non-Final Office Action received for U.S. Appl. No. 15/872,685, mailed on Mar. 27, 2018, 9 pages.
Non-Final Office Action received for U.S. Appl. No. 15/894,221, mailed on Jul. 25, 2018, 21 pages.
Non-Final Office Action received for U.S. Appl. No. 15/903,456, mailed on Sep. 6, 2018, 20 pages.
Non-Final Office Action received for U.S. Appl. No. 15/992,722, mailed on Aug. 6, 2020, 7 pages.
Non-Final Office Action received for U.S. Appl. No. 16/035,419, mailed on Jan. 30, 2019, 24 pages.
Non-Final Office Action received for U.S. Appl. No. 16/125,267, mailed on Jul. 2, 2020, 20 pages.
Non-Final Office Action received for U.S. Appl. No. 16/125,267, mailed on Mar. 26, 2021, 20 pages.
Non-Final Office Action received for U.S. Appl. No. 16/125,267, mailed on Nov. 23, 2021, 21 pages.
Non-Final Office Action received for U.S. Appl. No. 16/147,023, mailed on Dec. 26, 2018, 17 pages.
Non-Final Office Action received for U.S. Appl. No. 16/147,115, mailed on Dec. 13, 2018, 12 pages.
Non-Final Office Action received for U.S. Appl. No. 16/164,561, mailed on Jan. 4, 2019, 14 pages.
Non-Final Office Action received for U.S. Appl. No. 16/369,355, mailed on Apr. 29, 2021, 16 pages,.
Non-Final Office Action received for U.S. Appl. No. 16/369,473, mailed on Apr. 27, 2020, 12 pages.
Non-Final Office Action received for U.S. Appl. No. 16/369,473, mailed on Jun. 11, 2021, 19 pages.
Non-Final Office Action received for U.S. Appl. No. 16/434,865, mailed on Jan. 16, 2020, 9 pages.
Non-Final Office Action received for U.S. Appl. No. 16/542,084, mailed on Jan. 24, 2020, 21 pages.
Non-Final Office Action received for U.S. Appl. No. 16/553,622, mailed on May 29, 2020, 11 pages.
Non-Final Office Action received for U.S. Appl. No. 16/667,271, mailed on Dec. 13, 2019, 8 pages.
Non-Final Office Action received for U.S. Appl. No. 16/670,949, mailed on Dec. 9, 2020, 11 pages.
Non-Final Office Action received for U.S. Appl. No. 16/938,362, mailed on Sep. 14, 2022, 14 pages.
Non-Final Office Action received for U.S. Appl. No. 16/987,003, mailed on May 10, 2021, 20 pages.
Non-Final Office Action received for U.S. Appl. No. 16/990,974, mailed on Oct. 15, 2020, 6 pages.
Non-Final Office Action received for U.S. Appl. No. 17/062,941, mailed on Mar. 30, 2023, 6 pages.
Non-Final Office Action received for U.S. Appl. No. 17/062,941, mailed on Nov. 24, 2023, 8 pages.
Non-Final Office Action received for U.S. Appl. No. 17/087,855, mailed on Dec. 24, 2021, 21 pages.
Non-Final Office Action received for U.S. Appl. No. 17/087,855, mailed on Jul. 12, 2021, 17 pages.
Non-Final Office Action received for U.S. Appl. No. 17/087,855, mailed on Jul. 21, 2022, 23 pages.
Non-Final Office Action received for U.S. Appl. No. 17/193,991, mailed on Oct. 6, 2022, 7 pages.
Non-Final Office Action received for U.S. Appl. No. 17/409,570, mailed on Sep. 21, 2022, 35 pages.
Non-Final Office Action received for U.S. Appl. No. 17/496,716, mailed on Jul. 18, 2023, 15 pages.
Non-Final Office Action received for U.S. Appl. No. 17/516,495, mailed on Jul. 6, 2022, 10 pages.
Non-Final Office Action received for U.S. Appl. No. 17/685,039, mailed on Mar. 26, 2024, 40 pages.
Non-Final Office Action received for U.S. Appl. No. 17/725,311, mailed on May 10, 2023, 54 pages.
Non-Final Office Action received for U.S. Appl. No. 17/863,974, mailed on Apr. 13, 2023, 30 pages.
Non-Final Office Action received for U.S. Appl. No. 17/863,974, mailed on Oct. 24, 2022, 23 pages.
Non-Final Office Action received for U.S. Appl. No. 17/955,311, mailed on Mar. 15, 2023, 6 pages.
Non-Final Office Action received for U.S. Appl. No. 17/962,369, mailed on Jun. 9, 2023, 17 pages.
Non-Final Office Action received for U.S. Appl. No. 18/105,191, mailed on Oct. 13, 2023, 23 pages.
Non-Final Office Action received for U.S. Appl. No. 18/237,849, mailed on Apr. 10, 2024, 9 pages.
Non-Final Office Action received for U.S. Appl. No. 18/237,849, mailed on Nov. 7, 2023, 8 pages.
Non-Final Office Action received for U.S. Appl. No. 18/237,849, mailed on Mar. 26, 2024, 47 pages.
Non-Final Office Action received for U.S. Appl. No. 15/250,152, mailed on Apr. 6, 2018, 31 pages.
Non-Final Office Action received for U.S. Appl. No. 15/250,152, mailed on Mar. 2, 2017, 26 pages.

(56)　　　References Cited

OTHER PUBLICATIONS

Non-Final Office Action received for U.S. Appl. No. 15/945,610, mailed on Sep. 20, 2018, 9 pages.

Non-Final Office Action received for U.S. Appl. No. 13/243,045, mailed on Mar. 17, 2015, 9 pages.

Notice of Acceptance received for Australian Patent Application No. 2008305338, mailed on Oct. 27, 2011, 1 page.

Notice of Acceptance received for Australian Patent Application No. 2014334869, mailed on Jan. 3, 2018, 3 pages.

Notice of Acceptance received for Australian Patent Application No. 2015266650, mailed on Jan. 18, 2018, 3 pages.

Notice of Acceptance received for Australian Patent Application No. 2015266693, mailed on Jan. 19, 2018, 3 pages.

Notice of Acceptance received for Australian Patent Application No. 2016201310, mailed on Feb. 21, 2018, 3 pages.

Notice of Acceptance received for Australian Patent Application No. 2016203896, mailed on Mar. 2, 2018, 3 Pages.

Notice of Acceptance received for Australian Patent Application No. 2016203898, mailed on Feb. 21, 2018, 3 pages.

Notice of Acceptance received for Australian Patent Application No. 2017201064, mailed on Feb. 20, 2018, 3 pages.

Notice of Acceptance received for Australian Patent Application No. 2017266867, mailed on Mar. 6, 2019, 3 pages.

Notice of Acceptance received for Australian Patent Application No. 2017330208, mailed on Nov. 28, 2019, 3 pages.

Notice of Acceptance received for Australian Patent Application No. 2018202559, mailed on Oct. 21, 2019, 3 pages.

Notice of Acceptance received for Australian Patent Application No. 2018270420, mailed on Jul. 21, 2021, 3 pages.

Notice of Acceptance received for Australian Patent Application No. 2018279788, mailed on Nov. 6, 2019, 3 pages.

Notice of Acceptance received for Australian Patent Application No. 2018312629, mailed on Nov. 7, 2019, 4 pages.

Notice of Acceptance received for Australian Patent Application No. 2019200360, mailed on Mar. 15, 2019, 3 pages.

Notice of Acceptance received for Australian Patent Application No. 2019201101, mailed on May 6, 2019, 3 pages.

Notice of Acceptance received for Australian Patent Application No. 2019203473, mailed on Nov. 7, 2019, 3 pages.

Notice of Acceptance received for Australian Patent Application No. 2019204387, mailed on Dec. 4, 2020, 3 pages.

Notice of Acceptance received for Australian Patent Application No. 2019268070, mailed on Feb. 27, 2023, 3 pages.

Notice of Acceptance received for Australian Patent Application No. 2019346842, mailed on Jan. 21, 2021, 3 pages.

Notice of Acceptance received for Australian Patent Application No. 2020200685, mailed on Oct. 29, 2020, 3 pages.

Notice of Acceptance received for Australian Patent Application No. 2020200795, mailed on Feb. 28, 2020, 3 pages.

Notice of Acceptance received for Australian Patent Application No. 2020201306, mailed on Mar. 12, 2020, 3 pages.

Notice of Acceptance received for Australian Patent Application No. 2020201721, mailed on Jul. 6, 2021, 3 pages.

Notice of Acceptance received for Australian Patent Application No. 2020204256, mailed on Oct. 9, 2021, 3 pages.

Notice of Acceptance received for Australian Patent Application No. 2020239783, mailed on Mar. 2, 2021, 3 pages.

Notice of Acceptance received for Australian Patent Application No. 2020289822, mailed on Dec. 22, 2021, 3 pages.

Notice of Acceptance received for Australian Patent Application No. 2021200415, mailed on May 9, 2022, 3 pages.

Notice of Acceptance received for Australian Patent Application No. 2021202352, mailed on Jun. 6, 2022, 3 pages.

Notice of Acceptance received for Australian Patent Application No. 2021250944, mailed on Nov. 14, 2022, 3 pages.

Notice of Acceptance received for Australian Patent Application No. 2021254574, mailed on Dec. 14, 2022, 3 pages.

Notice of Acceptance received for Australian Patent Application No. 2022200617, mailed on May 12, 2022, 3 pages.

Notice of Acceptance received for Australian Patent Application No. 2022206826, mailed on Aug. 24, 2023, 3 pages.

Notice of Acceptance received for Australian Patent Application No. 2022209019, mailed on Nov. 15, 2023, 3 pages.

Notice of Acceptance received for Australian Patent Application No. 2022231779, mailed on Feb. 5, 2024, 3 pages.

Notice of Acceptance received for Australian Patent Application No. 2022279466, mailed on Jan. 10, 2024, 3 pages.

Notice of Allowance received for Australian Patent Application No. 2015202397, mailed on Feb. 15, 2017, 3 pages.

Notice of Allowance received for Chinese Patent Application No. 200880108306.1, mailed on Oct. 28, 2014, 2 pages.

Notice of Allowance received for Chinese Patent Application No. 201280047459.6, mailed on Jan. 31, 2018, 2 pages.

Notice of Allowance received for Chinese Patent Application No. 201410407626.4, mailed on Aug. 27, 2020, 2 pages.

Notice of Allowance received for Chinese Patent Application No. 201480058054.1, mailed on Jul. 8, 2019, 2 pages.

Notice of Allowance received for Chinese Patent Application No. 201510284896.5, mailed on Jul. 8, 2022, 2 pages.

Notice of Allowance received for Chinese Patent Application No. 201520357381.9, mailed on Jul. 29, 2015, 4 pages.

Notice of Allowance received for Chinese Patent Application No. 201520358683.8, mailed on Mar. 10, 2016, 5 pages.

Notice of Allowance received for Chinese Patent Application No. 201620480708.6, mailed on Apr. 20, 2017, 3 pages.

Notice of Allowance received for Chinese Patent Application No. 201620480846.4, mailed on Apr. 20, 2017, 3 pages.

Notice of Allowance received for Chinese Patent Application No. 201710093861.2, mailed on Sep. 24, 2019, 4 pages.

Notice of Allowance received for Chinese Patent Application No. 201710094150.7, mailed on Feb. 23, 2022, 4 pages.

Notice of Allowance received for Chinese Patent Application No. 201710198190.6, mailed on Sep. 23, 2022, 7 pages.

Notice of Allowance received for Chinese Patent Application No. 201780002398.4, mailed on Jun. 17, 2019, 2 pages.

Notice of Allowance received for Chinese Patent Application No. 201810338038.8, mailed on Jun. 30, 2020, 2 pages.

Notice of Allowance received for Chinese Patent Application No. 201810338040.5, mailed on Mar. 30, 2022, 6 pages.

Notice of Allowance received for Chinese Patent Application No. 201810339290.0, mailed on Mar. 9, 2022, 2 pages.

Notice of Allowance received for Chinese Patent Application No. 201810954931.3, mailed on Jun. 23, 2021, 4 pages.

Notice of Allowance received for Chinese Patent Application No. 201810955077.2, mailed on Jul. 14, 2021, 2 pages.

Notice of Allowance received for Chinese Patent Application No. 201811460172.1, mailed on Jan. 11, 2021, 2 pages.

Notice of Allowance received for Chinese Patent Application No. 201910246400.3, mailed on Jan. 28, 2023, 5 pages.

Notice of Allowance received for Chinese Patent Application No. 201910278273.5, mailed on Nov. 19, 2020, 2 pages.

Notice of Allowance received for Chinese Patent Application No. 201910744886.3, mailed on Jun. 3, 2021, 2 pages.

Notice of Allowance received for Chinese Patent Application No. 201910899698.8, mailed on Oct. 23, 2020, 4 pages.

Notice of Allowance received for Chinese Patent Application No. 201980041865.3, mailed on Aug. 16, 2022, 6 pages.

Notice of Allowance received for Chinese Patent Application No. 202211285112.7, mailed on Mar. 21, 2024, 2 pages.

Notice of Allowance received for Japanese Patent Application No. 2013-098406, mailed on Jan. 23, 2017, 18 pages.

Notice of Allowance received for Japanese Patent Application No. 2015-083696, mailed on Jan. 6, 2017, 3 pages.

Notice of Allowance received for Japanese Patent Application No. 2016-131998, mailed on Nov. 30, 2018, 4 pages.

Notice of Allowance received for Japanese Patent Application No. 2016-224506, mailed on Jan. 24, 2020, 4 pages.

Notice of Allowance received for Japanese Patent Application No. 2016-224507, mailed on Mar. 26, 2019, 3 pages.

Notice of Allowance received for Japanese Patent Application No. 2016-224508, mailed on Jun. 20, 2017, 3 pages.

(56) References Cited

OTHER PUBLICATIONS

Notice of Allowance received for Japanese Patent Application No. 2016-540927, mailed on May 14, 2018, 4 pages.
Notice of Allowance received for Japanese Patent Application No. 2016-558332, mailed on Jan. 11, 2019, 4 pages.
Notice of Allowance received for Japanese Patent Application No. 2016-569665, mailed on Feb. 22, 2019, 4 pages.
Notice of Allowance received for Japanese Patent Application No. 2017-013383, mailed on Mar. 31, 2017, 3 pages.
Notice of Allowance received for Japanese Patent Application No. 2017-085582, mailed on Nov. 30, 2018, 4 pages.
Notice of Allowance received for Japanese Patent Application No. 2018-113081, mailed on Nov. 8, 2021, 15 pages.
Notice of Allowance received for Japanese Patent Application No. 2018-241505, mailed on Oct. 4, 2019, 4 pages.
Notice of Allowance received for Japanese Patent Application No. 2018-551159, mailed on Jun. 15, 2020, 5 pages.
Notice of Allowance received for Japanese Patent Application No. 2018-560107, mailed on Dec. 6, 2019, 4 pages.
Notice of Allowance received for Japanese Patent Application No. 2019-053379, mailed on Nov. 16, 2020, 5 pages.
Notice of Allowance received for Japanese Patent Application No. 2019-107235, mailed on May 15, 2020, 5 pages.
Notice of Allowance received for Japanese Patent Application No. 2019-194603, mailed on Apr. 19, 2021, 4 pages.
Notice of Allowance received for Japanese Patent Application No. 2019-238894, mailed on Oct. 5, 2020, 4 pages.
Notice of Allowance received for Japanese Patent Application No. 2019-510416, mailed on Oct. 12, 2020, 5 pages.
Notice of Allowance received for Japanese Patent Application No. 2019-511975, mailed on Dec. 14, 2020, 4 pages.
Notice of Allowance received for Japanese Patent Application No. 2020-028315, mailed on May 27, 2022, 3 pages.
Notice of Allowance received for Japanese Patent Application No. 2020-103213, mailed on Oct. 25, 2021, 5 pages.
Notice of Allowance received for Japanese Patent Application No. 2020-126751, mailed on Aug. 16, 2021, 5 pages.
Notice of Allowance received for Japanese Patent Application No. 2020-159979, mailed on Nov. 8, 2021, 5 pages.
Notice of Allowance received for Japanese Patent Application No. 2020-184605, mailed on Oct. 10, 2023, 4 pages.
Notice of Allowance received for Japanese Patent Application No. 2020-569806, mailed on Jul. 12, 2021, 4 pages.
Notice of Allowance received for Japanese Patent Application No. 2021-001028, mailed on Sep. 9, 2022, 4 pages.
Notice of Allowance received for Japanese Patent Application No. 2021-015128, mailed on Sep. 3, 2021, 4 pages.
Notice of Allowance received for Japanese Patent Application No. 2021-035572, mailed on Jun. 3, 2022, 4 pages.
Notice of Allowance received for Japanese Patent Application No. 2021-084065, mailed on May 15, 2023, 4 pages.
Notice of Allowance received for Japanese Patent Application No. 2021-131310, mailed on Dec. 9, 2022, 4 pages.
Notice of Allowance received for Japanese Patent Application No. 2021-149549, mailed on Oct. 16, 2023, 4 pages.
Notice of Allowance received for Japanese Patent Application No. 2021-163037, mailed on Dec. 6, 2021, 4 pages.
Notice of Allowance received for Japanese Patent Application No. 2021-208395, mailed on Mar. 25, 2022, 4 pages.
Notice of Allowance received for Japanese Patent Application No. 2022-070240, mailed on Aug. 5, 2022, 4 pages.
Notice of Allowance received for Japanese Patent Application No. 2022-100394, mailed on Jan. 12, 2024, 4 pages.
Notice of Allowance received for Japanese Patent Application No. 2023-001790, mailed on Jul. 5, 2024, 4 pages.
Notice of Allowance received for Korean Patent Application No. 10-2010-7008899, mailed on Feb. 12, 2016, 3 pages.
Notice of Allowance received for Korean Patent Application No. 10-2014-7004771, mailed on Oct. 29, 2015, 3 pages.

Notice of Allowance received for Korean Patent Application No. 10-2014-7004772, mailed on Feb. 12, 2016, 4 pages.
Notice of Allowance received for Korean Patent Application No. 10-2014-7004773, mailed on Jan. 7, 2016, 3 pages.
Notice of Allowance received for Korean Patent Application No. 10-2014-7025441, issued on Feb. 26, 2016, 3 pages.
Notice of Allowance received for Korean Patent Application No. 10-2015-7004548, issued on Feb. 26, 2016, 3 pages.
Notice of Allowance received for Korean Patent Application No. 10-2016-7009347, mailed on May 10, 2018, 4 pages.
Notice of Allowance received for Korean Patent Application No. 10-2016-7009632, mailed on Aug. 17, 2018, 4 pages.
Notice of Allowance received for Korean Patent Application No. 10-2016-7035555, mailed on Sep. 23, 2019, 3 pages.
Notice of Allowance received for Korean Patent Application No. 10-2017-0022365, mailed on Mar. 27, 2018, 4 pages.
Notice of Allowance received for Korean Patent Application No. 10-2017-0022546, mailed on Feb. 27, 2018, 4 pages.
Notice of Allowance received for Korean Patent Application No. 10-2017-0022582, mailed on Feb. 27, 2020, 5 pages.
Notice of Allowance received for Korean Patent Application No. 10-2017-7012145, mailed on Oct. 30, 2019, 3 pages.
Notice of Allowance received for Korean Patent Application No. 10-2017-7015582, mailed on Dec. 27, 2018, 5 pages.
Notice of Allowance received for Korean Patent Application No. 10-2018-7022895, mailed on Feb. 22, 2019, 4 pages.
Notice of Allowance received for Korean Patent Application No. 10-2018-7028845, mailed on Apr. 16, 2020, 5 pages.
Notice of Allowance received for Korean Patent Application No. 10-2018-7032467, mailed on Jan. 28, 2019, 4 pages.
Notice of Allowance received for Korean Patent Application No. 10-2018-7033301, mailed on Feb. 20, 2019, 5 pages.
Notice of Allowance received for Korean Patent Application No. 10-2019-7003374, mailed on Oct. 4, 2019, 10 pages.
Notice of Allowance received for Korean Patent Application No. 10-2019-7003836, mailed on Oct. 4, 2019, 6 pages.
Notice of Allowance received for Korean Patent Application No. 10-2019-7004734, mailed on Oct. 24, 2019, 7 pages.
Notice of Allowance received for Korean Patent Application No. 10-2019-7005136, mailed on Feb. 19, 2021, 5 pages.
Notice of Allowance received for Korean Patent Application No. 10-2019-7005925, mailed on Jan. 21, 2020, 7 pages.
Notice of Allowance received for Korean Patent Application No. 10-2019-7014494, mailed on Mar. 19, 2020, 4 pages.
Notice of Allowance received for Korean Patent Application No. 10-2019-7014988, mailed on Jan. 19, 2020, 4 pages.
Notice of Allowance received for Korean Patent Application No. 10-2019-7038021, mailed on May 2, 2020, 7 pages.
Notice of Allowance received for Korean Patent Application No. 10-2020-0048600, mailed on Apr. 30, 2020, 5 pages.
Notice of Allowance received for Korean Patent Application No. 10-2020-0097418, mailed on Apr. 27, 2021, 5 pages.
Notice of Allowance received for Korean Patent Application No. 10-2020-7002929, mailed on Nov. 26, 2020, 3 pages.
Notice of Allowance received for Korean Patent Application No. 10-2020-7011172, mailed on Aug. 25, 2020, 9 pages.
Notice of Allowance received for Korean Patent Application No. 10-2020-7011424, mailed on Jan. 21, 2021, 4 pages.
Notice of Allowance received for Korean Patent Application No. 10-2020-7017803, mailed on Nov. 5, 2020, 6 pages.
Notice of Allowance received for Korean Patent Application No. 10-2020-7022596, mailed on Jan. 27, 2022, 7 pages.
Notice of Allowance received for Korean Patent Application No. 10-2020-7027862, mailed on Jun. 29, 2021, 7 pages.
Notice of Allowance received for Korean Patent Application No. 10-2020-7034180, mailed on Feb. 22, 2022, 8 pages.
Notice of Allowance received for Korean Patent Application No. 10-2020-7036748, mailed on Jan. 25, 2021, 3 pages.
Notice of Allowance received for Korean Patent Application No. 10-2021-0099243, mailed on Oct. 30, 2021, 4 pages.
Notice of Allowance received for Korean Patent Application No. 10-2021-7005691, mailed on Mar. 29, 2021, 3 pages.

(56) References Cited

OTHER PUBLICATIONS

Notice of Allowance received for Korean Patent Application No. 10-2021-7010306, mailed on Aug. 14, 2023, 7 pages.
Notice of Allowance received for Korean Patent Application No. 10-2021-7011888, mailed on Jan. 27, 2022, 5 pages.
Notice of Allowance received for Korean Patent Application No. 10-2021-7015473, mailed on Feb. 24, 2022, 5 pages.
Notice of Allowance received for Korean Patent Application No. 10-2021-7020549, mailed on Jul. 13, 2021, 3 pages.
Notice of Allowance received for Korean Patent Application No. 10-2021-7024020, mailed on Jan. 14, 2022, 4 pages.
Notice of Allowance received for Korean Patent Application No. 10-2021-7032984, mailed on Jun. 29, 2022, 5 pages.
Notice of Allowance received for Korean Patent Application No. 10-2022-0010942, mailed on Aug. 10, 2022, 6 pages.
Notice of Allowance received for Korean Patent Application No. 10-2022-7012864, mailed on Dec. 15, 2022, 7 pages.
Notice of Allowance received for Korean Patent Application No. 10-2022-7012869, mailed on Apr. 18, 2023, 7 pages.
Notice of Allowance received for Korean Patent Application No. 10-2022-7014519, mailed on Jul. 28, 2023, 7 pages.
Notice of Allowance received for Korean Patent Application No. 10-2022-7014519, mailed on Nov. 16, 2023, 7 pages.
Notice of Allowance received for Korean Patent Application No. 10-2022-7015289, mailed on Jul. 31, 2023, 8 pages.
Notice of Allowance received for Korean Patent Application No. 10-2022-7029609, mailed on Oct. 23, 2023, 8 pages.
Notice of Allowance received for Korean Patent Application No. 10-2022-7033655, mailed on Nov. 29, 2023, 6 pages.
Notice of Allowance received for Korean Patent Application No. 10-2014-7008348, mailed on Feb. 21, 2019, 5 pages.
Notice of Allowance received for Korean Patent Application No. 10-2020-7034405, mailed on Jun. 20, 2022, 6 pages.
Notice of Allowance received for Taiwan Patent Application No. 097134592, mailed on Aug. 12, 2014, 3 pages.
Notice of Allowance received for Taiwan Patent Application No. 101107082, mailed on Oct. 22, 2014, 2 pages.
Notice of Allowance received for Taiwanese Patent Application No. 103131074, mailed on Nov. 17, 2015, 3 pages.
Notice of Allowance received for Taiwanese Patent Application No. 103136545, mailed on Nov. 27, 2017, 4 pages.
Notice of Allowance received for Taiwanese Patent Application No. 104117508, mailed on Sep. 18, 2019, 5 pages.
Notice of Allowance received for Taiwanese Patent Application No. 104140890, mailed on Oct. 25, 2017, 5 pages.
Notice of Allowance received for Taiwanese Patent Application No. 106141250, mailed on May 24, 2018, 7 pages.
Notice of Allowance received for Taiwanese Patent Application No. 107121719, mailed on Sep. 27, 2018, 7 pages.
Notice of Allowance received for Taiwanese Patent Application No. 107138003, mailed on Aug. 30, 2019, 4 pages.
Notice of Allowance received for U.S. Appl. No. 14/503,381, mailed on Dec. 16, 2015, 8 pages.
Notice of Allowance received for U.S. Appl. No. 14/142,661, mailed on Aug. 3, 2015, 10 pages.
Notice of Allowance received for U.S. Appl. No. 14/479,088, mailed on Nov. 12, 2015, 7 pages.
Notice of Allowance received for U.S. Appl. No. 12/074,985, mailed on Jul. 30, 2013, 8 pages.
Notice of Allowance received for U.S. Appl. No. 12/207,370, mailed on Jun. 7, 2013, 9 pages.
Notice of Allowance received for U.S. Appl. No. 12/207,370, mailed on Mar. 6, 2014, 5 pages.
Notice of Allowance received for U.S. Appl. No. 12/207,374, mailed on Aug. 29, 2014, 8 pages.
Notice of Allowance received for U.S. Appl. No. 12/207,374, mailed on Dec. 4, 2014, 8 pages.
Notice of Allowance received for U.S. Appl. No. 13/243,045, mailed on Aug. 4, 2021, 8 pages.

Notice of Allowance received for U.S. Appl. No. 13/243,326, mailed on Sep. 23, 2013, 11 pages.
Notice of Allowance received for U.S. Appl. No. 13/248,872, mailed on Dec. 4, 2014, 7 pages.
Notice of Allowance received for U.S. Appl. No. 13/248,882, mailed on Mar. 13, 2014, 16 pages.
Notice of Allowance received for U.S. Appl. No. 14/090,344, mailed on Aug. 26, 2015, 7 pages.
Notice of Allowance received for U.S. Appl. No. 14/142,657, mailed on Jan. 8, 2015, 5 pages.
Notice of Allowance received for U.S. Appl. No. 14/142,657, mailed on Jul. 23, 2015, 2 pages.
Notice of Allowance received for U.S. Appl. No. 14/142,657, mailed on Jun. 29, 2015, 7 pages.
Notice of Allowance received for U.S. Appl. No. 14/142,657, mailed on Sep. 10, 2014, 9 pages.
Notice of Allowance received for U.S. Appl. No. 14/142,661, mailed on Sep. 28, 2015, 9 pages.
Notice of Allowance received for U.S. Appl. No. 14/142,669, mailed on Aug. 25, 2016, 2 pages.
Notice of Allowance received for U.S. Appl. No. 14/142,669, mailed on Jun. 14, 2016, 5 pages.
Notice of Allowance received for U.S. Appl. No. 14/142,669, mailed on Sep. 21, 2016, 2 pages.
Notice of Allowance received for U.S. Appl. No. 14/142,674, mailed on Feb. 18, 2015, 7 pages.
Notice of Allowance received for U.S. Appl. No. 14/142,674, mailed on Jan. 23, 2015, 7 pages.
Notice of Allowance received for U.S. Appl. No. 14/142,674, mailed on Sep. 26, 2014, 18 pages.
Notice of Allowance received for U.S. Appl. No. 14/255,765, mailed on Jun. 12, 2014, 10 pages.
Notice of Allowance received for U.S. Appl. No. 14/285,378, mailed on May 19, 2016, 10 pages.
Notice of Allowance received for U.S. Appl. No. 14/479,088, mailed on Mar. 9, 2016, 2 pages.
Notice of Allowance received for U.S. Appl. No. 14/480,183, mailed on Nov. 29, 2017, 7 pages.
Notice of Allowance received for U.S. Appl. No. 14/503,072, mailed on Jun. 4, 2018, 6 pages.
Notice of Allowance received for U.S. Appl. No. 14/503,072, mailed on Mar. 26, 2018, 6 pages.
Notice of Allowance received for U.S. Appl. No. 14/503,296, mailed on Aug. 28, 2019, 12 pages.
Notice of Allowance received for U.S. Appl. No. 14/503,364, mailed on Jun. 16, 2016, 11 pages.
Notice of Allowance received for U.S. Appl. No. 14/612,214, mailed on Apr. 15, 2020, 8 pages.
Notice of Allowance received for U.S. Appl. No. 14/642,366, mailed on Jan. 14, 2016, 8 pages.
Notice of Allowance received for U.S. Appl. No. 14/661,796, mailed on Jul. 7, 2015, 10 pages.
Notice of Allowance received for U.S. Appl. No. 14/661,796, mailed on Jul. 23, 2015, 2 pages.
Notice of Allowance received for U.S. Appl. No. 14/980,344, mailed on Mar. 23, 2020, 9 pages.
Notice of Allowance received for U.S. Appl. No. 15/017,436, mailed on May 27, 2016, 17 pages.
Notice of Allowance received for U.S. Appl. No. 15/134,638, mailed on Apr. 10, 2018, 7 pages.
Notice of Allowance received for U.S. Appl. No. 15/134,638, mailed on Jul. 27, 2018, 7 pages.
Notice of Allowance received for U.S. Appl. No. 15/137,944, mailed on Dec. 21, 2017, 8 pages.
Notice of Allowance received for U.S. Appl. No. 15/250,152, mailed on May 1, 2019, 12 pages.
Notice of Allowance received for U.S. Appl. No. 15/269,801, mailed on May 3, 2017, 6 pages.
Notice of Allowance received for U.S. Appl. No. 15/269,801, mailed on Sep. 7, 2017, 5 pages.
Notice of Allowance received for U.S. Appl. No. 15/294,439, mailed on Jan. 8, 2019, 8 pages.

(56)         References Cited

OTHER PUBLICATIONS

Notice of Allowance received for U.S. Appl. No. 15/294,439, mailed on Sep. 10, 2018, 9 pages.

Notice of Allowance received for U.S. Appl. No. 15/357,873, mailed on Aug. 23, 2017, 10 pages.

Notice of Allowance received for U.S. Appl. No. 15/357,873, mailed on Jan. 8, 2018, 9 pages.

Notice of Allowance received for U.S. Appl. No. 15/470,752, mailed on Feb. 7, 2019, 11 pages.

Notice of Allowance received for U.S. Appl. No. 15/845,794, mailed on Feb. 14, 2019, 6 pages.

Notice of Allowance received for U.S. Appl. No. 15/866,341, mailed on Jul. 26, 2019, 8 pages.

Notice of Allowance received for U.S. Appl. No. 15/872,685, mailed on Mar. 8, 2019, 10 pages.

Notice of Allowance received for U.S. Appl. No. 15/894,221, mailed on Apr. 11, 2019, 5 pages.

Notice of Allowance received for U.S. Appl. No. 15/894,221, mailed on Aug. 13, 2019, 2 pages.

Notice of Allowance received for U.S. Appl. No. 15/894,221, mailed on Feb. 1, 2019, 5 pages.

Notice of Allowance received for U.S. Appl. No. 15/894,221, mailed on Mar. 3, 2019, 2 pages.

Notice of Allowance received for U.S. Appl. No. 15/899,966, mailed on Mar. 21, 2019, 7 pages.

Notice of Allowance received for U.S. Appl. No. 15/899,996, mailed on Apr. 24, 2018, 9 pages.

Notice of Allowance received for U.S. Appl. No. 15/900,047, mailed on Dec. 5, 2018, 10 pages.

Notice of Allowance received for U.S. Appl. No. 15/903,456, mailed on May 1, 2019, 6 pages.

Notice of Allowance received for U.S. Appl. No. 15/945,610, mailed on May 20, 2019, 7 pages.

Notice of Allowance received for U.S. Appl. No. 15/992,722, mailed on Oct. 19, 2020, 5 pages.

Notice of Allowance received for U.S. Appl. No. 16/035,419, mailed on May 24, 2019, 14 pages.

Notice of Allowance received for U.S. Appl. No. 16/125,267, mailed on Mar. 3, 2022, 10 pages.

Notice of Allowance received for U.S. Appl. No. 16/131,767, mailed on Sep. 6, 2019, 7 pages.

Notice of Allowance received for U.S. Appl. No. 16/147,023, mailed on Apr. 3, 2020, 2 pages.

Notice of Allowance received for U.S. Appl. No. 16/147,023, mailed on Aug. 13, 2020, 2 pages.

Notice of Allowance received for U.S. Appl. No. 16/147,023, mailed on Feb. 27, 2020, 2 pages.

Notice of Allowance received for U.S. Appl. No. 16/147,023, mailed on Jan. 31, 2020, 7 pages.

Notice of Allowance received for U.S. Appl. No. 16/147,023, mailed on Jul. 2, 2020, 2 pages.

Notice of Allowance received for U.S. Appl. No. 16/147,023, mailed on Jul. 21, 2020, 2 pages.

Notice of Allowance received for U.S. Appl. No. 16/147,023, mailed on Jun. 1, 2020, 2 pages.

Notice of Allowance received for U.S. Appl. No. 16/147,023, mailed on Jun. 18, 2020, 2 pages.

Notice of Allowance received for U.S. Appl. No. 16/147,023, mailed on Mar. 27, 2020, 2 pages.

Notice of Allowance received for U.S. Appl. No. 16/147,023, mailed on May 5, 2020, 2 pages.

Notice of Allowance received for U.S. Appl. No. 16/147,023, mailed on May 20, 2020, 7 pages.

Notice of Allowance received for U.S. Appl. No. 16/147,115, mailed on Oct. 30, 2019, 10 pages.

Notice of Allowance received for U.S. Appl. No. 16/164,561, mailed on Apr. 8, 2020, 5 pages.

Notice of Allowance received for U.S. Appl. No. 16/369,355, mailed on Sep. 1, 2021, 10 pages.

Notice of Allowance received for U.S. Appl. No. 16/369,473, mailed on Jun. 8, 2022, 7 pages.

Notice of Allowance received for U.S. Appl. No. 16/386,707, mailed on Dec. 31, 2020, 18 pages.

Notice of Allowance received for U.S. Appl. No. 16/434,865, mailed on Apr. 7, 2020, 5 pages.

Notice of Allowance received for U.S. Appl. No. 16/456,839, mailed on Apr. 15, 2021, 8 pages.

Notice of Allowance received for U.S. Appl. No. 16/456,839, mailed on Dec. 11, 2020, 10 pages.

Notice of Allowance received for U.S. Appl. No. 16/542,084, mailed on May 20, 2020, 7 pages.

Notice of Allowance received for U.S. Appl. No. 16/553,622, mailed on Sep. 11, 2020, 8 pages.

Notice of Allowance received for U.S. Appl. No. 16/667,271, mailed on May 12, 2020, 11 pages.

Notice of Allowance received for U.S. Appl. No. 16/670,494, mailed on May 27, 2021, 7 pages.

Notice of Allowance received for U.S. Appl. No. 16/670,949, mailed on Sep. 14, 2021, 7 pages.

Notice of Allowance received for U.S. Appl. No. 16/843,638, mailed on Feb. 4, 2022, 7 pages.

Notice of Allowance received for U.S. Appl. No. 16/843,638, mailed on Oct. 29, 2021, 28 pages.

Notice of Allowance received for U.S. Appl. No. 16/938,362, mailed on Apr. 10, 2023, 7 pages.

Notice of Allowance received for U.S. Appl. No. 16/938,362, mailed on Jan. 19, 2023, 8 pages.

Notice of Allowance received for U.S. Appl. No. 16/987,003, mailed on Aug. 18, 2021, 9 pages.

Notice of Allowance received for U.S. Appl. No. 16/990,974, mailed on Apr. 28, 2021, 5 pages.

Notice of Allowance received for U.S. Appl. No. 16/990,974, mailed on Jan. 22, 2021, 7 pages.

Notice of Allowance received for U.S. Appl. No. 17/015,429, mailed on Apr. 4, 2022, 2 pages.

Notice of Allowance received for U.S. Appl. No. 17/015,429, mailed on Apr. 15, 2022, 2 pages.

Notice of Allowance received for U.S. Appl. No. 17/015,429, mailed on Dec. 13, 2021, 2 pages.

Notice of Allowance received for U.S. Appl. No. 17/015,429, mailed on Dec. 24, 2021, 2 pages.

Notice of Allowance received for U.S. Appl. No. 17/015,429, mailed on Feb. 16, 2022, 5 pages.

Notice of Allowance received for U.S. Appl. No. 17/015,429, mailed on Jun. 1, 2022, 5 pages.

Notice of Allowance received for U.S. Appl. No. 17/015,429, mailed on Jun. 17, 2021, 10 pages.

Notice of Allowance received for U.S. Appl. No. 17/015,429, mailed on Mar. 4, 2022, 2 pages.

Notice of Allowance received for U.S. Appl. No. 17/015,429, mailed on May 10, 2022, 2 pages.

Notice of Allowance received for U.S. Appl. No. 17/015,429, mailed on Nov. 24, 2021, 2 pages.

Notice of Allowance received for U.S. Appl. No. 17/015,429, mailed on Oct. 8, 2021, 5 pages.

Notice of Allowance received for U.S. Appl. No. 17/015,429, mailed on Oct. 22, 2021, 2 pages.

Notice of Allowance received for U.S. Appl. No. 17/015,429, mailed on Sep. 22, 2021, 6 pages.

Notice of Allowance received for U.S. Appl. No. 17/062,941, mailed on Aug. 11, 2023, 11 pages.

Notice of Allowance received for U.S. Appl. No. 17/087,855, mailed on Nov. 25, 2022, 8 pages.

Notice of Allowance received for U.S. Appl. No. 17/193,991, mailed on Jul. 17, 2023, 10 pages.

Notice of Allowance received for U.S. Appl. No. 17/193,991, mailed on Mar. 29, 2023, 9 pages.

Notice of Allowance received for U.S. Appl. No. 17/208,957, mailed on Aug. 17, 2022, 11 pages.

Notice of Allowance received for U.S. Appl. No. 17/208,957, mailed on Jun. 15, 2022, 12 pages.

(56) References Cited

OTHER PUBLICATIONS

Notice of Allowance received for U.S. Appl. No. 17/409,570, mailed on Apr. 11, 2023, 7 pages.

Notice of Allowance received for U.S. Appl. No. 17/409,570, mailed on Jan. 25, 2023, 7 pages.

Notice of Allowance received for U.S. Appl. No. 17/409,570, mailed on Jul. 20, 2023, 7 pages.

Notice of Allowance received for U.S. Appl. No. 17/496,716, mailed on Nov. 8, 2023, 24 pages.

Notice of Allowance received for U.S. Appl. No. 17/519,025, mailed on Jun. 22, 2023, 7 pages.

Notice of Allowance received for U.S. Appl. No. 17/519,025, mailed on Mar. 2, 2023, 8 pages.

Notice of Allowance received for U.S. Appl. No. 17/587,558, mailed on Apr. 3, 2024, 19 pages.

Notice of Allowance received for U.S. Appl. No. 17/725,311, mailed on Feb. 14, 2024, 8 pages.

Notice of Allowance received for U.S. Appl. No. 17/732,222, mailed on Mar. 5, 2024, 14 pages.

Notice of Allowance received for U.S. Appl. No. 17/863,974, mailed on Aug. 9, 2023, 2 pages.

Notice of Allowance received for U.S. Appl. No. 17/863,974, mailed on Jul. 11, 2023, 5 pages.

Notice of Allowance received for U.S. Appl. No. 17/863,974, mailed on Jul. 21, 2023, 2 pages.

Notice of Allowance received for U.S. Appl. No. 17/955,311, mailed on May 22, 2023, 7 pages.

Notice of Allowance received for U.S. Appl. No. 18/105,191, mailed on May 22, 2024, 8 pages.

Notice of Allowance received for U.S. Appl. No. 14/311,214, mailed on Jan. 21, 2016, 7 pages.

Notice of Allowance received for U.S. Appl. No. 14/142,661, mailed on Dec. 3, 2015, 2 pages.

Notice of Allowance received for U.S. Appl. No. 14/479,088, mailed on Dec. 23, 2015, 5 pages.

Notice of Allowance received for U.S. Appl. No. 14/479,088, mailed on Jan. 11, 2016, 2 pages.

Notice of Allowance received for U.S. Appl. No. 14/873,023, mailed on Dec. 23, 2015, 10 pages.

Notice of Allowance received for U.S. Appl. No. 14/873,023, mailed on Jan. 14, 2016, 2 pages.

Notice of Hearing received for Indian Patent Application No. 201617039493, mailed on Aug. 10, 2022, 3 pages.

Notice of Hearing received for Indian Patent Application No. 201617039493, mailed on Nov. 21, 2023, 3 pages.

Notice of Hearing received for Indian Patent Application No. 201618024020, mailed on Nov. 21, 2023, 2 pages.

Notice of Hearing received for Indian Patent Application No. 201817036875, mailed on Jan. 11, 2024, 3 pages.

Notice of Hearing received for Indian Patent Application No. 202018014786, mailed on Nov. 29, 2023, 3 pages.

Notice of Hearing received for Indian Patent Application No. 202018044420, mailed on Feb. 28, 2024, 2 pages.

Notice of Hearing received for Indian Patent Application No. 202118009403, mailed on Mar. 15, 2024, 2 pages.

Notice of Preliminary Rejection received for Korean Patent Application No. 10-2014-7025441, mailed on Jun. 12, 2015, 9 pages.

Notice of Preliminary Rejection received for Korean Patent Application No. 10-2015-7004548, mailed on Jun. 12, 2015, 8 pages.

Notice of Preliminary Rejection received from Korean Patent Application No. 10-2015-7010262, mailed on Jun. 12, 2015, 5 pages.

Numnonda Thanachart, "Mobile payment", Software Park Thailand, Available online at: https://www.slideshare.net/softwarepark/mobile-payment, Nov. 23, 2010, 6 pages.

Office Action received for European Patent Application No. 15168475.0, mailed on Oct. 05. 2018, 4 pages.

Office Action received for European Patent Application No. 15728352.4, mailed on Jan. 25, 2018, 10 pages.

Office Action received for Japanese Patent Application No. 2016-224507, mailed on Dec. 1, 2017, 14 pages.

Office Action received for Australian Patent Application No. 2008305338, mailed on Mar. 21, 2011, 3 pages.

Office Action received for Australian Patent Application No. 2008305338, mailed on Oct. 19, 2010, 3 pages.

Office Action received for Australian Patent Application No. 2012200716, issued on Jul. 16, 2014, 4 pages.

Office Action received for Australian Patent Application No. 2012200716, mailed on Nov. 15, 2013, 3 pages.

Office Action received for Australian Patent Application No. 2014204462, issued on May 8, 2015, 4 pages.

Office Action received for Australian Patent Application No. 2014204462, mailed on Apr. 29, 2016, 3 pages.

Office Action received for Australian Patent Application No. 2014334869, mailed on Jan. 11, 2017, 4 pages.

Office Action received for Australian Patent Application No. 2015100708, issued on Sep. 8, 2015, 4 pages.

Office Action received for Australian Patent Application No. 2015100709, issued on Sep. 9, 2015 (Examination Report 1), 4 pages.

Office Action received for Australian Patent Application No. 2015100709, issued on Sep. 9, 2015 (Examination Report 2), 4 pages.

Office Action received for Australian Patent Application No. 2015266650, mailed on Apr. 10, 2017, 4 pages.

Office Action received for Australian Patent Application No. 2015266693, mailed on Apr. 10. 2017, 4 pages.

Office Action received for Australian Patent Application No. 2016100367, issued on May 25, 2016, 3 pages.

Office Action received for Australian Patent Application No. 2016100367, mailed on Oct. 26, 2016, 3 pages.

Office Action received for Australian Patent Application No. 2016100383, issued on Jun. 9, 2016, 2 pages.

Office Action received for Australian Patent Application No. 2016100383, issued on Nov. 11, 2016, 3 pages.

Office Action received for Australian Patent Application No. 2016201310, mailed on Feb. 28, 2017, 3 Pages.

Office Action received for Australian Patent Application No. 2016203896, mailed on Jan. 19, 2018, 4 pages.

Office Action received for Australian Patent Application No. 2016203896, mailed on Mar. 6, 2017, 3 Pages.

Office Action received for Australian Patent Application No. 2016203898, mailed on Dec. 19, 2017, 4 pages.

Office Action received for Australian Patent Application No. 2016203898, mailed on Feb. 17, 2017, 3 Pages.

Office Action received for Australian Patent Application No. 2017100070, mailed on Mar. 16, 2017, 6 pages.

Office Action received for Australian Patent Application No. 2017100553, mailed on Aug. 4, 2017, 5 pages.

Office Action received for Australian Patent Application No. 2017201064, mailed on Mar. 9, 2017, 2 pages.

Office Action received for Australian Patent Application No. 2017201068, mailed on Jan. 17, 2018, 5 pages.

Office Action received for Australian Patent Application No. 2017201068, mailed on Mar. 10, 2017, 2 pages.

Office Action received for Australian Patent Application No. 2017266867, mailed on Dec. 6, 2018, 3 pages.

Office Action received for Australian Patent Application No. 2017330208, mailed on Jul. 25, 2019, 5 pages.

Office Action received for Australian Patent Application No. 2018202559, mailed on Apr. 8, 2019, 4 pages.

Office Action Received for Australian Patent Application No. 2018202559, mailed on Jan. 16, 2019, 6 pages.

Office Action received for Australian Patent Application No. 2018202559, mailed on Jul. 19, 2019, 5 pages.

Office Action received for Australian Patent Application No. 2018202712, mailed on Mar. 22, 2019, 5 pages.

Office Action received for Australian Patent Application No. 2018202712, mailed on Nov. 15, 2019, 5 pages.

Office Action received for Australian Patent Application No. 2018202712, mailed on Nov. 20, 2018, 12 pages.

(56) References Cited

OTHER PUBLICATIONS

Office Action received for Australian Patent Application No. 2018202712, mailed on Sep. 2, 2019, 4 pages.
Office Action received for Australian Patent Application No. 2018203732, mailed on Feb. 26, 2019, 5 pages.
Office Action received for Australian Patent Application No. 2018203732, mailed on Jun. 6, 2019, 4 pages.
Office Action received for Australian Patent Application No. 2018203732, mailed on Jun. 21, 2018, 3 pages.
Office Action Received for Australian Patent Application No. 2018203732, mailed on Nov. 30, 2018, 3 Pages.
Office Action received for Australian Patent Application No. 2018270420, mailed on Apr. 19, 2021, 4 pages.
Office Action received for Australian Patent Application No. 2018270420, mailed on Jan. 7, 2021, 5 pages.
Office Action received for Australian Patent Application No. 2018270420, mailed on Jul. 21, 2020, 5 pages.
Office Action received for Australian Patent Application No. 2018279788, mailed on Feb. 8, 2019, 4 pages.
Office Action received for Australian Patent Application No. 2018312629, mailed on Feb. 25, 2019, 4 pages.
Office Action received for Australian Patent Application No. 2019201101, mailed on Feb. 28, 2019, 3 pages.
Office Action received for Australian Patent Application No. 2019203473, mailed on Oct. 25, 2019, 2 pages.
Office Action received for Australian Patent Application No. 2019204387, mailed on Jun. 17, 2020, 7 pages.
Office Action received for Australian Patent Application No. 2019268070, mailed on Jan. 27, 2022, 3 pages,.
Office Action received for Australian Patent Application No. 2019268070, mailed on Jan. 29, 2021, 6 pages.
Office Action received for Australian Patent Application No. 2019268070, mailed on Sep. 21, 2021, 4 pages.
Office Action received for Australian Patent Application No. 2019281965, mailed on Aug. 31, 2022, 5 pages.
Office Action received for Australian Patent Application No. 2019281965, mailed on May 11, 2022, 5 pages.
Office Action received for Australian Patent Application No. 2019281965, mailed on Nov. 18, 2022, 7 pages.
Office Action received for Australian Patent Application No. 2019281965, mailed on Nov. 30, 2021, 3 pages.
Office Action received for Australian Patent Application No. 2020200685, mailed on Apr. 20, 2020, 3 pages.
Office Action received for Australian Patent Application No. 2020200685, mailed on Aug. 12, 2020, 3 pages.
Office Action received for Australian Patent Application No. 2020200685, mailed on Feb. 10, 2020, 4 pages.
Office Action received for Australian Patent Application No. 2020201721, mailed on Feb. 26, 2021, 7 pages.
Office Action received for Australian Patent Application No. 2020203899, mailed on May 5, 2021, 10 pages.
Office Action received for Australian Patent Application No. 2020203899, mailed on May 5, 2022, 4 pages.
Office Action received for Australian Patent Application No. 2020203899, mailed on Nov. 26, 2021, 4 pages.
Office Action received for Australian Patent Application No. 2020204256, mailed on Jun. 21, 2021, 2 pages.
Office Action received for Australian Patent Application No. 2020239783, mailed on Oct. 13, 2020, 4 pages.
Office Action received for Australian Patent Application No. 2020289822, mailed on Aug. 24, 2021, 7 pages.
Office Action received for Australian Patent Application No. 2021200415, mailed on Jan. 18, 2022, 3 pages.
Office Action received for Australian Patent Application No. 2021202352, mailed on Mar. 15, 2022, 3 pages.
Office Action received for Australian Patent Application No. 2021250944, mailed on Sep. 16, 2022, 3 pages.
Office Action received for Australian Patent Application No. 2021254574, mailed on Oct. 15, 2022, 3 pages.

Office Action received for Australian Patent Application No. 2022200900, mailed on Jul. 13, 2023, 3 pages.
Office Action received for Australian Patent Application No. 2022200900, mailed on Mar. 28, 2023, 3 pages.
Office Action received for Australian Patent Application No. 2022200900, mailed on Nov. 30, 2022, 6 pages.
Office Action received for Australian Patent Application No. 2022200900, mailed on Nov. 30, 2023, 3 pages.
Office Action received for Australian Patent Application No. 2022200900, mailed on Sep. 8, 2023, 4 pages.
Office Action received for Australian Patent Application No. 2022203027, mailed on Mar. 14, 2024, 3 pages.
Office Action received for Australian Patent Application No. 2022203027, mailed on Oct. 25, 2023, 5 pages.
Office Action received for Australian Patent Application No. 2022206826, mailed on Jul. 4, 2023, 3 pages.
Office Action received for Australian Patent Application No. 2022209019, mailed on Aug. 18, 2023, 4 pages.
Office Action received for Australian Patent Application No. 2022231779, mailed on Aug. 7, 2023, 5 pages.
Office Action received for Australian Patent Application No. 2022231779, mailed on Nov. 6, 2023, 3 pages.
Office Action received for Australian Patent Application No. 2022279466, mailed on Oct. 25, 2023, 3 pages.
Office Action received for Australian Patent Application No. 2023200797, mailed on Jan. 23, 2024, 5 pages,.
Office Action received for Australian Patent Application No. 2023203469, mailed on Aug. 31, 2023, 5 pages.
Office Action received for Australian Patent Application No. 2023203469, mailed on Dec. 18, 2023, 4 pages.
Office Action received for Chinese Patent Application No. 200880108306.1, mailed on Aug. 24, 2011, 10 pages.
Office Action received for Chinese Patent Application No. 200880108306.1, mailed on Mar. 20, 2012, 8 pages.
Office Action received for Chinese Patent Application No. 200880108306.1, mailed on Mar. 27, 2014, 6 pages.
Office Action received for Chinese Patent Application No. 201410407626.4, mailed on May 21, 2018, 13 pages.
Office Action received for Chinese Patent Application No. 201410407626.4, mailed on Oct. 31, 2016, 10 pages.
Office Action received for Chinese Patent Application No. 201410407626.4, mailed on Sep. 11, 2017, 11 pages.
Office Action received for Chinese Patent Application No. 201480058054.1, mailed on Jan. 22, 2019, 6 pages.
Office Action received for Chinese Patent Application No. 201480058054.1, mailed on May 3, 2018, 18 pages.
Office Action received for Chinese Patent Application No. 201510284715.9, mailed on Apr. 14, 2020, 19 pages.
Office Action received for Chinese Patent Application No. 201510284715.9, mailed on Dec. 18, 2019, 24 pages.
Office Action received for Chinese Patent Application No. 201510284715.9, mailed on Dec. 21, 2018, 22 pages.
Office Action received for Chinese Patent Application No. 201510284715.9, mailed on Jun. 19, 2019, 26 pages.
Office Action received for Chinese Patent Application No. 201510284896.5, mailed on Jun. 28, 2018, 15 pages.
Office Action received for Chinese Patent Application No. 201510284896.5, mailed on Mar. 6, 2019, 13 pages.
Office Action received for Chinese Patent Application No. 201510284896.5, mailed on Mar. 14, 2022, 10 pages.
Office Action received for Chinese Patent Application No. 201510284896.5, mailed on Sep. 3, 2019, 9 pages.
Office Action received for Chinese Patent Application No. 201520358683.8, mailed on Sep. 2, 2015, 4 pages.
Office Action received for Chinese Patent Application No. 201610459968.X, mailed on Aug. 23, 2018, 14 pages.
Office Action received for Chinese Patent Application No. 201610459968.X, mailed on Aug. 23, 2019, 12 pages.
Office Action received for Chinese Patent Application No. 201610459968.X, mailed on Feb. 18, 2020, 8 pages.
Office Action received for Chinese Patent Application No. 201610459968.X, mailed on Feb. 22, 2019, 11 pages.

(56) References Cited

OTHER PUBLICATIONS

Office Action received for Chinese Patent Application No. 201620480708.6, mailed on Jan. 9, 2017, 3 pages,.

Office Action received for Chinese Patent Application No. 201620480708.6, mailed on Sep. 14, 2016, 3 pages.

Office Action received for Chinese Patent Application No. 201620480846.4, mailed on Jan. 9, 2017, 3 pages.

Office Action received for Chinese Patent Application No. 201620480846.4, mailed on Sep. 14, 2016, 3 pages.

Office Action received for Chinese Patent Application No. 201710093861.2, mailed on Mar. 5, 2019, 6 pages.

Office Action received for Chinese Patent Application No. 201710093861.2, mailed on Sep. 14, 2018, 15 pages.

Office Action received for Chinese Patent Application No. 201710094150.7, mailed on Dec. 19, 2018, 12 Pages.

Office Action received for Chinese Patent Application No. 201710094150.7, mailed on Jan. 10, 2022, 6 pages.

Office Action received for Chinese Patent Application No. 201710094150.7, mailed on Jul. 31, 2019, 6 pages.

Office Action received for Chinese Patent Application No. 201710198190.6, mailed on Jan. 24, 2022, 16 pages.

Office Action received for Chinese Patent Application No. 201710198190.6, mailed on Jul. 5, 2022, 7 pages.

Office Action received for Chinese Patent Application No. 201710198190.6, mailed on May 8, 2021, 22 pages.

Office Action received for Chinese Patent Application No. 201710198190.6, mailed on Oct. 12, 2020, 18 pages.

Office Action received for Chinese Patent Application No. 201710198190.6, mailed on Sep. 25, 2019, 27 pages.

Office Action received for Chinese Patent Application No. 201711292804.3, mailed on Aug. 5, 2020, 26 pages.

Office Action received for Chinese Patent Application No. 201711292804.3, mailed on Feb. 23, 2021, 17 pages.

Office Action received for Chinese Patent Application No. 201711292804.3, mailed on Sep. 10, 2021, 19 pages.

Office Action received for Chinese Patent Application No. 201780002398.4, mailed on Feb. 27. 2019, 6 pages.

Office Action received for Chinese Patent Application No. 201780002398.4, mailed on Sep. 12, 2018, 17 pages,.

Office Action received for Chinese Patent Application No. 201780053143.0, mailed on Dec. 16, 2021, 19 pages.

Office Action received for Chinese Patent Application No. 201780053143.0, mailed on Dec. 24, 2020, 21 pages.

Office Action received for Chinese Patent Application No. 201780053143.0, mailed on Mar. 30, 2022, 12 pages.

Office Action received for Chinese Patent Application No. 201780053143.0, mailed on May 22, 2020, 21 pages.

Office Action received for Chinese Patent Application No. 201780053143.0, mailed on Nov. 30, 2022, 13 pages.

Office Action received for Chinese Patent Application No. 201780053143.0, mailed on Sep. 3, 2021, 24 pages.

Office Action received for Chinese Patent Application No. 201810094316.X, mailed on Apr. 28, 2019, 9 pages.

Office Action received for Chinese Patent Application No. 201810094316.X, mailed on Aug. 5, 2019, 9 pages.

Office Action received for Chinese Patent Application No. 201810094316.X, mailed on Oct. 29, 2018, 12 pages.

Office Action received for Chinese Patent Application No. 201810338038.8, mailed on Jan. 21, 2020, 26 pages.

Office Action received for Chinese Patent Application No. 201810338038.8, mailed on May 14, 2019, 26 pages,.

Office Action received for Chinese Patent Application No. 201810338040.5, mailed on Jun. 3, 2021, 25 pages.

Office Action received for Chinese Patent Application No. 201810338040.5, mailed on Oct. 25, 2021, 22 pages.

Office Action received for Chinese Patent Application No. 201810338826.7, mailed on Apr. 3, 2019, 21 pages.

Office Action received for Chinese Patent Application No. 201810338826.7, mailed on Jan. 16, 2020, 16 Pages.

Office Action received for Chinese Patent Application No. 201810338826.7, mailed on Oct. 21, 2019, 19 pages.

Office Action received for Chinese Patent Application No. 201810339290.0, mailed on Jun. 4, 2021, 20 pages.

Office Action received for Chinese Patent Application No. 201810339290.0, mailed on Oct. 18, 2021, 20 pages.

Office Action received for Chinese Patent Application No. 201810954931.3, mailed on Jan. 15, 2021, 11 pages.

Office Action received for Chinese Patent Application No. 201810955077.2, mailed on Feb. 20, 2021, 19 pages.

Office Action received for Chinese Patent Application No. 201811460172.1, mailed on Jan. 21, 2020, 17 pages.

Office Action received for Chinese Patent Application No. 201811460172.1, mailed on Oct. 14, 2020, 7 pages.

Office Action received for Chinese Patent Application No. 201880000798.6, mailed on Aug. 5, 2020, 18 pages.

Office Action received for Chinese Patent Application No. 201880000798.6, mailed on Dec. 30, 2021, 10 pages.

Office Action received for Chinese Patent Application No. 201880000798.6, mailed on Jul. 2, 2021, 15 pages.

Office Action received for Chinese Patent Application No. 201880001546.5, mailed on Feb. 24, 2024, 21 pages.

Office Action received for Chinese Patent Application No. 201880003211.7, mailed on Jan. 23, 2024, 20 pages.

Office Action received for Chinese Patent Application No. 201910070375.8, mailed on Dec. 4, 2019, 23 pages.

Office Action received for Chinese Patent Application No. 201910070375.8, mailed on Sep. 3, 2020, 8 pages.

Office Action received for Chinese Patent Application No. 201910109868.8, mailed on Apr. 23, 2023, 30 pages.

Office Action received for Chinese Patent Application No. 201910109868.8, mailed on Jun. 30, 2020, 15 pages.

Office Action received for Chinese Patent Application No. 201910109868.8, mailed on Mar. 16, 2020, 19 pages.

Office Action received for Chinese Patent Application No. 201910109868.8, mailed on Nov. 18, 2022, 32 pages.

Office Action received for Chinese Patent Application No. 201910109868.8, mailed on Sep. 19, 2019, 23 pages.

Office Action received for Chinese Patent Application No. 201910246400.3, mailed on Apr. 19, 2022, 24 pages.

Office Action received for Chinese Patent Application No. 201910246439.5, mailled on Apr. 6, 2023, 14 pages.

Office Action received for Chinese Patent Application No. 201910246439.5, mailed on Apr. 23, 2020, 14 pages.

Office Action received for Chinese Patent Application No. 201910246439.5, mailed on Nov. 22, 2023, 20 pages.

Office Action received for Chinese Patent Application No. 201910246439.5, mailed on Oct. 15, 2019, 17 pages.

Office Action received for Chinese Patent Application No. 201910246439.5, mailed on Sep. 2, 2020, 15 pages.

Office Action received for Chinese Patent Application No. 201910278273.5, mailed on Jan. 3, 2020, 17 pages.

Office Action received for Chinese Patent Application No. 201910278273.5, mailed on Jun. 9, 2020, 8 pages.

Office Action received for Chinese Patent Application No. 201910744886.3, mailed on Jan. 18, 2021, 10 pages.

Office Action received for Chinese Patent Application No. 201910899698.8, mailed on Mar. 23, 2020, 15 pages.

Office Action received for Chinese Patent Application No. 201910899698.8, mailed on May 27, 2020, 10 pages.

Office Action received for Chinese Patent Application No. 201910901500.5, mailed on Dec. 22, 2023, 19 pages.

Office Action received for Chinese Patent Application No. 201910901500.5, mailed on Jun. 30, 2023, 27 pages.

Office Action received for Chinese Patent Application No. 201910901500.5, mailed on Nov. 24, 2022, 22 pages.

Office Action received for Chinese Patent Application No. 201910901500.5, mailed on Sep. 29, 2023, 15 pages.

Office Action received for Chinese Patent Application No. 201911022883.5, mailed on Jan. 6, 2024, 9 pages.

Office Action received for Chinese Patent Application No. 201911023090.5, mailed on Jan. 29, 2024, 27 pages.

(56)        References Cited

OTHER PUBLICATIONS

Office Action received for Chinese Patent Application No. 201911199010.1, mailed on Mar. 29, 2021, 14 pages.

Office Action received for Chinese Patent Application No. 201911199010.1, mailed on Nov. 4, 2020, 20 pages.

Office Action received for Chinese Patent Application No. 201911199010.1, mailed on Sep. 3, 2021, 12 pages.

Office Action received for Chinese Patent Application No. 201980041865.3, mailed on Apr. 13, 2022, 12 pages.

Office Action received for Chinese Patent Application No. 201980041865.3, mailed on May 24, 2021, 14 pages.

Office Action received for Chinese Patent Application No. 202110011700.0, mailed on Jan. 24, 2024, 11 pages.

Office Action received for Chinese Patent Application No. 202211283788.2, mailed on Jul. 7, 2023, 7 pages.

Office Action received for Chinese Patent Application No. 202211283788.2, mailed on Mar. 22, 2023, 15 pages.

Office Action received for Chinese Patent Application No. 202211283788.2, mailed on Nov. 1, 2023, 10 pages.

Office Action received for Chinese Patent Application No. 202211285112.7, mailed on May 18, 2023, 16 pages.

Office Action received for Chinese Patent Application No. 202211285112.7, mailed on Nov. 11, 2023, 6 pages.

Office Action received for Chinese Patent Application No. 201410407626.4, mailed on Feb. 12. 2019, 13 pages.

Office Action received for Danish Patent Application No. PA201670628, mailed on Jun. 6, 2017, 3 pages.

Office Action received for Danish Patent Application No. PA201670628, mailed on Oct. 26, 2016, 7 pages.

Office Action received for Danish Patent Application No. PA201770418, mailed on May 8, 2018, 3 pages.

Office Action received for Danish Patent Application No. PA201770419, mailed on Jan. 10, 2018, 4 pages,.

Office Action received for Danish Patent Application No. PA201770712, mailed on Jul. 20. 2018, 4 pages.

Office Action received for Danish Patent Application No. PA201770712, mailed on Mar. 1, 2019, 3 pages.

Office Action received for Danish Patent Application No. PA201770713, mailed on Apr. 18, 2018, 4 pages.

Office Action received for Danish Patent Application No. PA201770713, mailed on Jun. 7, 2019, 4 pages.

Office Action received for Danish Patent Application No. PA201770713, mailed on Nov. 13, 2018, 3 pages.

Office Action received for Danish Patent Application No. PA201770714, mailed on Aug. 17, 2018, 6 pages.

Office Action received for Danish Patent Application No. PA201770714, mailed on Feb. 21, 2018, 3 pages.

Office Action received for Danish Patent Application No. PA201770714, mailed on Oct. 13, 2017, 9 pages.

Office Action received for Danish Patent Application No. PA201770715, mailed on Mar. 8, 2018, 4 pages.

Office Action received for Danish Patent Application No. PA201770715, mailed on Oct. 29, 2018, 4 pages.

Office Action received for Danish Patent Application No. PA201770782, mailed on Jan. 26, 2018, 8 pages.

Office Action received for Danish Patent Application No. PA201770782, mailed on Nov. 22, 2018, 3 pages.

Office Action received for Danish Patent Application No. PA201870370, mailed on Nov. 9, 2018, 4 pages.

Office Action received for Danish Patent Application No. PA201870371, mailed on Nov. 20, 2018, 3 pages.

Office Action received for Danish Patent Application No. PA201870855, mailed on May 14, 2020, 4 pages.

Office Action received for Danish Patent Application No. PA201870855, mailed on Nov. 7, 2019, 4 pages.

Office Action received for Danish Patent Application No. PA201970127, mailed on Dec. 20, 2019, 3 pages.

Office Action received for Danish Patent Application No. PA201970127, mailed on Feb. 24, 2020, 2 pages.

Office Action received for European Patent Application No. 08834386.8, mailed on Aug. 23, 2010, 4 pages.

Office Action received for European Patent Application No. 12181538.5, mailed on Dec. 16, 2013, 4 pages.

Office Action received for European Patent Application No. 12770400.5, mailed on Mar. 10, 2015, 5 pages.

Office Action received for European Patent Application No. 12773460.6, mailed on Feb. 19, 2018, 6 pages.

Office Action Received for European Patent Application No. 13171145.9, mailed on Apr. 28, 2016, 5 pages.

Office Action Received for European Patent Application No. 13171145.9, mailed on May 3, 2018, 4 pages.

Office Action received for European Patent Application No. 15168475.0, mailed on Dec. 19, 2016, 5 pages.

Office Action received for European Patent Application No. 15168475.0, mailed on May 6, 2020, 5 pages.

Office Action received for European Patent Application No. 15727291.5, mailed on Jan. 15, 2018, 8 pages.

Office Action received for European Patent Application No. 16201159.7, mailed on Jun. 12, 2019, 10 pages.

Office Action Received for European Patent Application No. 16201195.1, mailed on Feb. 14, 2018, 12 pages.

Office Action received for European Patent Application No. 16201205.8, mailed on Feb. 16, 2018, 12 pages.

Office Action received for European Patent Application No. 17799904.2, mailed on Oct. 21, 2020, 6 pages.

Office Action received for European Patent Application No. 17853654.6, mailed on Mar. 23, 2020, 4 pages.

Office Action received for European Patent Application No. 18208881.5, mailed on Jun. 11, 2019, 5 pages.

Office Action received for European Patent Application No. 18208881.5, mailed on May 7, 2021, 6 pages.

Office Action received for European Patent Application No. 18704335.1, mailed on Sep. 23, 2019, 7 pages.

Office Action received for European Patent Application No. 18713408.5, mailed on May 20, 2019, 5 pages.

Office Action received for European Patent Application No. 18713408.5, mailed on May 26, 2020, 5 pages.

Office Action received for European Patent Application No. 18713408.5, mailed on Nov. 4, 2020, 6 pages.

Office Action received for European Patent Application No. 18713408.5, mailed on Nov. 20, 2019, 4 pages.

Office Action received for European Patent Application No. 18830326.7. mailed on Apr. 30, 2020, 5 pages.

Office Action received for European Patent Application No. 18830326.7, mailed on Aug. 13, 2020, 6 pages.

Office Action received for European Patent Application No. 18830326.7, mailed on Aug. 27, 2019, 6 pages.

Office Action received for European Patent Application No. 18830326.7, mailed on Nov. 22, 2019, 8 pages.

Office Action received for European Patent Application No. 18830326.7, mailed on Sep. 16, 2019, 6 pages.

Office Action received for European Patent Application No. 19150528.8, mailed on Jul. 1, 2020, 6 pages.

Office Action received for European Patent Application No. 19160344.8, mailed on Mar. 26, 2021, 7 pages.

Office Action received for European Patent Application No. 19160344.8, mailed on Oct. 7, 2021, 8 pages.

Office Action received for European Patent Application No. 19160348.9, mailed on Aug. 4, 2022, 6 pages.

Office Action received for European Patent Application No. 19160348.9, mailed on May 14, 2020, 4 pages.

Office Action received for European Patent Application No. 19160348.9, mailed on Nov. 17, 2020, 6 pages.

Office Action received for European Patent Application No. 19186538.5, mailed on Oct. 12, 2020, 7 pages.

Office Action received for European Patent Application No. 19186538.5, mailed on Oct. 22, 2021, 7 pages.

Office Action received for European Patent Application No. 19194828.0, mailed on May 10, 2021, 6 pages.

Office Action received for European Patent Application No. 19194828.0, mailed on Oct. 15, 2020, 7 pages.

(56) References Cited

OTHER PUBLICATIONS

Office Action received for European Patent Application No. 19731554.2, mailed on Apr. 19, 2022, 8 pages.
Office Action received for European Patent Application No. 19769336.9, mailed on Nov. 4, 2021, 6 pages.
Office Action received for European Patent Application No. 19769669.3, mailed on Apr. 18, 2023, 20 pages.
Office Action received for European Patent Application No. 20186286.9, mailed on Jan. 25, 2022, 8 pages.
Office Action received for European Patent Application No. 20186286.9, mailed on Jul. 29, 2021, 8 pages.
Office Action received for European Patent Application No. 20191533.7, mailed on May 12, 2022, 5 pages.
Office Action received for European Patent Application No. 20198076.0, mailed on Mar. 25, 2022, 5 pages.
Office Action received for European Patent Application No. 20198076.0, mailed on Sep. 22, 2021, 6 pages.
Office Action received for European Patent Application No. 20198076.0, mailed on Sep. 22, 2022, 7 pages.
Office Action received for European Patent Application No. 21173988.3, mailed on Jan. 19, 2023, 5 pages.
Office Action received for European Patent Application No. 22188377.0, mailed on Mar. 7, 2024, 7 pages.
Office Action received for German Patent Application No. 112014004134.3, mailed on Dec. 21, 2022, 22 pages.
Office Action received for German Patent Application No. 112014004134.3, mailed on Jul. 31, 2023, 11 pages.
Office Action received for German Patent Application No. 202015004267.8, mailed on Nov. 4, 2015, 4 pages.
Office Action received for Indian Patent Application No. 201617006865, mailed on Dec. 11, 2019, 7 pages.
Office Action received for Indian Patent Application No. 201617039493, mailed on Oct. 21, 2019, 6 pages.
Office Action received for Indian Patent Application No. 201618024020, mailed on Sep. 14, 2020, 7 pages.
Office Action received for Indian Patent Application No. 201817036875, mailed on Oct. 29, 2021, 8 pages.
Office Action received for Indian Patent Application No. 201917024374, mailed on Dec. 30, 2021, 10 pages.
Office Action received for Indian Patent Application No. 201918003782, mailed on Nov. 18, 2021, 8 pages.
Office Action received for Indian Patent Application No. 201918027146, mailed on Jan. 4, 2022, 7 pages.
Office Action received for Indian Patent Application No. 202018009834, mailed on Nov. 12, 2021, 6 pages.
Office Action received for Indian Patent Application No. 202018009906, mailed on Apr. 29, 2022, 9 pages.
Office Action received for Indian Patent Application No. 202018014786, mailed on Nov. 9, 2021, 7 pages.
Office Action received for Indian Patent Application No. 202018038351, mailed on Feb. 25, 2022, 6 pages.
Office Action received for Indian Patent Application No. 202018041558, mailed on Dec. 3, 2021, 7 pages.
Office Action received for Indian Patent Application No. 202018044420, mailed on Jan. 31, 2022, 6 pages.
Office Action received for Indian Patent Application No. 202118009403, mailed on Feb. 21, 2022, 6 pages.
Office Action received for Indian Patent Application No. 202118018461, mailed on Feb. 23, 2022, 6 pages.
Office Action received for Japanese Patent Application No. 2010-525891, mailed on Jun. 12, 2012, 11 pages.
Office Action received for Japanese Patent Application No. 2013-098406, mailed on Dec. 9, 2013, 12 pages.
Office Action received for Japanese Patent Application No. 2013-098406, mailed on Dec. 15, 2014, 12 pages.
Office Action received for Japanese Patent Application No. 2013-098406, mailed on Jul. 19, 2016, 10 pages.
Office Action received for Japanese Patent Application No. 2015-083696, mailed on Jun. 17, 2016, 12 pages.

Office Action received for Japanese Patent Application No. 2016-131998, mailed on Aug. 10, 2018, 9 pages.
Office Action received for Japanese Patent Application No. 2016-131998, mailed on Sep. 25, 2017, 10 pages.
Office Action received for Japanese Patent Application No. 2016-224506, mailed on May 14, 2019, 22 pages.
Office Action received for Japanese Patent Application No. 2016-224507, mailed on Jun. 16, 2017, 16 pages.
Office Action received for Japanese Patent Application No. 2016-540927, mailed on Jun. 20, 2017, 12 pages.
Office Action received for Japanese Patent Application No. 2016-558332, mailed on Dec. 8, 2017, 12 pages.
Office Action received for Japanese Patent Application No. 2016-558332, mailed on Jul. 27, 2018, 9 pages.
Office Action received for Japanese Patent Application No. 2016-569665, mailed on Aug. 20, 2018, 9 pages.
Office Action received for Japanese Patent Application No. 2016-569665, mailed on Jan. 19, 2018, 10 pages.
Office Action received for Japanese Patent Application No. 2017-075031, mailed on Jul. 30, 2018, 16 pages.
Office Action received for Japanese Patent Application No. 2017-085582, mailed on Jul. 2, 2018, 11 pages.
Office Action received for Japanese Patent Application No. 2018-113081, mailed on Apr. 9, 2019, 6 pages.
Office Action received for Japanese Patent Application No. 2018-113081, mailed on Jan. 10, 2020, 8 pages.
Office Action received for Japanese Patent Application No. 2018-113081, mailed on Oct. 2, 2020, 7 pages.
Office Action received for Japanese Patent Application No. 2018-551159, mailed on Jan. 27, 2020, 8 pages.
Office Action received for Japanese Patent Application No. 2018-551159, mailed on Sep. 30, 2019, 6 pages.
Office Action received for Japanese Patent Application No. 2018-560107, mailed on Jun. 14, 2019, 26 pages.
Office Action received for Japanese Patent Application No. 2019-053379, mailed on May 29, 2020, 11 pages.
Office Action received for Japanese Patent Application No. 2019-053379, mailed on Oct. 18, 2019, 11 pages.
Office Action received for Japanese Patent Application No. 2019-107235, mailed on Oct. 18, 2019, 8 pages.
Office Action received for Japanese Patent Application No. 2019-194603, mailed on Jan. 4, 2021, 8 pages.
Office Action received for Japanese Patent Application No. 2019-238894, mailed on Mar. 6, 2020, 7 pages.
Office Action received for Japanese Patent Application No. 2019-510416, mailed on May 15. 2020, 4 pages.
Office Action received for Japanese Patent Application No. 2019-510416, mailed on Oct. 18, 2019, 4 pages.
Office Action received for Japanese Patent Application No. 2019-511975, mailed on Apr. 10, 2020, 6 pages.
Office Action received for Japanese Patent Application No. 2019-563560, mailed on Jan. 20, 2023, 56 pages.
Office Action received for Japanese Patent Application No. 2019-563560, mailed on Jul. 4, 2022, 34 pages.
Office Action received for Japanese Patent Application No. 2019-563560, mailed on Jun. 14, 2021, 6 pages.
Office Action received for Japanese Patent Application No. 2019-563560, mailed on Nov. 30, 2020, 7 pages.
Office Action received for Japanese Patent Application No. 2020-028315, mailed on Feb. 7, 2022, 6 pages.
Office Action received for Japanese Patent Application No. 2020-028315, mailed on Jul. 6, 2020, 18 pages.
Office Action received for Japanese Patent Application No. 2020-028315, mailed on Nov. 9, 2020, 11 pages.
Office Action received for Japanese Patent Application No. 2020-126751, mailed on Jan. 5, 2021, 8 pages.
Office Action received for Japanese Patent Application No. 2020-159979, mailed on May 10, 2021, 9 pages.
Office Action received for Japanese Patent Application No. 2020-184605, mailed on Dec. 12, 2022, 9 pages.
Office Action received for Japanese Patent Application No. 2020-184605, mailed on Feb. 14, 2022, 24 pages.

(56)     References Cited

OTHER PUBLICATIONS

Office Action received for Japanese Patent Application No. 2020-184605, mailed on Jul. 3, 2023, 6 pages.
Office Action received for Japanese Patent Application No. 2020-566978, mailed on Feb. 4, 2022, 12 pages.
Office Action received for Japanese Patent Application No. 2020-566978, mailed on Sep. 26, 2022, 4 pages.
Office Action received for Japanese Patent Application No. 2021-001028, mailed on Jan. 31, 2022, 10 pages.
Office Action received for Japanese Patent Application No. 2021-015128, mailed on Jun. 14, 2021, 4 pages.
Office Action received for Japanese Patent Application No. 2021-084065, mailed on Apr. 10, 2023, 6 pages.
Office Action received for Japanese Patent Application No. 2021-084065, mailed on Jun. 24, 2022, 12 pages.
Office Action received for Japanese Patent Application No. 2021-084065, mailed on Nov. 14, 2022, 10 pages.
Office Action received for Japanese Patent Application No. 2021-131310, mailed on Sep. 2, 2022, 9 pages.
Office Action received for Japanese Patent Application No. 2021-149549, mailed on Oct. 21, 2022, 4 pages.
Office Action received for Japanese Patent Application No. 2021-168243, mailed on Feb. 6, 2023, 8 pages.
Office Action received for Japanese Patent Application No. 2021-168243, mailed on Mar. 8, 2024, 4 pages.
Office Action received for Japanese Patent Application No. 2022-100394, mailed on Sep. 29, 2023, 6 pages.
Office Action received for Japanese Patent Application No. 2022-140146, mailed on Mar. 1, 2024, 8 pages.
Office Action received for Japanese Patent Application No. 2022-140146, mailed on Oct. 20, 2023, 8 pages.
Office Action received for Japanese Patent Application No. 2022-151495, mailed on Sep. 29, 2023, 11 pages.
Office Action received for Japanese Patent Application No. 2022-163568, mailed on Dec. 22, 2023, 8 pages.
Office Action received for Japanese Patent Application No. 2023-001790, mailed on Mar. 4, 2024, 10 pages.
Office Action received for Japanese Patent Application No. 2023-009554, mailed on Apr. 1, 2024, 4 pages.
Office Action received for Korean Patent Application No. 10-2010-7008899, mailed on Aug. 17, 2014, 7 pages.
Office Action received for Korean Patent Application No. 10-2010-7008899, mailed on Feb. 3, 2015, 7 pages.
Office Action received for Korean Patent Application No. 10-2010-7008899, mailed on Jan. 28, 2013, 5 pages.
Office Action received for Korean Patent Application No. 10-2010-7008899, mailed on Jun. 12. 2015, 4 pages.
Office Action received for Korean Patent Application No. 10-2010-7008899, mailed on Mar. 29, 2012, 6 pages.
Office Action received for Korean Patent Application No. 10-2010-7008899, mailed on May 30, 2011, 4 pages,.
Office Action received for Korean Patent Application No. 10-2011-7023152, mailed on Apr. 22, 2014, 6 pages.
Office Action received for Korean Patent Application No. 10-2014-7004771, mailed on Jun. 12, 2015, 6 pages.
Office Action received for Korean Patent Application No. 10-2014-7004771, mailed on Apr. 22, 2014, 5 pages.
Office Action received for Korean Patent Application No. 10-2014-7004771, mailed on Oct. 21, 2014, 7 pages.
Office Action received for Korean Patent Application No. 10-2014-7004772, mailed on Apr. 22, 2014, 8 pages.
Office Action received for Korean Patent Application No. 10-2014-7004772, mailed on Oct. 21, 2014, 5 pages.
Office Action received for Korean Patent Application No. 10-2014-7004773, mailed on Apr. 22, 2014, 9 pages.
Office Action received for Korean Patent Application No. 10-2014-7004773, mailed on Jun. 12, 2015, 6 pages.
Office Action received for Korean Patent Application No. 10-2014-7004773, mailed on Oct. 21, 2014, 9 pages.

Office Action received for Korean Patent Application No. 10-2014-7008348, mailed on Jan. 22, 2019, 16 pages.
Office Action received for Korean Patent Application No. 10-2014-7025441, mailed on Oct. 21, 2014, 5 pages.
Office Action received for Korean Patent Application No. 10-2015-7010262, mailed on Mar. 8, 2017, 6 pages.
Office Action received for Korean Patent Application No. 10-2015-7010262, mailed on May 24, 2016, 10 pages.
Office Action received for Korean Patent Application No. 10-2016-0152210, mailed on Jan. 29, 2019, 7 pages.
Office Action received for Korean Patent Application No. 10-2016-0152210, mailed on May 14, 2018, 13 pages.
Office Action received for Korean Patent Application No. 10-2016-0152210, mailed on May 30, 2019, 8 pages.
Office Action received for Korean Patent Application No. 10-2016-7009347, mailed on Feb. 18, 2018, 9 pages.
Office Action received for Korean Patent Application No. 10-2016-7009632, mailed on Feb. 2, 2018, 11 pages.
Office Action received for Korean Patent Application No. 10-2016-7035555, mailed on Dec. 26, 2017, 5 pages.
Office Action received for Korean Patent Application No. 10-2016-7035555, mailed on Jul. 18, 2019, 9 pages.
Office Action received for Korean Patent Application No. 10-2016-7035555, mailed on Sep. 18, 2018, 9 pages.
Office Action received for Korean Patent Application No. 10-2017-0022365, mailed on Jun. 26, 2017, 10 pages.
Office Action received for Korean Patent Application No. 10-2017-0022546, mailed on Jun. 21, 2017, 12 pages.
Office Action received for Korean Patent Application No. 10-2017-0022582, mailed on Jul. 31, 2019, 5 pages.
Office Action received for Korean Patent Application No. 10-2017-0022582, mailed on Sep. 19, 2018, 6 pages.
Office Action received for Korean Patent Application No. 10-2017-7012145, mailed on Jul. 18, 2019, 5 pages.
Office Action received for Korean Patent Application No. 10-2017-7012145, mailed on Sep. 13, 2018, 6 pages.
Office Action received for Korean Patent Application No. 10-2017-7015582, mailed on Apr. 5, 2018, 8 pages.
Office Action received for Korean Patent Application No. 10-2017-7015582, mailed on Jun. 12, 2017, 9 pages.
Office Action received for Korean Patent Application No. 10-2018-7022895, mailed on Aug. 17, 2018, 8 pages.
Office Action received for Korean Patent Application No. 10-2018-7028845, mailed on Jun. 19, 2019, 7 pages.
Office Action received for Korean Patent Application No. 10-2018-7033301, mailed on Dec. 14, 2018, 6 pages.
Office Action received for Korean Patent Application No. 10-2019-7003374, mailed on Jun. 10, 2019, 7 pages,.
Office Action received for Korean Patent Application No. 10-2019-7003836, mailed on Jun. 14. 2019, 7 pages.
Office Action received for Korean Patent Application No. 10-2019-7004734, mailed on Jul. 4, 2019, 7 pages.
Office Action received for Korean Patent Application No. 10-2019-7005136, mailed on Jan. 28, 2020, 5 pages.
Office Action received for Korean Patent Application No. 10-2019-7005925, mailed on Jul. 4, 2019, 24 pages.
Office Action received for Korean Patent Application No. 10-2019-7014494, mailed on Jun. 14, 2019, 11 pages.
Office Action received for Korean Patent Application No. 10-2019-7014988, mailed on Jul. 19, 2019, 9 pages.
Office Action received for Korean Patent Application No. 10-2019-7033799, mailed on Apr. 27, 2021, 9 pages.
Office Action received for Korean Patent Application No. 10-2019-7033799, mailed on Nov. 23, 2021, 6 pages.
Office Action received for Korean Patent Application No. 10-2020-0097418, mailed on Aug. 28, 2020, 6 pages.
Office Action received for Korean Patent Application No. 10-2020-7002929, mailed on Mar. 22, 2020, 5 pages.
Office Action received for Korean Patent Application No. 10-2020-7011424, mailed on Jul. 7, 2020, 6 pages.
Office Action received for Korean Patent Application No. 10-2020-7020782, mailed on Aug. 19, 2020, 8 pages.

(56) References Cited

OTHER PUBLICATIONS

Office Action received for Korean Patent Application No. 10-2020-7020782, mailed on Mar. 29, 2021, 7 pages.

Office Action received for Korean Patent Application No. 10-2020-7022596, mailed on Jul. 28, 2021, 26 pages.

Office Action received for Korean Patent Application No. 10-2020-7027862, mailed on Jan. 29, 2021, 8 pages.

Office Action received for Korean Patent Application No. 10-2020-7034180, mailed on Aug. 17, 2021, 15 pages.

Office Action received for Korean Patent Application No. 10-2020-7034405, mailed on Dec. 4, 2021, 15 pages.

Office Action received for Korean Patent Application No. 10-2021-7010306, mailed on Feb. 15, 2023, 10 pages.

Office Action received for Korean Patent Application No. 10-2021-7011888, mailed on Jul. 27, 2021, 11 pages.

Office Action received for Korean Patent Application No. 10-2021-7015473, mailed on Aug. 25, 2021, 5 pages.

Office Action received for Korean Patent Application No. 10-2021-7032984, mailed on Feb. 22, 2022, 8 pages.

Office Action received for Korean Patent Application No. 10-2022-0010942, mailed on Apr. 27, 2022, 5 pages.

Office Action received for Korean Patent Application No. 10-2022-0150750, mailed on Feb. 20, 2024, 7 pages.

Office Action received for Korean Patent Application No. 10-2022-0150750, mailed on Sep. 20, 2023, 15 pages.

Office Action received for Korean Patent Application No. 10-2022-7004578, mailed on Jan. 27, 2023, 8 pages.

Office Action received for Korean Patent Application No. 10-2022-7004578, mailed on Mar. 22, 2022, 11 pages.

Office Action received for Korean Patent Application No. 10-2022-7004578, mailed on May 11, 2023, 8 pages.

Office Action received for Korean Patent Application No. 10-2022-7012864, mailed on Jun. 27, 2022, 9 pages.

Office Action received for Korean Patent Application No. 10-2022-7012869, mailed on Jun. 27, 2022, 11 pages.

Office Action received for Korean Patent Application No. 10-2022-7014519, mailed on Jan. 26, 2023, 9 pages.

Office Action received for Korean Patent Application No. 10-2022-7015289, mailed on Jan. 28, 2023, 12 pages.

Office Action received for Korean Patent Application No. 10-2022-7029609, mailed on Apr. 28, 2023, 9 pages.

Office Action received for Korean Patent Application No. 10-2022-7033655, mailed on Jul. 27, 2023, 5 pages.

Office Action received for Korean Patent Application No. 10-2023-7024803, mailed on Sep. 19, 2023, 7 pages.

Office Action received for Korean Patent Application No. 10-2023-7025821, mailed on Mar. 12, 2024, 11 pages.

Office Action received for Korean Patent Application No. 10-2016-7009347, mailed on Mar. 9, 2017, 15 pages.

Office Action received for Korean Patent Application No. 10-2018-7028845, mailed on Dec. 10, 2018, 8 pages.

Office Action received for Taiwan Patent Application No. 103136545, mailed on May 25, 2016, 7 pages.

Office Action received for Taiwan Patent Application No. 103136545, mailed on Nov. 2, 2015, 39 pages.

Office Action received for Taiwan Patent Application No. 101107082, mailed on Jul. 7, 2014, 21 pages.

Office Action received for Taiwan Patent Application No. 103131074, mailed on Jul. 21, 2015, 16 pages.

Office Action received for Taiwanese Patent Application No. 104117508, issued on Jul. 14, 2017, 9 pages.

Office Action received for Taiwanese Patent Application No. 104117508, issued on Jul. 20, 2016, 19 pages.

Office Action received for Taiwanese Patent Application No. 104117508, issued on Mar. 20, 2017, 22 pages.

Office Action received for Taiwanese Patent Application No. 104117508, mailed on Jan. 25, 2019, 24 pages.

Office Action received for Taiwanese Patent Application No. 104117508, mailed on May 22, 2019, 7 pages.

Office Action received for Taiwanese Patent Application No. 107138003, issued on Mar. 20, 2019, 6 pages.

Office Action received from Japanese Patent Application No. 2013-098406, mailed on May 8, 2015, 14 pages.

OKAZOLAB, "Kinect Based 3D Head Tracking in Behavioural Research", Available online at: <https://www.youtube.com/watch?v=nigRvT9beQw>, Aug. 8, 2012, 3 pages.

ONEFACEIN, "[How It Works] Securing Your Smartphone With OneFaceIn", Biometric Password Manager, Available at <https://www.youtube.com/watch?v=h-JG5SPxBQ0>, Dec. 2, 2016, 1 page.

Page Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.

Peishun et al., "PKI Authentication System Combining with Fingerprint", Computer Engineering, vol. 39, No. 9, May 2005, 3 pages.

Phonebuff, "How to Use Face Unlock on Android 4.0 ICS", Retrieved from <https://www.youtube.com/watch?v=0ASf6jkpFKE>, Dec. 15, 2011, 1 page.

Plaisant et al., "Touchscreen Toggle Switches: Push or slide? Design Issues and Usability Study", Technical Report CAR-TR-521, CS-TR-2557, Nov. 1990, pp. 1-10.

Pouralinazar Behzad, "The System for Secure Mobile Payment Transactions". Available online at: https://www.diva-portal.org/smash/get/diva2:616934/FULLTEXT01.pdf, 2013, 78 pages.

Pre-Appeal Review Report received for Japanese Patent Application No. 2020-566978, mailed on Feb. 21, 2023, 4 pages.

PSP SECURITY LTD, "AccuFACE features", Available online at <https://www.youtube.com/watch?v=p3jvGoEbioY>, Oct. 14, 2009, 1 page.

PSP SECURITY LTD, "PSP Security—AccuFACE Step by Step Enrollment Process", Available online at <https://www.youtube.com/watch?v=0IIF5OOdya0>, Oct. 14, 2009, 1 page.

Pu Fang, "Research on Location-aware Service in Pervasive Computing", Issue No. 7, Information Technology Series, China Doctoral Dissertations, Jul. 15, 2008, 140 pages.

Qiye Wang, "Design and Implementation of SAN Device Access Control in Unified Storage Platform", Master's Theses, Huazhong University of Science & Technology, Wuhan, Jun. 2008, 63 pages.

"Real Solution of two-step-authentication Password Management for Authentication Enhancement", Fukuda Takao, Nikkei PC, JPN, Nikkei Business Publications, Inc., No. 694, Mar. 24, 2014, 11 pages.

Record of Oral Hearing received for U.S. Appl. No. 13/243,045, mailed on Apr. 1, 2019, 18 pages.

Record of Oral Hearing received for U.S. Appl. No. 13/243,045, mailed on May 7, 2021, 18 pages.

Record of Oral Hearing received for U.S. Appl. No. 15/714,887, mailed on Feb. 15, 2022, 16 pages.

Record of Oral Hearing received for U.S. Appl. No. 17/516,495, mailed on Mar. 5, 2024, 15 pages.

Requirement for Restriction/Election received for U.S. Appl. No. 16/938,362, mailed on May 4, 2022, 6 pages.

Result of Consultation received for European Patent Application No. 18208881.5, mailed on Dec. 6, 2022, 10 pages.

Result of Consultation received for European Patent Application No. 18713408.5, mailed on Aug. 30, 2021, 5 pages.

Result of Consultation received for European Patent Application No. 18830326.7, mailed on Jun. 21, 2021, 5 pages.

Result of Consultation received for European Patent Application No. 19160344.8, mailed on Feb. 4, 2022, 3 pages.

Result of Consultation received for European Patent Application No. 19194828.0, mailed on May 9, 2022, 4 pages.

Riley et al., "Instruction, Feedback and Biometrics: The User Interface for Fingerprint Authentication System", Interact 2009, Part II, LNCS 5727, IFPI International Federation for Information Processing, 2009, pp. 293-305.

Sawamura Toru, "Emergency Proposal; personal information should be immediately unitarily managed", PC fan, Japan, Mainichi Communications Inc., 11th Edition, vol. 11, No. 240, Jun. 15, 2004, pp. 20-21.

(56) References Cited

OTHER PUBLICATIONS

Schofield Tim, "Face Unlock Demonstration on the HTC EVO 4G LTE", Retrieved from <https://www.youtube.com/watch?v=TNL9Or_9SWg>, May 31, 2012, 1 page.

Schürmann et al., "BANDANA—Body Area Network Device-to-Device Authentication Using Natural gAit", Ambient Intelligence, Comnet, Aalto University,DOI: 10.1109/PERCOM.2017.7917865, Dec. 11, 2016, 11 pages.

Search Report and Opinion received for Danish Patent Application No. PA201770418, mailed on Jun. 23, 2017, 8 pages.

Search Report and Opinion received for Danish Patent Application No. PA201770419, mailed on Jun. 19, 2017, 6 pages.

Search Report and Opinion received for Danish Patent Application No. PA201770712, mailed on Oct. 25, 2017, 10 pages.

Search Report and Opinion received for Danish Patent Application No. PA201770713, mailed on Oct. 31, 2017, 9 pages.

Search Report and Opinion received for Danish Patent Application No. PA201770715, issued on Nov. 9, 2017, 10 pages.

Search Report and Opinion received for Danish Patent Application No. PA201870370, mailed on Sep. 7, 2018, 11 pages.

Search Report and Opinion received for Danish Patent Application No. PA201870371, mailed on Sep. 14, 2018, 14 pages.

Search Report and Opinion received for Danish Patent Application No. PA201870855, mailed on Apr. 3, 2019, 12 pages.

Search Report and Opinion received for Danish Patent Application No. PA201970127, mailed on Oct. 4, 2019, 9 pages.

Sensory Trulysecure, "AppLock Face/Voice Recognition", Available at <https://www.youtube.com/watch?v=odax5O51aT0>, May 27, 2015, 1 page.

Stateoftech, "iPhone 6 Tips—How to Access the Camera from the Lock Screen", Screen captures with generated transcript from YouTube video clip, Online Available at: <https://www.youtube.com/watch?v=frB151RYB7U>, Jul. 2, 2015, 23 pages.

Summons to Attend Oral Proceedings received for European Patent Application No. 08834386.8, mailed on Aug. 24, 2012, 4 pages.

Summons to Attend Oral Proceedings received for European Patent Application No. 12770400.5, mailed on Mar. 19, 2018, 10 pages.

Summons to Attend Oral Proceedings received for European Patent Application No. 15727291.5, mailed on Jan. 28, 2020, 13 pages.

Summons to Attend Oral Proceedings received for European Patent Application No. 15727291.5, mailed on Sep. 12, 2022, 13 pages.

Summons to Attend Oral Proceedings received for European Patent Application No. 15728352.4, mailed on May 12, 2020, 25 pages.

Summons to Attend Oral Proceedings received for European Patent Application No. 15728352.4, mailed on Nov. 18, 2019, 15 pages.

Summons to Attend Oral Proceedings received for European Patent Application No. 16201159.7, mailed on Feb. 4, 2021, 12 pages.

Summons to Attend Oral Proceedings received for European Patent Application No. 16201195.1, mailed on Sep. 4, 2018, 21 pages.

Summons to Attend Oral Proceedings received for European Patent Application No. 16201195.1, mailed on Sep. 12, 2022, 14 pages.

Summons to Attend Oral Proceedings received for European Patent Application No. 16201205.8, mailed on Jan. 28, 2020, 18 pages.

Summons to Attend Oral Proceedings received for European Patent Application No. 17799904.2, mailed on Dec. 20, 2021, 8 pages.

Summons to Attend Oral Proceedings received for European Patent Application No. 18208881.5, mailed on Jun. 29, 2022, 9 pages.

Summons to Attend Oral Proceedings received for European Patent Application No. 18713408.5, mailed on Apr. 30, 2021, 5 pages.

Summons to Attend Oral Proceedings received for European Patent Application No. 18830326.7, mailed on Feb. 25, 2021, 6 pages.

Summons to Attend Oral Proceedings received for European Patent Application No. 19150528.8, mailed on Mar. 15, 2022, 7 pages.

Summons to Attend Oral Proceedings received for European Patent Application No. 19180348.9, mailed on Dec. 19, 2023, 7 pages.

Summons to Attend Oral Proceedings received for European Patent Application No. 19194828.0, mailed on Feb. 3, 2022, 10 pages.

Summons to Attend Oral Proceedings received for European Patent Application No. 19194828.0, mailed on Feb. 10, 2022, 2 pages.

Summons to Attend Oral Proceedings received for European Patent Application No. 20191533.7, mailed on Feb. 13, 2024, 7 pages.

Summons to Attend Oral Proceedings received for European Patent Application No. 20198076.0, mailed on Feb. 16, 2023, 8 pages.

Supplemental Notice of Allowance received for U.S. Appl. No. 12/207,370, mailed on Aug. 8, 2013, 2 pages.

Supplemental Notice of Allowance received for U.S. Appl. No. 15/899,996, mailed on Jul. 25, 2018, 2 pages.

Supplemental Notice of Allowance received for U.S. Appl. No. 17/496,716, mailed on Feb. 1, 2024, 2 pages.

Supplemental Notice of Allowance received for U.S. Appl. No. 17/496,716, mailed on Nov. 17, 2023, 2 pages.

Supplemental Notice of Allowance received for U.S. Appl. No. 17/955,311, mailed on May 26, 2023, 2 pages.

Tanaka et al., "Innovative Mobile Device of Apple Finally Appeared, Mobile Phone + iPod + Internet Terminal, iPhone", Mac Fan, vol. 15, No. 9, Japan, Mainichi Communications Inc., Sep. 1, 2007, 16 pages.

Thanakulmas Thanit, "MasterCard Identity Check Facial Recognition Biometrics", Available at <https://www.youtube.com/watch?v=g4sMbrkt1gl>, Oct. 10, 2016, 1 page.

The Youtube Tech Guy, "How to Setup Face Unlock on Your Android", Available online at: https://www.youtube.com/watch?v=iJYFLYKYvTK, Apr. 12, 2012, 1 page.

Third Party Observations received for European Patent Application No. 15168475.0, mailed on Jul. 19, 2016, 4 pages.

Videoreborn, "Motorola Atrix 4g: Wet Fingerprint Scanner Better Than iPhone 5S Finger Print Scanner!", Youtube, available at <https://www.youtube.com/watch?v=MSJIIG93MPg>, Mar. 16, 2011, 2 pages.

Wang Na, "Research of Face Detection System Based on Mobile Phone Platform", Video Engineering, vol. 36, No. 11, Nov. 2012, 5 pages.

Weiss et al., "Smartphone and Smartwatch-Based Biometrics using Activities of Daily Living", IEEE Access, DOI: 10.1109/ACCESS.2019.2940729, vol. XX, 2017, 13 pages.

Weiyi Liu, "Financial Revolution in the Era of Internet Finance and Big Data", China Electric Power Press, Apr. 30, 2014, 7 pages.

Wikipedia, "QR code", Available online at: https://en.wikipedia.org/w/index.php?title=OR_code&oldid=452939488, Sep. 28, 2011, pp. 1-9.

Yongxi et al., "Application of RFID Technology in Mobile Payment", China Academic Journal Electronic Publishing House, 1994-2022, Nov. 25, 2012, pp. 97-99.

Zhang et al., "WristUnlock: Secure and Usable Smartphone Unlocking with Wrist Wearables", IEEE Conference on Communications and Network Security (CNS), 2019, 9 pages.

Advisory Action received for U.S. Appl. No. 17/062,941, mailed on Oct. 7, 2024, 2 pages.

Applicant-Initiated Interview Summary received for U.S. Appl. No. 17/062,941, mailed on Sep. 6, 2024, 2 pages.

Applicant-Initiated Interview Summary received for U.S. Appl. No. 17/685,039, mailed on May 16, 2024, 4 pages.

Applicant-Initiated Interview Summary received for U.S. Appl. No. 18/237,849, mailed on Jul. 19, 2024, 4 pages.

Applicant-Initiated Interview Summary received for U.S. Appl. No. 18/237,849, mailed on Jul. 30, 2024, 4 pages.

Applicant-Initiated Interview Summary received for U.S. Appl. No. 18/239,701. mailed on Sep. 9, 2024, 2 pages.

Applicant-Initiated Interview Summary received for U.S. Appl. No. 18/239,701, mailed on Sep. 20, 2024, 2 pages.

Board Decision received for Chinese Patent Application No. 201910901500.5, mailed on Apr. 19, 2024, 2 pages (1 page of English Translation and 1 page of Official Copy).

Brief Communication Regarding Oral Proceedings received for European Patent Application No. 19160348.9, mailed on Jun. 12, 2024, 1 page.

Brief Communication Regarding Oral Proceedings received for European Patent Application No. 19160348.9, mailed on May 2, 2024, 4 pages.

Brief Communication Regarding Oral Proceedings received for European Patent Application No. 20191533.7, mailed on Jul. 17, 2024, 1 page.

(56) References Cited

OTHER PUBLICATIONS

Corrected Notice of Allowance received for U.S. Appl. No. 17/516,495, mailed on Jul. 17, 2024, 3 pages.

Corrected Notice of Allowance received for U.S. Appl. No. 17/725,311, mailed on Jul. 31, 2024, 2 pages,.

Decision on Hearing received for Australian Patent Application No. 2019281965, mailed on Jun. 25, 2024, 25 pages.

Examiner's Pre-Review Report received for Japanese Patent Application No. 2022-151495, mailed on Jun. 6, 2024, 8 pages (4 pages of English Translation and 4 pages of Official Copy).

Final Office Action received for U.S. Appl. No. 17/062,941, mailed on Jun. 3, 2024, 12 pages.

Intention to Grant received for European Patent Application No. 22150595.1, mailed on Jun. 7, 2024, 9 pages.

International Preliminary Report on Patentability received for PCT Patent Application No. PCT/US2023/014067, mailed on Sep. 12, 2024, 12 pages.

Non-Final Office Action received for U.S. Patent Application No. 17/862, 179, mailed on Sep. 12, 2024, 39 pages.

Non-Final Office Action received for U.S. Appl. No. 18/239,701, mailed on Jun. 7, 2024, 10 pages.

Notice of Acceptance received for Australian Patent Application No. 2019281965, mailed on Sep. 20, 2024, 3 pages.

Notice of Acceptance received for Australian Patent Application No. 2022203027, mailed on Oct. 4, 2024, 3 pages.

Notice of Acceptance received for Australian Patent Application No. 2023200797, mailed on May 21, 2024, 3 pages.

Notice of Acceptance received for Chinese Patent Application No. 201910901500.5, mailed on May 6, 2024, 4 pages (1 page of English Translation and 3 pages of Official Copy).

Notice of Acceptance received for Chinese Patent Application No. 202110011700.0, mailed on Sep. 14, 2024, 2 pages (1 page of English Translation and 1 page of Official Copy).

Notice of Allowance received for Japanese Patent Application No. 2021-168243, mailed on Apr. 30, 2024, 4 pages (1 page of English Translation and 3 pages of Official Copy).

Notice of Allowance received for U.S. Appl. No. 17/516,495, mailed on Jul. 3, 2024, 8 pages.

Notice of Allowance received for U.S. Appl. No. 17/587,558, mailed on Aug. 5, 2024, 10 pages.

Notice of Allowance received for U.S. Appl. No. 17/685,039, mailed on Aug. 28, 2024, 31 pages.

Notice of Allowance received for U.S. Appl. No. 17/725,311, mailed on May 1, 2024, 5 pages.

Notice of Allowance received for U.S. Appl. No. 17/732,222, mailed on Jul. 3, 2024, 14 pages.

Notice of Allowance received for U.S. Appl. No. 18/237,849, mailed on Aug. 12, 2024, 13 pages.

Notice of Allowance received for U.S. Appl. No. 18/436,612, mailed on Sep. 5, 2024, 9 pages.

Notice of Hearing received for Indian Patent Application No. 201918003782, mailed on May 8, 2024, 2 pages.

Notice of Hearing received for Indian Patent Application No. 201918027146, mailed on Sep. 17, 2024, 2 pages.

Notice of Hearing received for Indian Patent Application No. 202018041558, mailed on May 20, 2024, 2 pages.

Office Action received for Australian Patent Application No. 2022203027, mailed on Jul. 23, 2024, 3 pages.

Office Action received for Australian Patent Application No. 2023203469, mailed on Apr. 24, 2024, 4 pages.

Office Action received for Australian Patent Application No. 2023213252, mailed on Jul. 30, 2024, 4 pages.

Office Action received for Chinese Patent Application No. 201880003211.7, mailed on Sep. 7, 2024, 18 pages (10 pages of English Translation and 8 pages of Official Copy).

Office Action received for Chinese Patent Application No. 201911022883.5, mailed on Jun. 20, 2024, 13 pages (6 pages of English Translation and 7 pages of Official Copy).

Office Action received for Chinese Patent Application No. 201911023090.5, mailed on Jun. 25, 2024, 25 pages (6 pages of English Translation and 19 pages of Official Copy).

Office Action received for Chinese Patent Application No. 201980064012.1, mailed on Mar. 19, 2024, 18 pages (10 pages of English Translation and 8 pages of Official Copy).

Office Action received for Chinese Patent Application No. 202011020666.5, mailed on Apr. 27, 2024, 21 pages (10 pages of English Translation and 11 pages of Official Copy).

Office Action received for Chinese Patent Application No. 202111047788.8, mailed on Jun. 26, 2024, 25 pages (8 pages of English Translation and 17 pages of Official Copy).

Office Action received for Chinese Patent Application No. 202211284989.4, mailed on Jun. 12, 2024, 24 pages (11 pages of English Translation and 13 pages of Official Copy).

Office Action received for Chinese Patent Application No. 202211285799.4, mailed on Jun. 19, 2024, 19 pages (9 pages of English Translation and 10 pages of Official Copy).

Office Action received for European Patent Application No. 19160348. 9, mailed on Jul. 24, 2024, 9 pages.

Office Action received for European Patent Application No. 19731554. 2, mailed on May 8, 2024, 5 pages.

Office Action received for Indian Patent Application No. 202218027489, mailed on Jul. 9, 2024, 8 pages.

Office Action received for Japanese Patent Application No. 2022-163568, mailed on Jun. 3, 2024, 8 pages (4 pages of English Translation and 4 pages of Official Copy).

Office Action received for Japanese Patent Application No. 2023-110191, mailed on Jul. 16, 2024, 4 pages (2 pages of English Translation and 2 pages of Official Copy).

Office Action received for Korean Patent Application No. 10-2022-0150750, mailed on May 27, 2024, 8 pages (4 pages of English Translation and 4 pages of Official Copy).

Office Action received for Korean Patent Application No. 10-2023-7024803, mailed on Jul. 19, 2024, 11 pages (5 pages of English Translation and 6 pages of Official Copy).

Result of Consultation received for European Patent Application No. 19160348.9, mailed on May 8, 2024, 4 pages.

Result of Consultation received for European Patent Application No. 20191533.7, mailed on Jul. 9, 2024, 4 pages.

Result of Consultation received for European Patent Application No. 20191533.7, mailed on Jul. 18, 2024, 4 pages.

Sanchez-Reillo et al., "Strengths, Weaknesses and Recommendations in Implementing Biometrics in Mobile Devices", 2014 International Carnahan Conference on Security Technology (ICCST), IEEE., Oct. 2014, 6 pages.

Stone et al., "Excerpt from User Interface Design and Evaluation", Jan. 1, 2005, 1 page.

Summons to Attend Oral Proceedings received for European Patent Application No. 20191533.7, mailed on Jul. 25, 2024, 12 pages.

Supplemental Notice of Allowance received for U.S. Appl. No. 18/237,849, mailed on Sep. 11, 2024, 3 pages.

Supplemental Notice of Allowance received for U.S. Appl. No. 18/436,612, mailed on Oct. 9, 2024, 2 pages.

Applicant-Initiated Interview Summary received for U.S. Appl. No. 17/862,179. mailed on Nov. 21, 2024, 4 pages.

Applicant-Initiated Interview Summary received for U.S. Appl. No. 18/239,701, mailed on Nov. 22, 2024, 2 pages.

Intention to Grant received for European Patent Application No. 22150595.1, mailed on Nov. 22, 2024, 9 pages.

Notice of Allowance received for Chinese Patent Application No. 201980064012.1, mailed on Nov. 18, 2024, 2 pages (1 page of English Translation and 1 page of Official Copy).

Notice of Allowance received for U.S. Appl. No. 17/685,039, mailed on Dec. 4, 2024, 5 pages.

Office Action received for Chinese Patent Application No. 201911023090.5, mailed on Nov. 6, 2024, 19 pages (1 page of English Translation and 18 pages of Official Copy).

Office Action received for Indian Patent Application No. 202218045276, mailed on Nov. 19, 2024, 7 pages.

Office Action received for Japanese Patent Application No. 2023-147860, mailed on Nov. 18, 2024, 15 pages (7 pages of English Translation and 8 pages of Official Copy).

(56)         References Cited

OTHER PUBLICATIONS

Office Action received for Japanese Patent Application No. 2023-149400, mailed on Nov. 18, 2024, 4 pages (2 pages of English Translation and 2 pages of Official Copy).
Office Action received for Japanese Patent Application No. 2024-077446, mailed on Nov. 18, 2024, 14 pages (7 pages of English Translation and 7 pages of Official Copy).
Office Action received for Korean Patent Application No. 10-2023-7025821, mailed on Nov. 11, 2024, 7 pages (3 pages of English Translation and 4 pages of Official Copy).
Office Action received for Korean Patent Application No. 10-2023-7039602, mailed on Nov. 14, 2024, 12 pages (5 pages of English Translation and 7 pages of Official Copy).
Office Action received for Korean Patent Application No. 10-2024-0115394, mailed on Nov. 11, 2024, 13 pages (6 pages of English Translation and 7 pages of Official Copy).
Result of Consultation received for European Patent Application No. 20191533.7, mailed on Dec. 16, 2024, 4 pages.
Notice of Allowance received for Japanese Patent Application No. 2022-140146, mailed on Nov. 5, 2024, 21 pages (1 page of English Translation and 20 pages of Official Copy).
Notice of Allowance received for U.S. Appl. No. 18/436,612, mailed on Nov. 14, 2024, 5 pages.
Office Action received for Chinese Patent Application No. 201880001546.5, mailed on Oct. 24, 2024, 16 pages (10 pages of English Translation and 6 pages of Official Copy).
Office Action received for Chinese Patent Application No. 201911022883.5, mailed on Oct. 17, 2024, 11 pages (5 pages of English Translation and 6 pages of Official Copy).
Office Action received for Korean Patent Application No. 10-2023-7035977, mailed on Oct. 28, 2024, 9 pages (3 pages of English Translation and 6 pages of Official Copy).
Supplemental Notice of Allowance received for U.S. Appl. No. 17/516,495, mailed on Nov. 12, 2024, 3 pages.
Decision on Appeal received for Korean Patent Application No. 10-2022-0150750, mailed on Oct. 22, 2024, 17 pages (3 pages of English Translation and 14 pages of Official Copy).
Final Office Action received for U.S. Appl. No. 18/239,701, mailed on Oct. 29, 2024, 11 pages.
Notice of Allowance received for Japanese Patent Application No. 2023-009554, mailed on Oct. 18, 2024, 4 pages (1 page of English Translation and 3 pages of Official Copy).
Notice of Allowance received for U.S. Appl. No. 17/516,495, mailed on Oct. 31, 2024, 6 pages.
Office Action received for Australian Patent Application No. 2023213252, mailed on Oct. 29, 2024, 6 pages.
Supplemental Notice of Allowance received for U.S. Appl. No. 17/732,222, mailed on Nov. 1, 2024, 2 pages.
Office Action received for Korean Patent Application No. 10-2023-7032989, mailed on Sep. 23, 2024, 8 pages (3 pages of English Translation and 5 pages of Official Copy).
Corrected Notice of Allowance received for U.S. Appl. No. 18/239,701, mailed on Jan. 27, 2025, 2 pages.
Decision to Refuse received for European Patent Application No. 20191533.7, mailed on Jan. 13, 2025, 10 pages.
Intention to Grant received for European Patent Application No. 22197752.3, mailed on Jan. 7, 2025, 10 pages.
Minutes of the Oral Proceedings received for European Patent Application No. 20191533.7, mailed on Jan. 9, 2025, 6 pages.
Non-Final Office Action received for U.S. Appl. No. 18/756,740, mailed on Jan. 21, 2025, 11 pages.
Notice of Allowance received for Chinese Patent Application No. 201880003211.7, mailed on Jan. 16, 2025, 2 pages (1 page of English Translation and 1 page of Official Copy).
Notice of Allowance received for U.S. Appl. No. 18/239,701, mailed on Jan. 17, 2025, 8 pages.
Office Action received for European Patent Application No. 22212086.7, mailed on Jan. 20, 2025, 9 pages.
Corrected Notice of Allowance received for U.S. Appl. No. 18/239,701, mailed on Apr. 25, 2025, 2 pages.

Notice of Hearing received for Indian Patent Application No. 202018038351, mailed on Apr. 24, 2025, 3 pages.
Notice of Allowance received for Chinese Patent Application No. 202011020666.5, mailed on Jan. 23, 2025, 2 pages (1 page of English Translation and 1 page of Official Copy).
Office Action received for Chinese Patent Application No. 202211284989.4, mailed on Jan. 26, 2025, 15 pages (7 pages of English Translation and 8 pages of Official Copy).
Office Action received for Chinese Patent Application No. 202211285799.4, mailed on Jan. 16, 2025, 14 pages (7 pages of English Translation and 7 pages of Official Copy).
Record of Oral Hearing received for U.S. Appl. No. 17/962,369, mailed on Feb. 23, 2025, 13 pages.
Final Office Action received for U.S. Appl. No. 18/756,740, mailed on Apr. 30, 2025, 13 pages.
Notice of Acceptance received for Australian Patent Application No. 2024201005, mailed on May 7, 2025, 3 pages.
Notice of Allowance received for Korean Patent Application No. 10-2024-7006601, mailed on Apr. 29, 2025, 6 pages (2 pages of English Translation and 4 pages of Official Copy).
Applicant-Initiated Interview Summary received for U.S. Appl. No. 18/756,740, mailed on May 19, 2025, 2 pages.
Non-Final Office Action received for U.S. Appl. No. 18/374,562, mailed on May 19, 2025, 29 pages.
Office Action received for Australian Patent Application No. 2022352756, mailed on May 14, 2025, 4 pages.
Office Action received for Chinese Patent Application No. 202211285799.4, mailed on Apr. 25, 2025, 12 pages (5 pages of English Translation and 7 pages of Official Copy).
Decision to Grant received for European Patent Application No. 22150595.1, mailed on Apr. 3, 2025, 3 pages.
Notice of Allowance received for Japanese Patent Application No. 2024-073963, mailed on Apr. 11, 2025, 4 pages (1 page of English Translation and 3 pages of Official Copy).
Notice of Allowance received for U.S. Appl. No. 18/239,701, mailed on Apr. 14, 2025, 8 pages.
Office Action received for Japanese Patent Application No. 2024-077446, mailed on Apr. 7, 2025, 9 pages (4 pages of English Translation and 5 pages of Official Copy).
Applicant-Initiated Interview Summary received for U.S. Appl. No. 18/756,740, mailed on Feb. 4, 2025, 2 pages.
Office Action received for Australian Patent Application No. 2024201005, mailed on Jan. 30, 2025, 2 pages,.
Office Action received for Chinese Patent Application No. 201880001546.5, mailed on Jan. 8, 2025, 12 pages (6 pages of English Translation and 6 pages of Official Copy).
Office Action received for Chinese Patent Application No. 201911022883.5, mailed on Jan. 14, 2025, 11 pages (5 pages of English Translation and 6 pages of Official Copy).
Office Action received for Japanese Patent Application No. 2024-017393, mailed on Feb. 3, 2025, 12 pages (6 pages of English Translation and 6 pages of Official Copy).
Applicant-Initiated Interview Summary received for U.S. Patent Application No. 17/862, 179, mailed on Jun. 18, 2025, 4 pages.
Applicant-Initiated Interview Summary received for U.S. Appl. No. 18/671,070, mailed on Jun. 11, 2025, 4 pages.
Kxowls, "Face Unlock Not Working", Online available at: https://youtube.com/shorts/EF8WgD_9Oiw?si=i-4X8OAGPLHgMfvz, Nov. 2, 2020, 2 pages.
Non-Final Office Action received for U.S. Appl. No. 18/167,767, mailed on Jun. 4, 2025, 32 pages.
Notice of Allowance received for U.S. Appl. No. 18/756,740, mailed on Jun. 6, 2025, 7 pages.
Office Action received for Chinese Patent Application No. 201911199010.1, mailed on May 28, 2025, 24 pages (1 page of English Translation and 23 pages of Official Copy).
Office Action received for Japanese Patent Application No. 2024-017393, mailed on Jun. 9, 2025, 13 pages (6 pages of English Translation and 7 pages of Official Copy).
Office Action received for Korean Patent Application No. 10-2023-7039602, mailed on May 28, 2025, 9 pages (4 pages of English Translation and 5 pages of Official Copy).

(56) References Cited

OTHER PUBLICATIONS

Decision on Appeal received for Japanese Patent Application No. 2022-151495, mailed on Mar. 7, 2025, 43 pages (19 pages of English Translation and 24 pages of Official Copy).

International Search Report and Written Opinion received for PCT Patent Application No. PCT/US2024/043090, mailed on Jan. 28, 2025, 21 pages.

Invitation to Pay Additional Fees and Partial International Search Report received for PCT Patent Application No. PCT/US2024/043090, mailed on Dec. 4, 2024, 12 pages.

Notice of Allowance received for Japanese Patent Application No. 2023-211453, mailed on Mar. 14, 2025, 4 pages (1 page of English Translation and 3 pages of Official Copy).

Notice of Allowance received for Korean Patent Application No. 10-2023-7025821, mailed on Mar. 10, 2025, 7 pages (2 pages of English Translation and 5 pages of Official Copy).

Notice of Hearing received for Indian Patent Application No. 202018009906, mailed on Mar. 13, 2025, 2 pages.

Office Action received for European Patent Application No. 22188377.0, mailed on Mar. 17, 2025, 6 pages.

Office Action received for European Patent Application No. 22703812.2, mailed on Mar. 10, 2025, 5 pages.

Office Action received for Japanese Patent Application No. 2024-515963, mailed on Mar. 7, 2025, 15 pages (7 pages of English Translation and 8 pages of Official Copy).

Intention to Grant received for European Patent Application No. 22197752.3, mailed on May 28, 2025, 8 pages.

Office Action received for Chinese Patent Application No. 202211284989.4, mailed on Apr. 25, 2025, 12 pages (5 page of English Translation and 7 pages of Official Copy).

Decision on Appeal received for U.S. Appl. No. 17/962,369, mailed on Mar. 4, 2025, 16 pages.

Non-Final Office Action received for U.S. Appl. No. 18/671,070, mailed on Mar. 11, 2025, 14 pages.

Notice of Allowance received for Japanese Patent Application No. 2023-147860, mailed on Feb. 25, 2025, 4 pages (1 page of English Translation and 3 pages of Official Copy).

Notice of Allowance received for Japanese Patent Application No. 2023-149400, mailed on Mar. 3, 2025, 4 pages (1 page of English Translation and 3 pages of Official Copy).

Notice of Hearing received for Indian Patent Application No. 202018009906, mailed on Feb. 26, 2025, 2 pages.

Notice of Hearing received for Indian Patent Application No. 202018009906, mailed on Feb. 27, 2025, 2 pages.

Office Action received for Chinese Patent Application No. 202111047788.8, mailed on Jan. 14, 2025, 19 pages (6 pages of English Translation and 13 pages of Official Copy).

Office Action received for European Patent Application No. 19769669.3, mailed on Mar. 4, 2025, 11 pages.

Office Action received for European Patent Application No. 22197755.6, mailed on Feb. 25, 2025, 5 pages.

Office Action received for Korean Patent Application No. 10-2023-7024803, mailed on Feb. 24, 2025, 8 pages (4 pages of English Translation and 4 pages of Official Copy).

Applicant-Initiated Interview Summary received for U.S. Appl. No. 18/167,767, mailed on Sep. 4, 2025, 7 pages.

Applicant-Initiated Interview Summary received for U.S. Appl. No. 18/371,403, mailed on Sep. 18, 2025, 4 pages.

Applicant-Initiated Interview Summary received for U.S. Appl. No. 18/371,406, mailed on Sep. 19, 2025, 2 pages.

Final Office Action received for U.S. Appl. No. 18/374,562, mailed on Sep. 11, 2025, 45 pages.

Notice of Allowance received for Chinese Patent Application No. 202111047788.8, mailed on Aug. 27, 2025, 4 pages (1 page of English Translation and 3 pages of Official Copy).

Notice of Allowance received for U.S. Appl. No. 18/367,418, mailed on Aug. 15, 2025, 14 pages.

Office Action received for European Patent Application No. 23157906.1, mailed on Sep. 10, 2025, 4 pages.

Office Action received for Japanese Patent Application No. 2024-137827, mailed on Sep. 1, 2025, 6 pages (3 pages of English Translation and 3 pages of Official Copy).

Office Action received for Japanese Patent Application No. 2024-515963, mailed on Sep. 1, 2025, 17 pages (8 pages of English Translation and 9 pages of Official Copy).

Office Action received for Korean Patent Application No. 10-2023-7024803, mailed on Aug. 13, 2025, 4 pages (2 pages of English Translation and 2 pages of Official Copy).

Applicant-Initiated Interview Summary received for U.S. Appl. No. 18/374,562, mailed on Jul. 22, 2025, 2 pages.

Board Opinion received for Chinese Patent Application No. 201911022883.5, mailed on Jul. 1, 2025, 10 pages (3 pages of English Translation and 7 pages of Official Copy).

Corrected Notice of Allowance received for U.S. Appl. No. 17/862,179, mailed on Aug. 11, 2025, 3 Pages.

Corrected Notice of Allowance received for U.S. Appl. No. 18/367,418, mailed on Jul. 8, 2025, 12 pages.

Decision to Grant received for European Patent Application No. 22197752.3, mailed on Jun. 26, 2025, 4 pages.

Extended European Search Report received for European Patent Application No. 25165299.6, mailed on Jul. 2, 2025, 8 pages.

Final Office Action received for U.S. Appl. No. 18/671,070, mailed on Jul. 1, 2025, 15 pages.

Intention to Grant received for European Patent Application No. 22703812.2, mailed on Jul. 29, 2025, 9 pages.

Non-Final Office Action received for U.S. Appl. No. 18/371,403, mailed on Jul. 21, 2025, 23 pages.

Non-Final Office Action received for U.S. Appl. No. 18/371,406, mailed on Jul. 15, 2025, 15 pages.

Notice of Allowance received for Chinese Patent Application No. 201911199010.1, mailed on Jul. 1, 2025, 7 pages (2 pages of English Translation and 5 pages of Official Copy).

Notice of Allowance received for Korean Patent Application No. 10-2023-7032989, mailed on May 30, 2025, 7 pages (2 pages of English Translation and 5 pages of Official Copy).

Notice of Allowance received for Korean Patent Application No. 10-2023-7035977, mailed on Jun. 26, 2025, 7 pages (2 pages of English Translation and 5 pages of Official Copy).

Notice of Allowance received for U.S. Appl. No. 17/862,179, mailed on Jul. 22, 2025, 10 pages.

Notice of Allowance received for U.S. Appl. No. 18/367,418, mailed on Jun. 24, 2025, 18 pages.

Office Action received for Australian Patent Application No. 2022352756, mailed on Aug. 8, 2025, 4 pages.

Office Action received for Australian Patent Application No. 2024203238, mailed on Jun. 25, 2025, 5 pages.

Office Action received for Chinese Patent Application No. 202111047788.8, mailed on Jun. 4, 2025, 15 pages (4 pages of English Translation and 11 pages of Official Copy).

Office Action received for European Patent Application No. 22198902.3, mailed on Jul. 9, 2025, 7 pages.

Office Action received for Japanese Patent Application No. 2024-127947, mailed on Aug. 1, 2025, 6 pages (3 pages of English Translation and 3 pages of Official Copy).

Office Action received for Japanese Patent Application No. 2024-550636, mailed on Jun. 20, 2025, 10 pages (5 pages of English Translation and 5 pages of Official Copy).

Office Action received for Korean Patent Application No. 10-2024-0115394, mailed on Jul. 23, 2025, 7 pages (3 pages of English Translation and 4 pages of Official Copy).

Corrected Notice of Allowance received for U.S. Appl. No. 18/239,701, mailed on Mar. 26, 2025, 2 pages.

Final Office Action received for U.S. Appl. No. 17/862,179, mailed on Apr. 3, 2025, 37 pages.

International Preliminary Report on Patentability received for PCT Patent Application No. PCT/US2023/033372, mailed on Apr. 3, 2025, 15 pages.

International Preliminary Report on Patentability received for PCT Patent Application No. PCT/US2023/033376, mailed on Apr. 3, 2025, 15 pages.

(56) References Cited

OTHER PUBLICATIONS

International Preliminary Report on Patentability received for PCT Patent Application No. PCT/US2023/033540, mailed on Apr. 3, 2025, 18 pages.

Notice of Allowance received for Korean Patent Application No. 10-2024-7002826, mailed on Mar. 31, 2025, 7 pages (2 pages of English Translation and 5 pages of Official Copy).

Office Action received for Australian Patent Application No. 2023213252, mailed on Apr. 3, 2025, 7 pages.

Office Action received for Chinese Patent Application No. 201880000798.6, mailed on Mar. 18, 2025, 14 pages (6 pages of English Translation and 8 pages of Official Copy).

Intention to Grant received for European Patent Application No. 23714389.6, mailed on Dec. 15, 2025, 9 pages.

Non-Final Office Action received for U.S. Appl. No. 18/369,075, mailed on Dec. 29, 2025, 37 pages.

Office Action received for Japanese Patent Application No. 2025-109356, mailed on Dec. 23, 2025, 17 pages (8 pages of English Translation and 9 pages of Official Copy).

Board Decision received for Chinese Patent Application No. 201911022883.5, mailed on Aug. 26, 2025, 24 pages (3 pages of English Translation and 21 pages of Official Copy).

Corrected Notice of Allowance received for U.S. Appl. No. 18/167,767, mailed on Oct. 31, 2025, 2 pages.

Corrected Notice of Allowance received for U.S. Appl. No. 18/371,403, mailed on Nov. 12, 2025, 2 pages.

Corrected Notice of Allowance received for U.S. Appl. No. 18/371,406, mailed on Dec. 19, 2025, 5 pages.

Decision on Appeal received for Korean Patent Application No. 10-2023-7024803, mailed on Oct. 31, 2025, 24 pages (4 pages of English Translation and 20 pages of Official Copy).

Decision to Grant received for European Patent Application No. 22703812.2, mailed on Nov. 27, 2025, 2 pages.

Extended European Search Report received for European Patent Application No. 25203352.7, mailed on Nov. 25, 2025, 11 pages.

He et al., "LookAtChat: Visualizing Eye Contacts for Remote Small-Group Conversations", Arxiv.org, Cornell University Library, 201 Olin Library Cornell University Ithaca, NY 14853, XP091026044, Aug. 5, 2021, 23 pages.

Intention to Grant received for European Patent Application No. 19731554.2, mailed on Oct. 17, 2025, 9 pages.

Non-Final Office Action received for U.S. Appl. No. 18/961,226, mailed on Dec. 8, 2025, 11 pages.

Notice of Allowance received for Japanese Patent Application No. 2024-017393, mailed on Dec. 15, 2025, 4 pages (1 page of English Translation and 3 pages of Official Copy).

Notice of Allowance received for Japanese Patent Application No. 2024-550636, mailed on Nov. 25, 2025, 4 pages (1 page of English Translation and 3 pages of Official Copy).

Notice of Allowance received for Korean Patent Application No. 10-2025-7032042, mailed on Dec. 8, 2025, 9 pages (2 pages of English Translation and 7 pages of Official Copy).

Notice of Allowance received for U.S. Appl. No. 18/167,767, mailed on Oct. 15, 2025, 11 pages.

Notice of Allowance received for U.S. Appl. No. 18/371,403, mailed on Oct. 28, 2025, 8 pages.

Notice of Allowance received for U.S. Appl. No. 18/371,406, mailed on Dec. 3, 2025, 9 pages.

Office Action received for Australian Patent Application No. 2024266919, mailed on Nov. 28, 2025, 7 pages.

Office Action received for European Patent Application No. 22197755.6, mailed on Dec. 3, 2025, 4 pages.

Office Action received for Japanese Patent Application No. 2025-156897, mailed on Nov. 20, 2025, 5 pages (3 pages of English Translation and 2 pages of Official Copy).

Notice of Allowance received for Korean Patent Application No. 10-2023-7039602, mailed on Mar. 3, 2026, 7 pages (2 pages of English Translation and 5 pages of Official Copy).

* cited by examiner

Portable Multifunction Device 100

210

212

206

208

208

200

Speaker 111

Optical Sensor 164

Proximity Sensor 166

210 is SIM card slot
212 is headphone jack

202

Touch Screen 112

Contact Intensity Sensor(s) 165

Tactile Output Generator(s) 167

203

Microphone 113

Home 204

Accelerometer(s) 168

External Port 124

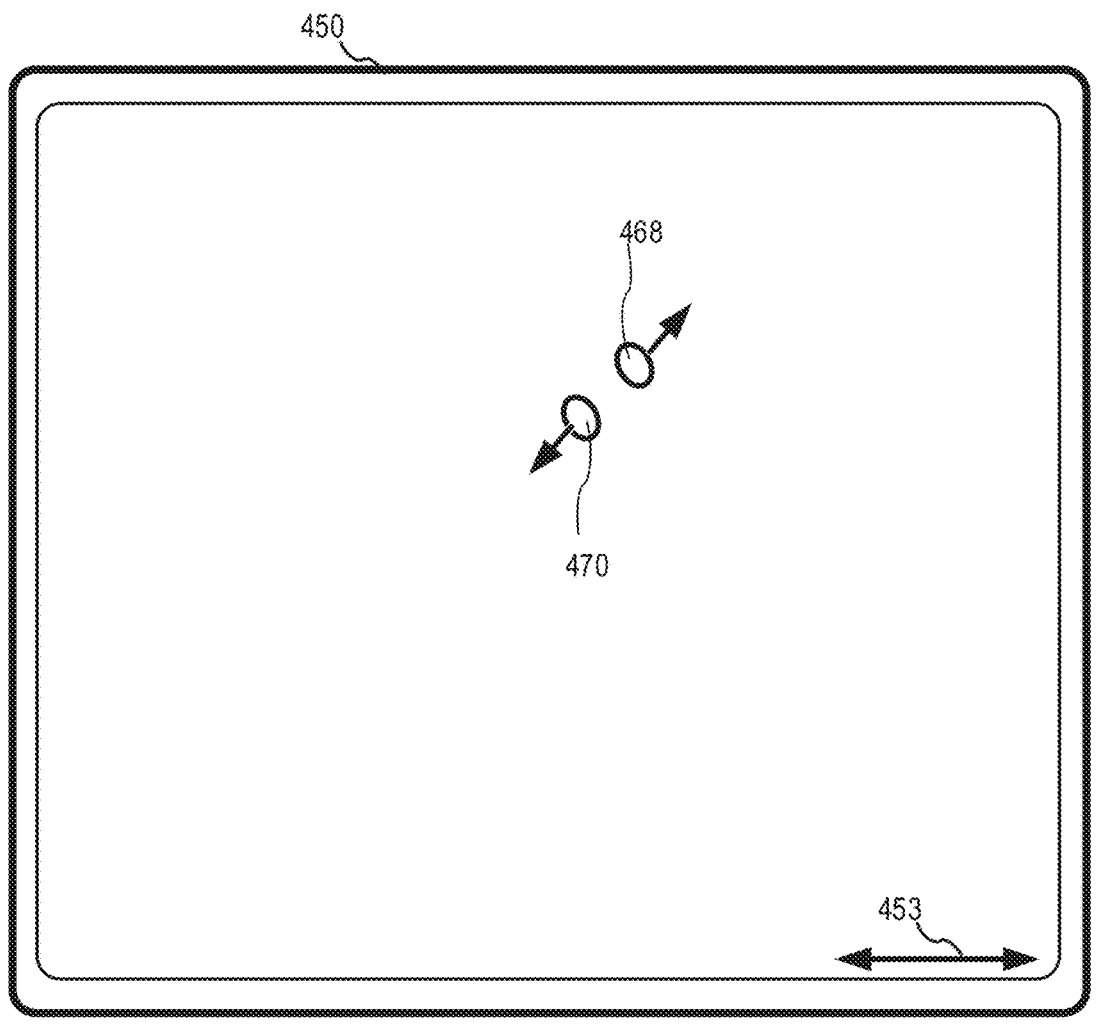
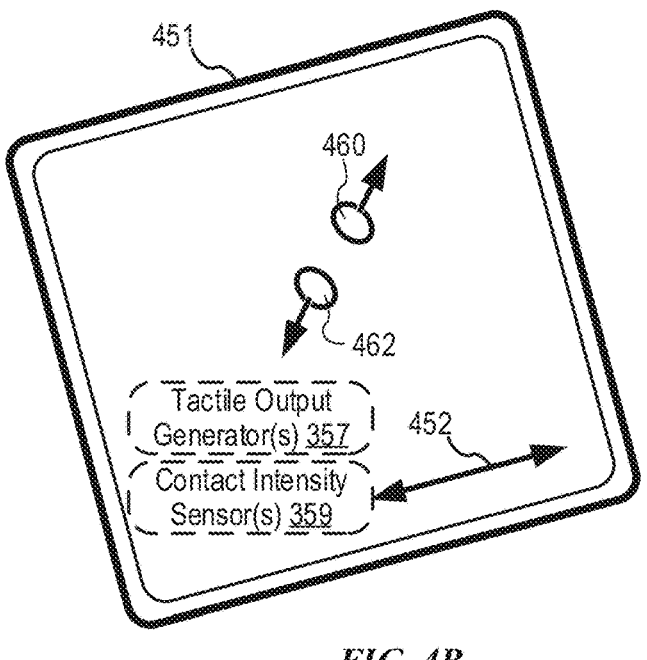
*FIG. 4B*

Figure 7A:
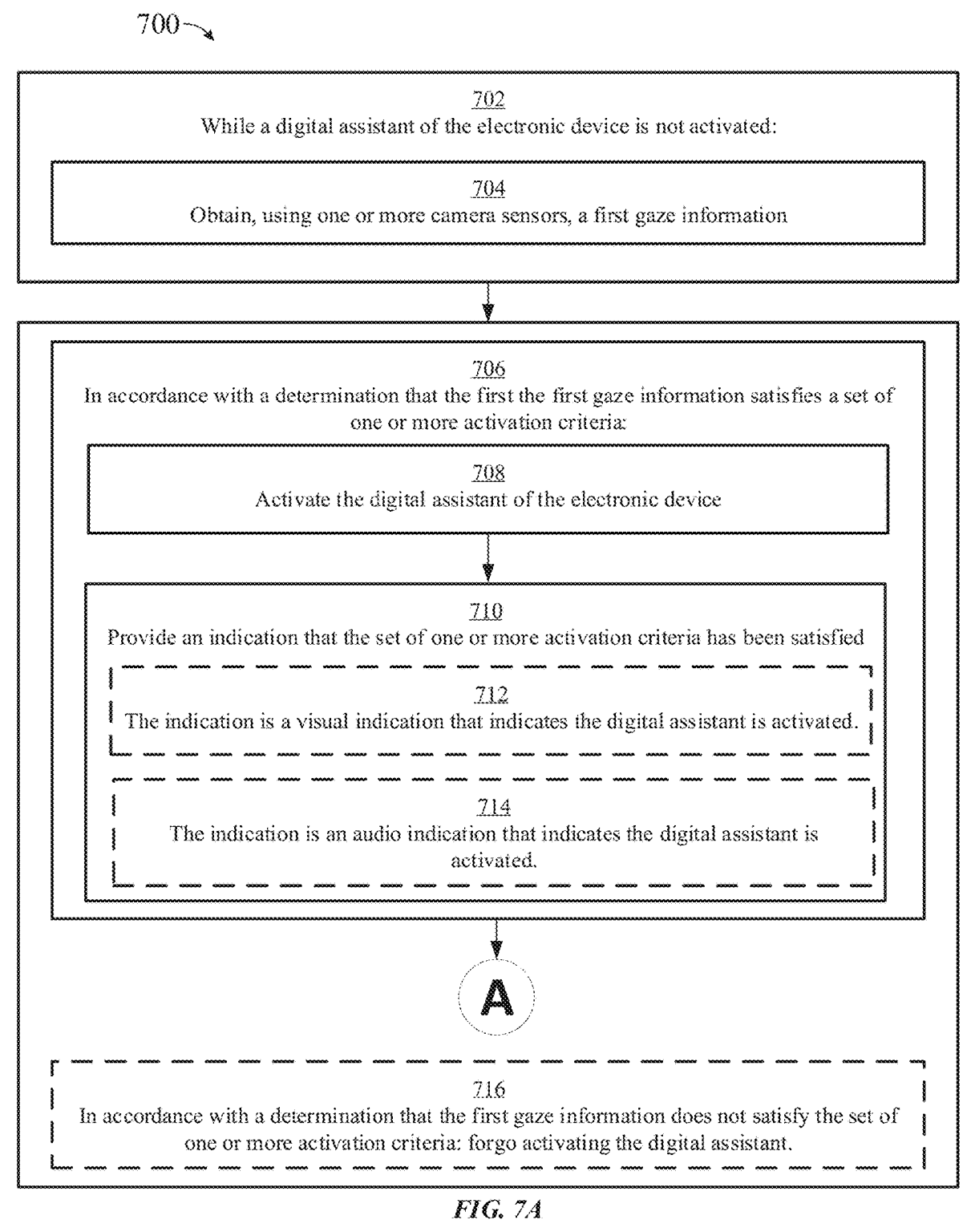

700 ⇘

702
While a digital assistant of the electronic device is not activated:

> 704
> Obtain, using one or more camera sensors, a first gaze information

706
In accordance with a determination that the first the first gaze information satisfies a set of one or more activation criteria:

> 708
> Activate the digital assistant of the electronic device

> 710
> Provide an indication that the set of one or more activation criteria has been satisfied
>
> > 712
> > The indication is a visual indication that indicates the digital assistant is activated.
>
> > 714
> > The indication is an audio indication that indicates the digital assistant is activated.

A

716
In accordance with a determination that the first gaze information does not satisfy the set of one or more activation criteria: forgo activating the digital assistant.

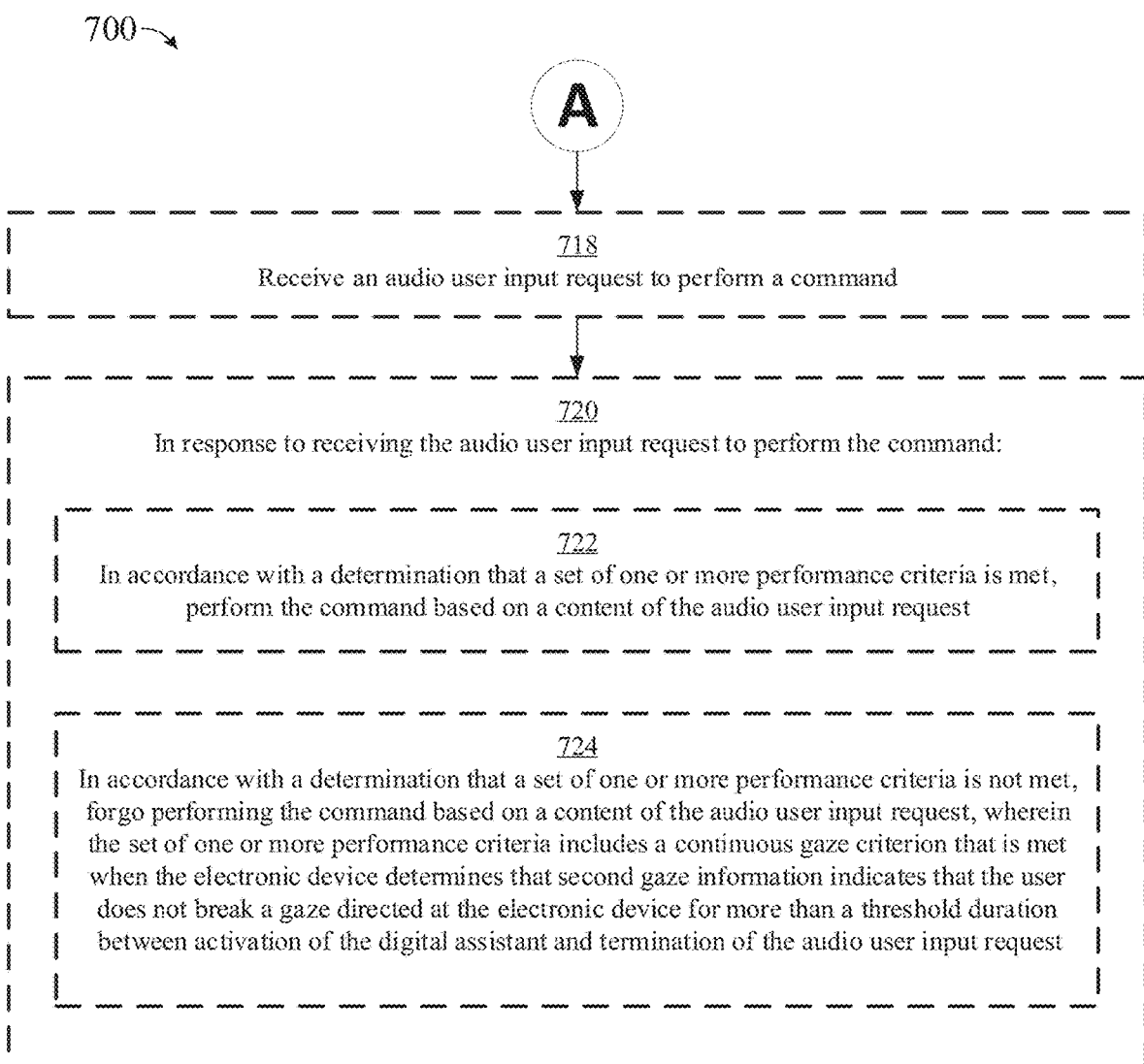

718
Receive an audio user input request to perform a command

720
In response to receiving the audio user input request to perform the command:

722
In accordance with a determination that a set of one or more performance criteria is met, perform the command based on a content of the audio user input request 724
In accordance with a determination that a set of one or more performance criteria is not met, forgo performing the command based on a content of the audio user input request, wherein the set of one or more performance criteria includes a continuous gaze criterion that is met when the electronic device determines that second gaze information indicates that the user does not break a gaze directed at the electronic device for more than a threshold duration between activation of the digital assistant and termination of the audio user input request

*FIG. 7B*

900

---

902
While a first external device is in a first state:

> 904
> Receive an audio user input request to perform a first command

> 906
> Obtain using one or more camera sensors, first gaze information

---

908
In accordance with a determination, using the first gaze information, that a set of one or more gaze criteria is met for the first external device:

> 910
> Transmit, based on the first command, an instruction to transition the first external device from the first state to a second state > 912
> Provide an indication that the set of one or more gaze criteria is met
>
> > 914
> > The indication is domain specific

---

916
Provide an indication that the first external device is in the second state.

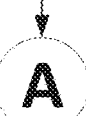

*FIG. 9A*

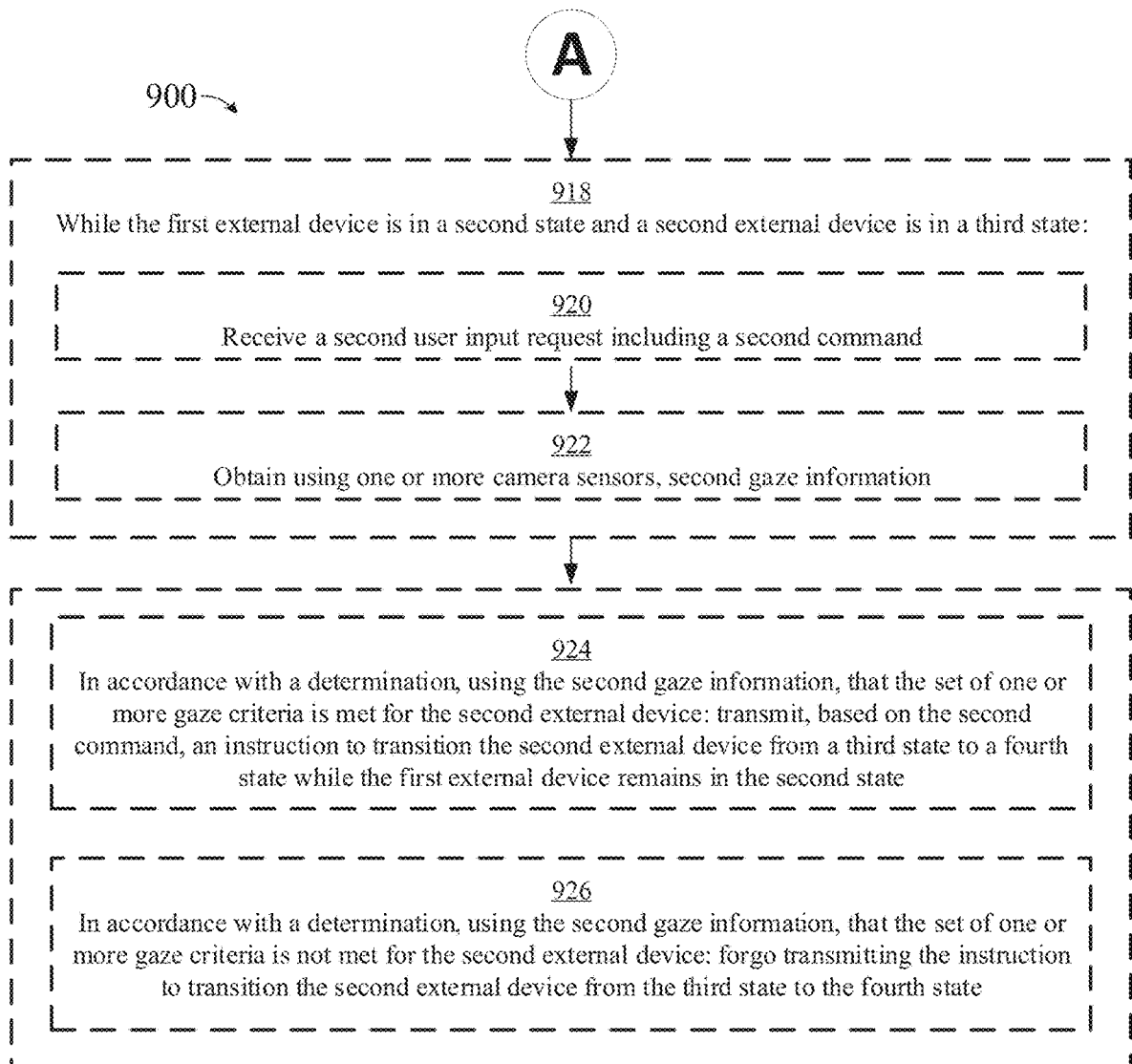

900

A

918
While the first external device is in a second state and a second external device is in a third state:

920
Receive a second user input request including a second command

922
Obtain using one or more camera sensors, second gaze information

924
In accordance with a determination, using the second gaze information, that the set of one or more gaze criteria is met for the second external device: transmit, based on the second command, an instruction to transition the second external device from a third state to a fourth state while the first external device remains in the second state 926
In accordance with a determination, using the second gaze information, that the set of one or more gaze criteria is not met for the second external device: forgo transmitting the instruction to transition the second external device from the third state to the fourth state

DEVICE CONTROL USING GAZE INFORMATION

CROSS-REFERENCE TO RELATED APPLICATIONS

This application is a continuation of U.S. application Ser. No. 18/105,191, entitled "DEVICE CONTROL USING GAZE INFORMATION", filed on Feb. 2, 2023, which is a continuation of U.S. application Ser. No. 17/087,855, now issued as U.S. Pat. No. 11,619,991, entitled "DEVICE CONTROL USING GAZE INFORMATION", filed on Nov. 3, 2020, which is a continuation of U.S. application Ser. No. 16/553,622, now issued as U.S. Pat. No. 10,860,096, entitled "DEVICE CONTROL USING GAZE INFORMATION", filed on Aug. 28, 2019, which claims priority to U.S. Provisional Application Ser. No. 62/739,087, entitled "DEVICE CONTROL USING GAZE INFORMATION", filed on Sep. 28, 2018, the contents of which are hereby incorporated by reference in their entirety.

FIELD

The present disclosure relates generally to computer user interfaces, and more specifically to techniques for controlling electronic devices using gaze information.

BACKGROUND

Users frequently provide inputs, such as keypresses and voice inputs, to control electronic devices. For example, users activate a device's button or speak a trigger phrase to start an application on the device. Such inputs frequently require the user to be within arm's reach or within microphone range.

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input, operationalize the user's intent into a task, and perform the task. In some systems, performing tasks in this manner may be constrained in the manner by which a task is identified. In some cases, however, a user may be limited to a particular set of commands such that the user cannot readily instruct a digital assistant to perform a task using natural-language speech inputs. Further, in many instances digital assistants fail to adapt based on previous user behavior and in turn lack a desirable optimization of user experience.

BRIEF SUMMARY

Some techniques for controlling electronic devices, however, are generally cumbersome and inefficient. For example, some existing techniques use a complex and time-consuming user interface, which may include multiple key presses or keystrokes. For another example, some existing techniques require the user to be within arm's distance to activate a button of the device. Existing techniques require more time than necessary, wasting user time and device energy. This latter consideration is particularly important in battery-operated devices.

Accordingly, the present technique provides electronic devices with faster, more efficient methods and interfaces for controlling electronic devices. Such methods and interfaces optionally complement or replace other methods for controlling electronic devices. Such methods and interfaces reduce the cognitive burden on a user and produce a more efficient human-machine interface. For battery-operated computing devices, such methods and interfaces conserve power and increase the time between battery charges. Such techniques also allow users to more efficiently interact with electronic devices in environments where the user is not within reaching distance of the electronic device and/or the user is in a noisy environment (e.g., including noise based on audio being produced by the electronic device).

In accordance with some embodiments, a method is provided. The method is performed at an electronic device. The method comprises: while a digital assistant of the electronic device is not activated: obtaining, using one or more camera sensors, first gaze information; and in accordance with a determination that the first gaze information satisfies a set of one or more activation criteria: activating the digital assistant of the electronic device; and providing an indication that the set of one or more activation criteria has been satisfied.

In accordance with some embodiments, a non-transitory computer-readable storage medium is provided. The medium stores one or more programs configured to be executed by one or more processors of an electronic device. The one or more programs including instructions for: while a digital assistant of the electronic device is not activated: obtaining, using one or more camera sensors, first gaze information; and in accordance with a determination that the first gaze information satisfies a set of one or more activation criteria: activating the digital assistant of the electronic device; and providing an indication that the set of one or more activation criteria has been satisfied.

In accordance with some embodiments, a transitory computer-readable storage medium is provided. The medium stores one or more programs configured to be executed by one or more processors of an electronic device. The one or more programs including instructions for: while a digital assistant of the electronic device is not activated: obtaining, using one or more camera sensors, first gaze information; and in accordance with a determination that the first gaze information satisfies a set of one or more activation criteria: activating the digital assistant of the electronic device; and providing an indication that the set of one or more activation criteria has been satisfied.

In accordance with some embodiments, an electronic device is provided. The electronic device comprises: one or more processors; and memory storing one or more programs configured to be executed by the one or more processors, the one or more programs including instructions for: while a digital assistant of the electronic device is not activated: obtaining, using one or more camera sensors, first gaze information; and in accordance with a determination that the first gaze information satisfies a set of one or more activation criteria: activating the digital assistant of the electronic device; and providing an indication that the set of one or more activation criteria has been satisfied.

In accordance with some embodiments, an electronic device is provided. The electronic device comprises: means, while a digital assistant of the electronic device is not activated, for: obtaining, using one or more camera sensors, first gaze information; and means, in accordance with a determination that the first gaze information satisfies a set of one or more activation criteria, for: activating the digital assistant of the electronic device; and providing an indication that the set of one or more activation criteria has been satisfied.

In accordance with some embodiments, a method is provided. The method is performed at an electronic device. The method comprises: while a first external device is in a first state: receiving an audio user input request to perform a first command; and obtaining, using one or more camera sensors, first gaze information; and in accordance with a determination, using the first gaze information, that a set of one or more gaze criteria is met for the first external device: transmitting, based on the first command, an instruction to transition the first external device from the first state to a second state.

In accordance with some embodiments, a non-transitory computer-readable storage medium is provided. The medium stores one or more programs configured to be executed by one or more processors of an electronic device. The one or more programs including instructions for: while a first external device is in a first state: receiving an audio user input request to perform a first command; and obtaining, using one or more camera sensors, first gaze information; and in accordance with a determination, using the first gaze information, that a set of one or more gaze criteria is met for the first external device: transmitting, based on the first command, an instruction to transition the first external device from the first state to a second state.

In accordance with some embodiments, a transitory computer-readable storage medium is provided. The medium stores one or more programs configured to be executed by one or more processors of an electronic device. The one or more programs including instructions for: while a first external device is in a first state: receiving an audio user input request to perform a first command; and obtaining, using one or more camera sensors, first gaze information; and in accordance with a determination, using the first gaze information, that a set of one or more gaze criteria is met for the first external device: transmitting, based on the first command, an instruction to transition the first external device from the first state to a second state.

In accordance with some embodiments, an electronic device is provided. The electronic device comprises: one or more processors; and memory storing one or more programs configured to be executed by the one or more processors, the one or more programs including instructions for: while a first external device is in a first state: receiving an audio user input request to perform a first command; and obtaining, using one or more camera sensors, first gaze information; and in accordance with a determination, using the first gaze information, that a set of one or more gaze criteria is met for the first external device: transmitting, based on the first command, an instruction to transition the first external device from the first state to a second state.

In accordance with some embodiments, an electronic device is provided. The electronic device comprises: means, while a first external device is in a first state, for: receiving an audio user input request to perform a first command; and obtaining, using one or more camera sensors, first gaze information; and means, in accordance with a determination, using the first gaze information, that a set of one or more gaze criteria is met for the first external device, for: transmitting, based on the first command, an instruction to transition the first external device from the first state to a second state.

In accordance with some embodiments, a method is provided. The method is performed at an electronic device. The method comprises: receiving an audio user input request; in accordance with a determination that the audio user input request corresponds to a first user, updating a value of a characteristic of an indicator to a first value corresponding to the first user; in accordance with a determination that the audio user input request corresponds to a second user, different from the first user, updating the value of the characteristic of the indicator to a second value corresponding to the second user, the second value being different from the first value; and responding to the audio user input request using the indicator, wherein the indicator includes the updated value of the characteristic.

In accordance with some embodiments, a non-transitory computer-readable storage medium is provided. The medium stores one or more programs configured to be executed by one or more processors of an electronic device. The one or more programs including instructions for: receiving an audio user input request; in accordance with a determination that the audio user input request corresponds to a first user, updating a value of a characteristic of an indicator to a first value corresponding to the first user; in accordance with a determination that the audio user input request corresponds to a second user, different from the first user, updating the value of the characteristic of the indicator to a second value corresponding to the second user, the second value being different from the first value; and responding to the audio user input request using the indicator, wherein the indicator includes the updated value of the characteristic.

In accordance with some embodiments, a transitory computer-readable storage medium is provided. The medium stores one or more programs configured to be executed by one or more processors of an electronic device. The one or more programs including instructions for: receiving an audio user input request; in accordance with a determination that the audio user input request corresponds to a first user, updating a value of a characteristic of an indicator to a first value corresponding to the first user; in accordance with a determination that the audio user input request corresponds to a second user, different from the first user, updating the value of the characteristic of the indicator to a second value corresponding to the second user, the second value being different from the first value; and responding to the audio user input request using the indicator, wherein the indicator includes the updated value of the characteristic.

In accordance with some embodiments, an electronic device is provided. The electronic device comprises: one or more processors; and memory storing one or more programs configured to be executed by the one or more processors, the one or more programs including instructions for: receiving an audio user input request; in accordance with a determination that the audio user input request corresponds to a first user, updating a value of a characteristic of an indicator to a first value corresponding to the first user; in accordance with a determination that the audio user input request corresponds to a second user, different from the first user, updating the value of the characteristic of the indicator to a second value corresponding to the second user, the second value being different from the first value; and responding to the audio user input request using the indicator, wherein the indicator includes the updated value of the characteristic.

In accordance with some embodiments, an electronic device is provided. The electronic device comprises: means for receiving an audio user input request; means, in accordance with a determination that the audio user input request corresponds to a first user, for updating a value of a characteristic of an indicator to a first value corresponding to the first user; means, in accordance with a determination that the audio user input request corresponds to a second user, different from the first user, for updating the value of the characteristic of the indicator to a second value corresponding to the second user, the second value being different from the first value; and means for responding to the audio user input request using the indicator, wherein the indicator includes the updated value of the characteristic.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for controlling electronic devices, thereby increasing the effectiveness, efficiency, and user satisfaction with such devices. Such methods and interfaces may complement or replace other methods for controlling electronic devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7B are flow diagrams illustrating a method for activating a digital assistant using gaze information.

FIGS. 9A-9B are flow diagrams illustrating a method for providing context to commands using gaze information.

DESCRIPTION OF EMBODIMENTS

Figure 1A:
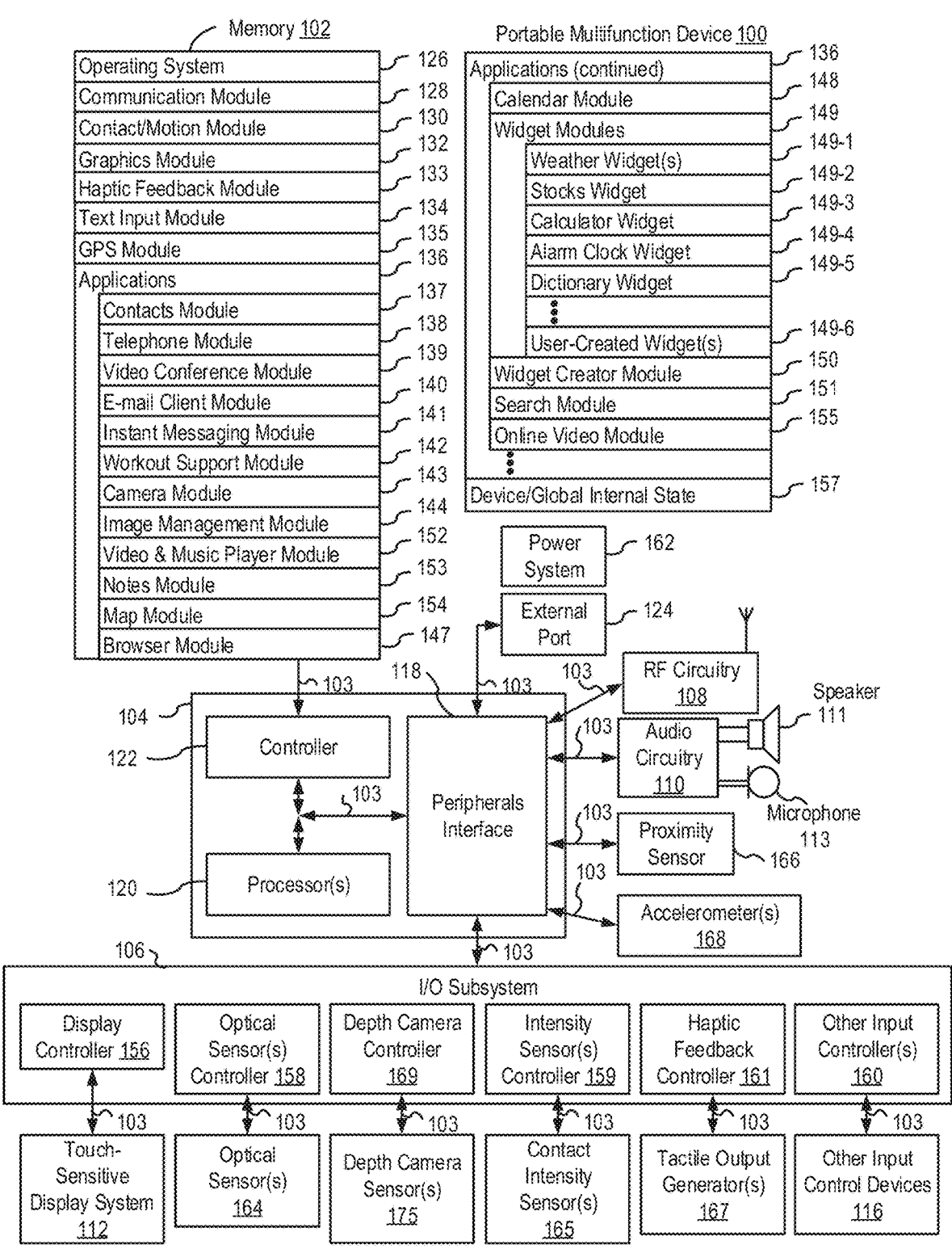
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for controlling electronic devices. For example, eliminating or reducing the need for users to provide tactile or verbal input to activate a digital assistant enables users to more effectively control electronic devices. For another example, identifying an external device through the user's gaze eliminates or reduces the need to provide complex and time-consuming user input to identify such a device. Such techniques can reduce the cognitive burden on a user who control electronic devices, thereby enhancing productivity. Further, such techniques can reduce processor and battery power otherwise wasted on redundant user inputs.

Below, FIGS. 1A-1C, 2, 3, 4A-4B, and 5A-5B provide a description of exemplary devices for performing the techniques for controlling electronic devices. FIGS. 6A-6O illustrate exemplary user interfaces for activating a digital assistant using gaze information. FIGS. 7A-7B are a flow diagram illustrating methods of activating a digital assistant using gaze information in accordance with some embodiments. The user interfaces in FIGS. 6A-6O are used to illustrate the processes described below, including the processes in FIGS. 7A-7B. FIGS. 8A-8L illustrate exemplary user interfaces for providing context to commands using gaze information. FIGS. 9A-9B are a flow diagram illustrating methods of providing context to commands using gaze information in accordance with some embodiments. The user interfaces in FIGS. 8A-8L are used to illustrate the processes described below, including the processes in FIGS. 9A-9B. FIGS. 10A-10D illustrate exemplary user interfaces for providing indications that distinguish between different speakers. FIGS. 11A-11B are a flow diagram illustrating methods of providing indications that distinguish between different speakers in accordance with some embodiments. The user interfaces in FIGS. 10A-10D are used to illustrate the processes described below, including the processes in FIGS. 11A-11B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser.

No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, cars of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
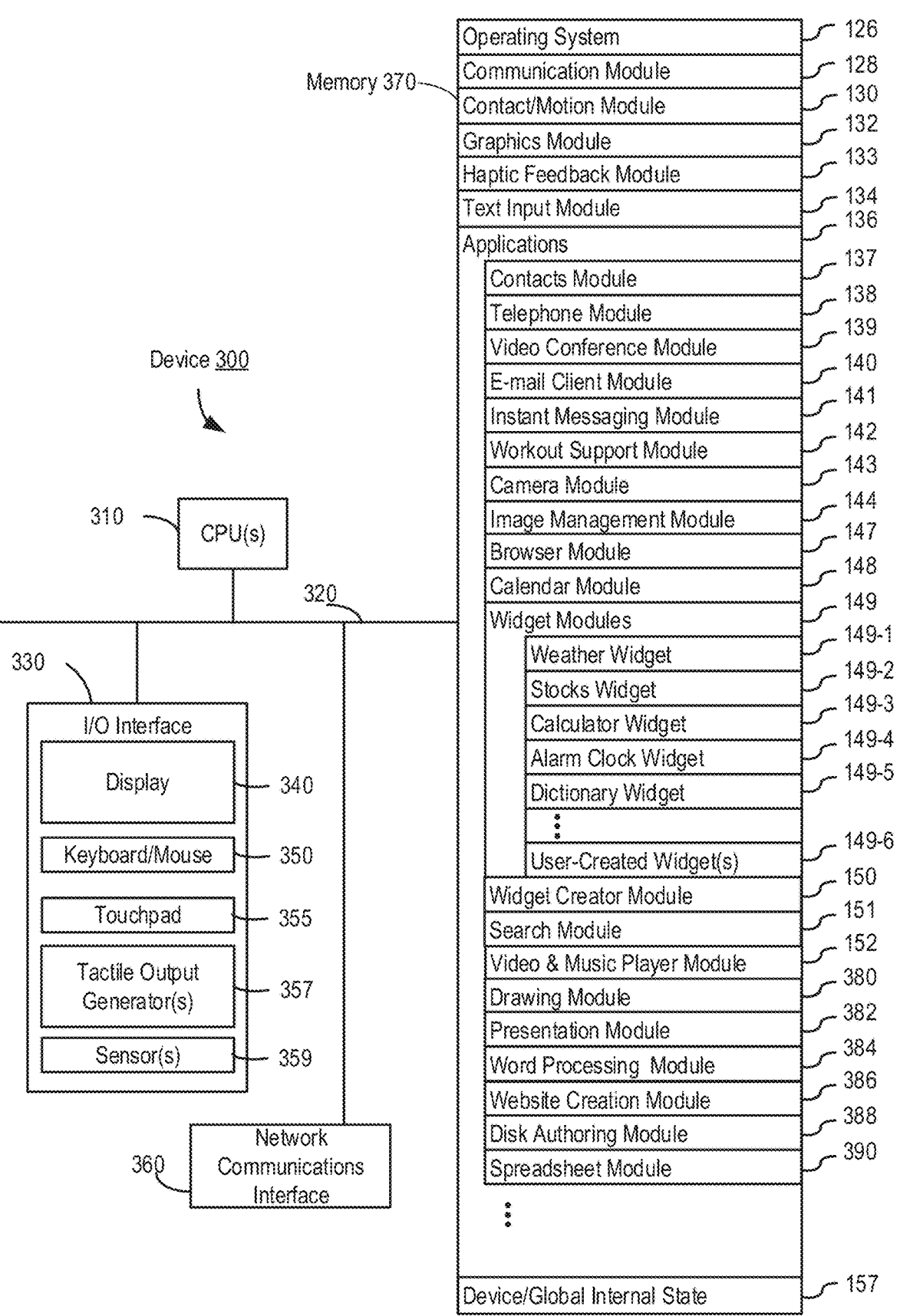
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multi-touch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
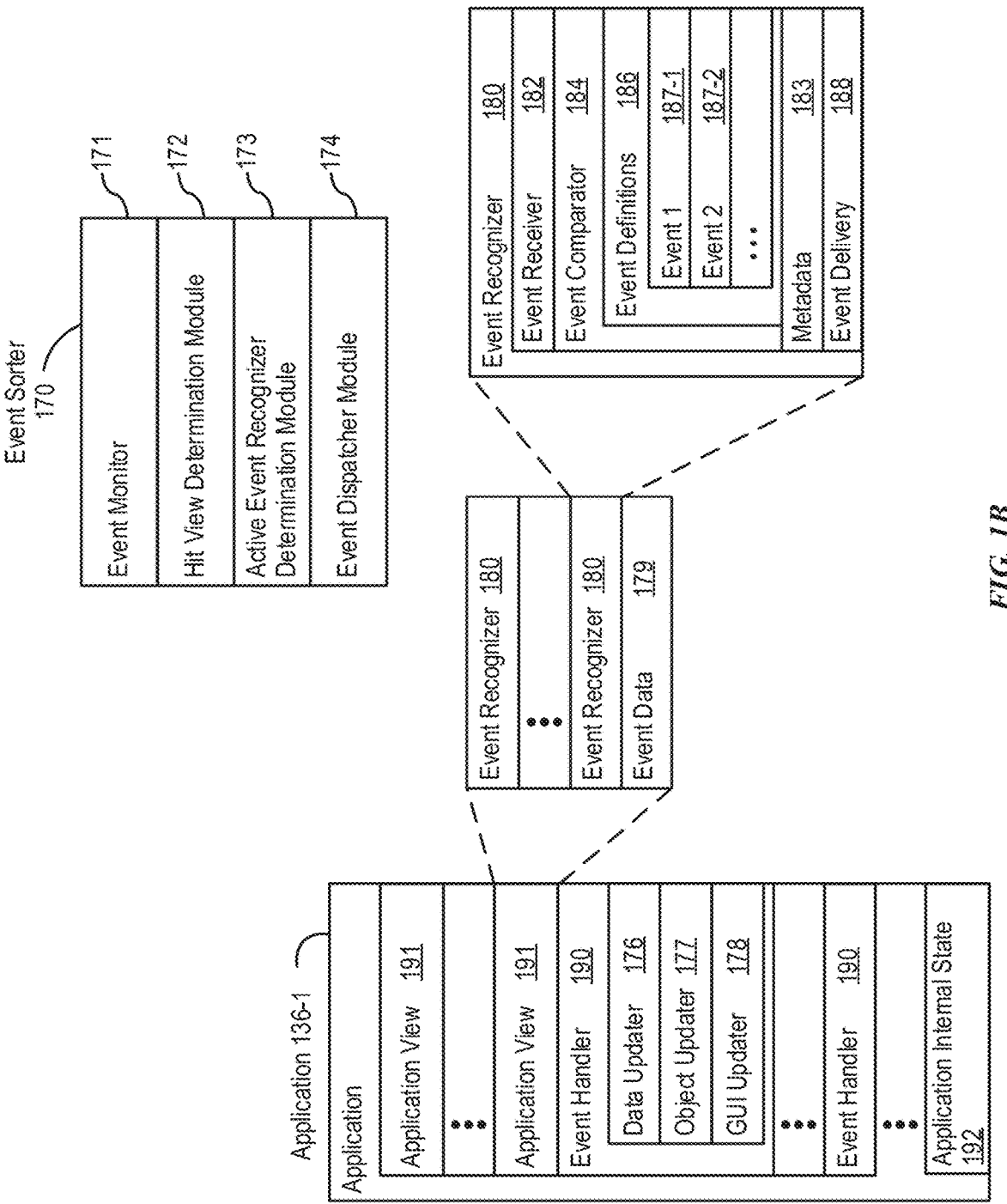
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 1C:
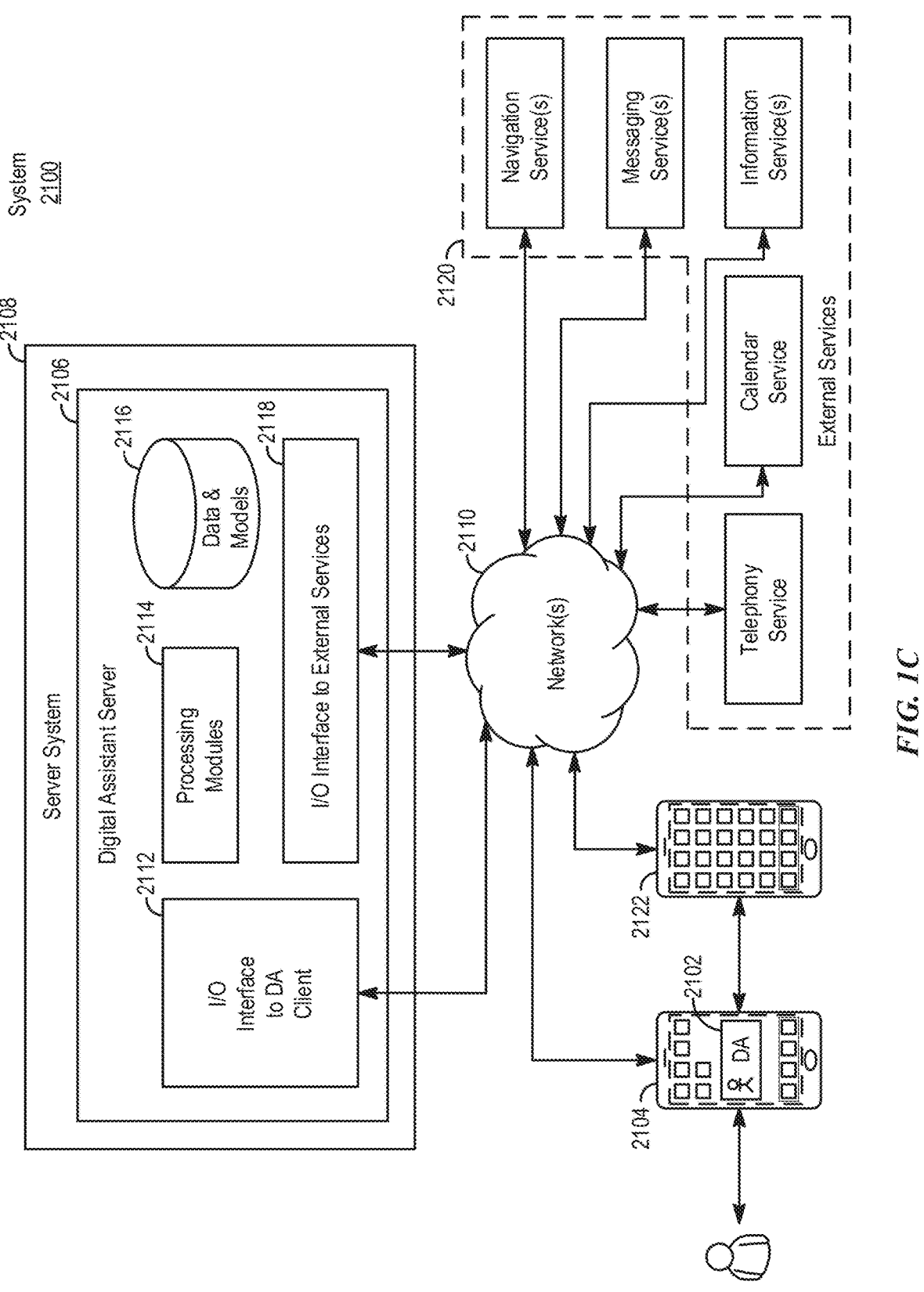
FIG. 1C is a block diagram illustrating a system and environment for implementing a digital assistant, in accordance with some embodiments.

FIG. 1C illustrates a block diagram of system 2100 according to various examples. In some examples, system 2100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time.

There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1C, in some examples, a digital assistant is implemented according to a client-server model. The digital assistant includes client-side portion 2102 (hereafter "DA client 2102") executed on user device 104 and server-side portion 2106 (hereafter "DA server 2106") executed on server system 2108. DA client 2102 communicates with DA server 2106 through one or more networks 2110. DA client 2102 provides client-side functionalities such as user-facing input and output processing and communication with DA server 2106. DA server 2106 provides server-side functionalities for any number of DA clients 2102 each residing on a respective user device 2104.

In some examples, DA server 2106 includes client-facing I/O interface 2112, one or more processing modules 2114, data and models 2116, and I/O interface to external services 2118. The client-facing I/O interface 2112 facilitates the client-facing input and output processing for DA server 2106. One or more processing modules 2114 utilize data and models 2116 to process speech input and determine the user's intent based on natural language input. Further, one or more processing modules 2114 perform task execution based on inferred user intent. In some examples, DA server 2106 communicates with external services 120 through network(s) 2110 for task completion or information acquisition. I/O interface to external services 2118 facilitates such communications.

User device 2104 can be any suitable electronic device. In some examples, user device 2104 is a portable multifunctional device (e.g., device 100, described above with reference to FIG. 1A), a multifunctional device or another electronic device (e.g., device 600, 800, 1000) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California. Other examples of portable multifunction devices include, without limitation, earphones/headphones, speakers, and laptop or tablet computers. Further, in some examples, user device 2104 is a non-portable multifunctional device. In particular, user device 2104 is a desktop computer, a game console, a speaker, a television, or a television set-top box. In some examples, user device 2104 includes a touch-sensitive surface (e.g., touch screen displays and/or touchpads). Further, user device 2104 optionally includes one or more other physical user-interface devices, such as a physical keyboard, a mouse, and/or a joystick. Various examples of electronic devices, such as multifunctional devices, are described below in greater detail.

Examples of communication network(s) 2110 include local area networks (LAN) and wide area networks (WAN), e.g., the Internet. Communication network(s) 2110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

Server system 2108 is implemented on one or more standalone data processing apparatus or a distributed network of computers. In some examples, server system 2108 also employs various virtual devices and/or services of third-party service providers (e.g., third-party cloud service providers) to provide the underlying computing resources and/or infrastructure resources of server system 2108.

In some examples, user device 2104 communicates with DA server 2106 via second user device 2122. Second user device 2122 is similar or identical to user device 2104. User device 2104 is configured to communicatively couple to second user device 2122 via a direct communication connection, such as Bluetooth, NFC, BTLE, or the like, or via a wired or wireless network, such as a local Wi-Fi network. In some examples, second user device 2122 is configured to act as a proxy between user device 2104 and DA server 2106. For example, DA client 2102 of user device 2104 is configured to transmit information (e.g., a user request received at user device 2104) to DA server 2106 via second user device 2122. DA server 2106 processes the information and returns relevant data (e.g., data content responsive to the user request) to user device 2104 via second user device 2122.

In some examples, user device 2104 is configured to communicate abbreviated requests for data to second user device 2122 to reduce the amount of information transmitted from user device 2104. Second user device 2122 is configured to determine supplemental information to add to the abbreviated request to generate a complete request to transmit to DA server 2106. This system architecture can advantageously allow user device 2104 having limited communication capabilities and/or limited battery power (e.g., a watch or a similar compact electronic device) to access services provided by DA server 2106 by using second user device 2122, having greater communication capabilities and/or battery power (e.g., a mobile phone, laptop computer, tablet computer, or the like), as a proxy to DA server 2106. While only two user devices 2104 and 2122 are shown in FIG. 1C, it should be appreciated that system 2100, in some examples, includes any number and type of user devices configured in this proxy configuration to communicate with DA server system 2106.

Although the digital assistant shown in FIG. 1C includes both a client-side portion (e.g., DA client 2102) and a server-side portion (e.g., DA server 2106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

Figure 2:
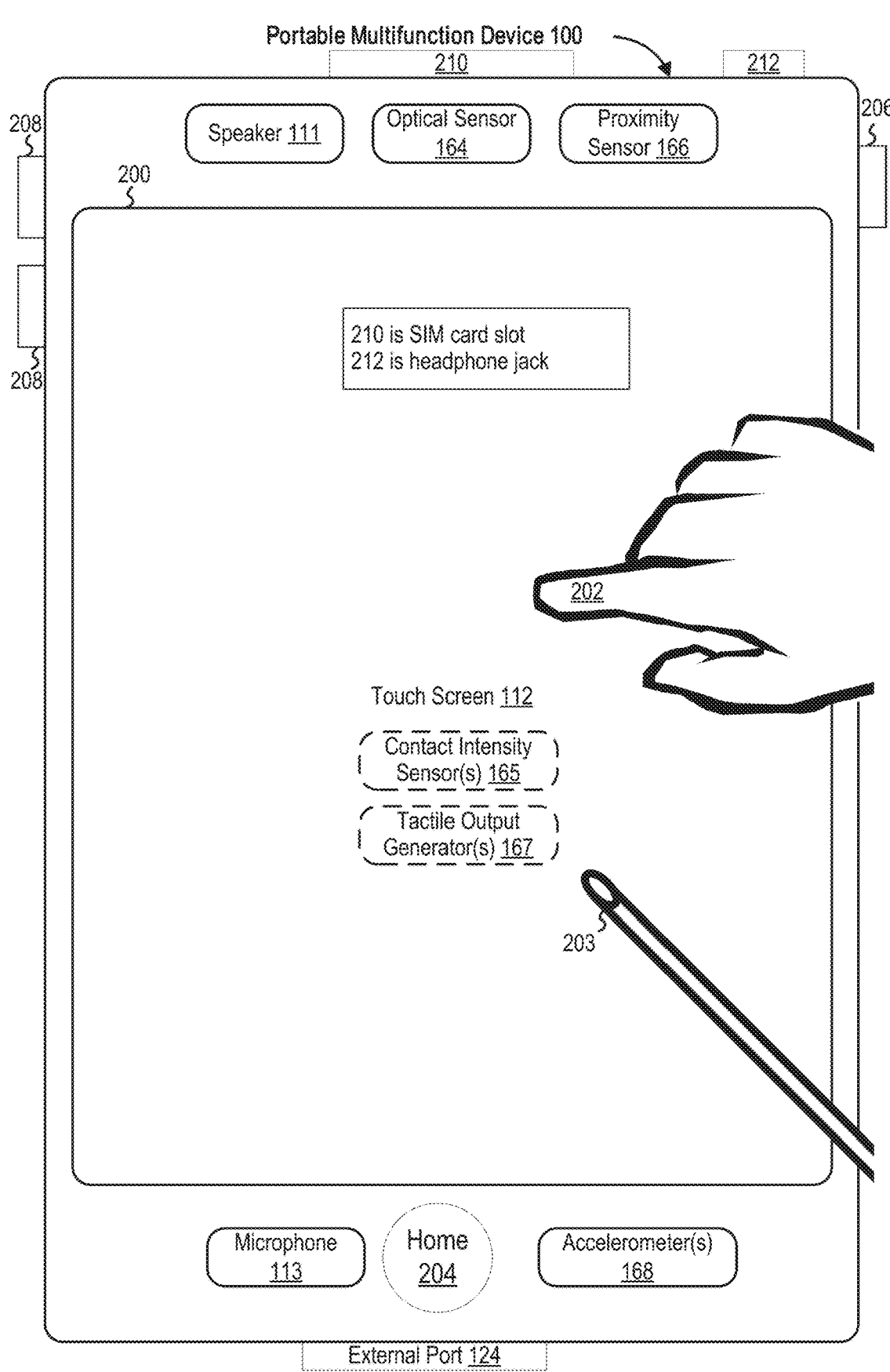
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
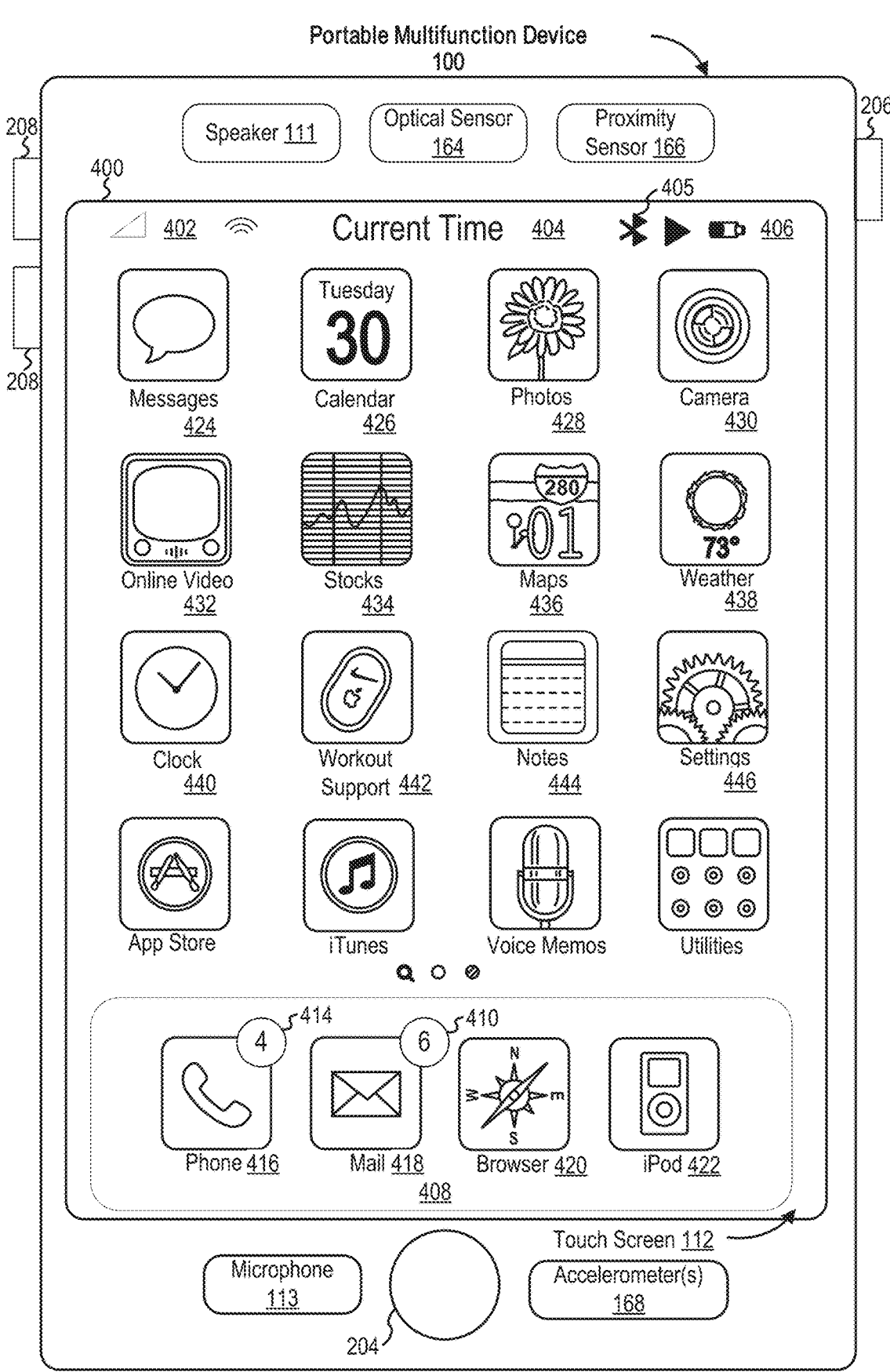
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
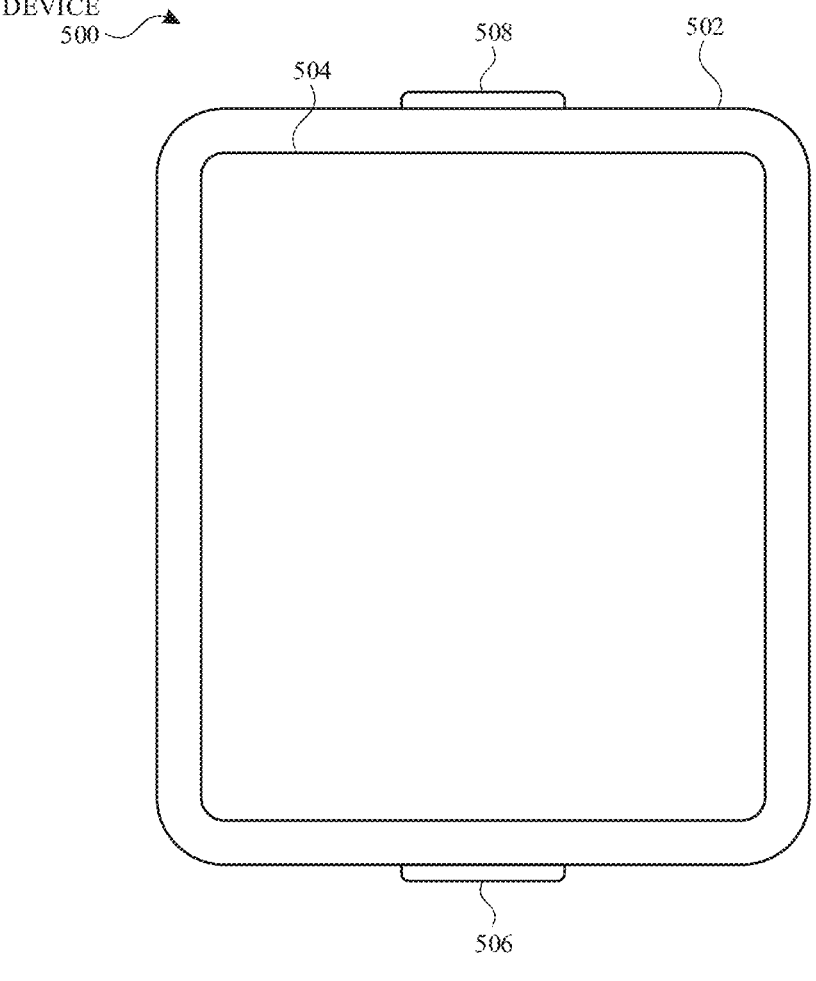
FIG. 5A illustrates a personal electronic device in accordance with some embodiments.
Figure 6A:
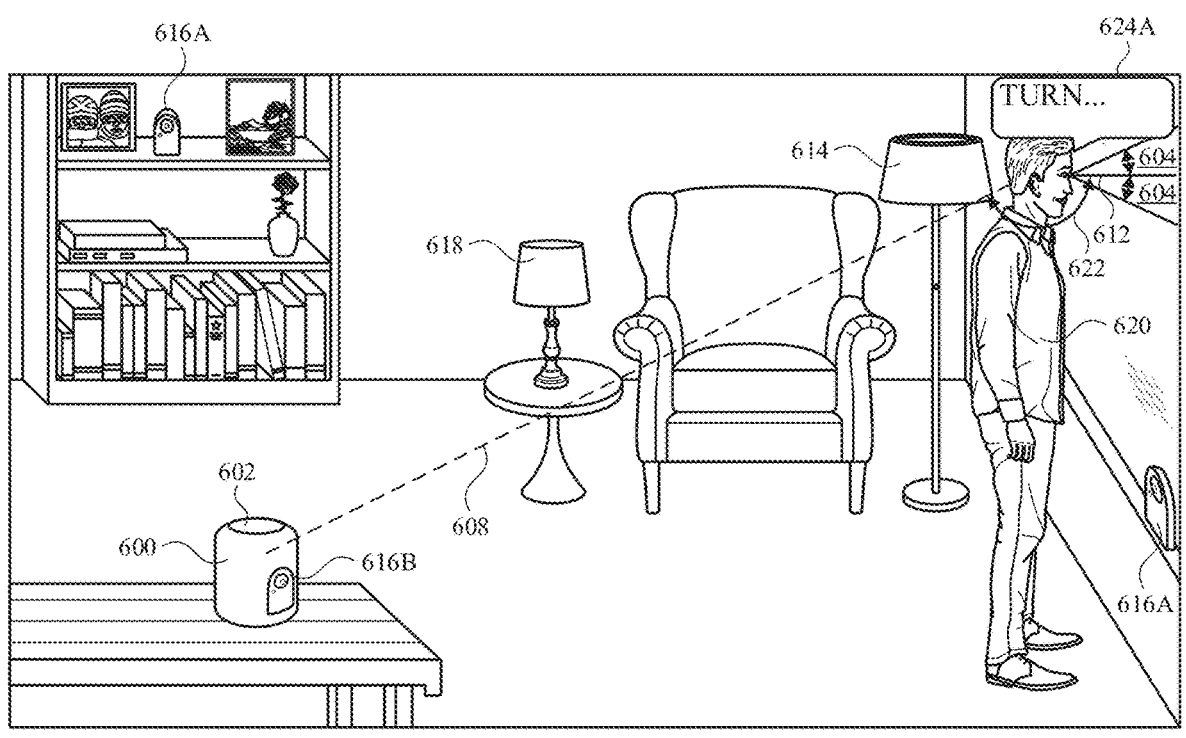
FIGS. 6A-6O illustrate exemplary techniques for activating a digital assistant using gaze information.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
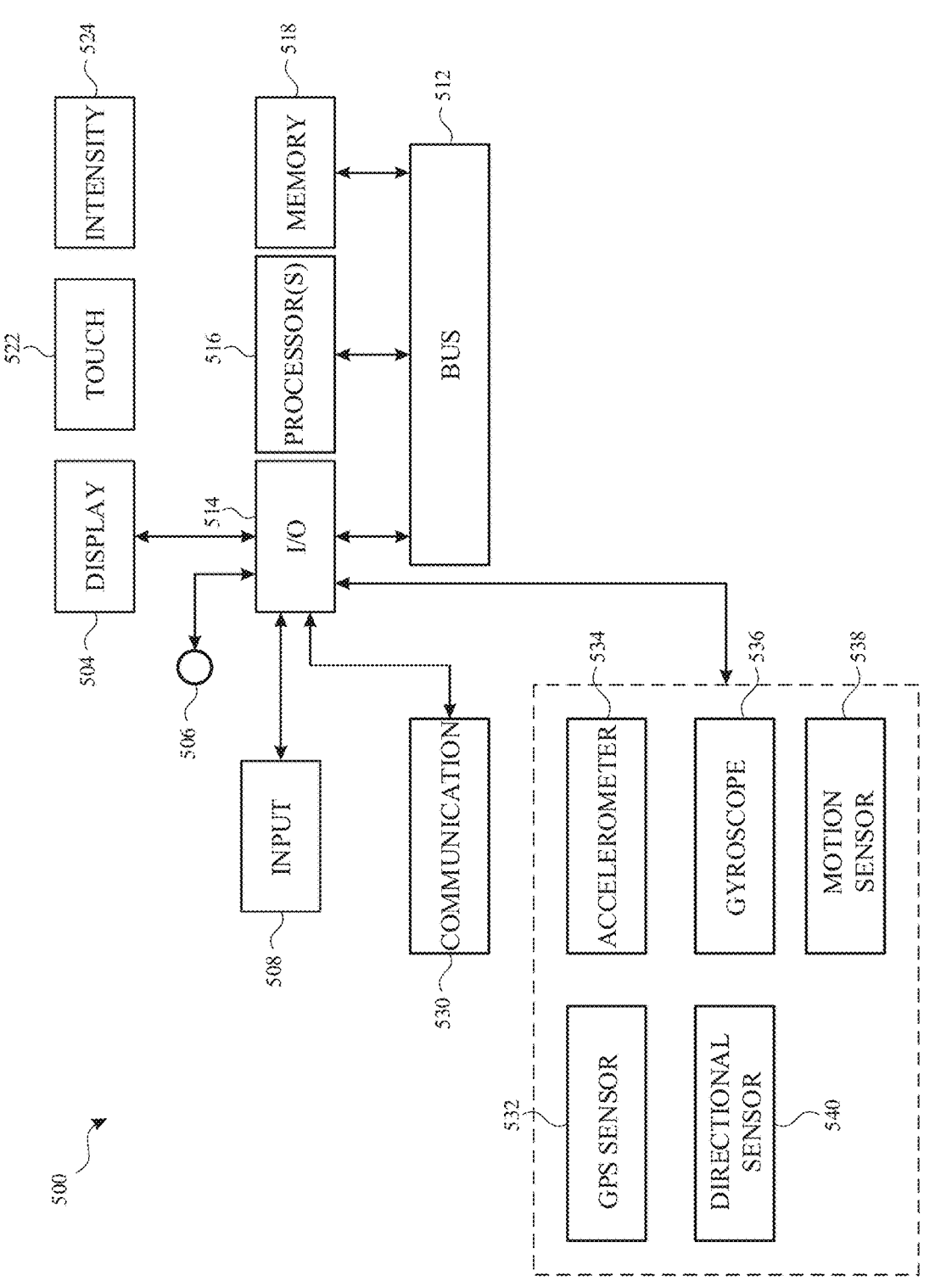
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7A-7B, 9A-9B, and 11A-11B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6O illustrate exemplary user interfaces for activating and interacting with a digital assistant using glance and voice commands, in accordance with some embodiments. These figures are used to illustrate the processes described below, including the processes in FIGS. 7A-7B.

FIGS. 6A-6D illustrate user 620 activating an exemplary digital assistant on electronic device 600 by glancing at electronic device 600. Once the digital assistant becomes activated, user 620 turns on the table lamp by speaking a command 624A-624B to the digital assistant.

FIG. 6A illustrates a digital assistant on electronic device 600 that is in an inactive state as indicated by display 602 being off. In some embodiments, the digital assistant is in an inactive state when electronic device 600 does not detect a user gaze or user 620 looking at electronic device 600. In some embodiments, the digital assistant is in an inactive state prior to the electronic device 600 detecting a button press (or other activation command) and/or prior to another device (e.g., watch 630) having receiving an activation command and transmitting an activation instruction to the electronic device. User 620 may glance at electronic device 600 to trigger the activation of the digital assistant when the gaze information based on the gaze of user 620 satisfies a set of one or more activation criteria. The electronic device 600 obtains gaze information of the gaze of user 620 using one or more camera sensors optionally located on external devices 616A and/or integrated with electronic device 600, such as camera 616B. Camera sensors 616A are wirelessly connected to electronic device 600 or alternatively could be wired. The one or more camera sensors include infrared camera sensors and/or visible light sensors that measure gaze information once a gaze has been detected. The gaze information optionally includes one or more of: the position of the user's head position, the dwell time or the duration of the gaze, the direction of the gaze, the field of view 606 of the gaze, and whether an object (e.g., electronic device 600 or an external device such as table lamp 618) is within the field of view 606 of the gaze.

Electronic device 600 determines whether the gaze information obtained from the one or more camera sensors 616A-616B satisfies a set of one or more activation criteria. In other words, electronic device 600 determines whether user 620 intended to look at electronic device 600 to activate the digital assistant. The set of one or more activation criteria optionally includes a direction criterion that is satisfied when the user's gaze is directed in the direction of electronic device 600. The set of one or more activation criteria also optionally includes a dwell time criterion that is satisfied when electronic device 600 detects a dwell time or duration of the gaze in the direction of electronic device 600 for greater than a non-zero, predetermined period of time (e.g., a couple seconds). If the dwell time or duration of the gaze is less than the threshold time period, this may indicate that the user does not intend to trigger the digital assistant. Thus, a dwell time of less than the threshold time period does not satisfy the activation criteria, resulting in the digital assistant not being activated.

The set of one or more activation criteria also optionally includes a field of view criteria. As illustrated in FIG. 6A, user 620 is not looking at electronic device 600 and electronic device 600 determines that device 600 is not in the field of view 606 of user 620. As further discussed below, the field of view criterion is satisfied when electronic device 600 is determined to be in field of view 606 of user 620, but is not satisfied when the electronic device 600 is determined to not be in the field of view 606 of user 620. Using the field of view 606 to determine whether a user 602 is looking at a target electronic device (e.g., device 600) results in a higher gaze detection rate as a gaze may be detected in the field of view even if the user is not looking directly at the target electronic device, but still intends to identify (or activate) the target electronic device.

Figure 6B:
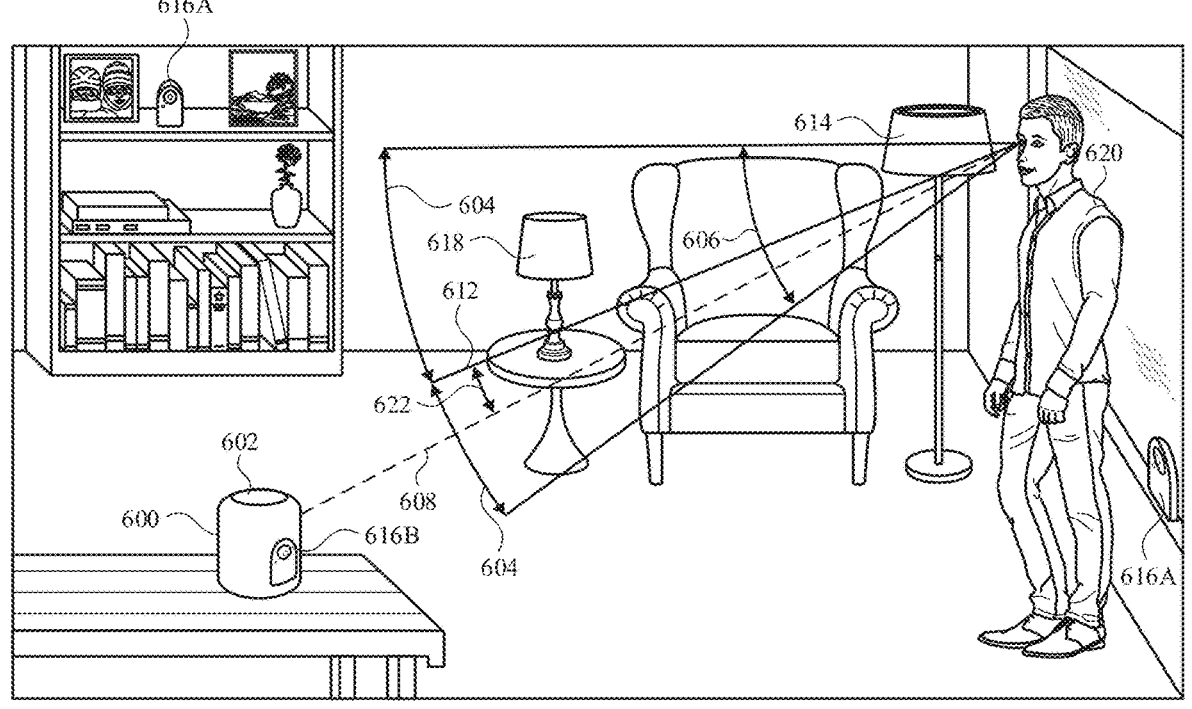

The field of view 606 is a range of degrees above and below the user's line-of-sight 612 as indicated by the threshold offset angle 604. In some embodiments, the field of view criterion is satisfied when electronic device 600 is directly in the line-of-sight 612 of user 620, or the determined offset degrees is zero. In some embodiments, a field of view criterion is satisfied when a determined offset angle 622 of the gaze is less than the threshold offset angle 604 (e.g., the maximum acceptable deviation from a line-of-sight 612 of user 620 looking directly at the electronic device as illustrated in FIG. 6B). The determined offset angle 622 (in this example) and the threshold offset angle 604 are greater than zero degrees (e.g., thirty degrees). The determined offset angle 622 is calculated based on the angle formed between a line-of-sight 612 from the gaze of user 620 (e.g., where the user is actually looking) and a calculated line-of-sight 608 from user 620 to electronic device 600 (e.g., the ideal path of the user looking directly at electronic device 600). When the offset angle 622 is greater than threshold offset angle 604, the field of view criterion is not satisfied resulting in the digital assistant remaining not activated because electronic device 600 is outside field of view 606, as illustrated in FIG. 6A. In some embodiments, if electronic device 600 is determined to be positioned more than a non-zero threshold number of degrees (e.g., more than 30 degrees) outside the field of view 606 of user 620, electronic device 600 is not in the user's gaze and the digital assistant is not activated. In some embodiments, line-of-sight 612 is measured based on the head position of the user. In some embodiments, the head position of the user is based on the tilt or rotation (e.g., yaw, pitch, and/or roll) of the user's head.

In FIG. 6A, the digital assistant on electronic device 600 is not activated because the gaze information obtained from the camera sensors (e.g., 616A, 61B) does not satisfy the set of one or more activation criteria, as discussed above. Electronic device 600 determines that user 620 is not looking at electronic device 600 when the dwell time of the gaze of user 620 is less than the threshold dwell time or electronic device 600 is not in the field of view of user 620. In some embodiments, the field of view criterion is not satisfied when the determined offset angle 622 between the user's line-of-sight 612 and a calculated line-of-sight 608 is greater than the threshold offset angle 604. When the digital assistant is not activated and the gaze information does not satisfy the set of one or more activation criteria, electronic device 600 forgoes activating the digital assistant. When the digital assistant is not activated, the electronic device 600 optionally does not turn on one or more of a microphone or a speaker, does not record audio, and/or does not enable processing of recorded audio for the purpose of performing a spoken command (e.g., electronic device 600 can still process audio to detect trigger words, but does not process the audio for performance of non-activation commands). In some embodiments, electronic device 600 does not provide any indications using a visual or audio indicator when the digital assistant is not activated (e.g., the state of electronic device 600 remains unchanged). In some embodiments, electronic device 600 remains in the same inactive state that it was in prior to the determination that the gaze information has not satisfied the set of one or more activation criteria.

In FIG. 6A, user 620 starts speaking a portion 624A "Turn . . . " of command 624A-624B "Turn on the table lamp" before the digital assistant is activated. In some embodiments, portion 624A of command 624A-624B is not processed, is cancelled, and/or is ignored by the digital assistant if the digital assistant is not subsequently activated (e.g., within a set (non-zero) duration of time), as further discussed below. In some embodiments, portion 624A of command 624A-624B received by electronic device 600 prior to the digital assistant being activated is processed if the digital assistant is activated (e.g., by user 620 looking at electronic device 600, satisfying the set of one or more activation criteria) prior to completing command 624A-624B (or within the set duration of time), as further discussed below.

As illustrated in FIG. 6B, user 620 is looking at electronic device 600 and electronic device 600 determines that electronic device 600 is in the field of view 606 of user 620. The gaze information, obtained from the camera sensors (e.g., 616A, 616B), satisfies the set of one or more activation criteria.

Figure 6C:
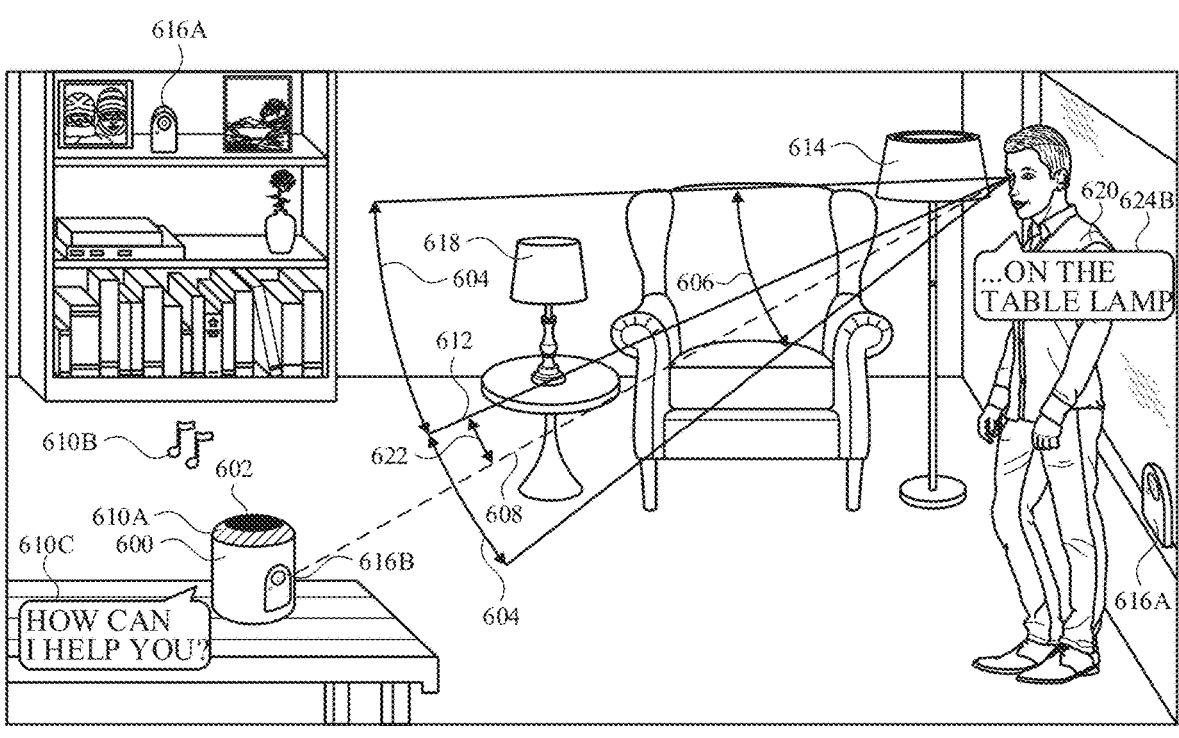

In FIG. 6C, electronic device 600 determines that the gaze information, obtained from the camera sensors (e.g., 616A, 616B), satisfies the set of one or more activation criteria and, in response, activates the digital assistant. Activating the digital assistant optionally includes one or more of: turning on a microphone or speaker, recording audio, and enabling processing of recorded audio for the purpose of performing a spoken command (rather than merely detecting a trigger phrase). Electronic device 600 optionally provides an indication (e.g., via indicator 610A, 610B, or 610C) that the set of one or more activation criteria has been satisfied and/or that the digital assistant has been activated. The indicator is optionally a visual indication 610A, an audio indication 610B, the digital assistant speaking a confirmation 610C, or any combination of the different indicators. Providing visual indication 610A optionally includes one or more of: turning on display 602 of electronic device 600, turning on an LED of electronic device 600, displaying a light of a particular color (e.g., blue or a color other than the default color when the digital assistant is not activated), a light pattern, or a visual output on display 602 of electronic device 600. In some embodiments, visual indicator 610A indicating that the digital assistant is activated is different from the visual indicator 610A indicating when the digital assistant has performed a command or is in an inactive state. For example, the electronic device displays a first color for visual indictor 610A in response to the set of one or more activation conditions being met, displays as second color for visual indicator 610A in response to the digital assistant being activated, displays a third color for visual indicator 610A in response to a determination that the digital assistant has performed a command, and/or displays a fourth color for visual indicator 610A in response to changing the digital assistant to not be activated. An audio indication 610B optionally includes one or more of: playing a sound, phrase, word, or tone. In some embodiments, audio indicator 610B indicating that the digital assistant is activated (or that the set of one or more activation criteria has been met) is different from audio indicator 610B indicating when the digital assistant has performed a command (e.g., 624A) or is in an inactive state. The digital assistant optionally provides a digital assistant voice confirmation 610C (e.g., "How can I help you?") indicating that the digital assistant has been activated or that the set of one or more activation criteria has been met. In some examples, as described in further detail with respect to FIGS. 10A-10D, the electronic device outputs the voice confirmation using a particular voice (e.g., accent, male or female voice) based on the detected user.

In FIG. 6C, subsequent to the electronic device activating the digital assistant and providing indication(s) using display 602, the electronic device detects user 620 finishing speaking the remaining portion 624B " . . . on the table lamp" of command 624C "Turn on the table lamp,". In some embodiments, the electronic device 600 detects user 620 speaking the entire command 624C "turn on the table lamp" after the digital assistant is activated. Optionally, electronic device 600 provides indication 610C in accordance with a determination that the set of one or more activation criteria is met prior to beginning to receive command 624A-624B and electronic device 600 does not provide indication 610C in accordance with a determination that the set of one or more activation criteria is met after (but not prior) to beginning to receive command 624A-624B.

In some embodiments, the electronic device 600 is producing an audio output, such as playing music, at a first volume prior to receiving the remaining portion 624B of command 624A-624B. In some embodiments, in response to electronic device 600 receiving first portion 624A of command 624A-624B, electronic device 600 reduces (ducks) the first volume of the audio output to a second volume that is lower than the first volume, where the second volume is optionally based on the distance between user 620 and electronic device 600. The first volume of the audio output is lowered so that electronic device 600 may better detect the words with reduced interference of background noise. In some embodiments, the first volume is reduced in response to the determination that the set of one or more activation criteria is met. In some embodiments, the amount of volume reduction is based on the distance between user 620 and electronic device 600 at the time first portion 624A of command 624A-624B is received (and not second portion 624B). Electronic device 600 determines the distance between user 620 and electronic device 600 using the external camera sensors 616A and/or the camera sensors 616B on electronic device 600. In some embodiments, electronic device 600 variably reduces the volume of the audio output by muting or lowering the volume of the audio output while detecting that user 620 is speaking. Electronic device 600 restores the volume of the audio output back to the first volume after detecting the end of command 624B. The volume change is not based on the content of the request. In some embodiments, even though electronic device 600 detects user 620 speaking the first portion 624A of command 624A-624B prior to activating the digital assistant, the digital assistant is still able to process the command (including 624A) if a set of one or more performance criteria is met. When the set of one or more performance criteria is met, the digital assistant performs the command based on the content of the request. The set of one or more performance criteria optionally includes one or more of: a command completion criterion, an actionable criterion, and an activation criteria. The command completion criterion is met when electronic device 600 detects the end of a received audio command (e.g., audio user input request). The end of command 624A-24B is determined by electronic device 600 detecting a pause in received audio (or lack of receiving user audio) for more than a non-zero, predetermined period of time. In some embodiments, the command completion criterion is not met when the detected pause is for less than a non-zero, predetermined period of time (e.g., the user is not done speaking the command). An actionable criterion is met when electronic device 600 determines that the received command is actionable (e.g., that the device has authority and/or capability to perform the command). In some examples, if the command is to access information from an account, but the electronic device has not received authorization to access the account, then the command is not actionable because the device does not have authority to access the account. In some examples, the actionable criterion is not met when electronic device 600 is unable to process the received request into a command that the digital assistant can perform or transmit (e.g., command is to "turn on the tv", but there is no tv in the room to which the corresponding instruction could be sent). The activation criteria is met when the digital assistant has been activated.

Figure 6D:
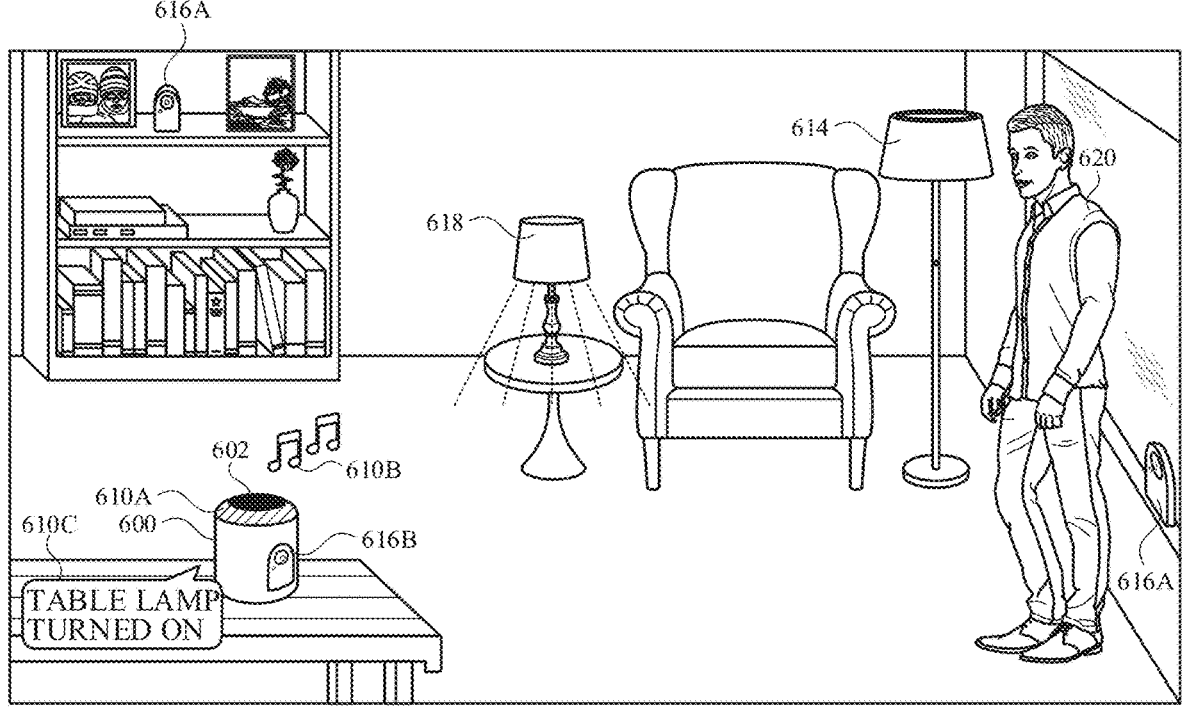

FIG. 6D illustrates that once the set of one or more performance criteria is met while the digital assistant is activated, the digital assistant performs the command. If the digital assistant successfully processes the command and determines that the performance criteria are met, the digital assistant will send an instruction to cause a change in state of an appropriate device. In this example, the instruction is sent to table lamp 618 (an external device) to turn on. In some embodiments, the determination as to which external device to act on is made in accordance with the description of FIGS. 8A-8C, as described in greater detail below. After the digital assistant has performed the command, electronic device 600 optionally provides an indicator (e.g., indicator 610A, 610B, 610C) indicating whether command 624A-624B has been successfully performed. In some embodiments, the indicator is a visual indicator 610A that displays a light of a particular color (e.g., blue or a color other than the default color when the digital assistant is not activated) or a light pattern to indicate that the digital assistant has performed command 624A-624B. In some embodiments, the indicator is an audio indicator 610B that plays a sound, phrase, word, or tone. In some embodiments, the indicator is a confirmation 610C spoken by the digital assistant, which can speak in a particular voice (e.g., accent, male or female voice), such as described with respect to FIGS. 10A-10D, when the digital assistant has performed command 624A-624B. In some embodiments, user 620 may customize the visual, audio, or digital assistant indicators to include values of characteristics (e.g., a user name, particular user preferences for light color, pattern, sound, voice, accent) associated with his/her profile as discussed below with respect to FIGS. 10A-10D. For example, in FIG. 6D, the digital assistant may provide a confirmation, "Jack, the table lamp has been turned on." The name of user 620, is obtained from the user profile of user 620, which user 620 provided during registration, and is determined as discussed below with respect to FIGS. 10A-10D. The registration process is described in detail below with respect to FIGS. 10A-10D and with respect to method 1100. The digital assistant may utilize settings from user 620's profile to further customize the indicator to reflect which user (e.g., Jack) has spoken the command When the set of one or more performance criteria is not met, electronic device 600 forgoes performing the command based on the content of the command. In some examples, the set of one or more performance criteria is not met when the actionable criterion is not met. When the actionable criterion is not met, electronic device 600 optionally produces a headshake indication as illustrated in FIG. 6O, to indicate that the digital assistant is unable to perform the command because it could not process the command, lacks authorization, or is incapable of performing the command. The headshake indication in FIG. 6O comprises a display of lights or a pattern of lights 602A on a first side of the display 602 of electronic device 600 (as shown in 6O-A), followed by a pattern of lights 602B on a second side of the display 602 (as shown in 6O-B), followed by the pattern of lights 602A on the first side of the display 602 (as shown in 6O-C), which simulates a person shaking his/her head. In some embodiments, a particular indicator (e.g., pattern of light, color, or particular sound) is produced by electronic device 600 when the performance criteria is not met. The particular indicator may correspond to a particular error code that indicates why the digital assistant was unable to perform the command (e.g., blue light indicates the command was not understood, purple light indicates lack of authorization). In some embodiments, the indicator produced when the digital assistant is unable to perform the command is different than the indicator produced when the digital assistant is able to perform the command.

Figure 6E:
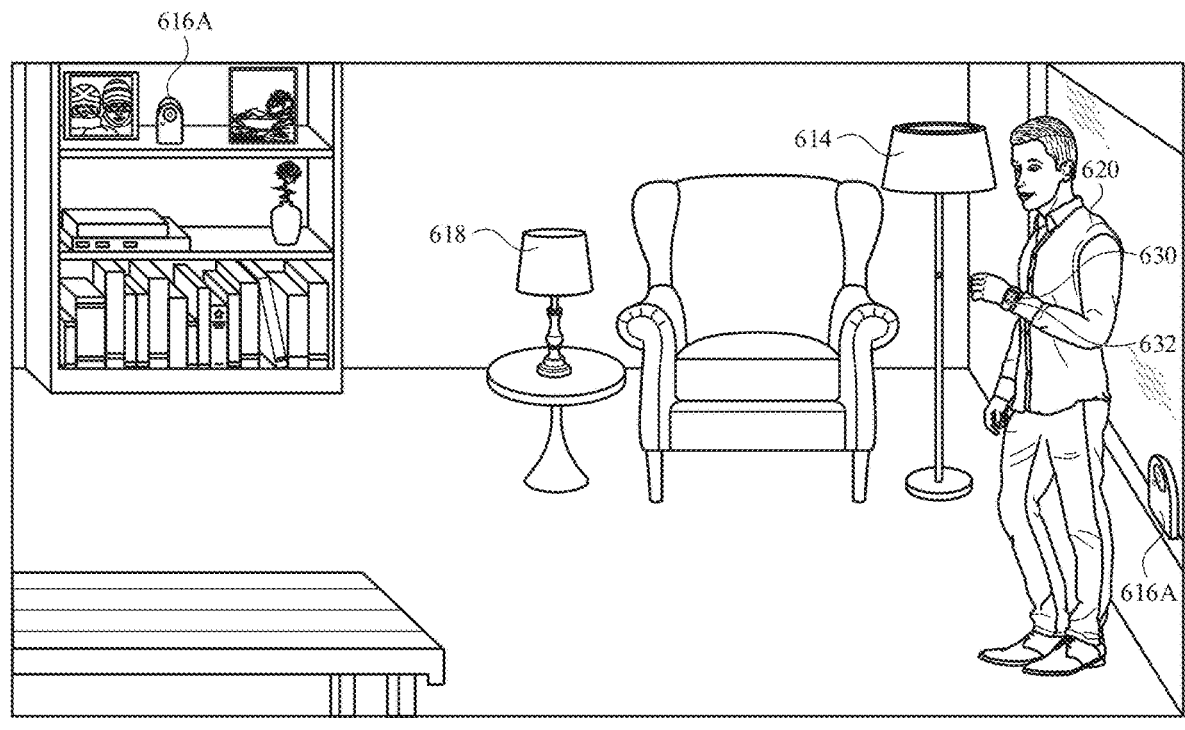
Figure 6F:
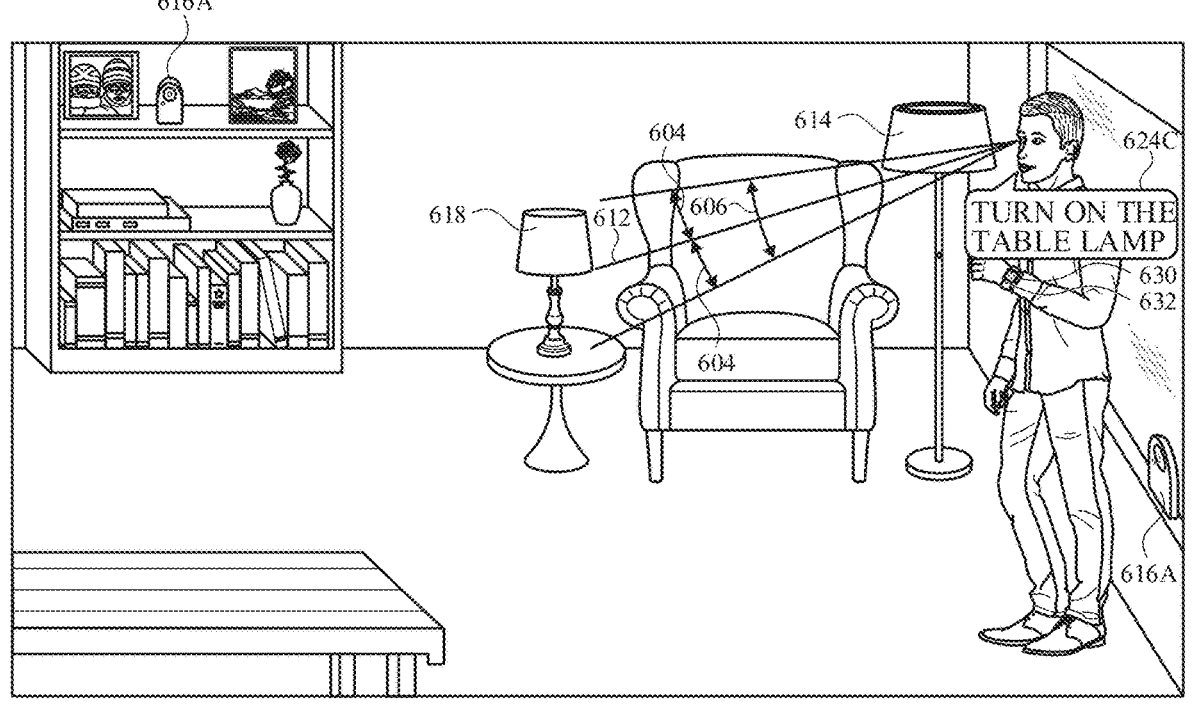
Figure 6G:
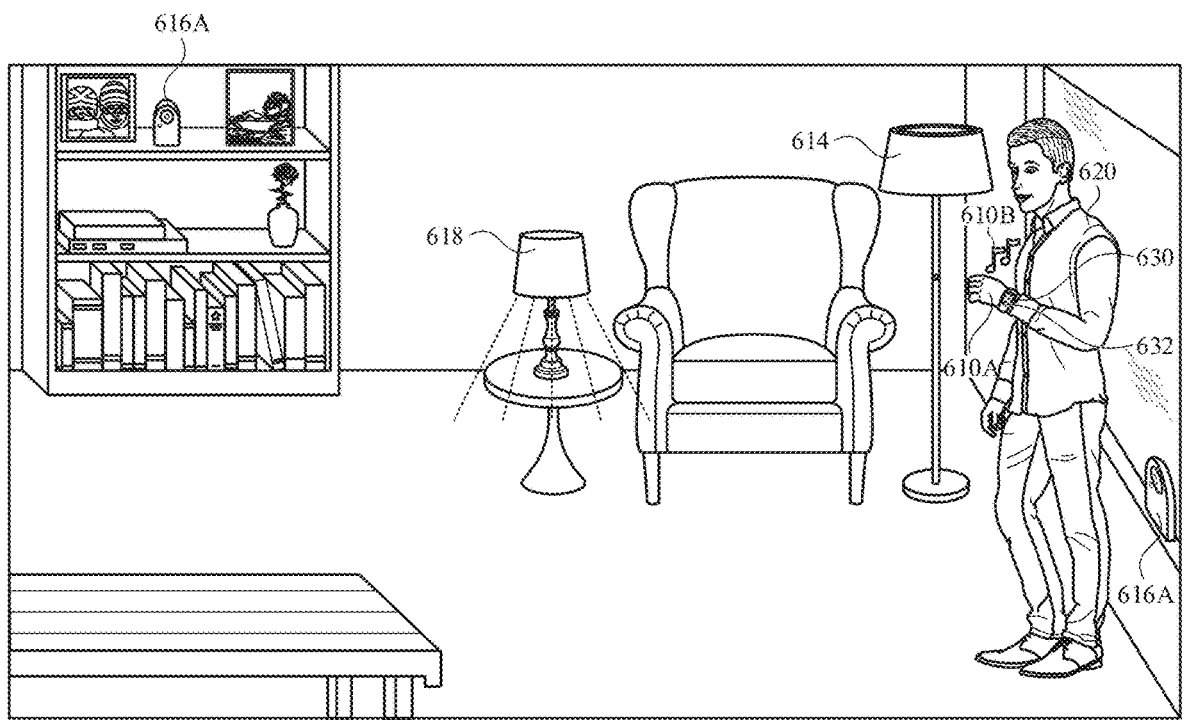

FIGS. 6E-6G illustrate another embodiment where user 620 activates a digital assistant on a wearable or mobile electronic device 630. In FIG. 6E, the digital assistant on electronic device 630 is activated when electronic device 630 detects a user input or gesture such as a wrist raise. In some embodiments, user 620 may also optionally press a button, rotate a crown, or provide audio user input to activate the digital assistant on electronic device 630. Once the digital assistant is activated, electronic device 630 optionally provides a visual indictor 610A (e.g., light), audio indicator 610B (e.g., a sound, tone, word), or digital assistant voice confirmation 610C to indicate that the digital assistant has been activated or that the set of one or more activation criteria are met. The various types of indicators are discussed above with respect to FIG. 6B.

In FIG. 6F, electronic device 630 detects a spoken command comprising command 624C "Turn on the table lamp"

from user 620. After receiving the spoken command, the digital assistant determines whether a set of one or more performance criteria (e.g., an actionable criterion, a command completion criterion, an activation criterion) are met. As discussed above, when one or more performance criteria is met, the digital assistant performs the command based on the content of the audio input request. As illustrated in FIG. 6F, the electronic device optionally also determines whether the user's gaze satisfies a set of one or more gaze criteria to identify an external device upon which to act. The set of one or more gaze criteria are described in further detail, below.

FIG. 6G illustrates electronic device 630 providing an indicator (e.g., 610A, 610B, 610C) that the command was successfully performed in causing the table lamp to turn on from an off state. The indicators displayed upon the successful performance of the command are discussed above with respect to FIG. 6E.

Figure 6H:
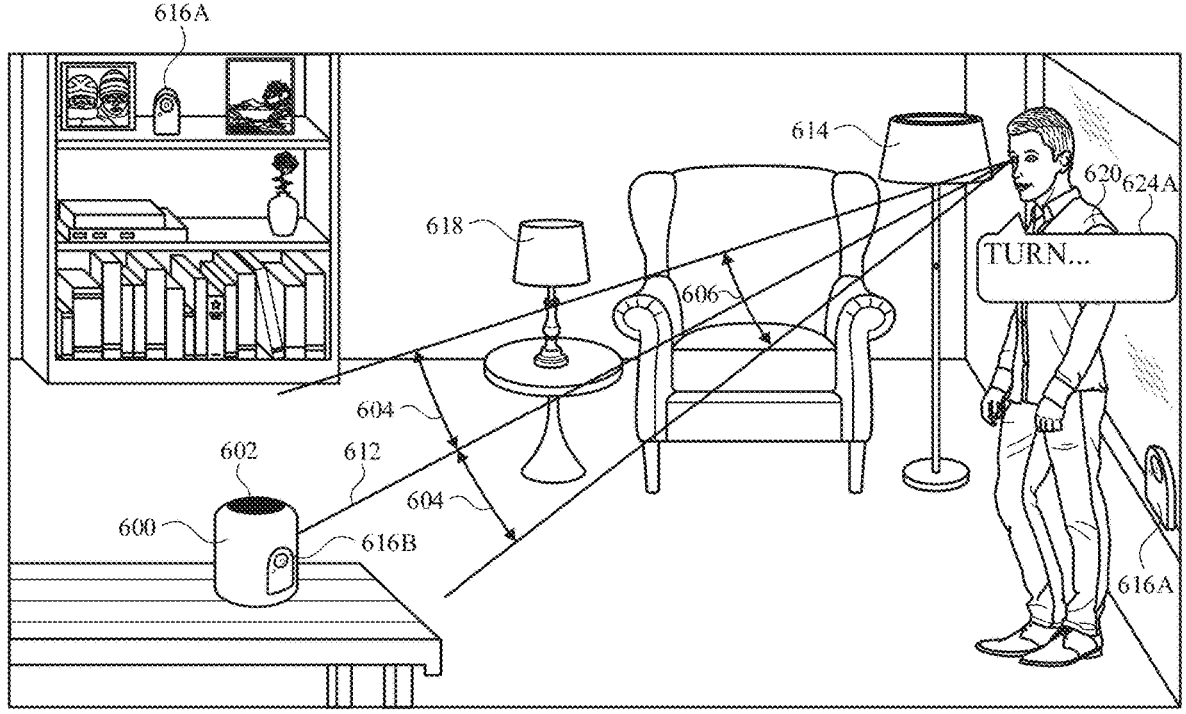
Figure 6I:
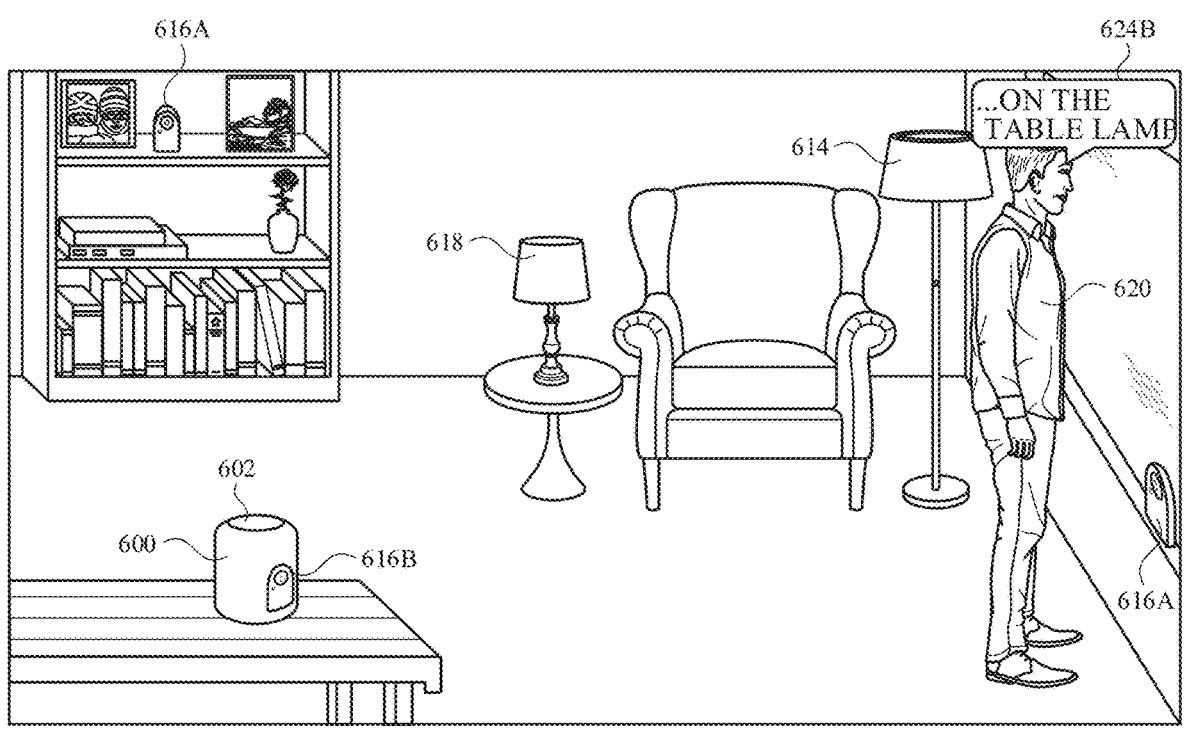
Figure 6J:
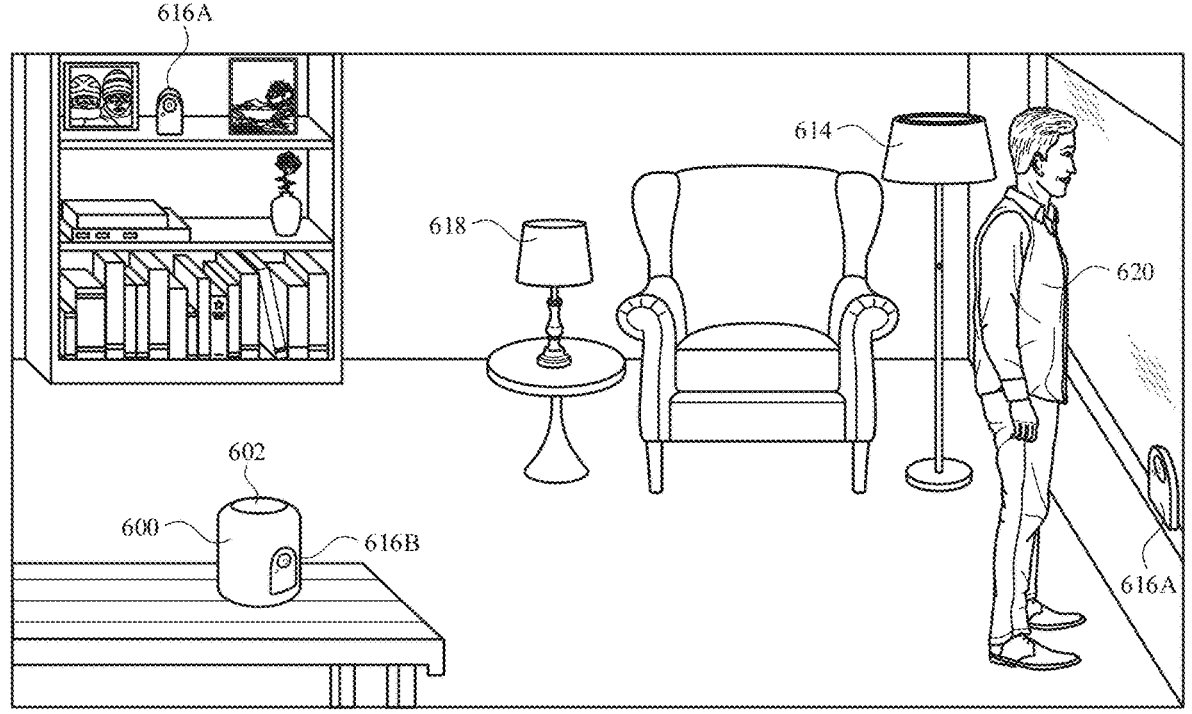

FIGS. 6H-6J illustrate when the digital assistant does not perform the command associated with the spoken command 624A-624B when the set of one or more performance criteria is not met because user 620 has broken his/her gaze while speaking command 642A-624B. The set of one or more performance criteria includes a continuous gaze criterion that is met when electronic device 600 determines that second gaze information (e.g., obtained by electronic device 600 using the one or more camera sensors 616A, 616B (while user 620 is speaking) indicates that user 620 did not break his/her gaze directed at electronic device 600 for more than a threshold duration between the activation of the digital assistant and the completion of speaking command 624A-624B. In some embodiments, the threshold duration is zero, meaning the user cannot break his/her gaze while speaking. In some embodiments, the threshold duration is a non-zero time period, which allows the user to briefly look away without cancelling the command.

In FIG. 6H-6I, user 602 breaks his/her gaze directed at electronic device 600 while speaking command 624A-624B to "turn on the table lamp" while electronic device 600 is activated. As illustrated in FIG. 6H, the electronic device 600 determines that the user 620 is looking at the electronic device while electronic device 600 receives a first portion 624A of command 624A-624B "turn . . . ". In FIG. 6I, electronic device 600 detects a break in the user gaze when user 620 turns 180 degrees to look away from electronic device 600 before having finished speaking the remainder 624B of command 624A-624B " . . . on the table lamp." The user's gaze is broken from electronic device 600 when electronic device 600 determines that the field of view criterion is not satisfied for more than a non-zero, threshold duration (e.g., 3 seconds).

FIG. 6J illustrates that electronic device 600 forgoes performing command 624A-624B to "turn on that light" when the continuous gaze criterion is not met, even when the set of one or more activation criteria has been met (e.g., in FIG. 6H). As a result, table lamp 618 remains off because the digital assistant has not transmitted the instructions to table lamp 618 to turn on. Electronic device 600 optionally produces an indicator (e.g., 610A, 610B, 610C) that indicates that the command has not been performed. In some embodiments, the indicator may be a visual indicator 610A (e.g., colored light or light pattern), an audio indicator 610B (e.g., sound, speech, or a particular voice), or a digital voice confirmation 620C, as discussed above. The indicator (e.g., 610A, 610B, 610C) provided by the electronic device 600 when command 624A-624B is not performed is optionally different than the indicator (e.g., 610A, 610B, 610C) provided by electronic device 600 when command 624A-624B is successfully performed.

Figure 6K:
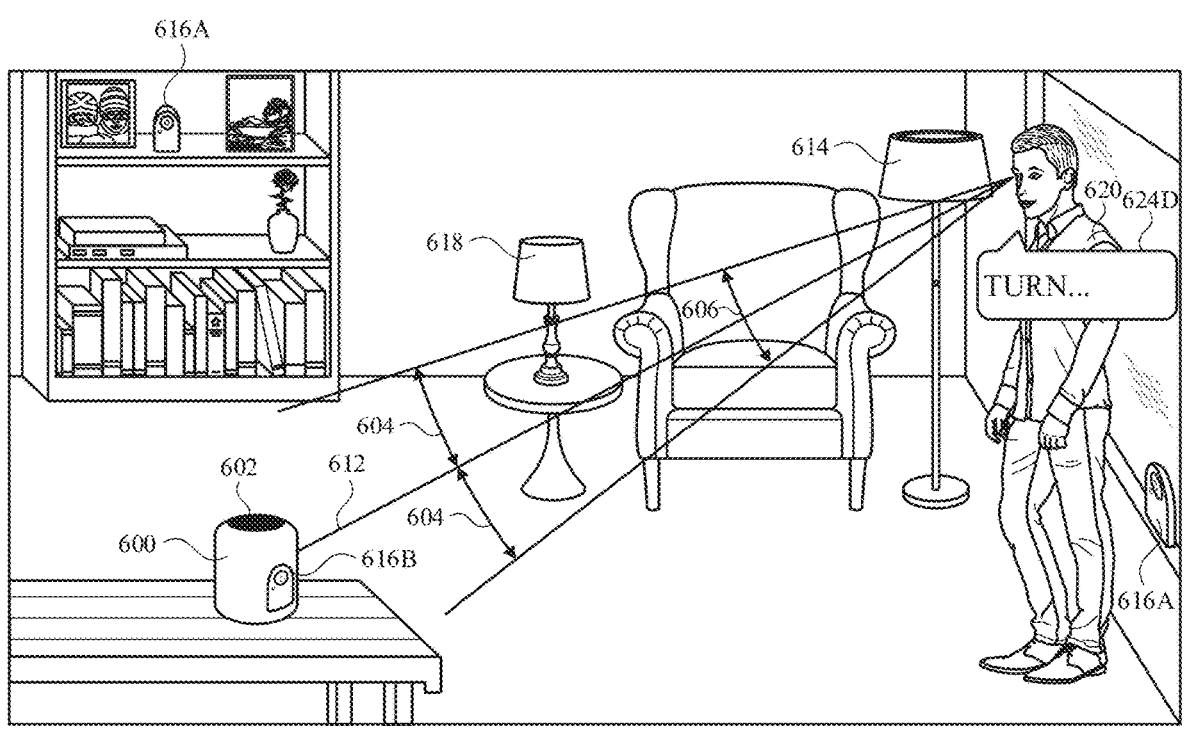
Figure 6L:
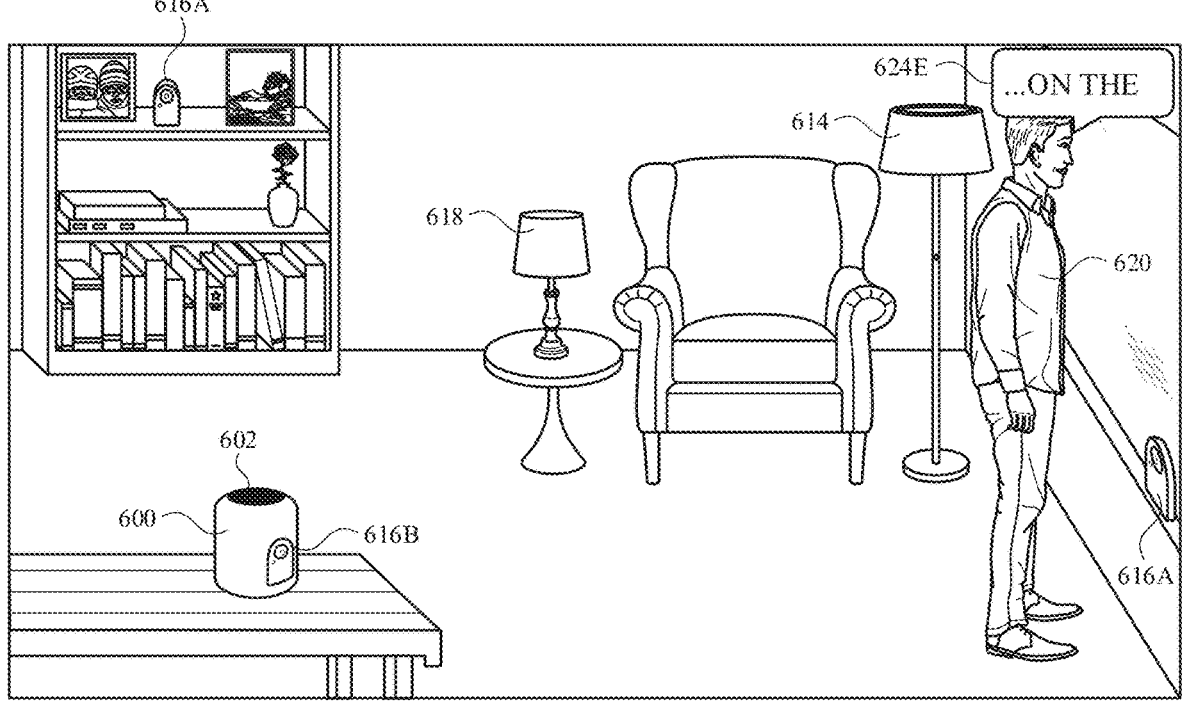

FIGS. 6K-6N illustrate that even if electronic device 600 detects that user 620 breaks his/her gaze directed at electronic device 600 while electronic device receives command 624D-624F (when electronic device 600 is activated), the continuous gaze criterion is still satisfied if the break in the gaze is less than the threshold duration. FIG. 6K illustrates that electronic device 600 has activated the digital assistant and is receiving portion 624D "turn . . . " of command 624D-624F to "turn on the table lamp" from user 620. In FIG. 6L, electronic device 600 continues to receive second portion 624E " . . . on the . . . " of command 624D-624F from user 620, but electronic device 600 detects a break in the user's gaze when the user looks away from electronic device 600.

Figure 6M:
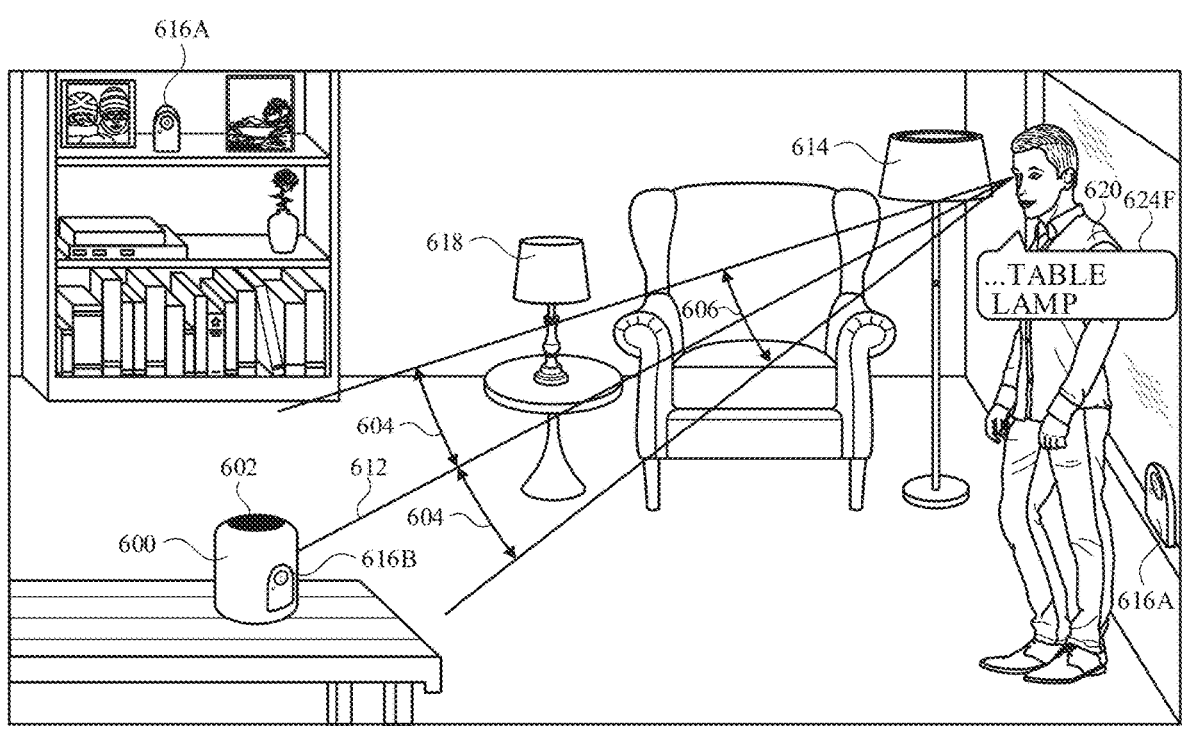
Figure 6N:
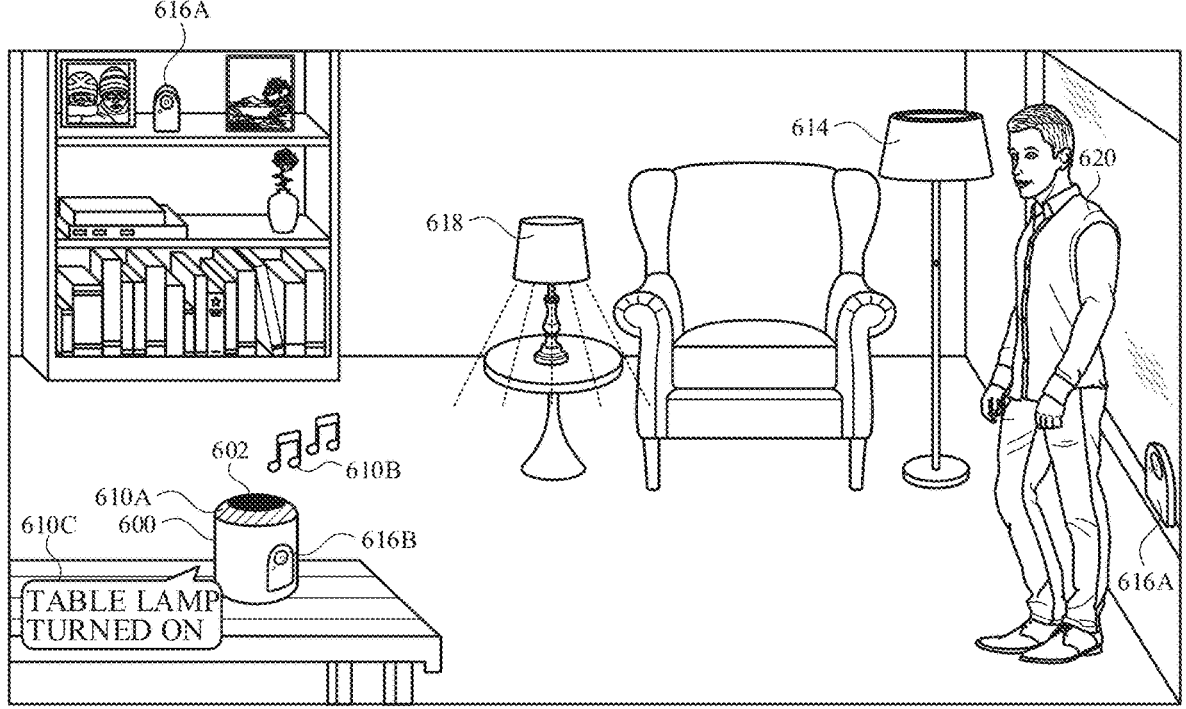
Figure 60:
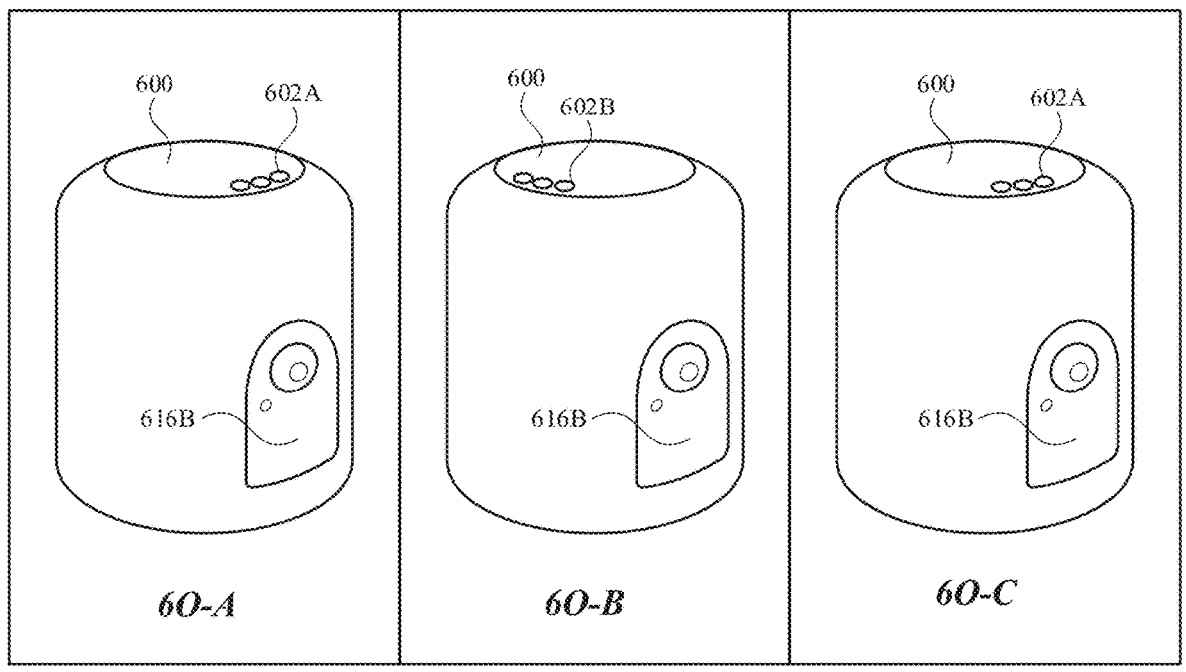

In FIG. 6M, electronic device 600 detects that user 620 has returned his gaze back to electronic device 600 within the threshold duration (e.g., 3 seconds). The electronic device continues to receive last portion 624F " . . . table lamp" of command 624D-624F. Because the break in gaze is for less than the threshold duration, the continuous gaze criterion is still satisfied. In FIG. 6N, when the continuous gaze criterion is satisfied, the digital assistant performs command 624D-624F to "turn on the table lamp" and provides an indication (e.g., visual 610A, audio 610B, and digital assistant confirmation 610C indications) once table lamp 618 has turned on.

FIGS. 7A-7B are flow diagrams illustrating a method for 700 using an electronic device in accordance with some embodiments. Method 700 is performed at an electronic device (e.g., 100, 300, 500, 600, 630, 800, 1000). Some operations in method 700 are, optionally, combined, the orders of some operations are, optionally, changed, and some operations are, optionally, omitted.

As described below, method 700 provides an intuitive way for activating a digital assistant on an electronic device by glancing at the electronic device. The method reduces the cognitive burden on a user when providing user input (e.g., audio input by speaking or touch input via button presses) to activate the digital assistant. In some circumstances, the user is unable to effectively use voice activation (e.g., when the room is noisy) or provide tactile user input (e.g., pressing a button). Therefore, by being able to activate the digital assistant by looking at the electronic device, the user is able to interact with the digital assistant using a more efficient user-device interface.

While a digital assistant of the electronic device (e.g., 600) is not activated (702), the electronic device (e.g., 600) obtains (704), using one or more camera sensors (e.g., cameras 616A, 616B), first gaze information (e.g., of the user 620). For example, the one or more camera sensors are infrared camera sensor(s) and/or visible light sensor(s). For example, the one or more camera sensors are external to the electronic device (e.g., 600), such as by being wirelessly connected to the electronic device.

In accordance with a determination (706) (e.g., while the digital assistant is not activated) that the first gaze information satisfies a set of one or more activation criteria: (e.g., the angle of the gaze is less than a threshold number of degrees relative to a line-of-sight, the gaze is in a particular direction, the duration of the gaze is greater than or equal to a predetermined period of time), the electronic device (e.g., 600) activates (708) the digital assistant of the electronic device (e.g., 600) (e.g., by turning on a microphone, enabling processing of recorded audio).

Using gaze detection to activate the digital assistant when the set of one or more activation criteria is satisfied provides the user with a more efficient user interface for activating a digital assistant, particularly in contexts where the user cannot press a button or use voice controls because the room is too noisy. Providing improved user interfaces to activate the digital assistant without requiring tactile user input (e.g., a button press) or voice input enhances the operability of the digital assistant and makes the user interface of the digital assistant interface more efficient. In addition, using gaze detection reduces the number of user inputs needed to activate the digital assistant to perform commands, which enhances the operability of the electronic device.

In some embodiments, the set of one or more activation criteria includes a field of view criterion that is met when a determined offset angle (e.g., 622) is less than a threshold offset angle (e.g., 604) (e.g., a non-zero degrees value, the maximum acceptable deviation from the user looking directly at the device), wherein the determined offset angle (e.g., 622) is an angle formed between: a line-of-sight (e.g., 612) (e.g., determined from the gaze information) of a gaze of a user (e.g., 620) and a calculated line-of-sight (e.g., 608) from the user (e.g., 620) to the electronic device (e.g., 600).

Using a field of view criterion as an activation criteria allows the user's gaze to be detected without requiring the user (e.g., 620) to look directly at the electronic device (e.g., 600). Instead, as long as the electronic device (e.g., 600) is within a field of view (e.g., 606) of the user's gaze, the user's gaze satisfies the activation criteria, allowing the digital assistant to be activated. Using the field of view criterion allows the digital assistant to be activated via gaze more successfully, which enhances the operability of the digital assistant and makes the gaze detection more efficient (e.g., the digital assistant has a higher activation rate since the electronic device (e.g., 600) does not have to be in the direct line-of-sight (e.g., 612) of the user (e.g., 620)).

In some examples, if the electronic device (e.g., 600) is determined to be positioned more than a threshold number of degrees (e.g., outside the field of view 606 of the gaze), the electronic device (e.g., 600) is not in the user's gaze and the digital assistant is not activated. In some examples, when the electronic device (e.g., 600) is in the field of view (e.g., 606) of the gaze by being within the threshold number of degrees, the digital assistant is activated.

In some embodiments, the line-of-sight (e.g., 612) of the gaze of the user (e.g., 620) is based on a head position of the user (e.g., 620). In some examples, the user's head position may be affected by the tilt or rotation (e.g., yaw, pitch, and roll of the user's head).

In some embodiments, the set of one or more activation criteria includes a dwell time criterion that is satisfied when a dwell time (e.g., duration) of the gaze determined from the first gaze information is more than a threshold period of time (e.g., a non-zero threshold period of time). In some examples, if the dwell time of the gaze is less than a threshold time period, the digital assistant is not activated.

Further in accordance with the determination (706) that the first gaze information satisfies the set of one or more activation criteria, the electronic device (e.g., 600) provides (710) an indication that the set of one or more activation criteria has been satisfied and/or that the digital assistant of the electronic device is in transition or transitioning into being activated.

Providing an indication (e.g., 610A, 610B, 610C) that the set of one or more activation criteria has been satisfied and that the digital assistant is activated provides the user with feedback about the current state of the digital assistant. The indication (e.g., 610A, 610B, 610C) can be visual, audio, or a digital assistant voice confirmation, which provides customizable feedback for various contexts. For example, in contexts where a sound indicator cannot be heard (e.g., a noisy room), providing visual feedback (e.g., 610A) allows the user (e.g., 620) to know whether the digital assistant is activated and can process commands. Providing customized feedback of the state of the digital device enhances the operability of the digital assistant and makes the user-device interface more efficient (e.g., the user (e.g., 620) doesn't issue commands when the digital assistant is not active) by informing the user (e.g., 620) when the digital assistant is available to process commands (e.g., activated) and when it is unavailable (e.g., inactive). Further, the feedback of the state of the digital assistant allows the user (e.g., 620) to use the digital assistant more efficiently.

In some embodiments, the indication (712) is a visual indication (e.g., 610A) (such as the electronic device 600 turning on a display, LED, or light of the electronic device) that indicates that the digital assistant is activated. In some embodiments, the indication (714) is an audio indication (e.g., 610B) (such as electronic device 600 playing a sound through a speaker of the electronic device 600) to indicate that the digital assistant is now activated.

In some embodiments, in accordance with a determination (716) (e.g., while the digital assistant is not activated) that the first gaze information does not satisfy the set of one or more activation criteria: (e.g., electronic device (e.g., 600) is not in the user's field of view (e.g., 606), the gaze is in the wrong direction, the duration of the gaze is less than a predetermined period of time), the electronic device (e.g., 600) forgoes activating the digital assistant. In some embodiments, forgoing activating the digital assistant includes the digital assistant remaining not activated or the electronic device (e.g., 600) not enabling the microphone or processing of recorded audio. In some examples, when the first set of gaze information does not satisfy the set of one or more activation criteria, the electronic device (e.g., 600) also forgoes providing the indicator (e.g., 610A, 610B, 610C) that the set of one or more activation criteria has been satisfied.

In some embodiments, the electronic device (e.g., 600) receives (718) an audio user input request to perform a command (e.g., 624A-624B, 624C). In response to the electronic device (e.g., 600) receiving (720) the audio user input request to perform the command (e.g., 624A-624B, 624C) (or in accordance with the digital assistant interpreting the command (e.g., 624A-624B, 624C)) and in accordance with a determination that a set of one or more performance criteria (e.g., an actionable criterion, a command completion criterion, an activation criterion) is met, the electronic device (e.g., 600) performs (722) the command (e.g., 624A-624B, 624C) based on a content of the audio user input request. In some examples, in response to receiving the audio input request and in accordance with a failure to interpret the command (e.g., 624A-624B, 624C), the electronic device (e.g., 600) forgoes performing the command (e.g., 624A-624B, 624C) and provides an indication (e.g., 610A, 610B, 610C) (e.g., a display of a visual indication, such as a headshake indication) that the electronic device (e.g., 600) did not interpret the command (e.g., 624A-624B, 624C). Thus, the electronic device (e.g., 600) provides an indication (e.g., 610A, 610B, 610C) if the digital assistant doesn't understand the audio input. In some examples, when the digital assistant is not activated, the digital assistant forgoes performing the received command (e.g., 624A-624B, 624C).

In some embodiments, in response to the electronic device (e.g., 600) receiving the audio user input request to perform the command (e.g., 624A-624B, 624C) and in accordance with a determination that the set of one or more performance criteria is not met (e.g., actionable criterion, command completion criterion, activation criterion), the electronic device (e.g., 600) provides a headshake indication. The headshake indication includes the electronic device (e.g., 600) displaying a first pattern of lights on a first side of a display (e.g., 602) of the electronic device (e.g., 600). Subsequent to displaying the first pattern of lights, the electronic device (e.g., 600) displays a second pattern of lights on a second side of the display (e.g., 602) of the electronic device (e.g., 600). Subsequent to displaying the second pattern of lights, the electronic device (e.g., 600) displays the first pattern of lights on the first side of the display (e.g., 602) of the electronic device (e.g., 600).

Providing a visual indication (e.g., 610A) (e.g., a headshake indication (e.g., 602A-602B)) that the set of one or more performance criteria is not met provides the user with feedback that the command issued by the user is unable to be processed. Providing a customizable indication, such as the headshake indication (e.g., 602A-602B), that indicates when the command (e.g., 624A-624B, 624C) will not be processed enhances the operability of the digital assistant and makes the user-device interface more efficient by informing the user (e.g., 602) that the command (e.g., 624A-624B, 624C) will not be performed. In addition, customized indications (e.g., 610A, 610B, 610C) corresponding to error codes provide improved feedback to the user which communicates why the command (e.g., 624A-624B, 624C) was not carried out, which makes the user-device interface more efficient.

In some embodiments, the set of one or more performance criteria includes a completion criterion that is met when the electronic device (e.g., 600) detects the end of a received audio command (e.g., the end of the audio user input request, a pause of audio for more than a predetermined period of time). In some examples, the set of one or more performance criteria includes a actionable criterion that is met when the electronic device (e.g., 600) determines that the received command is actionable (e.g., that the digital assistant has authority and/or capability to perform the command).

In some embodiments, the electronic device (e.g., 600) starts receiving the audio user input request while the digital assistant is not activated. In some examples, the digital assistant is inactive because the gaze information does not yet satisfy the set of one or more activation conditions. This may happen, for example, when the user (e.g., 620) begins speaking the command (e.g., 624A-624B, 624C) before looking at the digital assistant. In some examples, first gaze information satisfies the set of one or more activation criteria and, in response, the digital assistant is activated before the electronic device (e.g., 600) finishes receiving the audio user input request to perform the command.

Being able to receiving the audio user input request before the digital assistant is activated allows the user (e.g., 602) to begin speaking even if the user (e.g., 602) hasn't activated the digital assistant yet. Detecting the audio user input request when the set of activation conditions has not yet been met enhances the operability of the digital assistant and makes the device-user interface more efficient because the activation and speaking of a command (e.g., 624A-624B, 624C) do not have to be performed in order.

In some embodiments, in response to the electronic device (e.g., 600) receiving the audio user input request to perform the command (e.g., 124C) and in accordance with a determination that the set of one or more performance criteria is not met (e.g., various criteria that should be met for the electronic device (e.g., 600) to perform the command (e.g., 624A-624B, 624C)), the electronic device (e.g., 600) forgoes (724) performing the command (e.g., 624A-624B, 624C) based on the content of the audio user input request, wherein the set of one or more performance criteria includes a continuous gaze criterion that is met when the electronic device (e.g., 600) determines that second gaze information (e.g., obtained by the electronic device using the one or more camera sensors) indicates that the user (e.g., 602) does not break a gaze directed at the electronic device (e.g., 600) for more than a threshold duration (e.g., a non-zero duration) between activation of the digital assistant and the completion of the audio user input request. In some examples, the digital assistant does not perform the command (e.g., 624A-624B, 624C) because the user (e.g., 602) breaks their gaze with the device (e.g., user (e.g., 602) looked away before completion of the command, user (e.g., 602) looked away for more than 1 second at a time). In some examples, the threshold duration is 0 seconds. In some examples, the threshold duration is a duration that is non-zero (e.g., 0.5 seconds).

In some embodiments, the electronic device (e.g., 600) produces an audio output (e.g., the electronic device (e.g., 600) is playing a song), wherein the audio output is being produced at a first volume prior to receiving the audio user input request. In response to beginning to receive the audio user input request, the electronic device (e.g., 600) reduces a volume of the audio output to a second volume that is lower than the first volume, wherein the second volume is based on a distance between a user (e.g., the user providing the audio user input request) and the electronic device (e.g., 600). In some examples, the electronic device (e.g., 600) determines a distance between a user (e.g., 602) and the electronic device (e.g., 600) using the external sensors (e.g., 616A) or the sensor (e.g., 616B) on the electronic device (e.g., 600) and determines whether to mute or reduce the volume of the music while the user (e.g., 602) is talking (e.g., variably duck the audio output). In some examples, the electronic device may bring the volume back up to the first volume after detecting the end of the command (e.g., 624C). In some examples, the volume change is not based on the content of the request.

Reducing the audio output volume or muting the audio output when the electronic device receives an audio user input request enables the audio user input request to be more easily processed and results in a higher likelihood that the command (e.g., 624C) derived from the audio user input request will be understood by the electronic device as ambient noise is reduced. Removing possible ambient noise or sounds that could interfere with the command (e.g., 624C) that is processed by the digital assistant enhances the operability of the digital assistant and makes the user-device interface more efficient by enabling a higher accuracy of executing the correct command, which improves the user experience as the user (e.g., 602) doesn't have to repeat the command again when the digital assistant is unable to process the command (e.g., 624C).

Note that details of the processes described above with respect to method 700 (e.g., FIGS. 7A-7B) are also applicable in an analogous manner to the methods described below. For example, method 700 may include one or more of the characteristics of the various methods described below with reference to the processes in FIGS. 9A, 9B, 11A, and 11B. For brevity, these details are not repeated below.

It should be understood that the particular order in which the operations in the following FIGS. 9A-9B and 11A-11B have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of the methods and processes described throughout this description may be incorporated with one another.

FIGS. 8A-8L illustrate exemplary user interfaces for the electronic device to use gaze information to determine the context (e.g., an appliance that the command is directed at) for performing a command once the digital assistant has been activated, in accordance with some embodiments. The techniques illustrated in FIGS. 8A-8L optionally work in conjunction with or include the techniques illustrated in FIGS. 6A-6O, which disclose how the user may activate the digital assistant by looking at the electronic device and issuing commands. Thus, the techniques described below include one or more of the characteristics of the various techniques described above with reference to FIGS. 6A-6O and method 700. The user interfaces in these figures are used to illustrate the processes described below, including the processes in FIGS. 9A-9B.

Figure 8A:
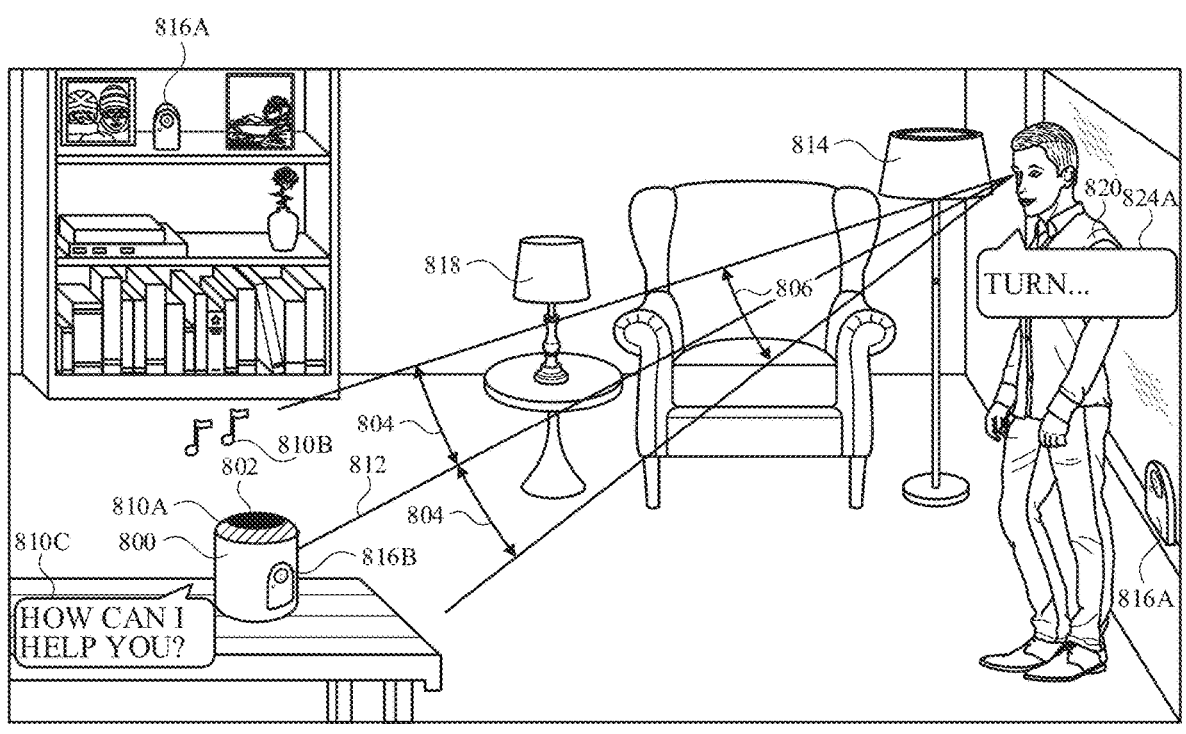
FIGS. 8A-8L illustrate exemplary techniques for providing context to commands using gaze information.
Figure 8B:
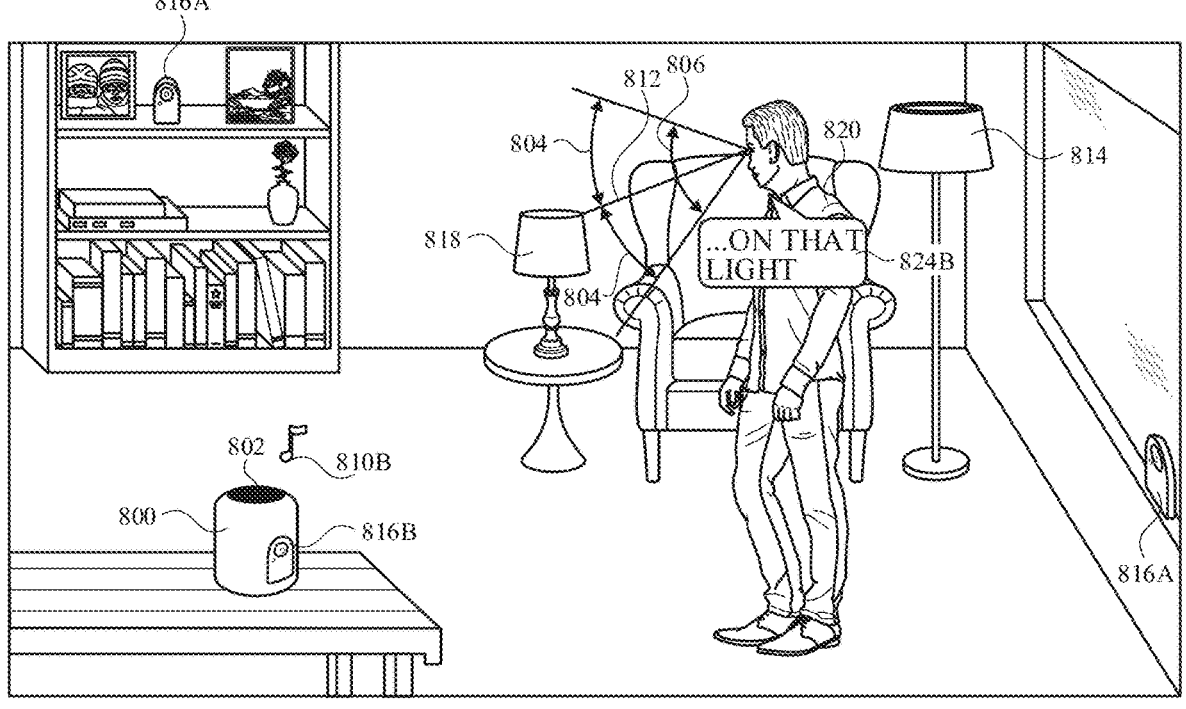
Figure 8C:
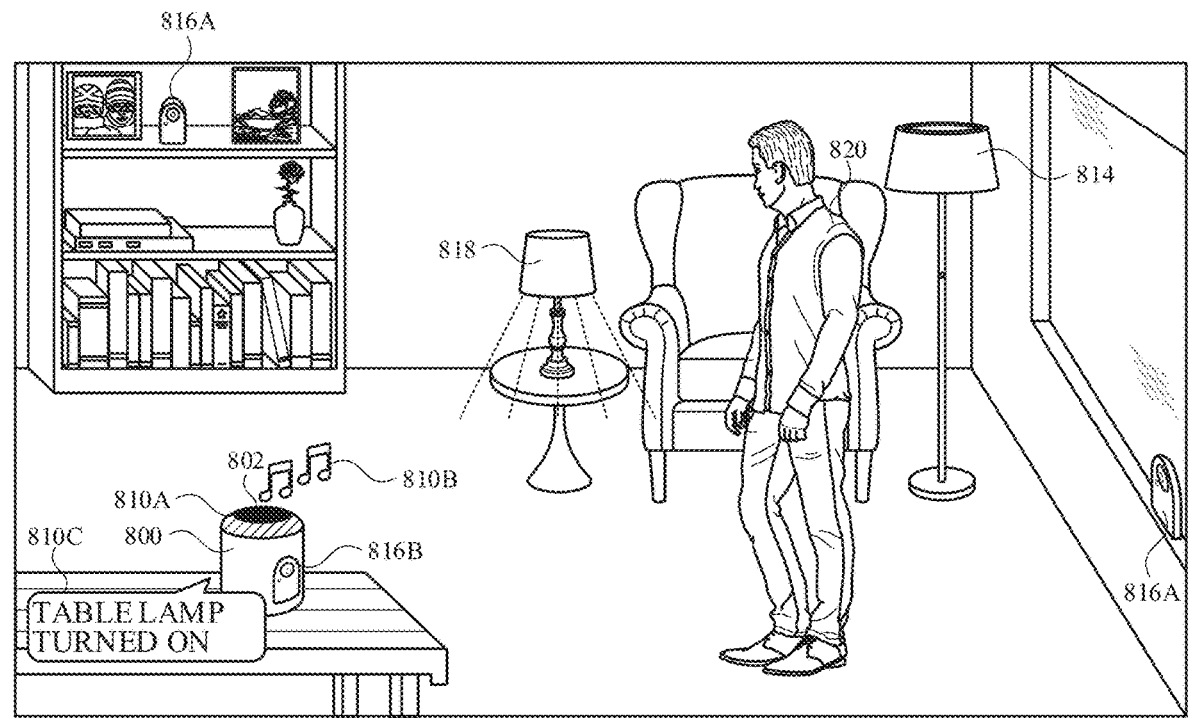

FIGS. 8A-8C illustrate electronic device 800 receiving an audio user input request from user 820 to perform a first command 824A-824B once the digital assistant of electronic device 800 has been activated. The digital assistant is activated based on a trigger word, a gaze (e.g., as discussed above with respect to FIGS. 6A-6O), a button press, a wrist raise (FIG. 6E-6G) while the user is wearing a wearable electronic device (e.g., a watch), and/or detecting an external device (e.g., a phone) being pointed at the electronic device 800. The electronic device (e.g., 800) optionally provides a visual or audio indication 810A-810B to indicate that the digital assistant is activated.

In FIG. 8A, user 820 is standing in a room with a table lamp 818 and a floor lamp 814. The digital assistant of electronic device 800 has been activated based on the electronic device 800 determining that the set of one or more activation criteria have been satisfied with respect to method 700 as discussed above (e.g., device 800 determines that user 820 is looking at device 800). Once the digital assistant is activated, the electronic device detects user 820 speaking a portion 824A "turn . . . " of the full command 824A-824B. In some embodiments, the complete command 824A-824B is applicable to the multiple external devices (e.g., table lamp 818, floor lamp 814) that may be in the room. In some embodiments, the user's command 824A-824B does not include enough detail for the digital assistant to determine which external device (e.g., table lamp 818, floor lamp 814) the command 824A-824B is directed to. Therefore, based on the command 824A-824B alone, the electronic device 800 is unable to determine whether "that light" refers to table lamp 818 or floor lamp 814.

In FIG. 8B, user 820 indicates which external device (e.g., light) he/she wants to act on (e.g., turn on) by looking at table lamp 818, while finishing the remaining portion 824B " . . . on that light" of command 824A-824B "turn on that light." The electronic device receives and uses gaze information based on the user's gaze, while the user 820 is speaking, to determine that table lamp 818 is the intended device, when the user's gaze satisfies a set of one or more gaze criteria. Electronic device 800 obtains information relating to the user's gaze through the one or more camera sensors that may be located on external devices 816A and/or is integrated with electronic device 800 at camera 816B. Cameras 816A are wirelessly connected to electronic device 600, though they could alternatively be wired. The one or more camera sensors include infrared camera sensors and/or visible light sensors and measure gaze information once a gaze has been detected. The gaze information optionally includes one or more of: the position of the user's head position, the dwell time or duration of the gaze, the direction of the gaze, the field of view 806 of the gaze, the direction of the gaze, and whether an object (e.g., electronic device 800 or an external device (e.g., lamps 814, 818) is within the field of view 806 of the gaze (e.g., external device is within a threshold offset angle 804 from a user's line-of-sight 812).

In some embodiments, electronic device 800 determines that the set of one or more gaze criteria is met when a direction criterion, a dwell time criterion, and/or a field of view criterion is met. The set of one or more gaze criteria optionally includes a direction criterion that is satisfied when the gaze is directed in the direction of table lamp 818.

The set of one or more gaze criteria optionally includes a dwell time criterion that is satisfied when electronic device 800 detects a dwell time or duration of the gaze in the direction of table lamp 818 for greater than a non-zero, predetermined period of time (e.g., two seconds, a threshold time period). In some examples, electronic device 800 utilizes the dwell time to determine whether user 820 is looking at table lamp 818 in order to determine which external object to act upon (e.g., to send the instruction to). If the dwell time or duration of the gaze is too short or less than the threshold time period, this indicates that the user does not intend the particular external device (e.g., table lamp 818) to be the target device of the command 824A-824B. In some embodiments, a dwell time less than the threshold time period does not satisfy the gaze criteria, resulting in the command 824A-824B not being transmitted to the particular external device identified by electronic device 800. In some embodiments, a dwell time less than the threshold time period results in electronic device 800 not identifying any external device.

The set of one or more gaze criteria optionally includes a field of view criterion. The field of view criterion is satisfied for a particular external device when an external device, such as table lamp 818, is determined to be in field of view 806 of user 820. Table lamp 818 is determined to be in field of view 806 of user 820 when table lamp 818 is within a threshold offset angle 804 from a user's line-of-sight 812. Using the field of view to determine whether a user is looking at a target external device (e.g., table lamp 818, floor lamp 814) results in a higher gaze detection rate as a gaze may be detected in the field of view even if the user is not looking directly at the target device. In some embodiments, the field of view criterion is satisfied for table lamp 818 when table lamp 818 is directly in the line-of-sight 812 of user 820. In some embodiments, the field of view criterion is satisfied for a particular external device when a determined offset angle of the gaze is less than the threshold offset angle 804 to the external device (e.g., the maximum acceptable deviation from a line-of-sight 812 of user 820 looking directly at table lamp 818). The threshold offset angle 804 is greater than zero degrees (e.g., thirty degrees). The determined offset angle is calculated based on the angle formed between a line-of-sight 812 from a gaze of user 820 and a calculated line-of-sight from user 820 to electronic device 800. In the example of FIG. 8B, user 820 is looking directly at table lamp 818. In some examples, when table lamp 818 is in the field of view of the gaze by being within the threshold number of degrees from the user's direct line-of-sight, the field of view criterion is met for table lamp 818 and electronic device 800 optionally transmits the instructions to table lamp 818. When the offset angle is greater than threshold offset angle 804, the field of view criterion is not satisfied resulting in the digital assistant not transmitting the instructions to table lamp 818, which is outside the field of view 806 of user 820. In some embodiments, if table lamp 818 is determined to be positioned more than a threshold number of degrees outside the field of view 808 of user 820, table lamp 818 is determined to not be in the user's gaze and electronic device 800 does not transmit the instructions to table lamp 818. In some embodiments, line-of-sight 812 is measured based on the head position of the user. In some embodiments, the head position of the user is based on the tilt or rotation (e.g., yaw, pitch, and/or roll) of the user's head. Aspects of these techniques are illustrated and described in further detail above with respect to FIGS. 6B-6C.

Electronic device 800 optionally provides an indication (e.g., indicators 810A, 810B, 810C) when the set of one or more gaze criteria is met for table lamp 818. The indication optionally indicates that the command 824A-824B from the received audio user input request is associated with or is directed to the table lamp 818. The indication may be a visual 810A or audio 810B indicator that indicates that the digital assistant has identified table lamp 818 based on the user's gaze. In some embodiments, the indicator is a visual indicator 810A that displays a light of a particular color (e.g., blue or a color other than the default color when table lamp 818 is identified) or a light pattern to indicate that the digital assistant has identified table lamp 818 based on the user's gaze. In some embodiments, the indicator is an audio indicator 810B that plays a sound, word, tone, or speaks in a particular voice (e.g., accent, male or female voice) when the digital assistant has identified table lamp 818. In some embodiments, the digital assistant provides an audio confirmation ("turning on the table lamp") to indicate that electronic device 800 has identified the external device to act on (e.g., to turn on).

In FIG. 8C, when the electronic device determines that the set of one or more gaze criteria is met for table lamp 818, the digital assistant transmits instructions to act on the command. For example, the electronic device determines that the command is to perform a function "turn on" and that the function should be directed at a particular device—the table lamp 818. Accordingly, the electronic device transmits an instruction (e.g., to table lamp 818 or to another device that controls table lamp 818) to turn the table light from an off state to an on state. In some embodiments, the digital assistant transmits instructions that causes an external device to change tasks as a result of transitioning from a first state to a second state. For example, the digital assistant may transmit instructions that causes an external device (e.g., a computer or phone) to transition from a first state to a second state when the external device changes a song, transitions from performing one task to another (e.g., playing music to providing the weather), or transitions from an inactive state to an active state, and vice versa.

As illustrated in FIG. 8C, when there are multiple external devices (e.g., table lamp 818, floor lamp 814) in the room (or accessible by electronic device 800), electronic device 800 is able to differentiate between the multiple external devices and only transmits instructions to the intended external device (e.g., table lamp 818, floor lamp 814). Electronic device 800 identifies the intended external device (e.g., table lamp 818, floor lamp 814) by determining whether the set of one or more gaze criteria is met for a particular external device (e.g., table lamp 818, floor lamp 814). In other words, electronic device 800 uses the gaze information to determine which external device (e.g., table lamp 818, floor lamp 814) the user is looking at, when the set of one or more gaze criteria is satisfied. In some embodiments, when electronic device 800 transmits the instructions (e.g. "turn on") to the identified first external device, table lamp 818, a second external device, floor lamp 814 in the room remains unaffected because floor lamp 814 is not the external device identified by the gaze information. Floor lamp 814 (the second external device) may be in an on state or an off state. For example, in FIG. 8C, the instructions are transmitted to table lamp 818 causing table lamp 818 to turn on, but the instructions are not transmitted to floor lamp 814, which remains off (floor lamp 814 was previously in the off state). Thus the transmitted instruction does not cause floor lamp 814 to change state. In some embodiments, when user 820 glances at floor lamp 814 instead of table lamp 818, the set of one or more gaze criteria is met by floor lamp 814, instead of table lamp 818. Accordingly, the digital assistant transmits the instructions to floor lamp 814, while table lamp 818 remains unaffected (e.g., table lamp 818 remains on if it was previously on, and remains off if it was previously off).

When the digital assistant has transmitted the instructions to the corresponding external device, electronic device 800 optionally provides an indicator (e.g., indicator 810A, 810B, 810C) indicating that the table lamp 818, has transitioned from a first state to a second state. In some embodiments, the indicator is a visual indicator 810A that displays a light of a particular color (e.g., blue or a color other than the default color) or a light pattern to indicate that table lamp 818 has turned on, from the off state, as a result of receiving the instructions. In some embodiments, the indicator is an audio indicator 810B that is a sound, one or more words, or a tone. In some embodiments, the indicator is an audio confirmation 810C from the digital assistant, such as "Ok, Jack, the table lamp is on." The user may customize the indicators to include characteristics (e.g., a user name, particular user preferences for light color, pattern, sound, voice, accent) associated with the user's profile, which user 820 provided during registration. The registration process is described in detail below with respect to FIGS. 10A-10D and method 1100. The digital assistant customizes the indicator to reflect which user (e.g., Jack) was recognized, as discussed below with respect to FIGS. 10A-10D and method 1100. In some embodiments, electronic device 800 provides the indicator (e.g., 810A, 810B, 810C) when the digital assistant has successfully sent instructions to table lamp 818, regardless of whether table lamp 818 actually turned on. In some embodiments, electronic device 800 provides the indicator (e.g., 810A, 810B, 810C) in response to a determination that table lamp 818 has turned on. Optionally, electronic device 800 provides a different indicator (e.g., 810A, 810B, 810C) when table lamp 818 was unable to execute the command to "turn on" and remains off. In some embodiments, the electronic device 800 may provide a different indicator (e.g., 810A, 810B, 810C) to indicate a particular error code when the command 824A-824B was unsuccessfully executed.

The indicators (e.g., 810A, 810B, 810C) are optionally domain (e.g., music) specific. In some embodiments, the electronic device 800 determines that the command refers to an action in a particular domain (e.g., "Love that song" command in the music domain). In accordance with a determination that the command is of a first domain (e.g., music), the indication is a first type of indication (e.g., a particular set of sounds or light indictors). In accordance with a determination that the command is of a second domain (e.g., e-mail) different from the first domain, the indication is a second type of indication (e.g., a different set of sounds or light indicators) different from the first type of indication. Having different indicators (e.g., 810A, 810B, 810C) for different domains allows the user to easily recognize when a command was executed successfully versus when a command failed to execute.

Figure 8D:
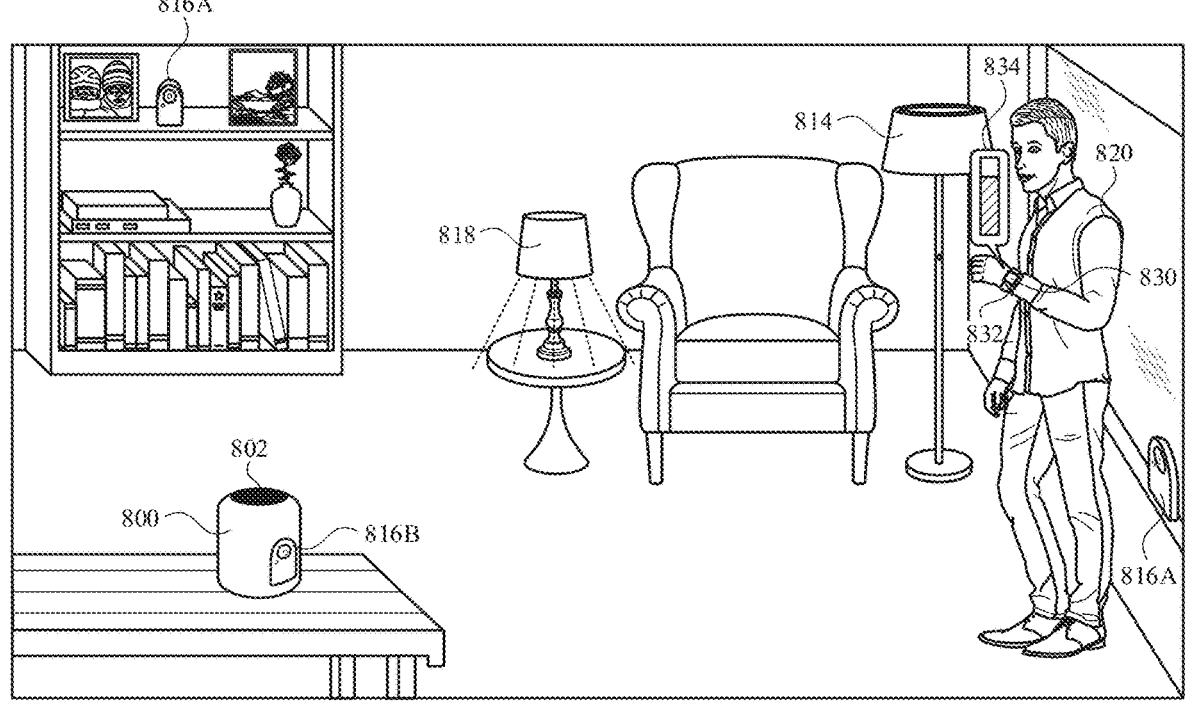

FIG. 8D illustrates that once the digital assistant has transmitted the instruction to turn on table lamp 818, user 820 may further change a setting of the external device (e.g., the brightness of the lamp) by providing an input at a second external device (e.g., by rotating the crown 832 of a watch 830 that user 820 is wearing). Watch 830 does not have access to contextual information about which external device to control. Instead, the user merely uses the crown 832 of watch 830 as an extended input mechanism to control the lamp. Watch 830 detects the user input and sends an indication of the user input to electronic device 800. Electronic device 800 receives the indication of the user input and determines that table lamp 818 is the intended external device (e.g., table lamp 818, floor lamp 814) that should receive the instructions. In FIG. 8D, user 820 turns the crown 842 to increase the brightness of the table lamp 818 to a brightness of 80. In some examples, electronic device 800 determines that table lamp 818 is the intended external device based on the recency of electronic device 800 having transmitted instructions to table lamp 818 based on user 820's actions. In some embodiments, the electronic device 800 transmits the instructions (based on the user input at watch 830) to the most recent device (e.g., table lamp 818) that the electronic device 800 instructed. For example, if the electronic device 800 had just instructed the computer to play music, then the user turning the crown 842 on the watch 840, results in electronic device 800 transmitting instructions to the computer to increase (or decrease) the volume of the computer. In some embodiments, electronic device 800 is paired to table lamp 818. In some embodiments, the electronic device 800 detects that user 820 is wearing watch 840 while watch 840 is paired with the electronic device 800. In some embodiments, watch 840 is (also) paired with the table lamp 818. Once electronic device 800 has sent instructions to table lamp 818, electronic device 800 provides an indicator (e.g., 810A, 810B, 810C) to indicate that the instructions were successfully sent. In some embodiments, electronic device 800 provides a different indicator (e.g., 810A, 810B, 810C) indicating that the instructions were not successfully sent to table lamp 818.

Figure 8E:
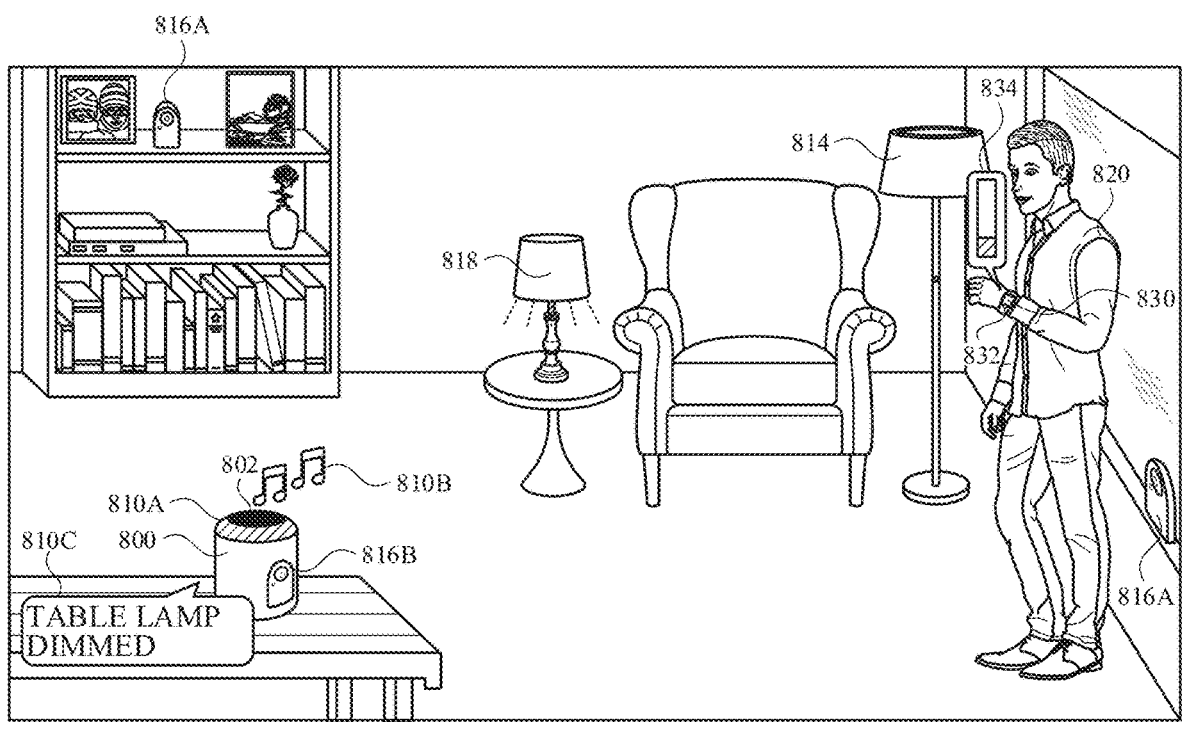

FIG. 8E illustrates the electronic device 800 receiving an additional indication of user input from watch 830 to dim the light of table lamp 818 to a lower brightness, which corresponds to an amount of rotation of crown 832 by user 820. In response to receiving the indication of the input from watch 830, electronic device 800 transmits an instruction to table lamp 818 to dim the lights from a brightness of 80 to a reduced brightness of 20, based on the recency of having instructed table lamp 818 to turn on. In some embodiments, user 820 uses watch 830 to directly control table lamp 818 once table lamp 818 has been turned on without having to provide additional commands to the digital assistant. Once electronic device 800 has sent instructions to table lamp 818, electronic device 800 provides an indicator (e.g., 810A, 810B, 810C) to indicate that the instructions were successfully sent. In some embodiments, electronic device 800 provides a different indicator (e.g., 810A, 810B, 810C) indicating that the instructions were not successfully sent to table lamp 818.

Figure 8F:
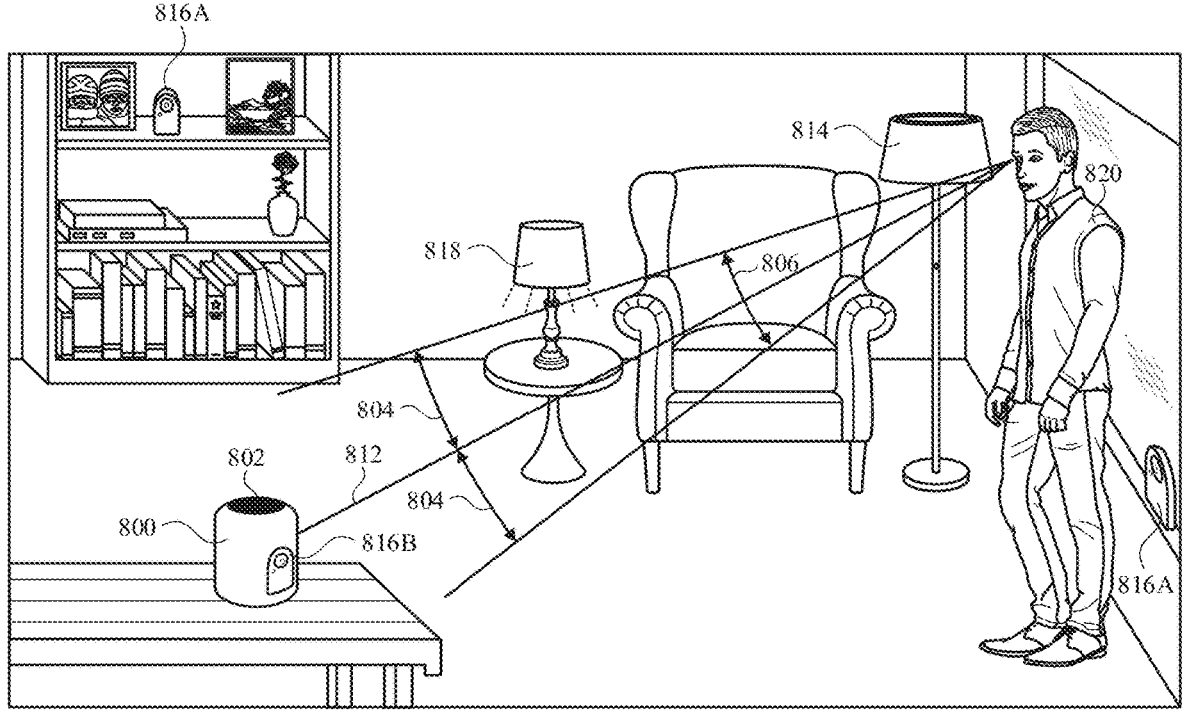
Figure 8G:
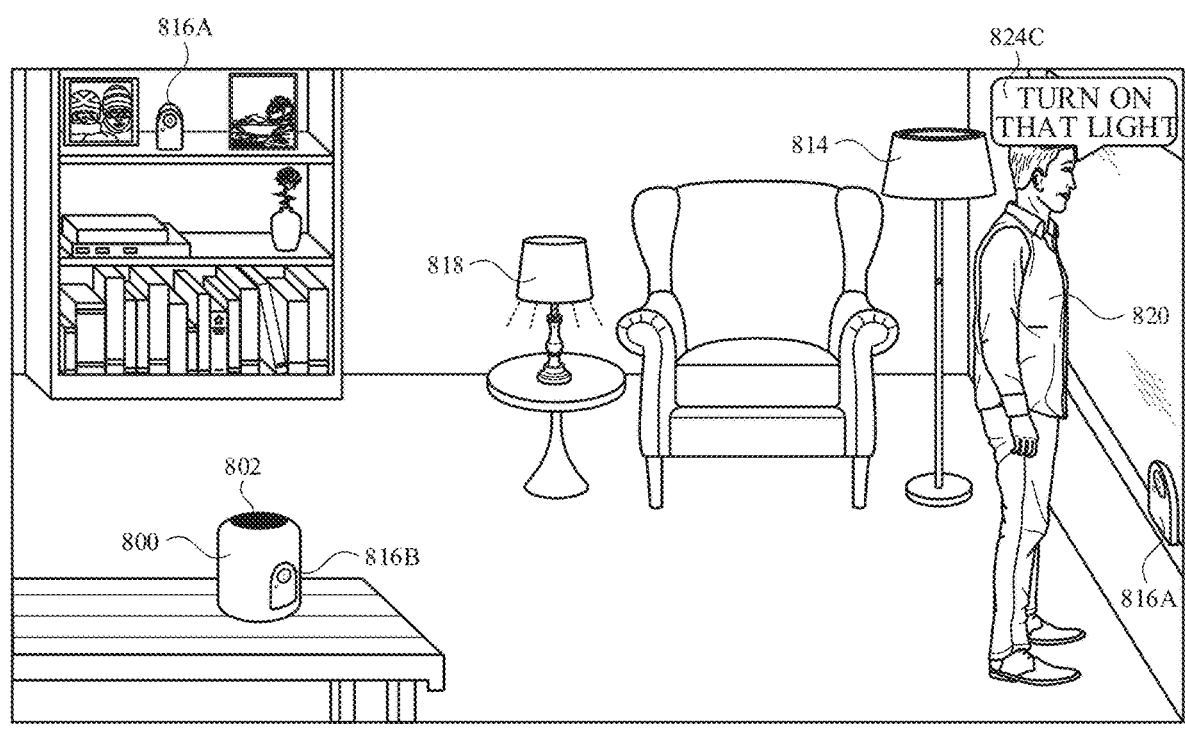
Figure 8H:
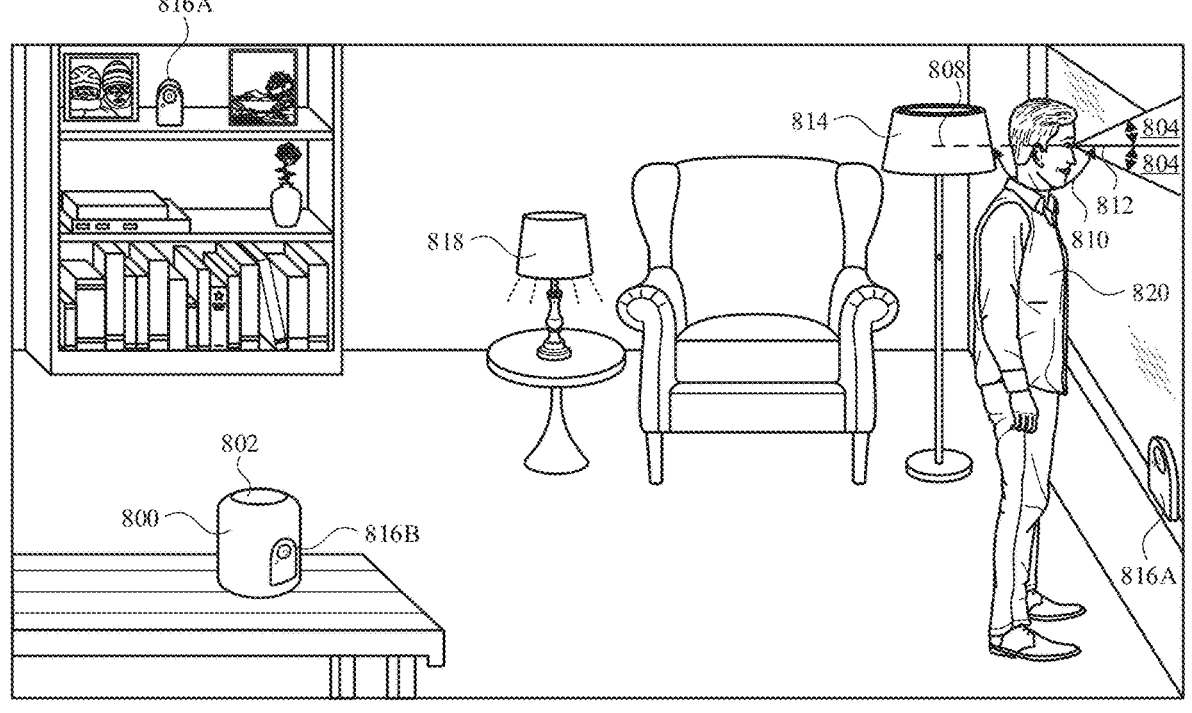

In some embodiments, as illustrated in FIGS. 8F-8H, when there are multiple external devices (e.g., floor lamp 814, table lamp 818) in the room, electronic device 800 uses the user's gaze information to identify a particular external device as the intended external device based on the user's gaze. Electronic device 800 identifies the intended external device by determining whether the set of one or more gaze criteria is met for the particular external device based on the gaze information. When the set of one or more gaze criteria is not satisfied for any external device, electronic device 800 forgoes transmitting the instruction because electronic device 800 is unable to determine the external device from the gaze information. As a result, the external devices in the room remain in their original states.

FIG. 8F illustrates electronic device 800 detecting gaze information of user 820 and, in accordance with a determination that the set of one or more activation criteria has been satisfied (e.g., as discussed above with respect to FIGS. 6A-6D), the electronic device activates the digital assistant. The electronic device may optionally provide a visual indicator 810A (e.g., turning on display 802), audio indicator 810B, or a digital voice confirmation 810C to indicate that the digital assistant is activated.

FIG. 8G illustrates a table lamp 818 that is initially on and floor lamp 814 that is initially off. Electronic device 800 detects user 820 speaking a second command 824C to "turn on that light." However, user 820 does not look at floor lamp 814, which is the intended external device of command 826C. Electronic device 800 obtains second gaze information through the one or more camera sensors 816A that may be located on external devices and/or is integrated with electronic device 800 at camera 816B. The second gaze information optionally includes one or more of: the position of the user's head position, the dwell time or duration of the gaze, the direction of the gaze, the field of view 806 of the gaze, the direction of the gaze, and whether floor lamp 814 is within the field of view 806 of the gaze.

In FIG. 8H, electronic device 800 determines that the second gaze information obtained from the one or more camera sensors 816 does not meet the set of one or more gaze criteria. As discussed above, the set of one or more gaze criteria optionally includes a direction criterion that is satisfied for floor lamp 814 when the gaze is directed in the direction of floor lamp 814. The set of one or more gaze criteria optionally includes a dwell time criterion that is satisfied for floor lamp 814 when electronic device 800 detects a dwell time or duration of the gaze in the direction of floor lamp 814 for greater than a predetermined period of time (e.g., a non-zero threshold, two seconds). The set of one or more gaze criteria optionally includes a field of view criterion. The field of view criterion is satisfied for floor lamp 814 when floor lamp 814 is determined to be in field of view 808 of user 820. FIGS. 8G-8H illustrates that floor lamp 814 and table lamp 818 are not determined to be in field of view 808 of user 820 because the determined offset angles is greater than the threshold offset angle from user 820's line-of-sight 812. The threshold offset angle 804 is greater than zero degrees (e.g., thirty degrees). When the set of one or more gaze criteria is not met because one or more of a duration criterion, dwell time criterion, and/or field of view criterion are not met for any external device, electronic device 800 is unable to determine which external device (floor lamp 814, table lamp 818) user 820 intends to act on (e.g., to turned on).

FIG. 8H illustrates that because the set of one or more gaze criteria was not met for any external device, electronic device 800 forgoes transmitting the instruction "turn on that light" to transition the external device, floor lamp 814 or table lamp 818, from the first state (e.g., off) to the second state (e.g., on). As a result, floor lamp 814 remains off and table lamp 818 remains off, which was the initial states of the external devices prior to electronic device 800 detecting user 820 speaking the command 824C. For example, table lamp 818 remains in its on state because no instructions have been sent to table lamp 818 to change its initially on state.

Electronic device 800 optionally produces a particular indicator (e.g., 810A, 810B, 810C) (e.g., a sequence of lights such as a headshake indication (e.g., FIG. 6O or sounds) to indicate that electronic device 800 did not transmit the instructions because it could not identify the floor lamp 814 (or any other device) as the intended external device based on the gaze information of user 820. In some embodiments, a particular indicator (e.g., pattern of light, color, or particular sound) may correspond to a particular error code for why the digital assistant was unable to determine the external device associated with command 824C. The indicator produced when the digital assistant is unable to transmit the instructions is optionally different than the indicator produced when the digital assistant is able to transmit the instruction. In some embodiments, no indicator is produced when the digital assistant does not transmit the instructions associated with command 824C.

Figure 8I:
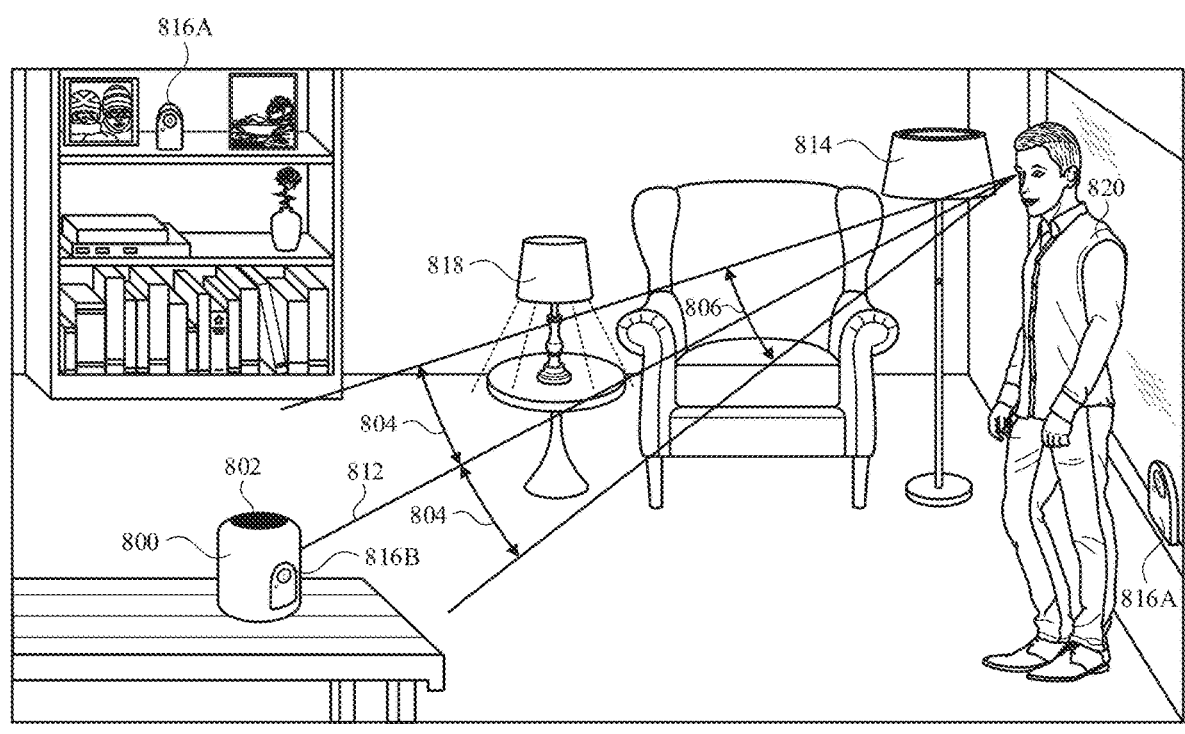

FIG. 8I illustrates another embodiment where there are multiple external devices (e.g., floor lamp 814 and table lamp 818) in the room and paired to electronic device 800. In this example, the digital assistant has been activated by user 820's glance. In other examples, the digital assistant is activated by a word, a glance, or by a button press, as discussed above. As shown in FIG. 8I, prior to the user speaking command 824A-824B in FIGS. 8J-8L, table lamp 818 is already in an on state, while floor lamp 814 is in an off state.

Figure 8J:
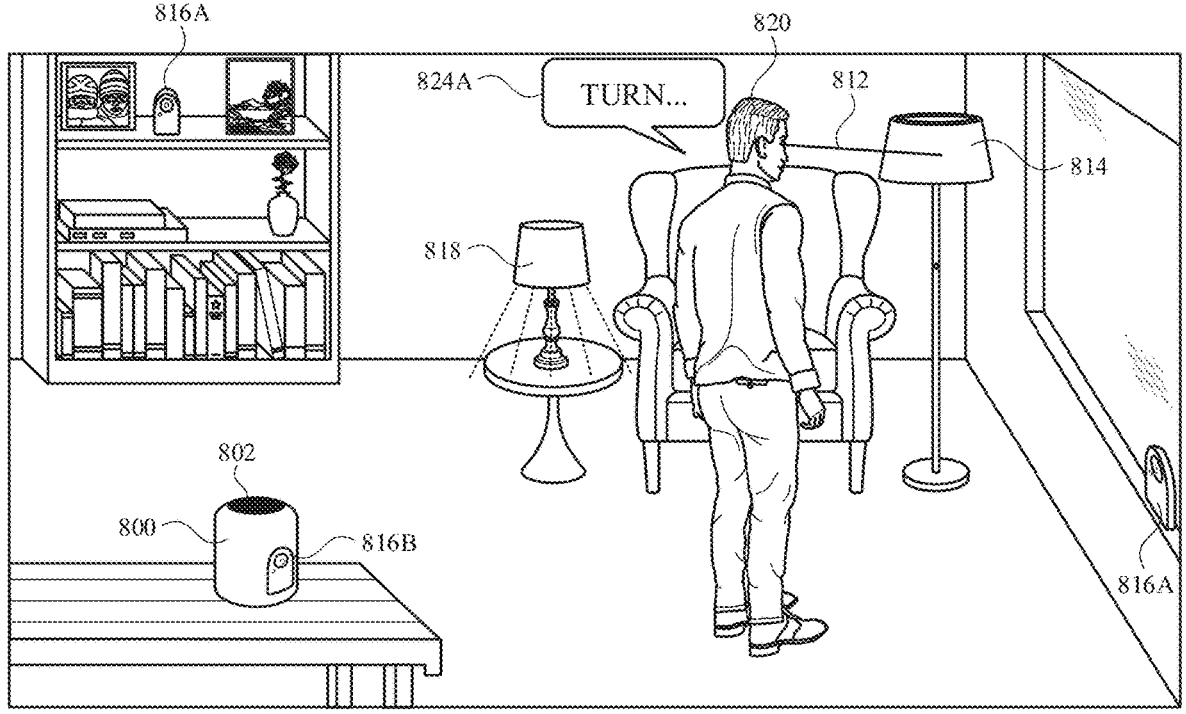

In FIG. 8J, electronic device 800 detects user 820 speak a portion 824A, "Turn . . . ", of a second command 824A-824B to "turn on that light" while detecting that user 820 is looking at floor lamp 814. At FIG. 8J, electronic device 800 obtains second gaze information based on the user's glance at floor lamp 814 through the one or more camera sensors 816A that may be located on external devices and/or is integrated with electronic device 800 at camera 816B. The second gaze information optionally includes one or more of: the position of the user's head position, the dwell time or duration of the gaze, the direction of the gaze, the field of view of the gaze, the direction of the gaze, and whether floor lamp 814 is within the field of view of the gaze based on an offset angle.

Electronic device 800 determines whether the second gaze information obtained from the one or more camera sensors 816A-816B satisfies a set of one or more gaze criteria. When the set of one or more gaze criteria is met for floor lamp 814, electronic device 800 is able to determine that user 820 intended the second command 824A-824B to be applied to floor lamp 814. As discussed above, the set of one or more gaze criteria optionally includes a direction criterion that is satisfied for floor lamp 814 when the gaze is directed in the direction of floor lamp 814. The set of one or more gaze criteria optionally includes a dwell time criterion that is satisfied when electronic device 800 detects a dwell time or duration of the gaze in the direction of floor lamp 814 for greater than a non-zero, predetermined period of time (e.g., two seconds). The set of one or more gaze criteria optionally includes a field of view criteria. The field of view criterion is satisfied when external device, floor lamp 814, is determined to be in field of view 808 of user 820. Floor lamp 814 is determined to be in field of view 808 of user 820 when floor lamp 814 is within a threshold offset angle 804 from a user's line of-sight 812. In some embodiments, the field of view criterion is satisfied when floor lamp 814 is directly in the line-of-sight 812 of user 820, as shown in FIG. 8J. In some embodiments, a field of view criterion is satisfied when a determined offset angle of the gaze is less than the threshold offset angle (e.g., the maximum acceptable deviation from a line-of-sight 812 of user 820 looking directly at floor lamp 814). The threshold offset angle 804 is optionally greater than zero degrees (e.g., thirty degrees). The determined offset angle is calculated based on the angle formed between a line-of-sight 812 from a gaze of user 820 and a calculated line-of-sight 808 from user 820 to electronic device 800. In some examples, when floor lamp 814 is in the field of view of the gaze by being within the threshold number of degrees from the user's direct line-of-sight 812, the field of view criterion is met for floor lamp 814.

Figure 8K:
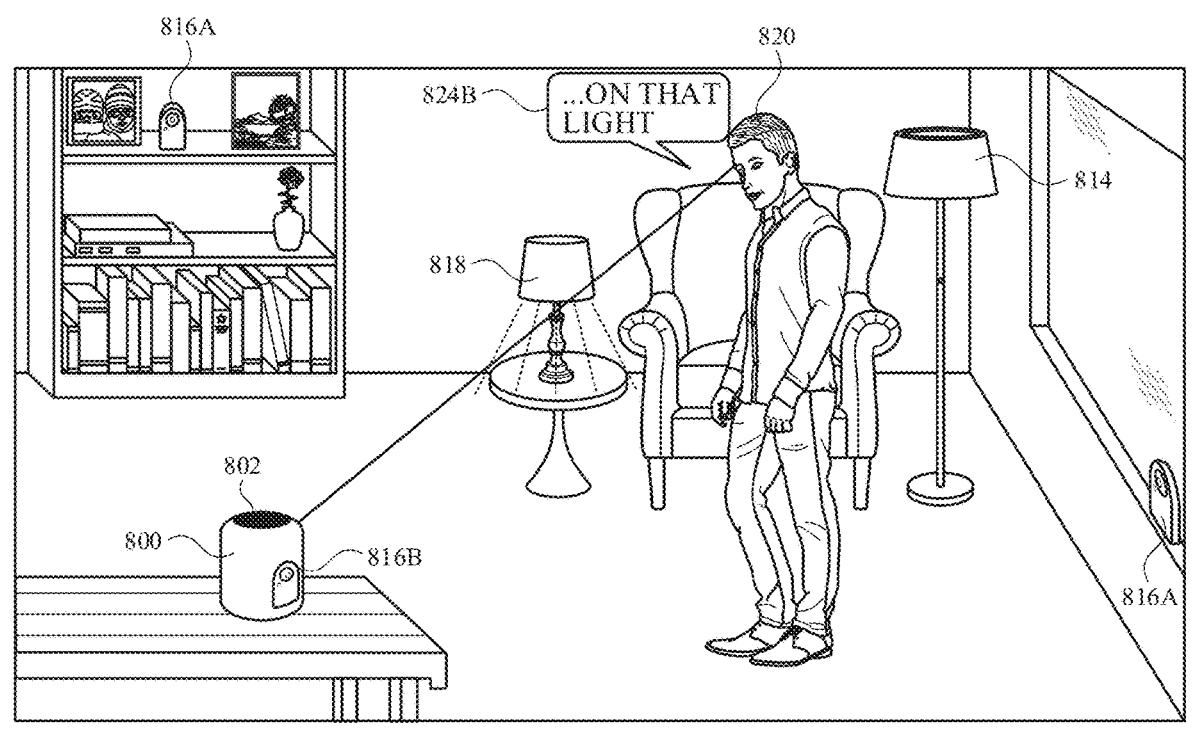

In some embodiments, as shown in FIG. 8K, user 820 breaks his gaze at the floor lamp 814 while speaking the remaining portion 824B of the second command 824A-824B. FIG. 8K illustrates electronic device 800 detecting that user 820 is looking away from floor lamp 814, thereby breaking his gaze with floor lamp 814 while speaking the second portion 824B of second command 824A-824B. In some embodiments, when electronic device 800 has already determined that floor lamp 814 is the intended external device prior to user 820 looking away, the set of one or more gaze criteria is still met even though user 820 has broken his/her gaze prior to completing second command 824A-824B. In some embodiments, if electronic device 800 detects that user 820 returns his gaze back to floor lamp 814 within a threshold duration, prior to completing command 824A-824B (e.g., FIGS. 6E-6G) electronic device 800 still identifies the floor lamp 814 as the external device.

Figure 8L:
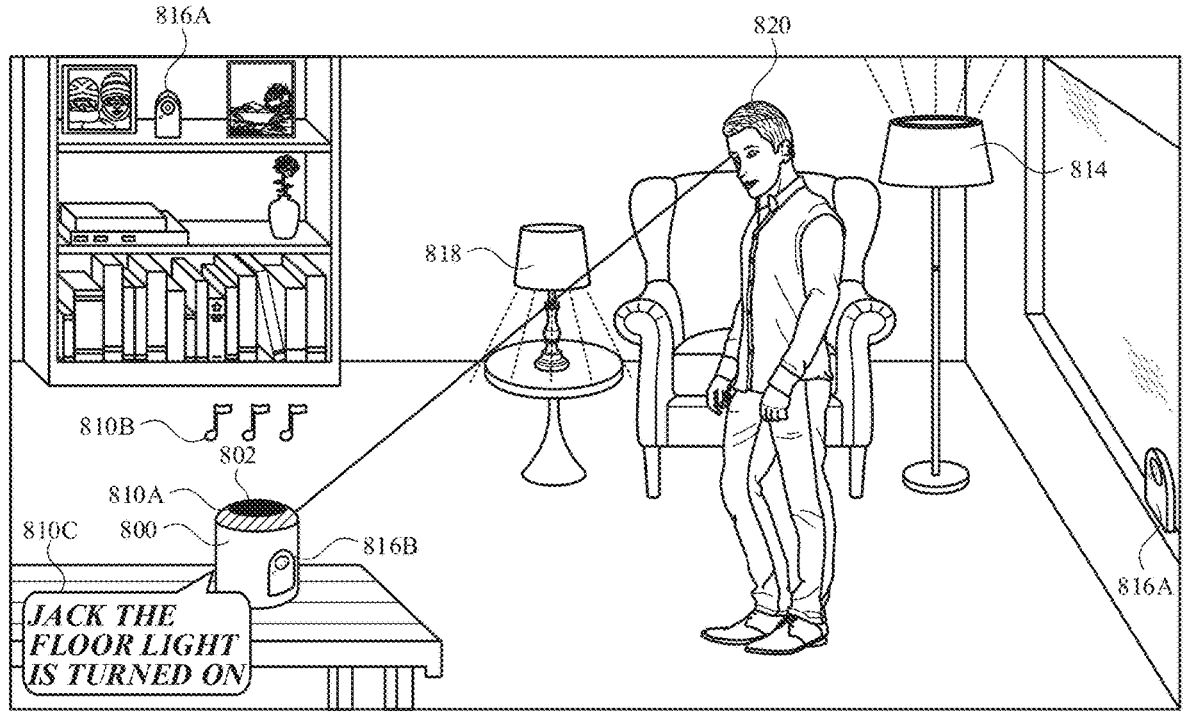

When the set of one or more gaze criteria is met, the electronic device transmits the instruction to floor lamp 814, causing floor lamp 814 to transition from an off state to an on state, as shown in FIG. 8L. Table lamp 818 remains in the prior on state, because table lamp 818 does not meet the set of one or more gaze criteria, and therefore, the electronic device does not transmit instructions for changing the state of the table lamp 818. In some embodiments, if the command 824C received by electronic device 800 was determined to be directed to floor lamp 814 and included "turn off that light," when the set of one or more gaze criteria is met for floor lamp 814, electronic device 800 would transmit instructions to turn off floor lamp 814, while table lamp 818 that was previously in the on state would remain on.

FIG. 8L illustrates when electronic device 800 has transmitted the instruction to floor lamp 814, electronic device 800 optionally provides an indicator (e.g., indicator 810A, 810B, 810C) indicating that floor lamp 814 has transitioned from an off state to an on state. In some embodiments, the indicator is a visual indicator 810A that displays a light of a particular color (e.g., blue or a color other than the default color) or a light pattern to indicate that table lamp 818 has turned on, from the off state, as a result of receiving the instructions. In some embodiments, the indicator is an audio indicator 810B that plays a sound, one or more words, or a tone. In some embodiments, the digital assistant speaks a confirmation 810C. In some embodiments, user 820 may customize the audio and visual indicators to include characteristics (e.g., a user name, particular user preferences for light color, pattern, sound, voice, accent) associated with his/her user profile. In FIG. 8K, the digital assistant provides an audio indicator, "Jack, floor lamp turned on." The audio indicator provides a confirmation that the instruction was executed. The audio indicator also includes the name of user 820, which was obtained from the user profile of user 820, which user 820 provided during registration. The registration process is described in detail below with respect to FIGS. 10A-10D. The digital assistant may utilize settings from user 820's profile to further customize the indicator to reflect which user (e.g., Jack) has spoken the command. In some embodiments, electronic device 800 provides the indicator when the electronic device has successfully sent instructions to "turn on" to floor lamp 814, regardless of whether floor lamp 814 actually turned on. Optionally, electronic device 800 provides a different indicator when floor lamp 814 was unable to execute the command to "turn on" and remains off. In some embodiments, the indictor when the command 824C was unsuccessfully executed includes different indicators for different error codes.

FIGS. 9A-9B are flow diagrams illustrating a method for 900 using an electronic device in accordance with some embodiments. Method 900 is performed at an electronic device (e.g., 100, 300, 500, 600, 640, 800, 1000). Some operations in method 900 are, optionally, combined, the orders of some operations are, optionally, changed, and some operations are, optionally, omitted.

As described below, method 900 provides an intuitive way for the user (e.g., 820) to provide context for an audio user input request to a digital assistant on an electronic device (e.g., 800) by glancing at the external device (e.g., 814, 818) that the audio user input request is intended to operate on. The method reduces the cognitive burden on a user (e.g., 820) when providing audio user input request (e.g., having to remember to say the external device in the command) to the digital assistant. Therefore, the digital assistant is able to determine the external device (e.g., 814, 818) for the command by monitoring the gaze of the user (e.g., 820).

While a first external device (e.g., 818) is in a first state (902) (e.g., the first external device (e.g., 818) is on or off, the first external device (e.g., 818) is playing a particular media item) the electronic device (e.g., 800) receives (904) an audio user input request (e.g., a user speech input) to perform a first command (e.g., 824A-824B) (e.g., to transition the external device to a second state, telling the digital assistant to "turn on that light"). In some embodiments, the electronic device receive (904) the audio user input request while the digital assistant on the electronic device (e.g., 800) is active (e.g., based on a trigger word, gaze, and/or button press).

While the first external device (e.g., 818) is in the first state (902), the electronic device obtains (906), using one or more camera sensors (e.g., 816A, 816B) (e.g., infrared camera sensor(s), visible light sensor(s)); from camera(s) external to the electronic device (e.g., 800) such as wirelessly connected to the electronic device or part of the electronic device (e.g., 800)), first gaze information (e.g., the electronic device (e.g., 800) detects gaze information that is directed at the first external device (e.g., 818)). In some examples, the electronic device (e.g., 800) determines, using the first gaze information, whether a set of one or more gaze criteria is met for a particular external device.

In accordance with a determination (908) (and, optionally, in response to the electronic device (e.g., 800) receiving the audio user input request), using the first gaze information, that a set of one or more gaze criteria is met for the first external device (e.g., 818) (e.g., appliance such as a lamp, tv, or computer): the electronic device (e.g., 800) transmits (910) (e.g., to the first external device (e.g., 818)), based on the first command, an instruction to transition the first external device (e.g., 818) from the first state to a second state (e.g., the digital assistant performs an action on the external device (e.g., 818) by causing the external device (e.g., 818) to transition from an ON state to an OFF state or from an OFF state to an ON state).

Using gaze detection to determine which external device (e.g., 814, 818) is associated with the command (e.g., 824A-824B) when the set of one or more gaze criteria is satisfied provides the user with a more efficient user interface for providing context to the digital assistant simply by looking at the external device (e.g., 814, 818) without having to answer follow up questions from the digital assistant to clarify which external device (e.g., 814, 818) is intended. Providing improved user interfaces to provide context to a command (e.g., 824A-824B) to the digital assistant without the digital assistant having to interact with the user to obtain more information makes the user interface of the digital assistant interface more efficient. In addition, using gaze detection reduces the number of inputs needed to activate the digital assistant to perform commands (e.g., 824A-824B), which enhances the operability of the digital assistant.

In some embodiments, in accordance with the determination that the set of one or more gaze criteria is met for the first external device (e.g., 818) (e.g., angle, duration, and direction of gaze), the electronic device (e.g., 800) provides (912) an indication (e.g., 810A, 810B, 810c) (e.g., visual or audio indication) that the set of one or more gaze criteria is met (e.g., indicating that the first command (e.g., 824A-824B) is associated with the first external device (e.g., 818)).

Providing an indication that the set of one or more gaze criteria has been satisfied and that the digital assistant has successfully transmitted the instructions to the external device (e.g., 800) provides the user with feedback about whether the command (e.g., 824A-824B) was executed. The indication (e.g., 810A, 810B, 810C) can be visual, audio, or a digital assistant voice confirmation, which provides customizable feedback for various contexts. For example, in contexts where sound cannot be heard (e.g., a noisy room), providing visual feedback allows the user to know whether the digital assistant has transmitted the command (e.g., 824C). Providing customized feedback of the state of the digital device enhances the operability of the digital assistant and makes the user-device interface more efficient (e.g., the user doesn't have to repeat the command because the user is not sure if it was carried out by the digital assistant) by informing the user when the digital assistant has successfully transmitted the command to the external device. Further, the feedback of the state of the digital assistant allows the user to use the device more quickly and efficiently.

In some embodiments, the indication (e.g., 810A, 810B, 810C) (e.g., visual or audio indication) is domain specific (914) (e.g., music domain, weather domain, messaging domain). In some examples, the electronic device (e.g., 800) determines that the command (e.g., 824C) is of a particular domain. In accordance with a determination that the command (e.g., 824C) is of a first domain, the indication (e.g., 810A, 810B, 810C) is a first type of indication. In accordance with a determination that the command (e.g., 824C) is of a second domain different from the first domain, the indication (e.g., 810A, 810B, 810C) is a second type of indication different from the first type of indication.

Providing domain specific indications quickly informs the user (e.g., 820) whether the digital assistant was able to transmit the instructions for the command (e.g., 824C) successfully. Associating particular visual, audio, or digital voice indicators with particular domains provide the user quickly with an improved user interface that allows the user quickly to quickly determine whether more action needs to be taken if the command (e.g., 824C) was not successfully carried out. For example, when the user quickly says "love that song" a particular tone that is played and associated with the command informs the user (e.g., 820) quickly that the digital assistant has added the song to a favorites list, without the user quickly having to verify it was added. This reduces the cognitive burden on the user quickly as the association of the success tone with a particular action in a particular domain provides immediate confirmation that the task was carried out. Further, the feedback of the state of the digital assistant allows the user (e.g., 820) to use the digital assistant more quickly and efficiently.

In some embodiments, the electronic device (e.g., 800) is paired (916) to the first external device (e.g., 814, 818) (e.g., a paired lamp, tv, computer, phone or watch).

In some embodiments, in accordance with a determination, using the first gaze information, that the set of one or more gaze criteria is not met (e.g., user breaks gaze; user is not looking at an external device for a threshold period of time) for the first external device (e.g., 814, 818), the electronic device (e.g., 800) forgoes transmitting the instruction to transition the first external device (e.g., 818) from the first state to the second state. In some examples, the digital assistant does not perform the command (e.g., 824C), when the set of one or more gaze criteria is not met.

In some embodiments, the set of one or more gaze criteria includes a field of view criterion that is met when a determined offset angle (e.g., 810) is less than a threshold offset angle (e.g., 804) (e.g., the maximum acceptable deviation from the user looking directly at the device; a non-zero threshold offset angle; the threshold offset angle is greater than zero degrees), wherein the determined offset angle (e.g., 810) is an angle formed between: a line-of-sight (e.g., 812) (e.g., determined from the gaze information) of a gaze of a user, and a calculated line-of-sight (e.g., 808) from the user (e.g., 820) to the first external device (e.g., 818). In some examples, if the first external device (e.g., 818) is determined to be positioned more than a threshold number of degrees (e.g., outside the field of view (e.g., 806) of the gaze), the first external device (e.g., 818) is not in the user's gaze and the instruction is not sent to the first external device (e.g., 818). In some examples, when the first external device (e.g., 818) is in the field of view (e.g., 806) of the gaze by being within the threshold number of degrees, the digital assistant sends the instruction to the first external device (e.g., 818).

Using a field of view criterion as a gaze criteria allows the user's gaze to be detected without requiring the user to look directly at the external device (e.g., 818). Instead, as long as the external device (e.g., 818) is within a field of view of the user's gaze, the user's gaze satisfies the gaze criteria, allowing the electronic device (e.g., 800) to determine which external device (e.g., 814, 818) is intended. Using the field of view criterion allows the external device (e.g., 818) to be determined without requiring further interaction with the user, which enhances the operability of the digital assistant and makes the gaze detection by the electronic device (e.g., 800) more efficient (e.g., the external device (e.g., 818) is more easily identified since the external device (e.g., 818) does not have to be in the direct line-of-sight of the user (e.g., 820)).

In some embodiments, the line-of-sight (e.g., 812) of the gaze of the user (e.g., 820) is based on a head position of the user (e.g., 820) (e.g., the same user from whom the audio user input request was received). In some examples, the user's head position may be affected by the tilt or rotation (e.g., yaw, pitch, and roll) of the user's head. In some examples, head position tracking is used to determine whether the first external device (e.g., 818) is in the field of view (e.g., 806).

In some embodiments, the set of one or more gaze criteria includes a dwell time criterion that is met for the first external device (e.g., 818) when a dwell time (e.g., duration) of the gaze determined from the first gaze information is more than a threshold period of time (e.g., a non-zero period of time). In some examples, when the dwell time of the gaze of the user (e.g., 820) is less than a threshold amount of time.

In some embodiments, subsequent to the electronic device (e.g., 8000) transmitting (e.g., to the first external device (e.g., 818)) the instruction to transition the first external device (e.g., 818) from the first state to the second state, the electronic device (e.g., 800) provides an indication (e.g., 810A, 810B, 810C) (e.g., audio or visual) that the first external device (e.g., 818) is in the second state (e.g., the electronic device (e.g., 800) provides a visual indication (e.g., 810A) to indicate that the first external device (e.g., 818) has turned on). In some examples, the electronic device (e.g., 800) provides a different indication (e.g., 810A, 810B, 810C) when the command (e.g., 824C) was not able to be executed (e.g., the first external device (e.g., 818) is still in the first state).

In some embodiments, while the first external device (e.g., 818) is in the first state and a second external device is in a third state and in accordance with a determination (and, optionally, in response to receiving the audio user input request), using the first gaze information, that the set of one or more gaze criteria is met for the second external device (e.g., appliance such as a lamp, tv, or computer): the electronic device (e.g., 800) transmits (e.g., to the first external device (e.g., 818)), based on the first command (e.g., 824C), an instruction to transition the second external device (e.g., 814) from the third state to a fourth state (e.g., the electronic device (e.g., 800) performs an action on the second external device (e.g., 814) by transitioning the second external device from an ON state to an OFF state or from an OFF state to an ON state).

In accordance with a determination (and, optionally, in response to receiving the audio user input request), using the first gaze information, that the set of one or more gaze criteria is not met for the second external device (e.g., 814) (e.g., appliance such as a lamp, tv, or computer): the electronic device (e.g., 800) forgoes transmitting (e.g., to the first external device), based on the first command (e.g., 824C), the instruction to transition the second external device (e.g., 814) from the third state to the fourth state (e.g., the electronic device (e.g., 800) forgoes performing an action on the second external device, such as forgoing transitioning the second external device from an ON state to an OFF state or from an OFF state to an ON state).

In some embodiments, while the first external device (e.g., 818) is in the second state (e.g., the first external device 9 e.g., 818) may also be in the first state) and a second external device (e.g., 814) is in a third state (918): the electronic device (e.g., 800) receives (920) a second user input request (e.g., a user speech input) including a second command (e.g., 826C).

The electronic device (e.g., 800) obtains (922), using one or more camera sensors (e.g., 816A, 816B), second gaze information (e.g., to transition the second external device (e.g., 814) to a second state, telling the digital assistant to turn on "that" light).

In accordance with a determination, using the second gaze information, that the set of one or more gaze criteria is met for the second external device (e.g., 814) (e.g., the second gaze identifies a second external device (e.g., 814) by satisfying gaze criteria such as the angle of the gaze being within a threshold number of degrees, gaze is in a particular direction, duration is greater than or equal to a predetermined time period): the electronic device (e.g., 800) transmits (924), based on the second command (e.g., 824C), an instruction to transition the second external device (e.g., 814) from the third state to a fourth state (e.g., changing the state of the second external device (e.g. 814): the floor lamp turned on) while the first external device (e.g., 818) remains in the second state (e.g., without changing the state of the first external device: the table lamp remains on).

In some embodiments, while the second external device (e.g., 814) is in the third state and in accordance with a determination, using the second gaze information, that the set of one or more gaze criteria is not met for the second external device (e.g., 814) (e.g., second external device is not identified): the electronic device (e.g., 800) forgoes (926) transmitting the instruction to transition the second external device (e.g., 814) from the third state to the fourth state (e.g., second external device (e.g., 814) remains in the same state as before).

In some embodiments, subsequent to transmitting (e.g., to the second external device (e.g., 814) the instruction to transition the second external device (e.g., 814) from the third state to the fourth state, the electronic device (e.g., 800) provides an indication (e.g., 810A, 810B, 810C) (e.g., visual or audio indication) that indicates that the second external device (e.g., 814) is in the fourth state (e.g., provide a visual (e.g., 810A) or audio (e.g., 810B) indication to indicate the second external device (e.g., 814) has changed state). In some examples, the electronic device (e.g., 800) provides a different indication (e.g., 810A, 810B, 810C) when the second command (e.g., 824C) was not able to be executed, (e.g., the second external device (e.g., 813) is still in the third state).

In some embodiments, subsequent to transmitting (e.g., to the first external device (e.g., 818)) the instruction to transition the first external device (e.g., 818) from the first state to the second state: the electronic device (e.g., 800) receives from the third external device (e.g. a watch or a phone), an indication of an input received by the third external device (e.g., 830) (e.g., rotation of a crown (e.g., 832) on a third external device). The electronic device (e.g., 800) transmits a second instruction, to the first external device (e.g., 818) based on a recency of the electronic device (e.g., 800) having instructed the first external device (e.g. 818) (e.g., a third instruction to transition the first external device (e.g., 818) (e.g., dim the brightness of the light of the table lamp after the table lamp has been turned on). In some examples, third external device (e.g., 830) doesn't know which external device (e.g., 814, 818) the third external device (e.g., 840) is interacting with. The third external device (e.g., 830) only receives the input and transmits the user input to the electronic device (e.g., 800), which is the device that figures out which external device (e.g., 814, 818) to send the instruction to (e.g., dim the light).

Using a third external device (e.g., 830) to further control the most recent external device (e.g., 818) that the electronic device (e.g., 800) sent an instruction to, provides the user (e.g., 820) with additional user interfaces to have more control over the external device (e.g., 818).

Providing a user (e.g., 820) with additional user interfaces and mechanisms for control devices without having to go through the digital assistant provides more efficient user interfaces and reduces the number of interactions needed with the digital assistant to perform a command. Rather than having to interact with the digital assistant to process additional commands, the user (e.g., 820) may simply use an external device (e.g., 830) to provide more precise input that is sometimes difficult to explain in words. Receiving additional user input based on input received from a third external device (e.g., 840), enhances the operability of the digital assistant and makes the user interface of controlling external devices (e.g., 818) more efficient as additional commands are not needed.

Note that details of the processes described above with respect to method 900 (e.g., FIGS. 9A-9B are also applicable in an analogous manner to the methods described below/above. For example, method 900 optionally includes one or more of the characteristics of the various methods described above with reference to method 700 and below with reference to method 1100. For example, method 900 may include one or more of the characteristics of the various methods described above and below with reference to the processes in FIGS. 7A, 7B, 11A, and 11B. For brevity, these details are not repeated below.

It should be understood that the particular order in which the operations in the following FIGS. 7A-7B and 11A-11B have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of the methods and processes described throughout this description may be incorporated with one another.

FIGS. 10A-10D illustrate exemplary user interfaces for providing different indicators to indicate the digital assistant's recognition of various users (e.g., 1020, 1030) speaking commands in a room, once the digital assistant has been activated, in accordance with some embodiments. The digital assistant is activated based on a trigger word, a gaze as discussed above with respect to method 700, a button press, a wrist raise while the user is wearing a wearable electronic device (e.g., a watch) (e.g., FIGS. 6E-6G), and/or the user pointing an external device (e.g., a phone) at electronic device 1000. In some examples, the electronic device 1000 activates the digital assistant in response to determining that a user (e.g., 1020, 1030) is looking at electronic device 1000 (e.g., in accordance with a determination that a set of one or more activation criteria are met using gaze information, as discussed above) and receives commands once the digital assistant is activated. The techniques illustrated in FIGS. 10A-10D also optionally include aspects of method 900 and the techniques described with respect to FIGS. 8A-8L, which illustrate an electronic device using the user's gaze to determine a particular external object (e.g., table lamp 1018, floor lamp) associated with the command. The techniques in these figures are used to illustrate the processes described below, including the processes in FIGS. 11A-11B.

Figure 10A:
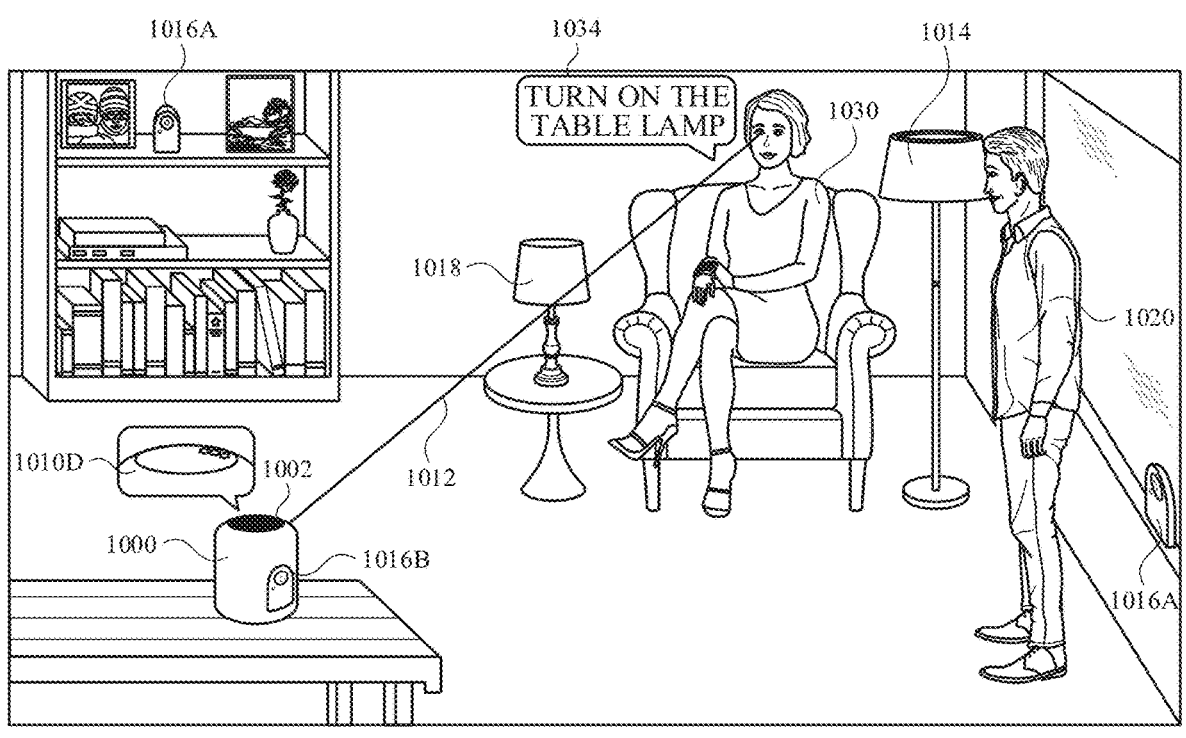
FIGS. 10A-10D illustrate exemplary techniques for providing indications that distinguish between different speakers.
Figure 10B:
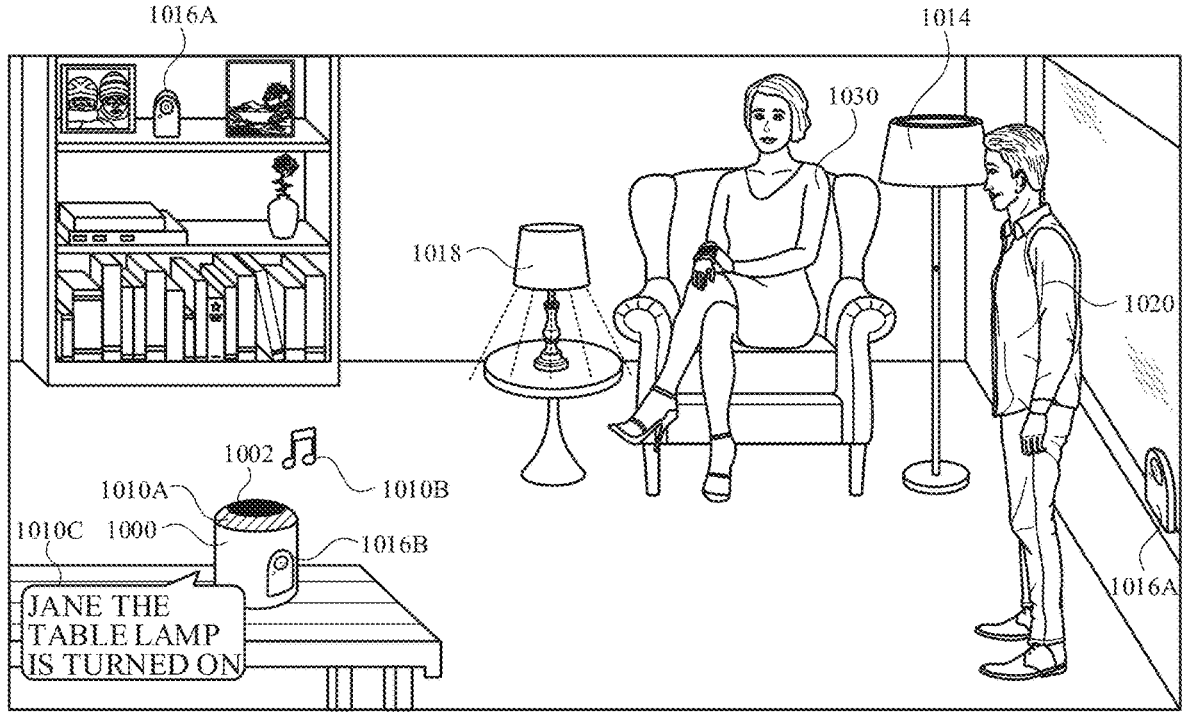

As illustrated in FIGS. 10A-10D, users Jane 1030 and Jack 1020 are in the same room as electronic device 1000. In FIG. 10A, the digital assistant of electronic device is activated, such as using aspects of the techniques described above. Electronic device 1000 receives a spoken command (e.g., 1024A, 1024B) from one or more users, (e.g., Jane 1030 and Jack 1020), to control various external devices, such a floor lamp 1014 or a table lamp 1018 in the room. In response to electronic device 1000 receiving the command (e.g., 1024A, 1024B), electronic device 1000 determines a user identity (e.g., 1020, 1030) of the particular user who spoke the command (e.g., 1024A, 1024B). In some embodiments, an external device (e.g., external cameras 1016A, a phone, or integrated camera 1016B) determines the user identity corresponding to the command, and sends the user identity to electronic device 1000. In some embodiments, electronic device 1000 obtains information about the user speaking using an external or internal device (e.g., external cameras 1016A, a phone, or integrated camera 1016B). In some embodiments, the electronic device 1000 uses the obtained information to perform facial recognition, voice recognition, or to calculate a distance to the user speaking to determine a user identity.

In some embodiments, prior to the electronic device activating the digital assistant, users Jane 1030 and Jack 1020 have optionally registered user profiles that are stored on electronic device 1000. In some embodiments, the user profiles are stored on a server and are accessible by electronic device 1000. The user profiles include settings and preferences (e.g., type of accent for the digital assistant voice, the gender for the digital assistant voice, indicator tones, LED light colors) that the electronic device may use to customize indicators 1010A, 1010B, 1010C used by the electronic device to indicate when the digital assistant is activated or when a command 1024A, 1024B has been successfully or unsuccessfully performed. For example, the user may customize the digital indicator settings by providing a value for each characteristic of the indicator. In some examples, the characteristics of the indicator include the type (e.g., visual, audio, voice confirmation or a combination of any of the types), a light color for a visual indicator, a tone for an audio indicator, and customizations (e.g., language, type of accent and gender) for the digital voice. The user profile also optionally stores information about the user provided by users Jane 1030 and Jack 1020 during registration with the user's consent, such as the user's name, birthdate, gender, and/or address. The user profile settings and preferences may be updated at any time. The techniques for user registration on electronic device 1000 described here may be used above in combination with methods 700 and 900 with reference to the processes in FIGS. 7A, 7B, 9A, and 9B. For brevity, these details are not repeated above.

In FIG. 10A, electronic device 1000 receives command 1024A, "turn on the table lamp," from Jane 1030 when the digital assistant is activated. As electronic device 100 is receiving the command 1024A being spoken by Jane 1030 (or after receiving the command 1024A spoken by Jane 1030), electronic device 1000 determines that the speaker is Jane 1030. For example, device 1000 uses the external cameras 1016A, integrated camera 1016B, and/or microphones, determines that the received command 1024A is coming from the direction in which Jane 1030 is sitting. Accordingly, electronic device 1000 displays a light pattern 1010D (e.g., three illuminated dots) on display 1002 in a position that corresponds to the direction in which Jane 1030 is sitting. In some embodiments, electronic device 1000 displays an animated light pattern 1010D on display 1002, where the light pattern is animated to point to the direction in which Jane 1030 is sitting.

In FIG. 10A, when the digital assistant determines that the speaker of command 1024A is Jane 1030, electronic device 1000 updates a value of a characteristic (e.g., a color of a light, a particular sound, words, or a specific digital assistant voice) of an indicator (e.g., visual 1010A, audio 1010B, or a digital assistant confirmation 1010C) to a value corresponding to Jane 1030 (e.g., a purple light, a two-note tone, Jane's name, a British accent, female voice). In some embodiments, the value of the characteristic is a value obtained from Jane's user profile. For example, the electronic device sets the color of light pattern 1010D (e.g., three illuminated dots) on display 1002 to be a color (such as purple) that corresponds to Jane 1030. As a result, electronic device 1000 indicates to Jane 1030 and Jack 1020 that device 1000 has recognized the speaker as Jane 1030 and that one or more of the preferences of Jane 1030 will be used.

Figure 10C:
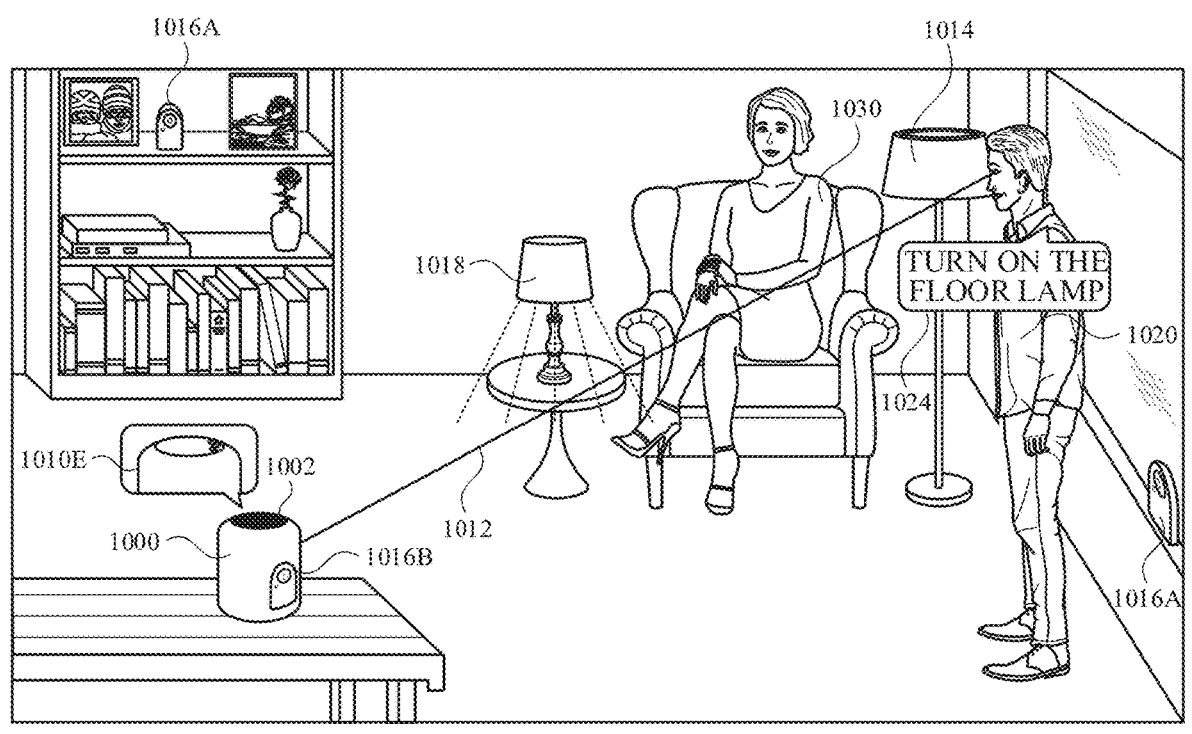
Figure 11A:
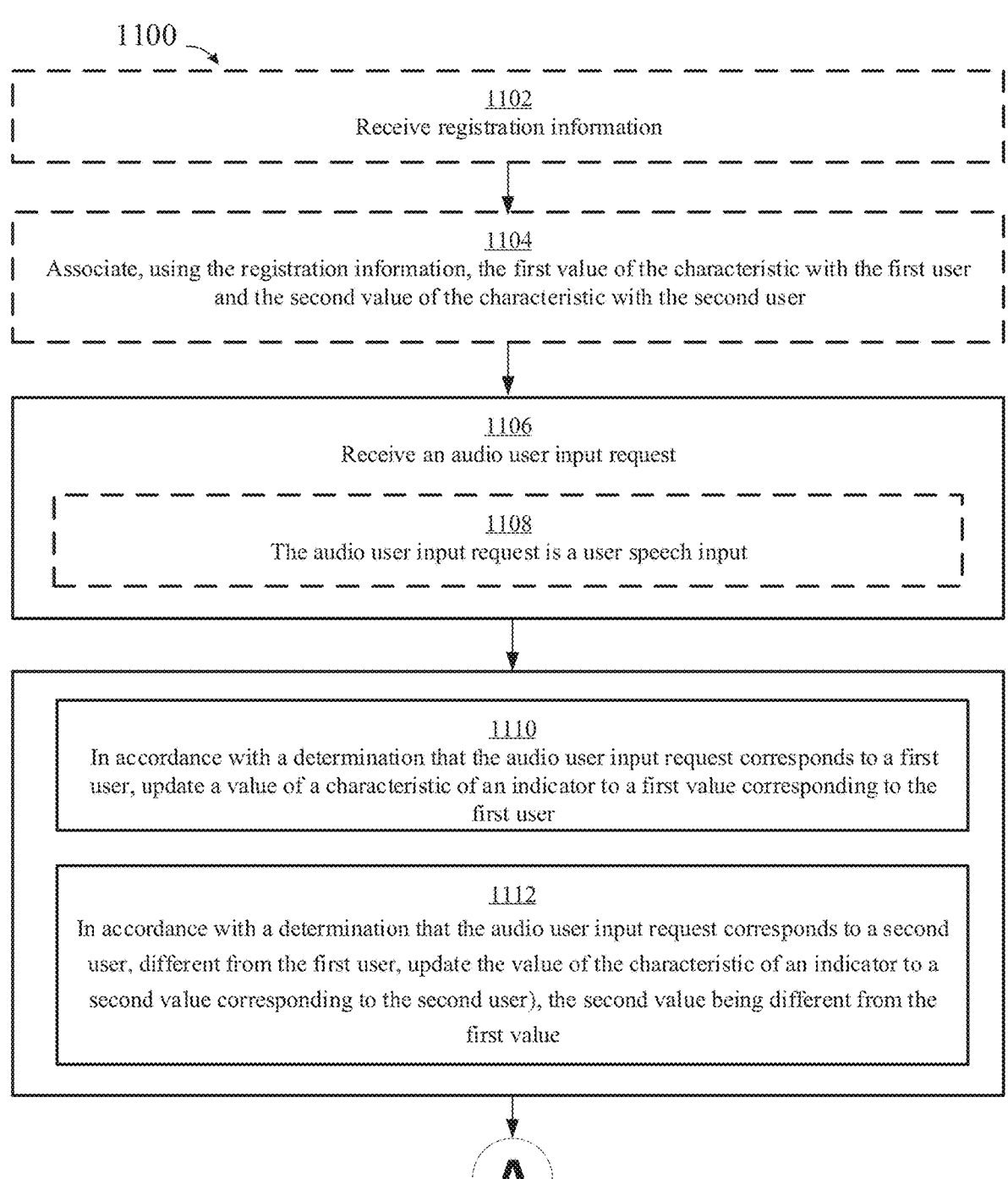
FIGS. 11A-11B are flow diagrams illustrating a method for providing indications that distinguish between different speakers.
Figure 11B:
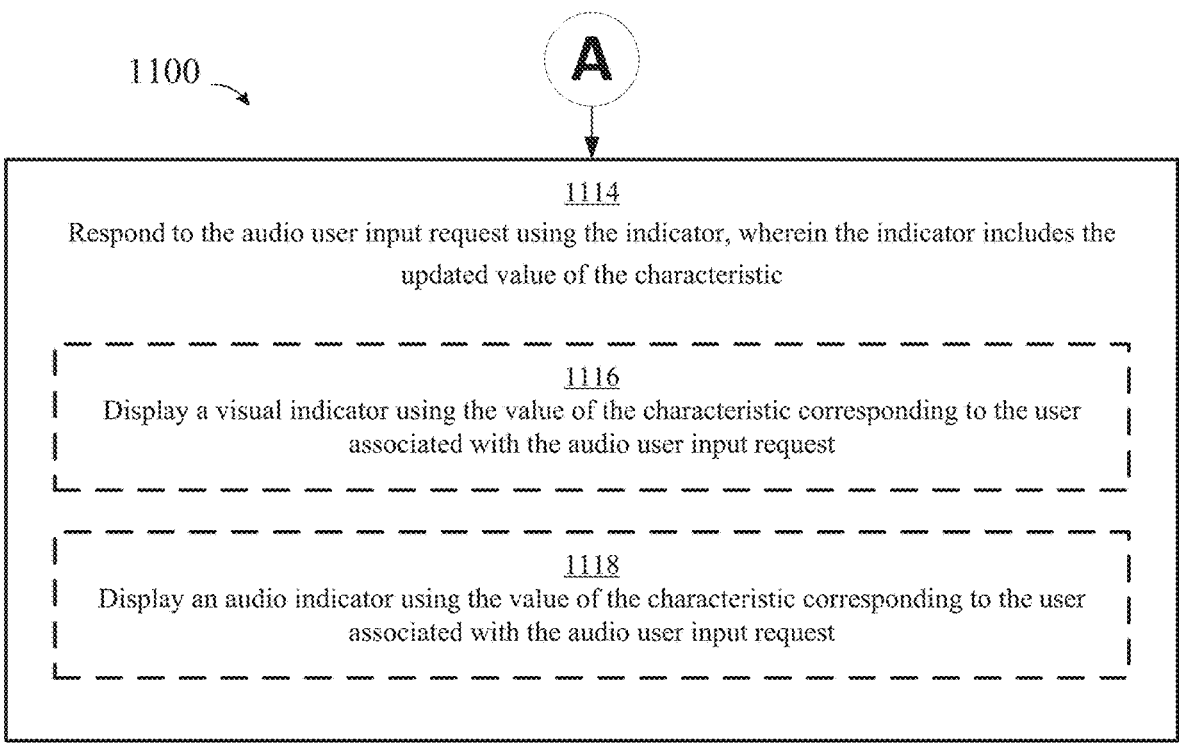

In contrast, in FIG. 10C when the digital assistant determines that the speaker of command 1024B is Jack 1020, who is a different user than Jane 1030, electronic device 1000 updates the value of the characteristic (e.g., a color of a light, a sound, or a digital assistant voice) of the indicator (e.g., a visual indicator or an audio indicator) to a value corresponding to Jack 1020 (e.g., a blue light, a one-note tone, Jack's name, an Australian accent, male voice), where the value of the characteristic associated with Jack 1020 is different form the value of the characteristic associated with Jane 1030. For example, the electronic device sets the color of light pattern 1010E (e.g., three illuminated dots) on display 1002 to be a color (such as blue) that corresponds to Jack 1020. As a result, electronic device 1000 indicates to Jane 1030 and Jack 1020 that device 1000 has recognized the speaker as Jack 1020 and that one or more of the preferences of Jack 1020 will be used.

In some embodiments, Jack 1020 and Jane 1030 may have values of characteristics associated with each person that are the same. For example, Jack 1020 and Jane 1030 may both choose the American, female, digital assistant voice. In some embodiments, the values of the characteristic of the indicators associated with each user is unique. For example Jane 1030 and Jack 1020 may have different light colors (e.g., purple for Jane vs. blue for Jack) and different sounds (e.g., two note sound vs. one note sound) associated with the respective user.

In FIG. 10B, once electronic device 1000 has identified that Jane 1030 is speaking the command 1024A, electronic device 1000 determines whether a set of one or more performance criteria are met, as discussed above with respect to method 900. The set of one or more performance criteria includes one or more of: a completion criterion, an actionable criterion, and an activation criteria. When the set of one or more performance criteria are met, electronic device 1000 performs the action, such as transmitting the instructions to floor lamp 1014 to be turned on.

When electronic device 1000 has performed command 1024A, electronic device 1000 optionally provides an indicator (e.g., indicator 1010A, 1010B, 1010C) using Jane's 1030 preferences to indicate that the command has been successfully performed. The types of indicators (e.g., visual, audio, and digital voice confirmations) and their characteristics are discussed above with respect to method 700 and 900. In FIG. 10B, electronic device 1000 has determined that the speaker is Jane 1030 and, based on that determination, provides a confirmation using a female digital assistant voice confirmation with an American accent, "Jane, the floor lamp has been turned on." The name "Jane" is obtained from Jane's 1030 user profile, which Jane 1030 provided during registration. Electronic device 1000 uses a female American accent based on a previous preference stored as part of Jane's 1030 user profile. A purple light pattern may be displayed as the visual indicator on electronic device 1000 to indicate that the digital assistant has processed Jane's command 1024A. A tone associated with Jane 1030 may also be played as the audio indicator on electronic device 1000 to indicate that the digital assistant has processed Jane's command 1024A. As a result, both Jane 1030 and Jack 1020 recognize that Jane was identified as the speaker.

FIG. 10C similarly illustrates Jack 1020 speaking command 1024B "turn on the floor lamp." Electronic device 1000 determines that the speaker is Jack 1020 using, for example, external cameras 1016A, integrated camera 1016B, and/or microphones to determine that the command 1024B is coming from the direction in which Jack 1030 is sitting. In response, electronic device 1000 displays a light pattern 1010E (e.g., three illuminated dots) on display 1002 in a position that corresponds to the direction in which Jack 1020 is standing. In some embodiments, electronic device 1000 displays an animated light pattern 1010E on display 1002, where the light pattern is animated to point to the direction in which Jack 1020 is standing. For example, the electronic device sets the color of light pattern 1010E (e.g., three illuminated dots) on display 1002 to be a color (such as blue) that corresponds to Jack 1020. As a result, electronic device 1000 indicates to Jane 1030 and Jack 1020 that device 1000 has recognized the speaker as Jack 1020 and that one or more of the preferences of Jack 1020 will be used.

Figure 10D:
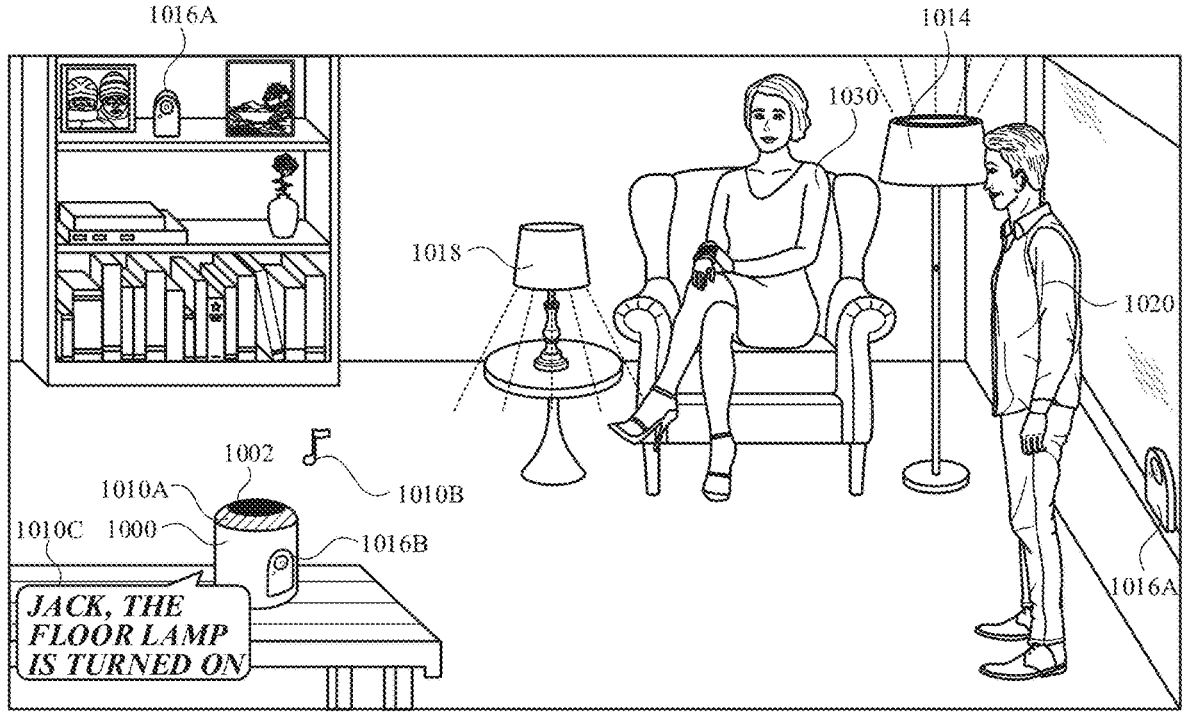

In FIG. 10D, once electronic device 1000 has identified that Jack 1020 is speaking the command 1024B, electronic device 1000 determines whether a set of one or more performance criteria are met, as discussed above with respect to method 900. The set of one or more performance criteria includes one or more of: a completion criterion, an actionable criterion, and an activation criteria. When the set of one or more performance criteria are met, electronic device 1000 performs the action, such as transmitting the instructions to floor lamp 1014 to be turned on.

When electronic device 1000 has performed command 1024B, electronic device 1000 optionally provides an indicator (e.g., indicator 1010A, 1010B, 1010C) using Jacks' 1020 preferences to indicate that the command has been successfully performed. The types of indicators (e.g., visual, audio, and digital voice confirmations) and their characteristics are discussed above with respect to method 700 and 900. In FIG. 10D, electronic device 1000 has determined that the speaker is Jack 1020 and, based on that determination, provides a confirmation using a male digital assistant voice with an Australian accent, "Jack, the table lamp has been turned on." The name "Jack" is obtained from Jack's 1030 user profile, which Jack 1020 provided during registration. Electronic device 1000 uses a male Australian accent based on a previous preference stored as part of Jack's 1020 user profile. A blue light pattern may be displayed as the visual indicator on electronic device 1000 to indicate that the digital assistant has processed Jack's command 1024B. The electronic device optionally plays a custom tone associated with Jack 1020 as the audio indicator to indicate that the digital assistant has processed Jack's command 1024B.

FIGS. 11A-11B are a flow diagrams illustrating a method 1100 using an electronic device in accordance with some embodiments. Method 1100 is performed at an electronic device (e.g., 100, 300, 500, 600, 640, 800, 1000). Some operations in method 1100 are, optionally, combined, the orders of some operations are, optionally, changed, and some operations are, optionally, omitted.

As described below, method 1100 provides an intuitive way for the digital assistant to show recognition of different users (e.g., 1020, 1030) by providing unique indicator for each person. The method reduces the cognitive burden on a user (e.g., 1020, 1030) because the user is able to confirm that the digital assistant processed the command of a particular user when multiple users are speaking commands in the room. Therefore, the digital assistant is able to provide immediate feedback to indicate which user's commands were processed.

After the digital assistant on the electronic device (e.g., 1000) has been activated based on a trigger word, gaze, and/or button press, electronic device 1000 receives (1106) an audio user input request (e.g., 1024A, 1024B). In some examples, in response to receiving the audio user input request (e.g., 1024A, 1024B), the electronic device (e.g., 1000) determines a user identity (e.g., a particular user (e.g., 1020, 1030)) corresponding to the audio user input request (e.g., 1024A, 1024B). In some examples, a remote device (e.g., cameras 1016) determines the user identity corresponding to the audio user input request (e.g., 1024A, 1024B) and the electronic device (e.g., 1000) receives results of the determination.

In some embodiments, prior to the electronic device (e.g., 1000) receiving the audio user input request (e.g., 1024A, 1024B), the electronic device (e.g., 1000) receives (1102) registration information (e.g., user profile information). In some embodiments, the electronic device (e.g., 1000) associates (1104), using the registration information, a first value of a characteristic (e.g., a light, a sound, a digital assistant voice) of an indicator (e.g., 1010A, 1010B, 1010C) of electronic device (e.g., 1000) with a first user (e.g., 1020) (and not the second user) and a second value of the characteristic of an indicator of electronic device (e.g., 1000) with a second user (e.g., 1030) (and not the first user). In some examples, during a registration process, the electronic device (e.g., 1000) receives a name of a user and later associates the name with the voice of the user (e.g., 1020, 1030). In some examples, during a registration process, the electronic device (e.g., 1000) associates a color of a visual indicator (e.g., LED color) to the user (e.g., 1020, 1030).

Associating values of a characteristic of the indicator (e.g., 1010A, 1010B, 1010C) with preferences from the user's user profile, enables the digital assistant to provide feedback to confirm the digital assistant has identified the specific user (e.g., 1020, 1030) speaking the command. Providing customized feedback to confirm the user (e.g., 1020, 1030) enhances the operability of the digital assistant and makes the user-device interface more efficient (e.g., the user (e.g., 1020, 1030) knows the digital assistant has processed the user's command (e.g., 1024A, 1024B)) by providing confirmation to the user (e.g., 1020, 1030) using the user's preferences in the indicator (e.g., 1010A, 1010B, 1010C). This reduces the cognitive burden on the user (e.g., 1020, 1030) as the association of the success indicator with a particular user's settings provides immediate confirmation that the task was carried out and reduces the confusion when there are multiple users speaking simultaneously or other speakers in the background. Further, the feedback of the state of the digital assistant allows the user (e.g., 1020, 1030) to use the digital assistant more quickly and efficiently.

The electronic device receives (1106) an audio user input request.

In some embodiments, the audio user input request (e.g., 1024A, 1024B) is a user speech input (e.g., utterance, a command) and the updating of (1108) the value of the characteristic (e.g., a light, a sound, a digital assistant voice) is not based on transcribed contents of the audio user input request (e.g., 1024A, 1024B) (e.g., the value of the characteristic is not based on the words said by the user, but instead is based on the identity of the user).

In accordance with a determination that the audio user input request corresponds to a first user (e.g., 1020) (and, optionally, in response to receiving the audio user input request), the electronic device (e.g., 1000) updates (1110) a value of a characteristic (e.g., a color of a light, a sound, or a digital assistant voice) of an indicator (e.g., 1010A, 1010B, 1010C) (e.g., a visual indicator, an audio indicator, or a digital assistant voice confirmation) to a first value corresponding to the first user (e.g., 1020) (e.g., the value of the characteristic is associated with the identity of the first user).

In accordance with a determination that the audio user input request corresponds to a second user (e.g., 1030) (and, optionally, in response to receiving the audio user input request), different from the first user, electronic device (1000) updates (1112) the value of the characteristic (e.g., a color of a light, a sound, or a digital assistant voice) of the indicator (e.g., 1010A, 1010B, 1010C) (e.g., a visual indicator, an audio indicator, or a digital assistant voice confirmation) to a second value corresponding to the second user (e.g., 1030) (e.g., the value of the characteristic is associated with the identity of the second user), the second value being different from the first value.

The electronic device (e.g., 1000) responds (1114) to the audio user input request (e.g., 1024A, 1024B) using the indicator (e.g., 1010A, 1010B, 1010C) (e.g., the electronic device (e.g., 1000) displays a light, plays a sound, using a particular digital assistant voice, or using the user's name in the response), wherein the indicator (e.g., 1010A, 1010B, 1010C) includes the updated value of the characteristic (e.g., a color of a light, a sound, or a digital assistant voice).

In some embodiments, the electronic device (e.g., 1000) responding to the audio user input request (e.g., 1024A, 1024B) using the indicator (e.g., 1010A, 1010B, 1010C) includes the electronic device (e.g., 1000) displaying (1116) a visual indicator (e.g., 1010A) (e.g., light) using the value of the characteristic (e.g., light color, position of displayed light) corresponding to the user associated with the audio user input request (e.g., 1024A, 1024B).

In some embodiments, the electronic device (e.g., 1000) responding to the audio user input request (e.g., 1024A, 1024B) using the indicator includes the electronic device (e.g., 1000) providing (1118) an audio indicator (e.g., 1010B) (e.g., a voice, a sound) using the value of the characteristic (the value of the characteristic could be an accent, gender, pitch, voice, sound, or a particular digital assistant voice, such as American, Female digital assistant voice) corresponding to the user (e.g., 1020, 1030) associated with the audio user input request (e.g., 1024A, 1024B). In some examples, the user selected the American, Female digital assistant voice in the digital assistant voice settings as indicated in the user profile of the user (e.g., 1020, 1030).

In some embodiments, the indicator is a visual indicator (e.g., 1010A) and in response to the electronic device (e.g., 1000) receiving the audio user input request (e.g., 1024A, 1024B) and prior to the determination that the audio user input request (e.g., 1024A, 1024B) corresponds to a particular user (e.g., 1020, 1030), the electronic device (e.g., 1000) displays the visual indicator (e.g., 1010A) with a default value (e.g., white light) of the characteristic (e.g., displaying a first light color when the digital assistant is activated). In some embodiments, the default value of the characteristic is different from the first value and the second value.

In some embodiments, the characteristic of the audio indicator (e.g., 1010B) (e.g., the digital assistant providing confirmation using words) is a term (e.g., a word, a name of) corresponding to a user associated with (e.g., that provides) the audio user input request (e.g., 1024A, 1024B).

Using the name of the user (e.g., 1020, 1030) in the digital assistant voice confirmation indicator (e.g., 1010C) enables the digital assistant to provide feedback to confirm the digital assistant has identified the specific user (e.g., 1020, 1030) speaking the command. Providing customized feedback to confirm the user (e.g., 1020, 1030) enhances the operability of the digital assistant and makes the user-device interface more efficient (e.g., the specific user (e.g., 1020, 1030) knows the digital assistant has processed the user's command (e.g., 1024A, 1024B). This reduces the cognitive burden on the user (e.g., 1020, 1030) as the use of the user's name provides immediate confirmation that the task was carried out and reduces the confusion when there are multiple users (e.g., 1020, 1030) speaking simultaneously or other speakers in the background. Further, the feedback of the state of the digital assistant allows the user (e.g., 1020, 1030) to use the digital assistant more quickly and efficiently.

In some embodiments, the electronic device (e.g., 1000) determines a user associated with the audio user input request based on one or more of voice recognition, facial recognition, and a direction of the audio user input request.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to better enable users to control electronic devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to personalize device interactions. Accordingly, use of such personal information data enables users to more easily control electronic devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of digital assistants, user gaze, and user profiles, the present technology can be configured to allow users to select to "opt in" or "opt out" of participation in the collection of personal information data during registration for services or anytime thereafter. In another example, users can select not to provide personal information for user profiles. In yet another example, users can select to limit the length of time personal information is maintained or entirely prohibit the development of a baseline profile. In addition to providing "opt in" and "opt out" options, the present disclosure contemplates providing notifications relating to the access or use of personal information. For instance, a user may be notified upon downloading an app (e.g., a digital assistant app) that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can interact with electronic devices based on non-personal information data or a bare minimum amount of personal information.

What is claimed is:

1. An electronic device that is configured to communicate with a display generation component and one or more cameras, the electronic device comprising:

one or more processors; and memory storing one or more programs configured to be executed by the one or more processors, the one or more programs including instructions for:

obtaining, using the one or more cameras, information about a respective user including a respective direction of the respective user relative to the electronic device and whether the electronic device is within a field of view of the respective user;

in accordance with a determination that the electronic device is within the field of view of the respective user and a determination that the respective user is a first user and the respective direction is a first direction:

displaying, via the display generation component, a first visual indicator corresponding to the first user, wherein the first visual indicator is displayed in a first position corresponding to the first direction of the first user relative to the electronic device; and in accordance with a determination that the electronic device is within the field of view of the respective user and a determination that the respective user is a second user, different from the first user, and the respective direction is a second direction:

displaying, via the display generation component, a second visual indicator corresponding to the second user, wherein the second visual indicator is displayed in a second position corresponding to the second direction of the second user relative to the electronic device.

2. The electronic device of claim 1, the one or more programs further including instructions for:

prior to obtaining information about the respective user via the one or more cameras, receiving registration information; and associating, using the registration information, the first visual indicator with the first user and the second visual indicator with the second user.

3. The electronic device of claim 1, the one or more programs further including instructions for:

determining that the respective user is the first user or the second user based on one or more of voice recognition, facial recognition, and the respective direction of the respective user.

4. The electronic device of claim 1, the one or more programs further including instructions for:

receiving an audio user input request from the respective user;

in accordance with a determination that the respective user is the first user, responding to the audio user input request using the first visual indicator; and in accordance with a determination that the respective user is the second user, responding to the audio user input request using the second visual indicator.

5. The electronic device of claim 4, wherein responding to the audio user input request includes providing an audio indicator corresponding to a user associated with the audio user input request.

6. A non-transitory computer-readable storage medium storing one or more programs configured to be executed by one or more processors of an electronic device that is in communication with a display generation component and one or more cameras, the one or more programs including instructions for:

obtaining, using the one or more cameras, information about a respective user including a respective direction of the respective user relative to the electronic device and whether the electronic device is within a field of view of the respective user;

in accordance with a determination that the electronic device is within the field of view of the respective user and a determination that the respective user is a first user and the respective direction is a first direction:

displaying, via the display generation component, a first visual indicator corresponding to the first user, wherein the first visual indicator is displayed in a first position corresponding to the first direction of the first user relative to the electronic device; and in accordance with a determination that the electronic device is within the field of view of the respective user and a determination that the respective user is a second user, different from the first user, and the respective direction is a second direction:

displaying, via the display generation component, a second visual indicator corresponding to the second user, wherein the second visual indicator is displayed in a second position corresponding to the second direction of the second user relative to the electronic device.

7. The non-transitory computer-readable storage medium of claim 6, the one or more programs further including instructions for:

prior to obtaining information about the respective user via the one or more cameras, receiving registration information; and associating, using the registration information, the first visual indicator with the first user and the second visual indicator with the second user.

8. The non-transitory computer-readable storage medium of claim 6, the one or more programs further including instructions for:

determining that the respective user is the first user or the second user based on one or more of voice recognition, facial recognition, and the respective direction of the respective user.

9. The non-transitory computer-readable storage medium of claim 6, the one or more programs further including instructions for:

receiving an audio user input request from the respective user;

in accordance with a determination that the respective user is the first user, responding to the audio user input request using the first visual indicator; and in accordance with a determination that the respective user is the second user, responding to the audio user input request using the second visual indicator.

10. The non-transitory computer-readable storage medium of claim 9, wherein responding to the audio user input request includes providing an audio indicator corresponding to a user associated with the audio user input request.

11. A method, comprising:

at an electronic device that is in communication with a display generation component and one or more cameras:

obtaining, using the one or more cameras, information about a respective user including a respective direction of the respective user relative to the electronic device and whether the electronic device is within a field of view of the respective user;

in accordance with a determination that the electronic device is within the field of view of the respective user and a determination that the respective user is a first user and the respective direction is a first direction:

displaying, via the display generation component, a first visual indicator corresponding to the first user, wherein the first visual indicator is displayed in a first position corresponding to the first direction of the first user relative to the electronic device; and in accordance with a determination that the electronic device is within the field of view of the respective user and a determination that the respective user is a second user, different from the first user, and the respective direction is a second direction:

displaying, via the display generation component, a second visual indicator corresponding to the second user, wherein the second visual indicator is displayed in a second position corresponding to the second direction of the second user relative to the electronic device.

12. The method of claim 11, further comprising:

prior to obtaining information about the respective user via the one or more cameras, receiving registration information; and associating, using the registration information, the first visual indicator with the first user and the second visual indicator with the second user.

13. The method of claim 11, the method further comprising:

determining that the respective user is the first user or the second user based on one or more of voice recognition, facial recognition, and the respective direction of the respective user.

14. The method of claim 11, further comprising:

receiving an audio user input request from the respective user;

in accordance with a determination that the respective user is the first user, responding to the audio user input request using the first visual indicator; and in accordance with a determination that the respective user is the second user, responding to the audio user input request using the second visual indicator.

15. The method of claim 14, wherein responding to the audio user input request includes providing an audio indicator corresponding to a user associated with the audio user input request.

16. The electronic device of claim 1, wherein:

the first visual indicator is displayed with a first color corresponding to a preference of the first user; and the second visual indicator is displayed with a second color corresponding to a preference of the second user.

17. The non-transitory computer-readable storage medium of claim 6, wherein:

the first visual indicator is displayed with a first color corresponding to a preference of the first user; and the second visual indicator is displayed with a second color corresponding to a preference of the second user.

18. The method of claim 11, wherein:

the first visual indicator is displayed with a first color corresponding to a preference of the first user; and the second visual indicator is displayed with a second color corresponding to a preference of the second user.

* * * * *